(12) United States Patent
Akiyama et al.

(10) Patent No.: US 7,792,428 B2
(45) Date of Patent: Sep. 7, 2010

(54) OPTICAL ADD/DROP MULTIPLEXER

(75) Inventors: Yuichi Akiyama, Kawasaki (JP);
Takafumi Terahara, Kawasaki (JP);
Hiroki Ooi, Kawasaki (JP); Jens C. Rasmussen, Kawasaki (JP); Akira Miura, Kawasaki (JP); Akihiko Isomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 619 days.

(21) Appl. No.: 11/204,184

(22) Filed: Aug. 16, 2005

(65) Prior Publication Data
US 2006/0034610 A1 Feb. 16, 2006

(30) Foreign Application Priority Data
Aug. 16, 2004 (JP) .............................. 2004-236836
Nov. 30, 2004 (JP) .............................. 2004-346685

(51) Int. Cl.
*H04B 10/00* (2006.01)
(52) U.S. Cl. .......................................... 398/83; 398/50
(58) Field of Classification Search .............. 398/88–93
See application file for complete search history.

(56) References Cited

U.S. PATENT DOCUMENTS

| 5,612,805 | A | 3/1997 | Fevrier |
| 5,953,141 | A * | 9/1999 | Liu et al. .................. 398/83 |
| 6,208,443 | B1 | 3/2001 | Liu et al. |
| 6,631,222 | B1 | 10/2003 | Wagener et al. ............. 385/16 |
| 6,694,073 | B2 | 2/2004 | Golub et al. ................. 385/18 |
| 7,027,732 | B2 * | 4/2006 | Paiam et al. ................ 398/50 |
| 7,184,666 | B1 * | 2/2007 | Li et al. ...................... 398/83 |
| 7,239,772 | B2 * | 7/2007 | Wang et al. ................. 385/17 |
| 7,254,293 | B1 * | 8/2007 | Helkey et al. .............. 385/18 |
| 7,254,336 | B2 * | 8/2007 | Harney et al. .............. 398/83 |
| 7,269,356 | B2 * | 9/2007 | Winzer ....................... 398/135 |
| 7,286,763 | B2 * | 10/2007 | Fishman et al. ............ 398/82 |
| 7,330,659 | B2 * | 2/2008 | Doerr ......................... 398/87 |
| 2002/0048065 | A1 * | 4/2002 | Shani ......................... 359/127 |
| 2002/0093707 | A1 * | 7/2002 | Katagiri et al. ............. 359/124 |
| 2002/0145781 | A1 | 10/2002 | Spock et al. |
| 2002/0186432 | A1 * | 12/2002 | Roorda et al. .............. 359/128 |
| 2002/0186434 | A1 * | 12/2002 | Roorda et al. .............. 359/128 |
| 2003/0002104 | A1 | 1/2003 | Caroli |
| 2003/0025956 | A1 | 2/2003 | Li et al. |
| 2003/0175029 | A1 | 9/2003 | Harney |

(Continued)

FOREIGN PATENT DOCUMENTS

EP 0687085 A 12/1995

(Continued)

OTHER PUBLICATIONS 200510092137.5, Jan. 12, 2007, Chinese Office Action with English translation of Claims rejected.

(Continued)

*Primary Examiner*—Agustin Bello
(74) *Attorney, Agent, or Firm*—Hanify & King, P.C.

(57) ABSTRACT

A core unit arranged in a transmission path includes a through path for causing an input signal to an input port to pass through to an output port, a drop-side port 25a that drops the input signal having a predetermined wavelength, and an add-side port 25b that adds channel having a predetermined wavelength to the input light.

13 Claims, 86 Drawing Sheets

U.S. PATENT DOCUMENTS

2004/0042795 A1* 3/2004 Doerr et al. .................... 398/83
2005/0013615 A1* 1/2005 Matsuda ...................... 398/83
2006/0045532 A1 3/2006 Yano

FOREIGN PATENT DOCUMENTS

| EP | 1271827 A | 1/2003 |
|---|---|---|
| JP | HEI 8-195972 A | 7/1996 |
| JP | 10-508437 | 8/1998 |
| JP | 2003-69499 | 3/2003 |
| JP | 2004-515798 A | 5/2004 |
| JP | 200642012 | 2/2006 |
| WO | 00/57665 | 9/2000 |
| WO | 02/075371 A | 9/2002 |

OTHER PUBLICATIONS

Notice of Rejection dated Nov. 17, 2009 received in corresponding Japanese application No. 2004-346685.
Extended European Search Report dated Nov. 3, 2009 received in corresponding EP Patent application 05017748.4-1237/1628424.
1D MEMS-Based Wavelength Switching Subsystem, Stew Mechels, Lilac Mutkr, G. Dave Mrlqy* and Doug Tiett, Network Photonits Inc. IEEE Communications Magazine Mar. 2003.
Notice of Reasons for Rejection dated Mar. 10, 2010 received in corresponding Japanese Patent Application No. 2004-346685.

* cited by examiner

FIG.2

| | OADM | ROADM | DOADM | DOADM WITH LIMITATION ON WAVELENGTH |
|---|---|---|---|---|
| CONFIGURATION EXAMPLE | DEMULTI-PLEXER (FIXED WAVE-LENGTH) / MULTI-PLEXER (FIXED WAVE-LENGTH) / DROP / ADD | DEMULTI-PLEXER (FIXED WAVE-LENGTH) / MULTI-PLEXER (FIXED WAVE-LENGTH) / DROP / ADD PORT | WSS (ARBITRARY WAVELENGTH) / WAVELENGTHS FOR ALL BANDS ARE VARIABLE | WSS (ARBITRARY WAVELENGTH) |
| ARBITRARY WAVELENGTH IS DROPPED TO ARBITRARY PORT | × | × HOWEVER, λ1 CAN BE DROP/ADD | ○ | △ (WAVELENGTH IS LIMITED) |
| ARBITRARY WAVELENGTH IS ADDED TO ARBITRARY PORT | × FIXED WAVELENGTH IS DROP/ADD TO FIXED PORT | × | ○ | △ (WAVELENGTH IS LIMITED) |
| RECONFIGURATION | × | ○ | ○ | ○ |

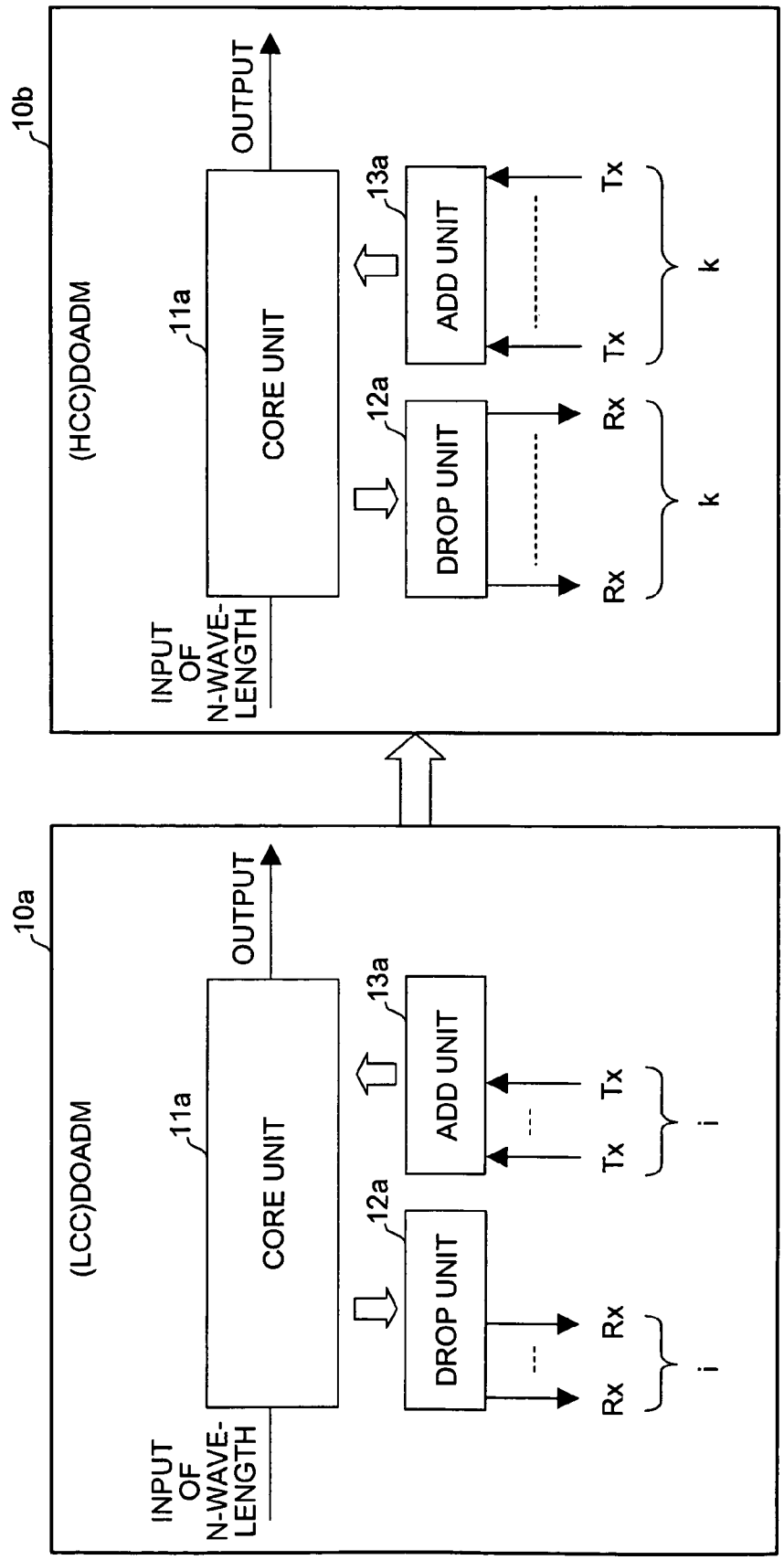

TO DROP UNIT   FROM ADD UNIT

TO DROP UNIT   FROM ADD UNIT

344c

344d

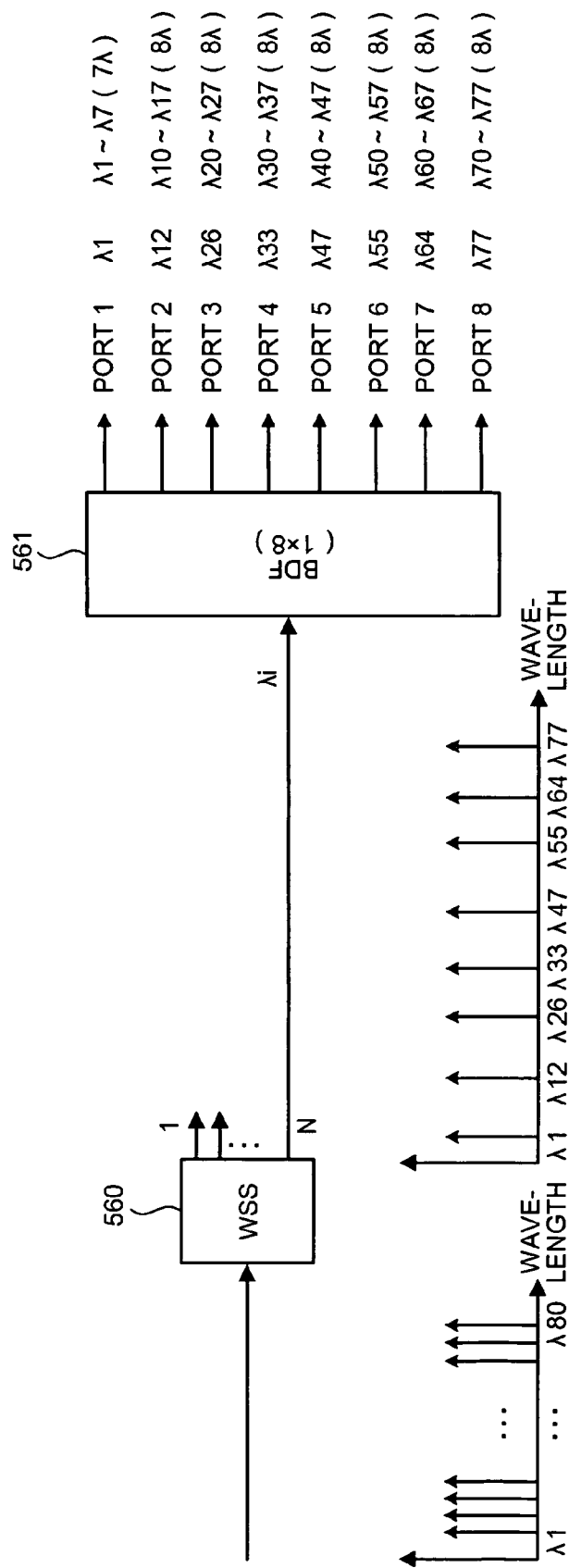

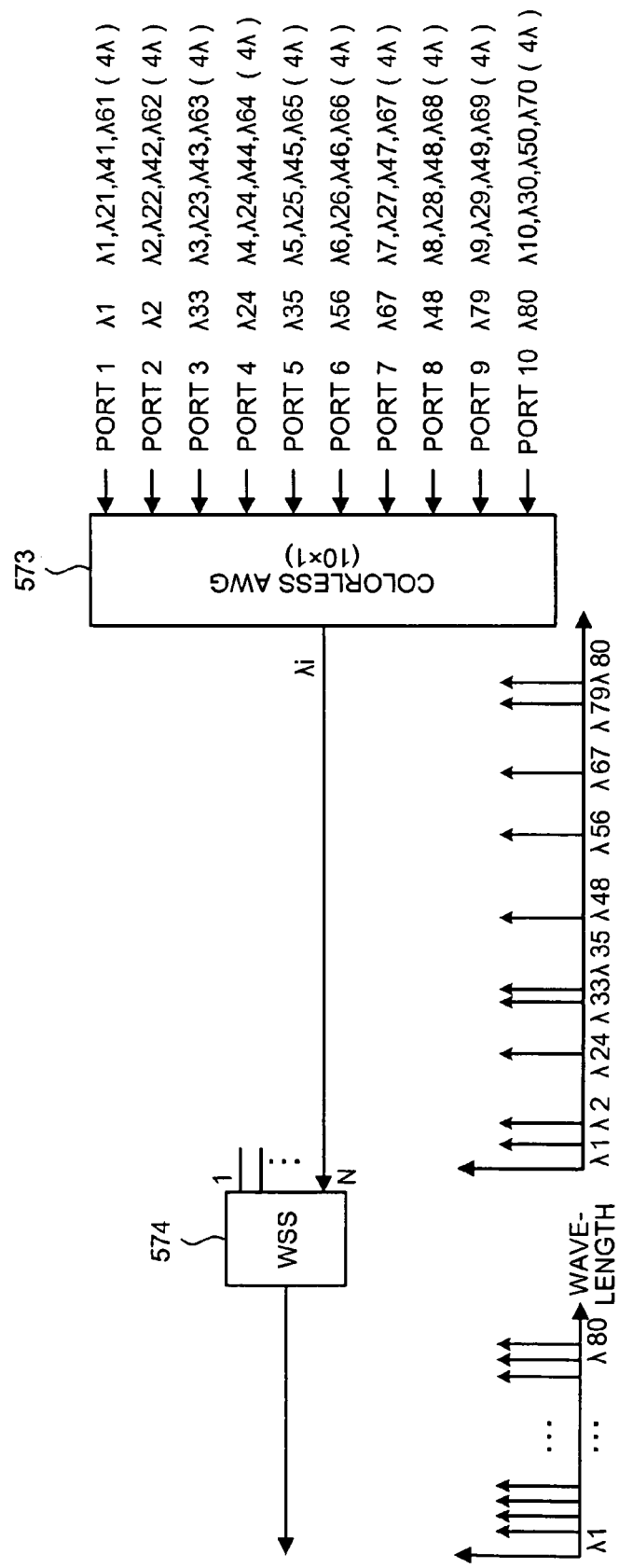

OPTICAL ADD/DROP MULTIPLEXER

CROSS-REFERENCE TO RELATED APPLICATIONS

This application is based upon and claims the benefit of priority from the prior Japanese Patent Application No. 2004-236836 and No. 2004-346685, filed on Aug. 16, 2004, and Nov. 30, 2004, the entire contents of which are incorporated herein by reference.

BACKGROUND OF THE INVENTION

1) Field of the Invention

The present invention relates to an optical add/drop multiplexer, and more particularly to an optical add/drop multiplexer in which a wavelength cross-connect function in a wavelength multiplexed optical transmission system and an optical add/drop function can be expanded.

2) Description of the Related Art

In recent years, with increasing traffic volume, there are demands for a large-capacity network. To meet the demands, an optical network using wavelength division multiplexing (WDM) is applied to a conventional basic network. In the optical network, the needs for a wavelength cross-connect function and an optical add/drop multiplexer (OADM) are increasing. With the wavelength cross-connection function, a destination to which an input light is output is changed for each wavelength of WDM light. Such a technology is disclosed in, for example, Japanese Patent Application Laid-Open Publication No. H8-195972. With the OADM, a signal light having an arbitrary wavelength is added to an arbitrary path, and then, dropped. Thus, the signal light is received. The OADM includes a wavelength selective switch (WSS). There are several types of the WSS such as one having a diffraction grating and a matrix switch using a micro electro mechanical system (MEMS) mirror using a MEMS technology, and one having a thin film filter and a matrix switch using the MEMS mirror.

From the viewpoint of a size and a cost of a device having the functions in the wavelength cross-connect function and of the OADM, it is preferable to make such functions expandable as required while the device is configured as small as possible upon its introduction, not just making the functions advanced. When the device is replaced with another one, optical fibers connected to the device have to be reconnected to the one replaced. However, because the number of optical fibers is as many as thousands, it takes a lot of time for the reconnection. Moreover, to carry out the reconnection, the signals being transmitted have to be disconnected. Therefore, it is desirable to realize a configuration (in-service upgrade) such that the functions can be expanded without disconnecting the signals being transmitted.

However, in the conventional configuration, a device is prepared by the number estimated, when a device is to be introduced, corresponding to the number of wavelengths and the number of switching routes to be demanded in the future. As a result, a size of the device required at the time of initial introduction becomes large, and introduction cost of the device at the time of initial introduction is increased.

FIG. 59 is a schematic of a transmission path and a wavelength cross-connect device in a network. Two rings of transmission paths A and B are connected to a wavelength cross-connect device 1300 that forms an optical add/drop multiplexer. The transmission path A includes two optical fibers 1301*a* and 1301*b*, while the transmission path B includes two optical fibers 1302*a* and 1302*b*. The wavelength cross-connect device 1300 switches a signal in four directions (a total of four routes of #1 to #4) through four lines of the optical fiber 1301*a* to the optical fiber 1302*b*. More specifically, the signal can be switched between a route #1 and a route #2, between the route #1 and a route #3, between the route #1 and a route #4, between the route #2 and the route #3, between the route #2 and the route #4, and the between the route #3 and the route #4.

FIG. 60 is a schematic of a configuration of an optical cross-connect. The case of using an 80×80 matrix switch 1310, in which the number of inputs and the number of outputs of wavelengths are 80 ($\lambda 1$ to $\lambda 80$), is explained below as an example. If it is predicted that the number of final routes (the number of transmission paths) is four after introduction of the device, the number of fibers for a signal having one wavelength is eight lines as "4 lines (for transmission signals)+4 lines (when all the wavelengths are targeted for adding/dropping)=8 lines". Therefore, the amount of 80/8=10 wavelengths is assigned to one matrix switch 1310.

If the number of routes upon initial introduction is two, input/output ports of the matrix switch 1310 for 40 lines obtained through "(2 lines (for transmission signals)+2 lines (for adding/dropping))×10 wavelengths" are used. Other input/output ports for the remaining 40 lines remain unused, which is wasteful. If prediction made upon the initial introduction is found incorrect and function expansion is required for the number of routes that is above the number predicted, the requirements may not be dealt with.

SUMMARY OF THE INVENTION

It is an object of the present invention to solve at least the above problems in the conventional technology.

An optical add/drop multiplexer for switching a light path for changing an input light that has multiplexed wavelengths and that is input to an input port to an output light for each wavelength that is led to output ports for a plurality of routes in each transmission path, and for dropping or adding a signal light that has a predetermined wavelength according to one aspect of the present invention includes a core unit. The core unit includes a through path that lets the input light pass through to the output port; a drop port for dropping the input light that has a predetermined wavelength; and an add port for adding the signal light to the input light.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 is a table for comparing functions of the optical add/drop multiplexers;

FIG. 3 is a schematic of function expansion from a low count channel DOADM to a high count channel DOADM;

FIG. 41A is a schematic of a configuration when the band division filter is used on the drop side as the grouping filter;

FIG. 42B is a schematic of a configuration when the colorless AWG is used on the add side as the grouping filter;

FIG. 45A is a schematic of a wavelength selective switch on the drop side separated as a block;

FIG. 45B is a schematic of a wavelength selective switch on the add side separated as a block;

FIG. 46A is a schematic of the optical add/drop multiplexer according to an embodiment of the present invention to realize a function of a wavelength cross-connect;

FIG. 46B is a graph of a relationship between number of channels for the add unit/drop unit and maximum number of routes for the wavelength cross-connect;

FIG. 47 is a schematic for explaining expansion of ports for routes of the optical add/drop multiplexer shown in FIG. 46A;

FIG. 48 is a schematic for explaining another expansion of ports for routes of the optical add/drop multiplexer shown in FIG. 46A;

Figure 49:
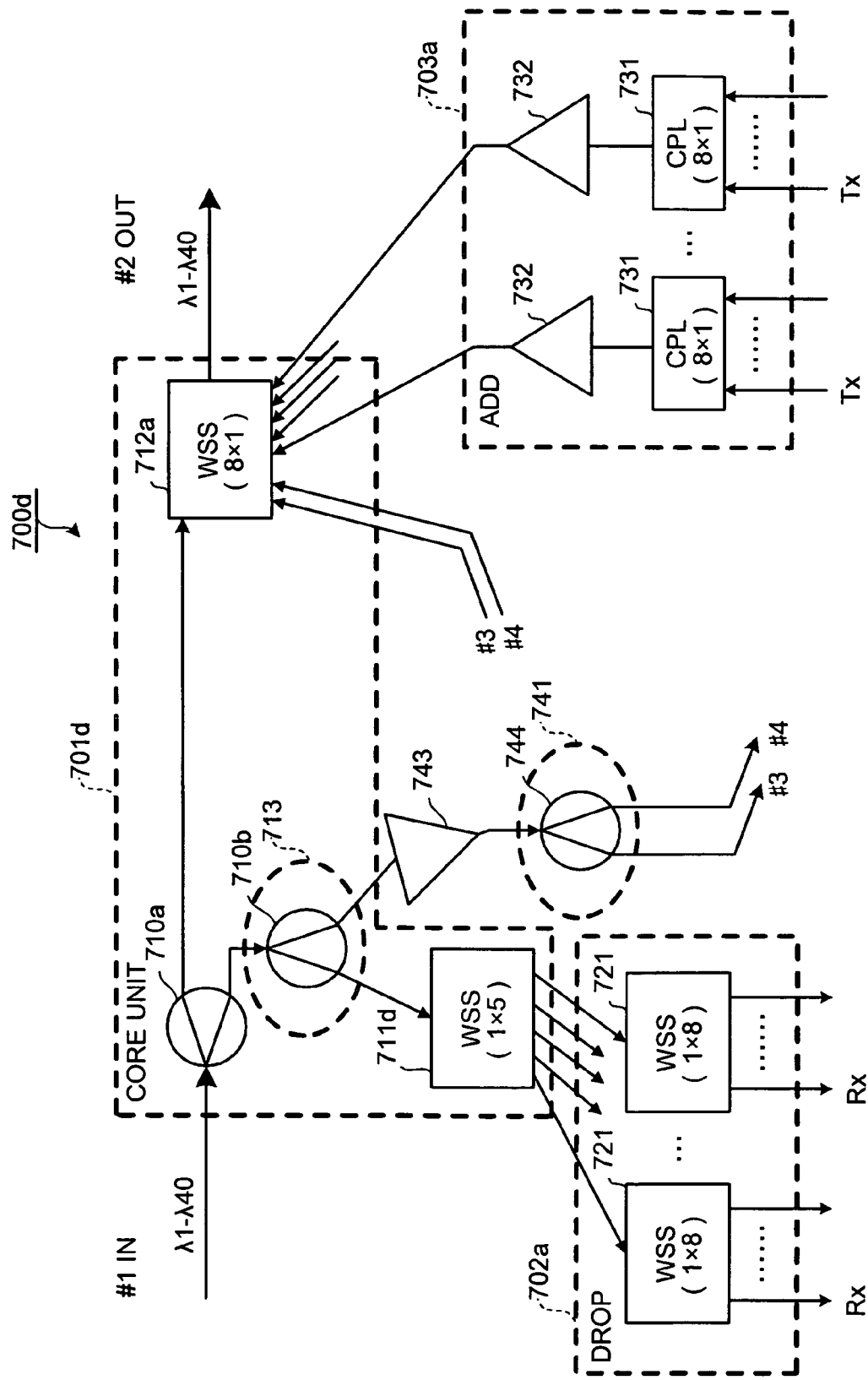
Figure 50:
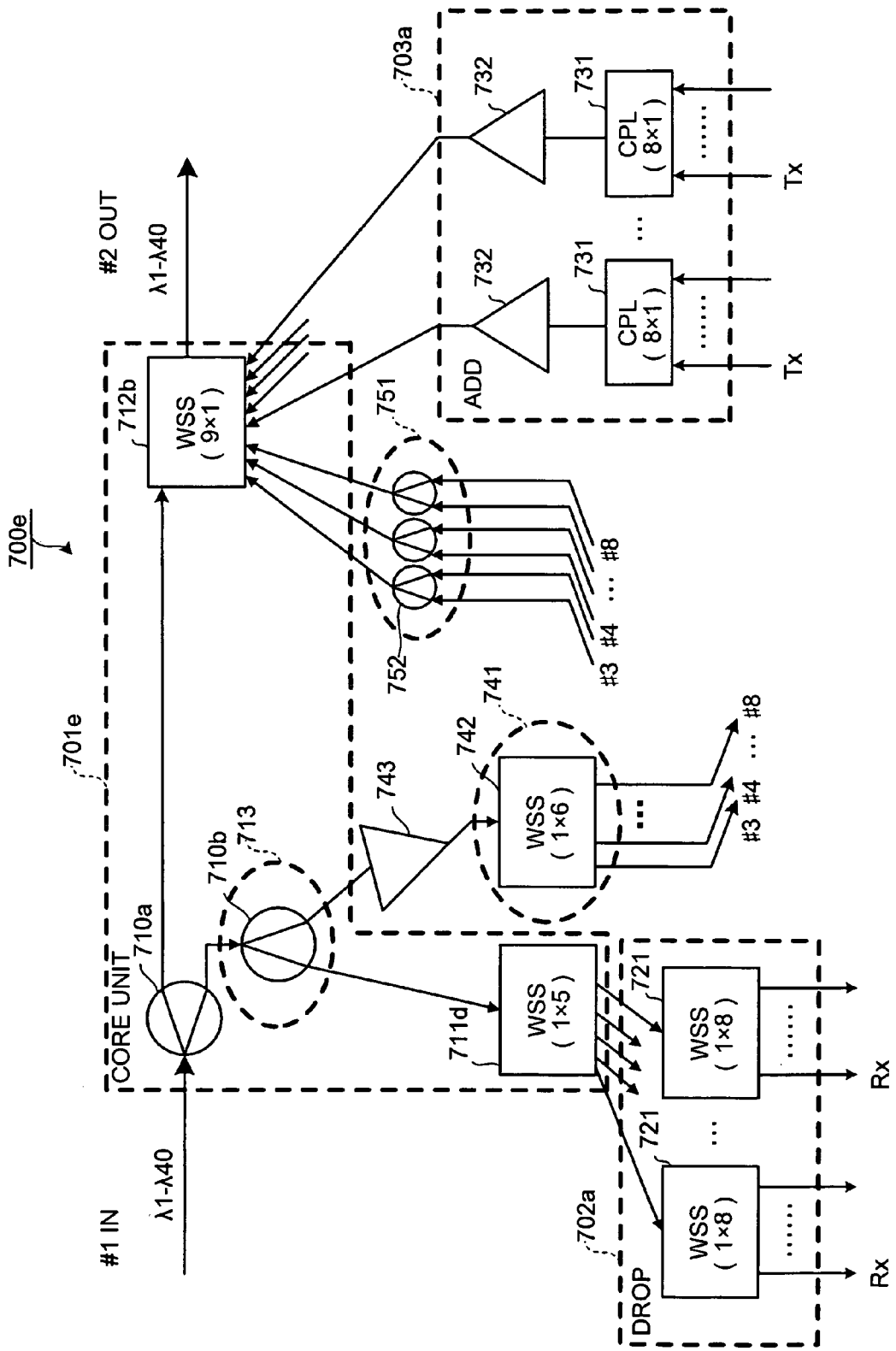
Figure 51:
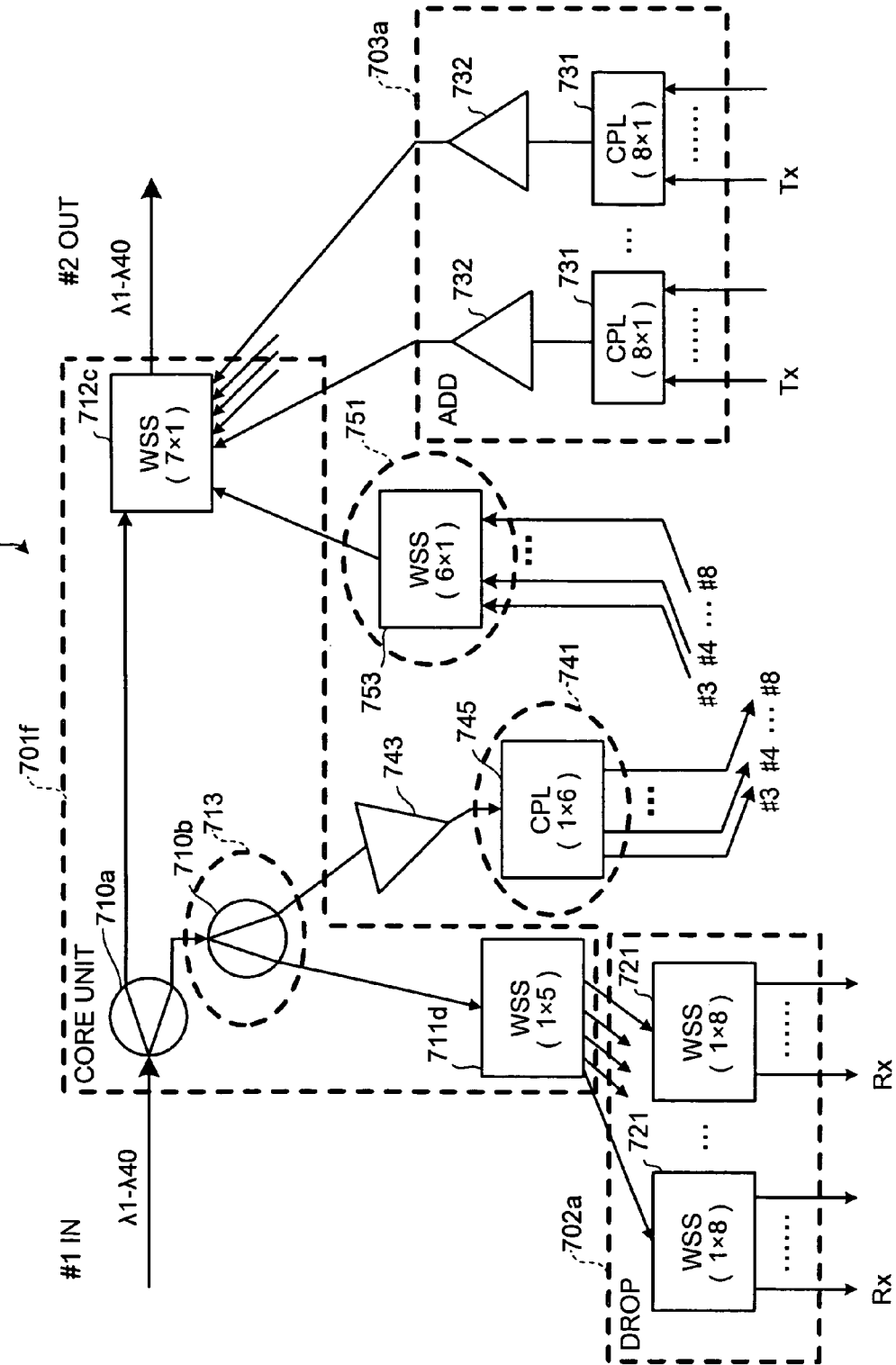
Figure 52:
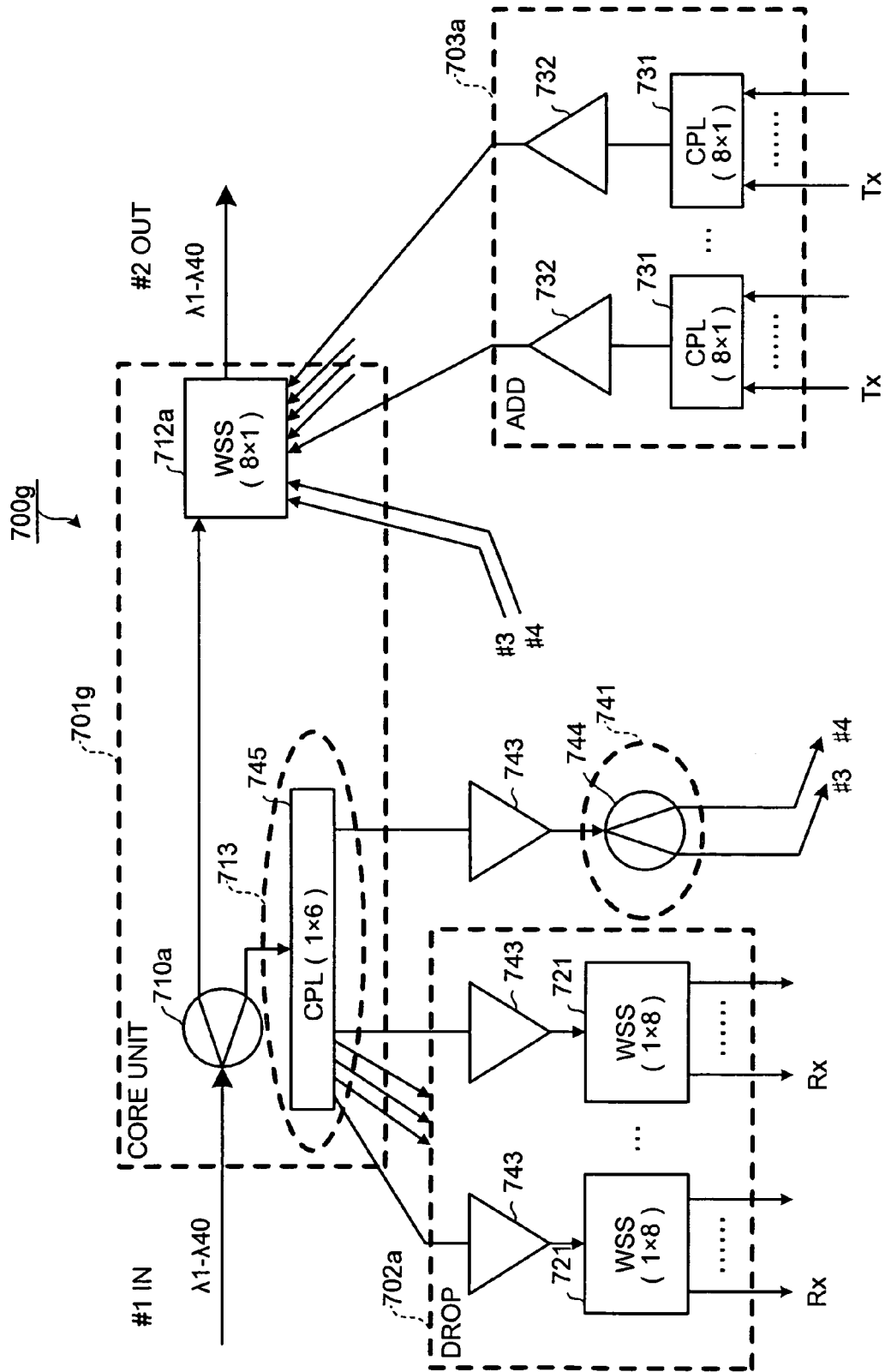
Figure 53:
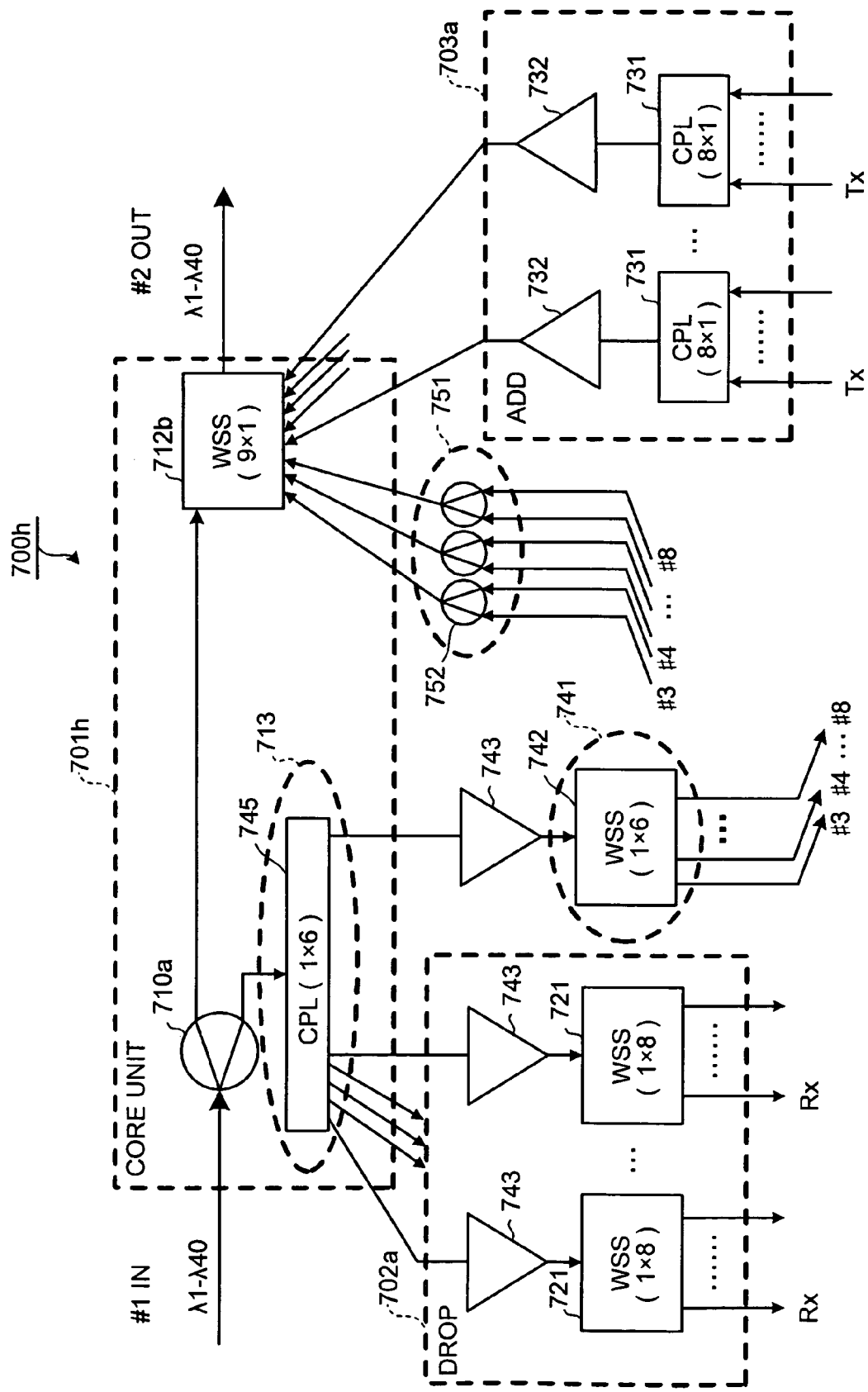
Figure 54:
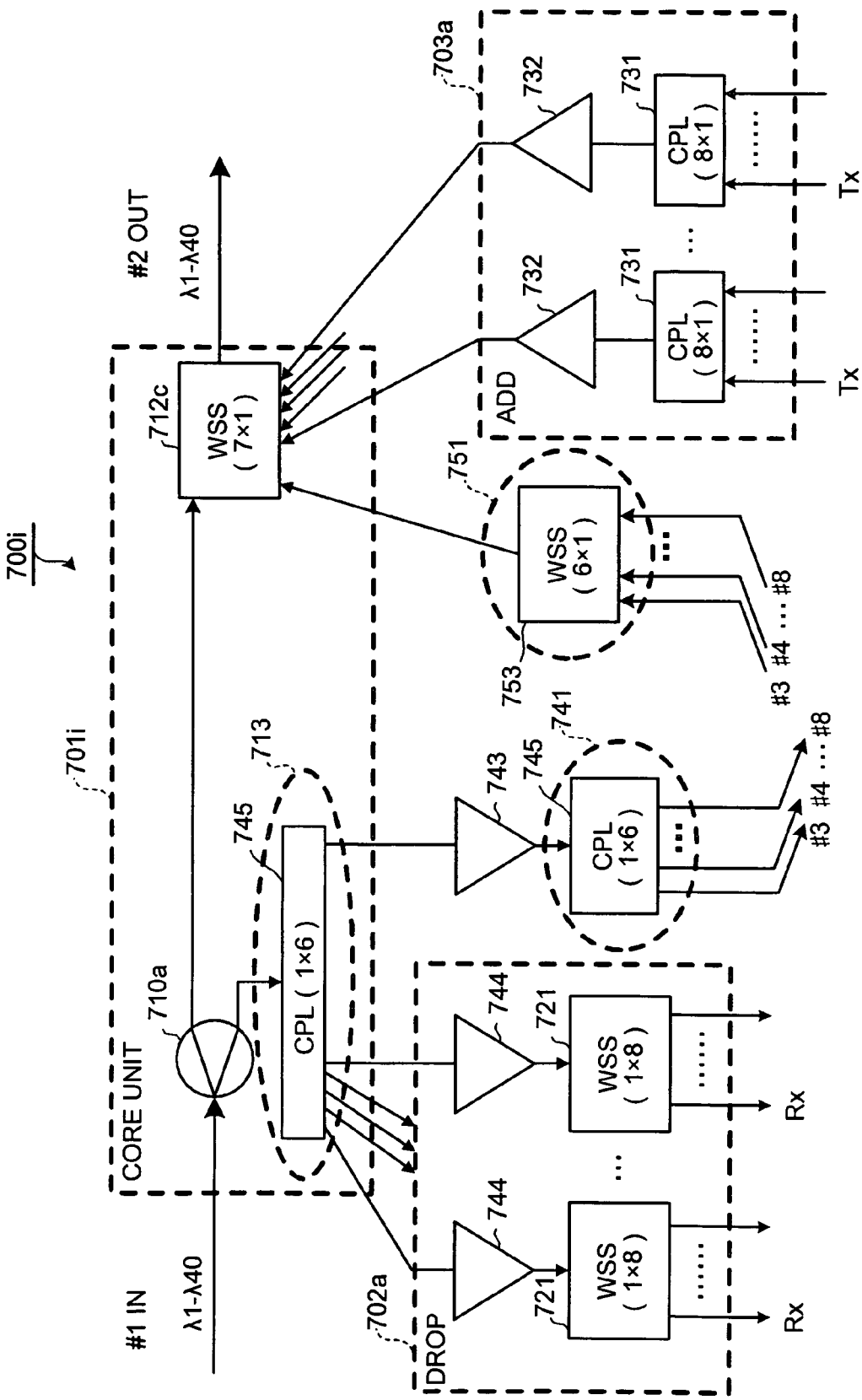
Figure 55:
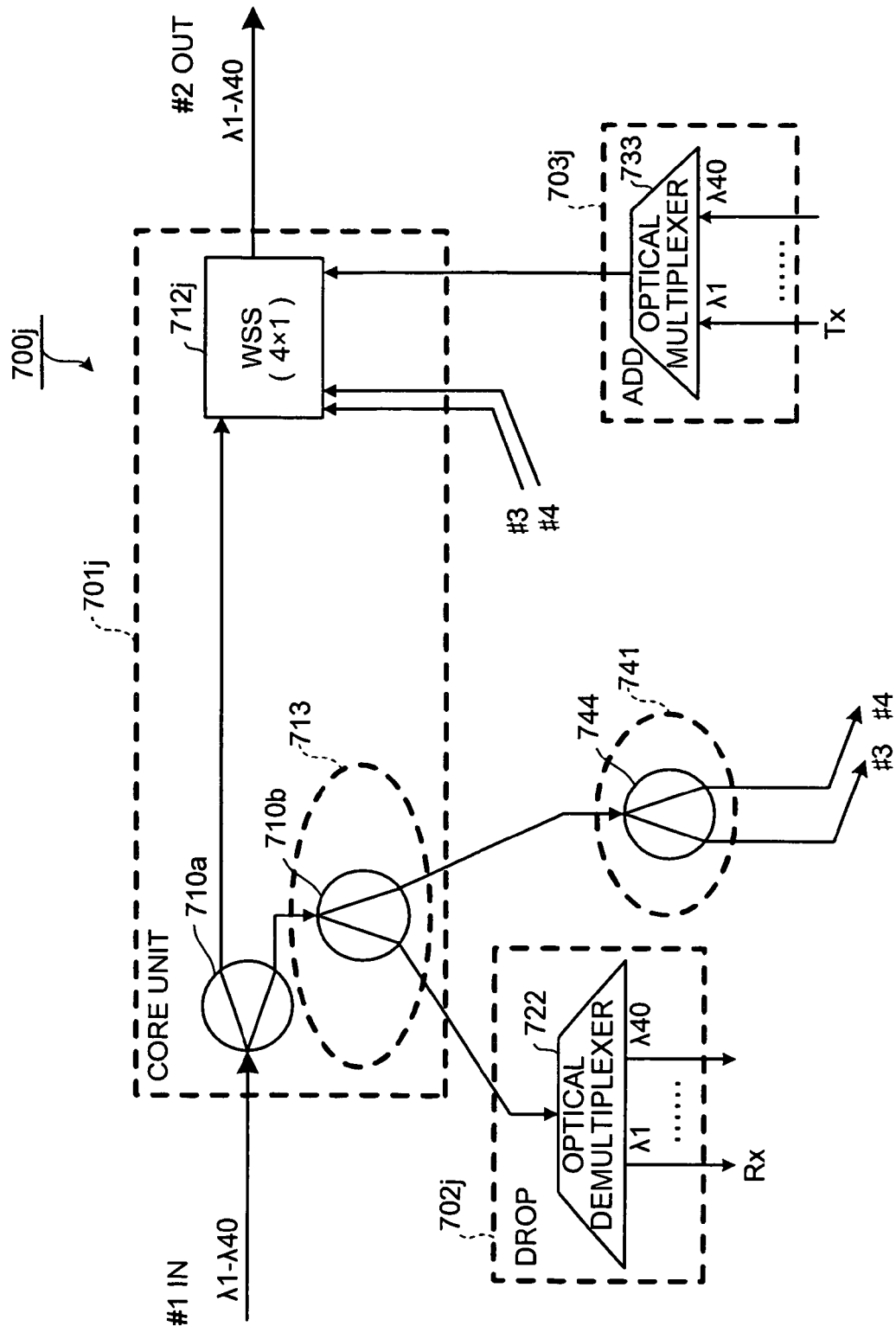
Figure 56:
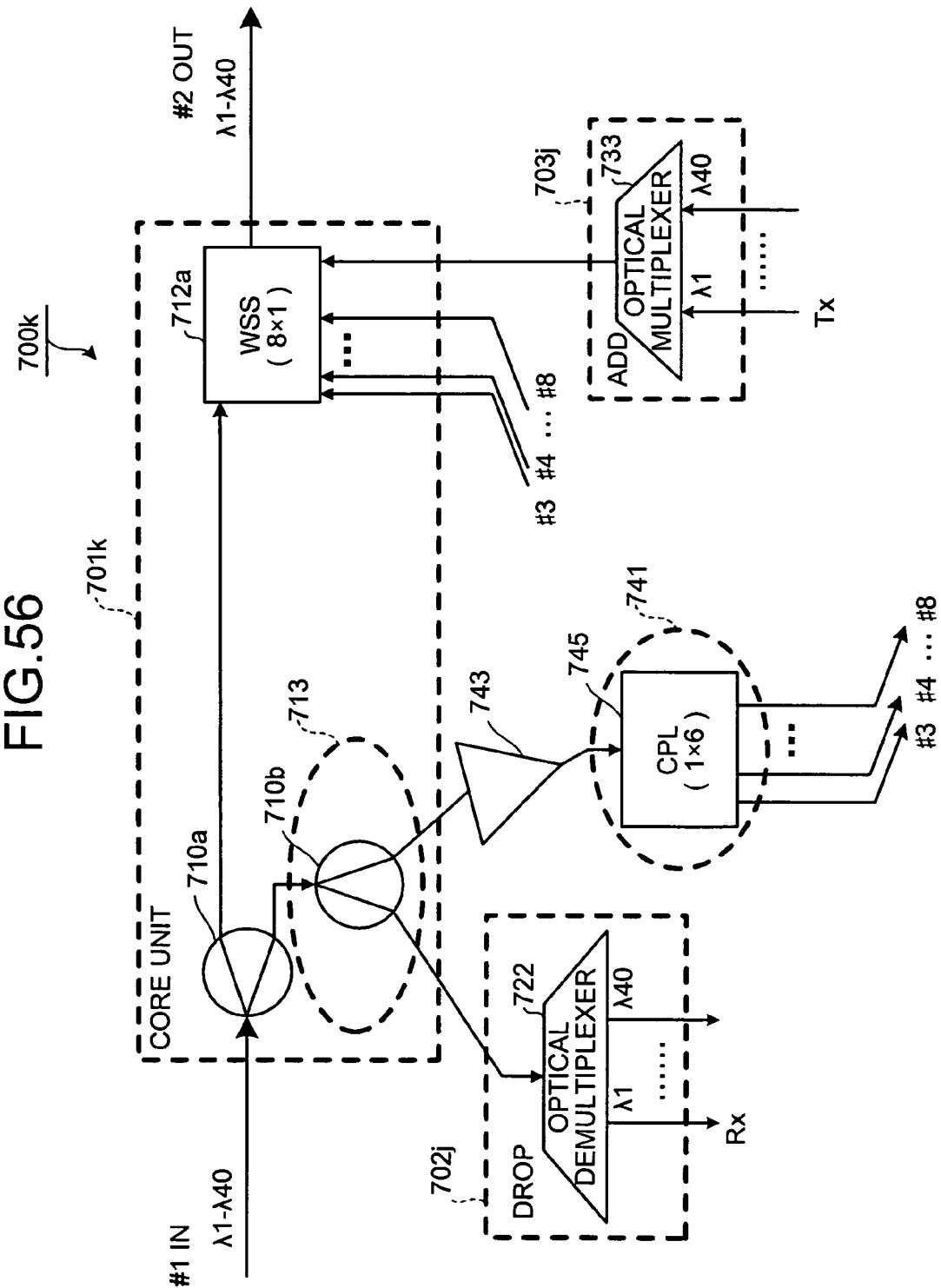
Figure 57:
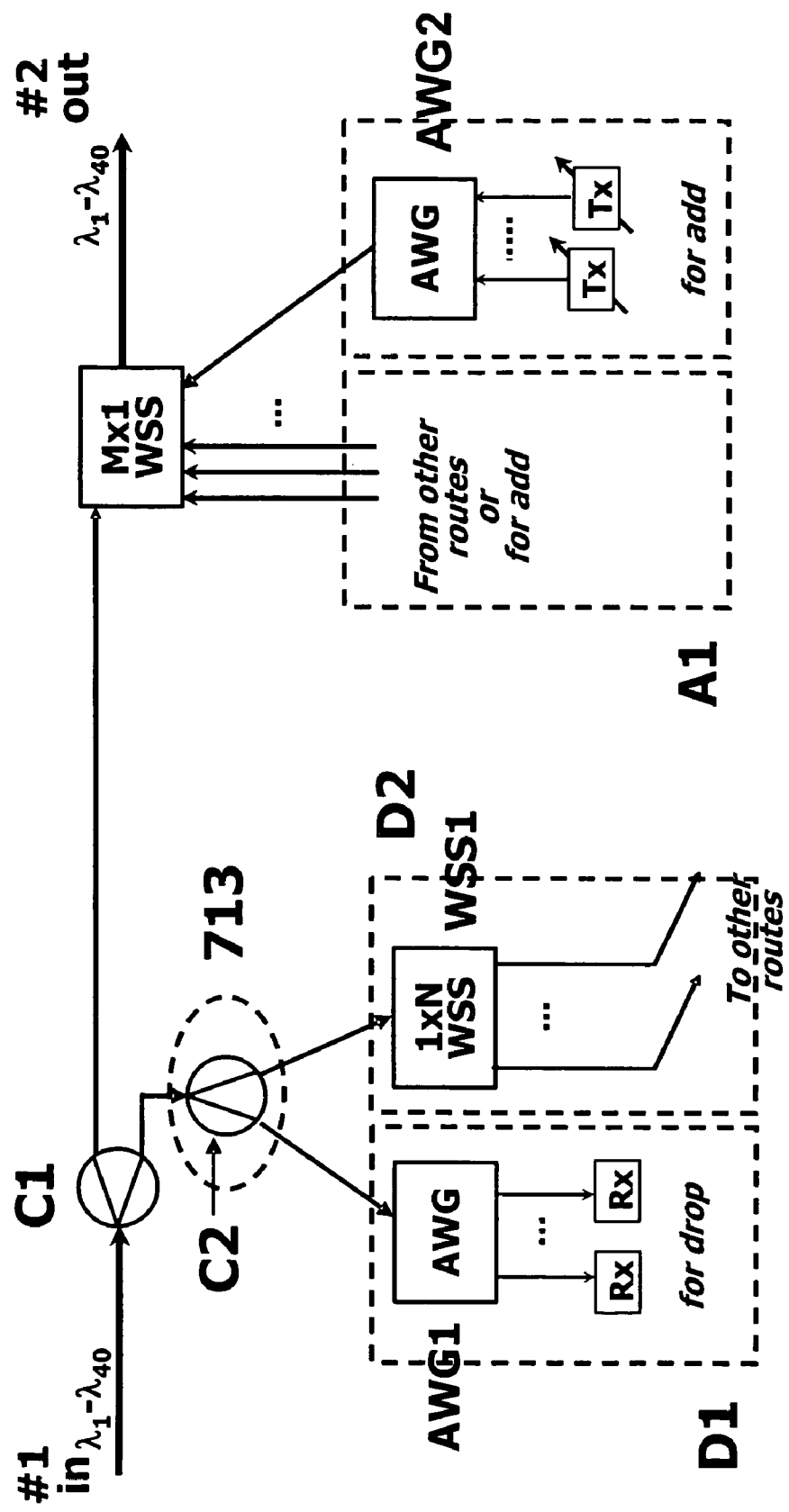
Figure 58:
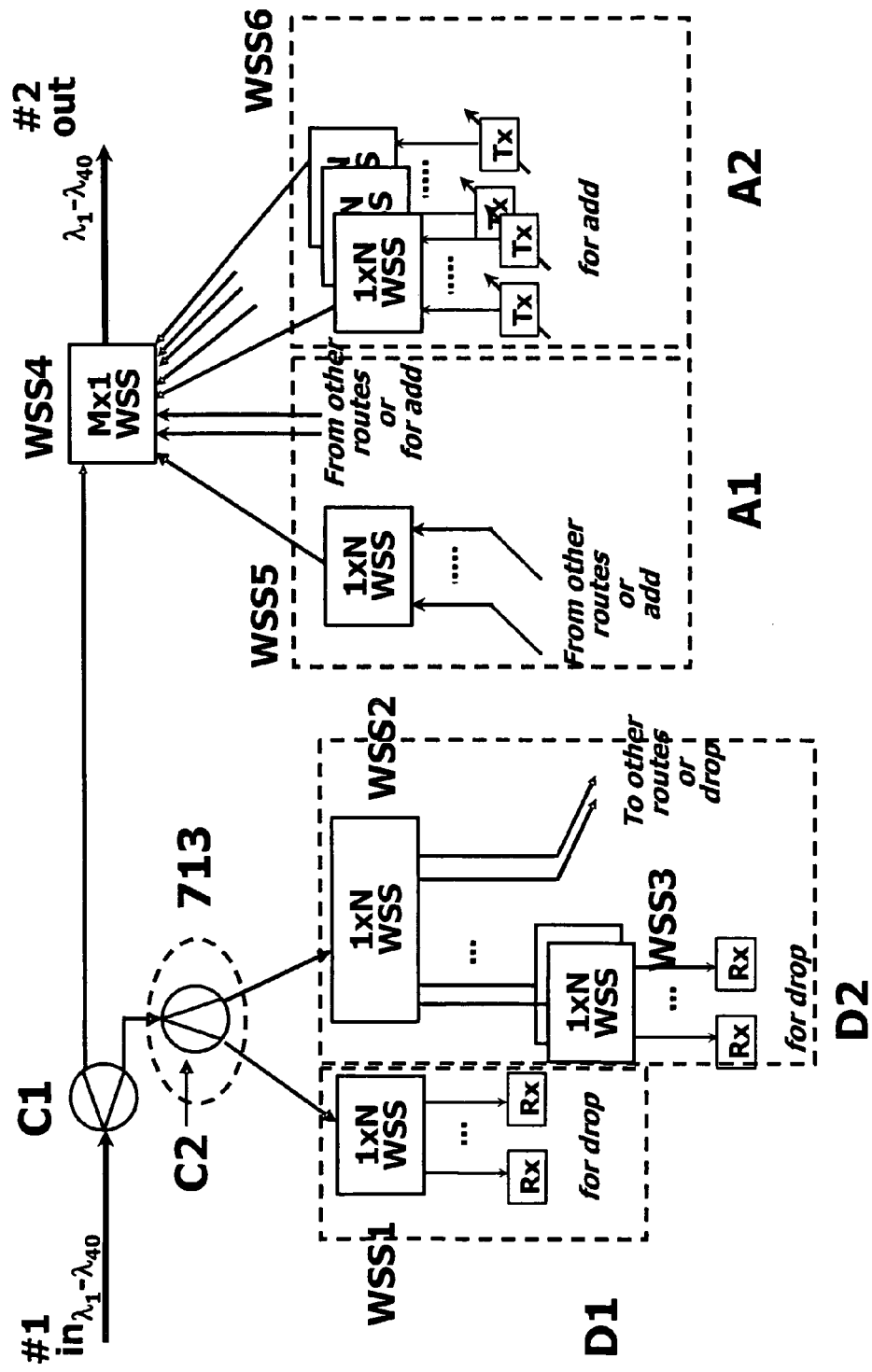
Figure 59:
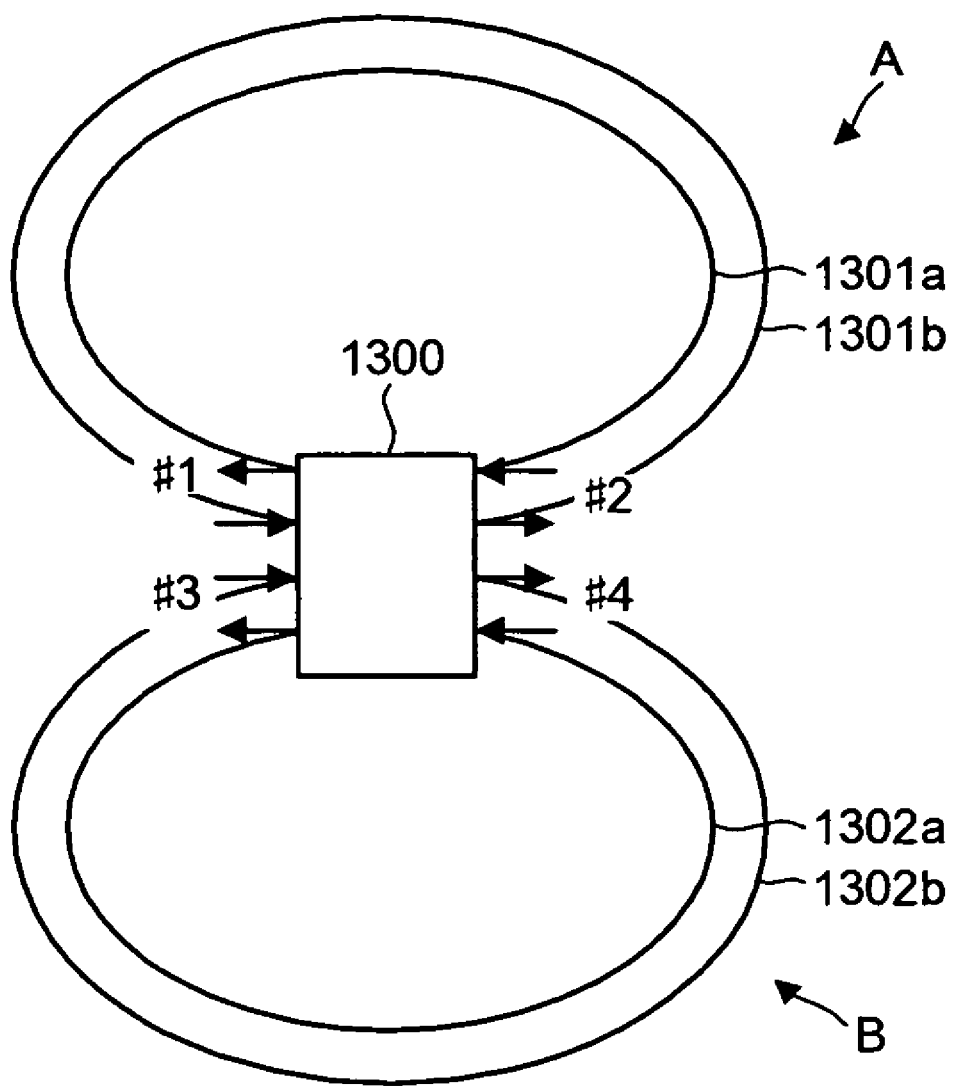
Figure 60:
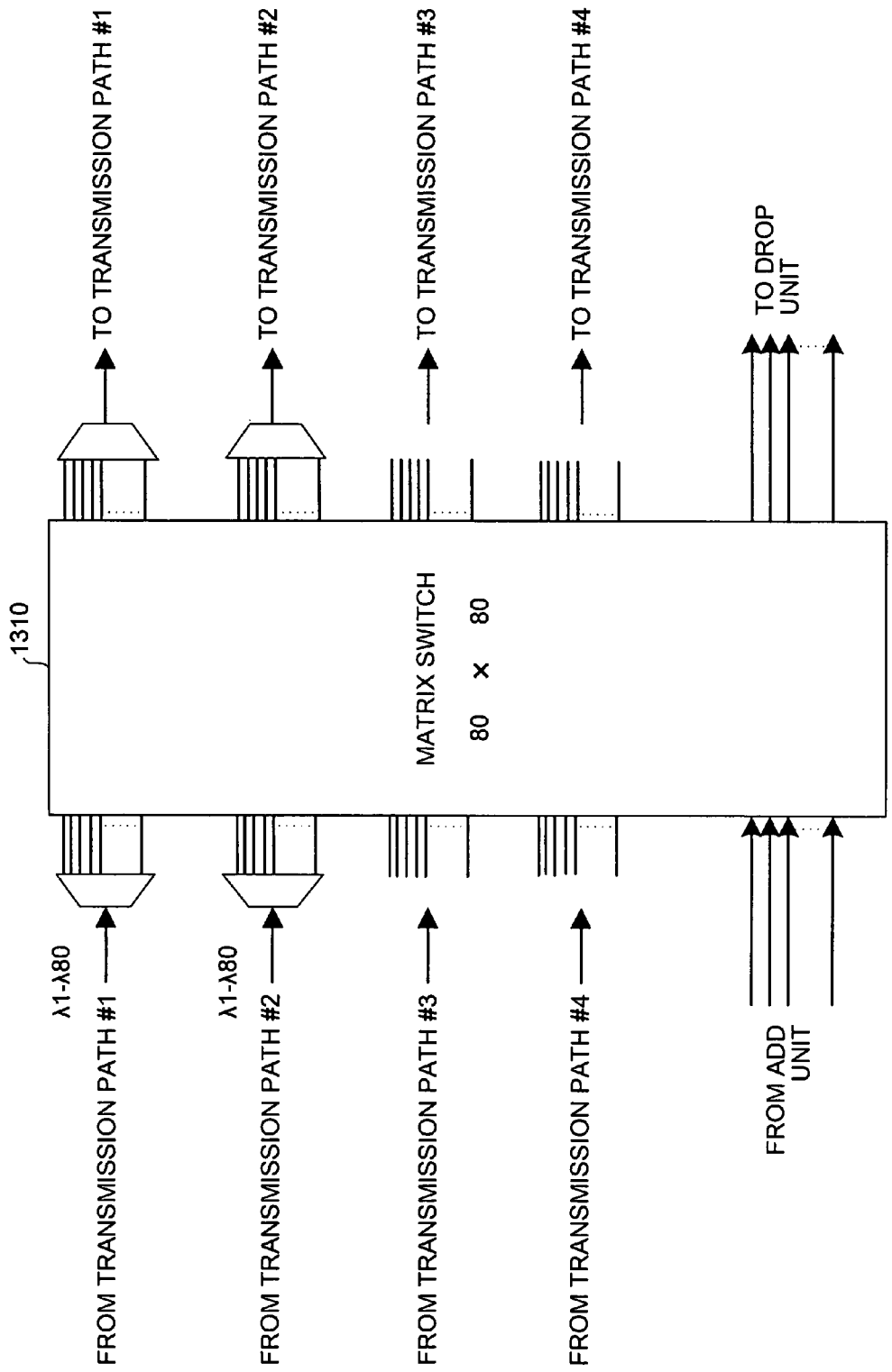

FIG. 49 a schematic for explaining expansion of ports for routes of the optical add/drop multiplexer when the 1×2 optical coupler is added to the core unit;

FIG. 50 is a schematic for explaining the expansion of the ports for the routes of the optical add/drop multiplexer when the 1×2 optical coupler is added to the core unit;

FIG. 51 is a schematic for explaining the expansion of the ports for the routes of the optical add/drop multiplexer when the 1×2 optical coupler is added to the core unit;

FIG. 52 is a schematic for explaining expansion of the ports for the routes of the optical add/drop multiplexer when the 1×6 optical coupler is used on the drop side;

FIG. 53 is a schematic for explaining the expansion of the ports for the routes of the optical add/drop multiplexer when the 1×6 optical coupler is used on the drop side;

FIG. 54 is a schematic for explaining expansion of the ports for routes of the optical add/drop multiplexer when the 1×6 optical coupler is used in the drop side of the core unit;

FIG. 55 is a schematic for explaining expansion of the ports for the routes based on ROADM;

FIG. 56 is a schematic for explaining expansion of the ports for the routes based on ROADM;

FIG. 57 is a schematic for expansion of the ports for the routes of the optical add/drop multiplexer when the 1×2 optical coupler is added to the core unit;

FIG. 58 is a schematic for expansion of the ports for the routes of the optical add/drop multiplexer when the 1×2 optical coupler is added to the core unit;

FIG. 59 is a schematic of a configuration of a transmission path and a wavelength cross-connect device in a network; and FIG. 60 is a schematic of a configuration of an optical cross-connect.

DETAILED DESCRIPTION

Exemplary embodiments of the present invention are explained in detail below with reference to the accompanying drawings.

Recently, instead of the matrix switch, a wavelength selective switch and a wavelength blocker are actively studied and developed. The wavelength selective switch can be used to switch an arbitrary wavelength in an arbitrary direction, and the wavelength blocker can block an arbitrary wavelength from an arbitrary wavelength. These have such advantages as compact size, low cost, low insertion loss, a smaller number of fibers required when being mounted.

The wavelength selective switch or the wavelength blocker is used in an optical add/drop multiplexer according to an embodiment of the present. The function is expanded from a Dynamic OADM (DOADM) that supports a small number of wavelengths (LCC: Low Count Channel) to a DOADM that supports a multiple wavelength (HCC: High Count Channel). Furthermore, the function is expanded to Wavelength Cross-Connect (WXC). It is thereby possible to realize the function expansions without disconnecting a transmission signal.

Figure 1:
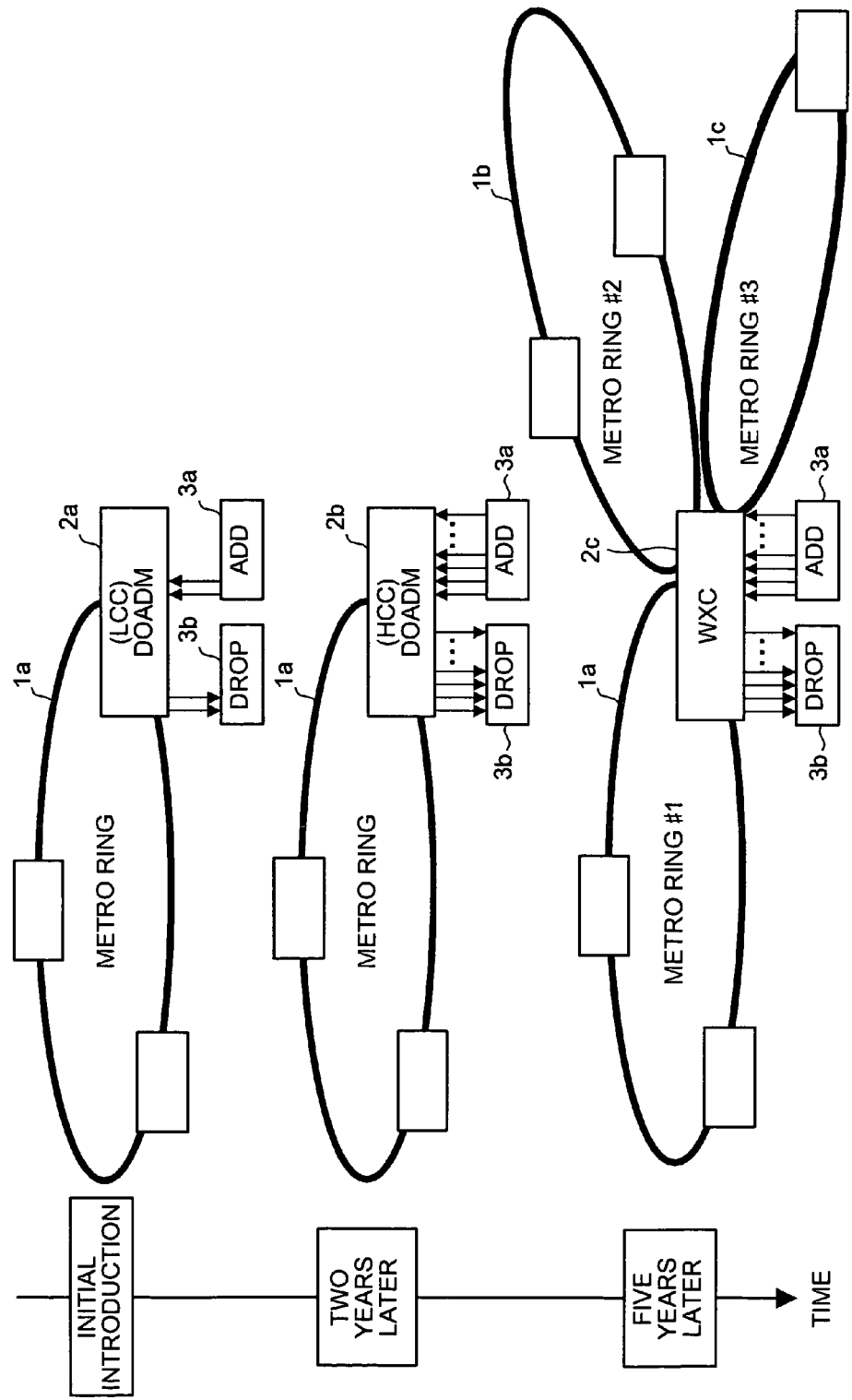
FIG. 1 is a schematic for explaining function expansion by the optical add/drop multiplexer according to an embodiment of the present invention.

FIG. 1 is schematic for explaining function expansion by the optical add/drop multiplexer according to an embodiment of the present invention. An example of the function expansion (in-service upgrade) is shown therein such that the function of the optical add/drop multiplexer is expanded from a low count channel (LCC) DOADM to a high count channel (HCC) DOADM and then to the WXC, depending on changes in network requirements.

At the time of initial introduction, a DOADM 2a is arranged for one ring network (metro ring 1a). This is based on prediction such that the ring network may be expanded up to three ring networks 1a to 1c five years later.

Since there are add/drop requests only for some wavelengths upon the initial introduction, a low count channel (LCC) DOADM 2a that has a necessary minimum function is arranged. As shown in FIG. 1, 3a represents an "add" unit, and 3b represents a "drop" unit. The DOADM 2a arranged upon the initial introduction has an expandable configuration so as to support network requirements expected five years later.

Referring to "Two years later", for example, the configuration is expected to support an increase in the required number of wavelengths in one ring network 1a. A DOADM 2b uses available ports of the add unit 3a and the drop unit 3b. Alternatively, by adding an add/drop module to an available port, the function is expanded to a high count channel (HCC) DOADM 2b without disconnecting transmission signals during operation.

Referring to "Five years later", for example, the function is expanded from the DOADM 2b to a wavelength cross-connect (WXC) 2c without disconnecting existing transmission signal so that communications are possible between three ring networks 1a to 1c that correspond to metro ring #1 to metro ring #3, respectively. The change from the DOADM 2b to the WXC 2c indicates not an exchange of devices but function expansion. With the function expansion, the name is changed from the DOADM 2b to the WXC 2c. The WXC 2c allows the function of a wavelength cross-connect device to be performed in the transmission path.

FIG. 2 is a table for comparing functions of the optical add/drop multiplexers with each other. The diagram describes a configuration example, presence or absence of the function for adding/dropping an arbitrary wavelength to an arbitrary port, and permission or prohibition of reconfiguration for each of the OADM, an ROADM (Reconfigurable OADM), the DOADM, and a DOADM with limitation on wavelength. As explained with reference to FIG. 1, by using the DOADM, the function of adding/dropping an arbitrary wavelength to an arbitrary port can be provided in the future, and reconfiguration becomes possible.

Referring to the function expansion of the present invention, it is also possible to use any configuration example other than the OADM, i.e., the ROADM and the DOADM with limitation on wavelength. Reconfiguration becomes possible with the ROADM. In the DOADM with limitation on wavelength, the function of adding/dropping an arbitrary wavelength to an arbitrary port is limited on wavelength as compared with the DOADM, but reconfiguration is possible in the same manner as the DOADM. If there are a small number of wavelengths that are to be added or dropped, the DOADM with limitation on wavelength obtained at cost lower than the DOADM can be used.

Figure 4:
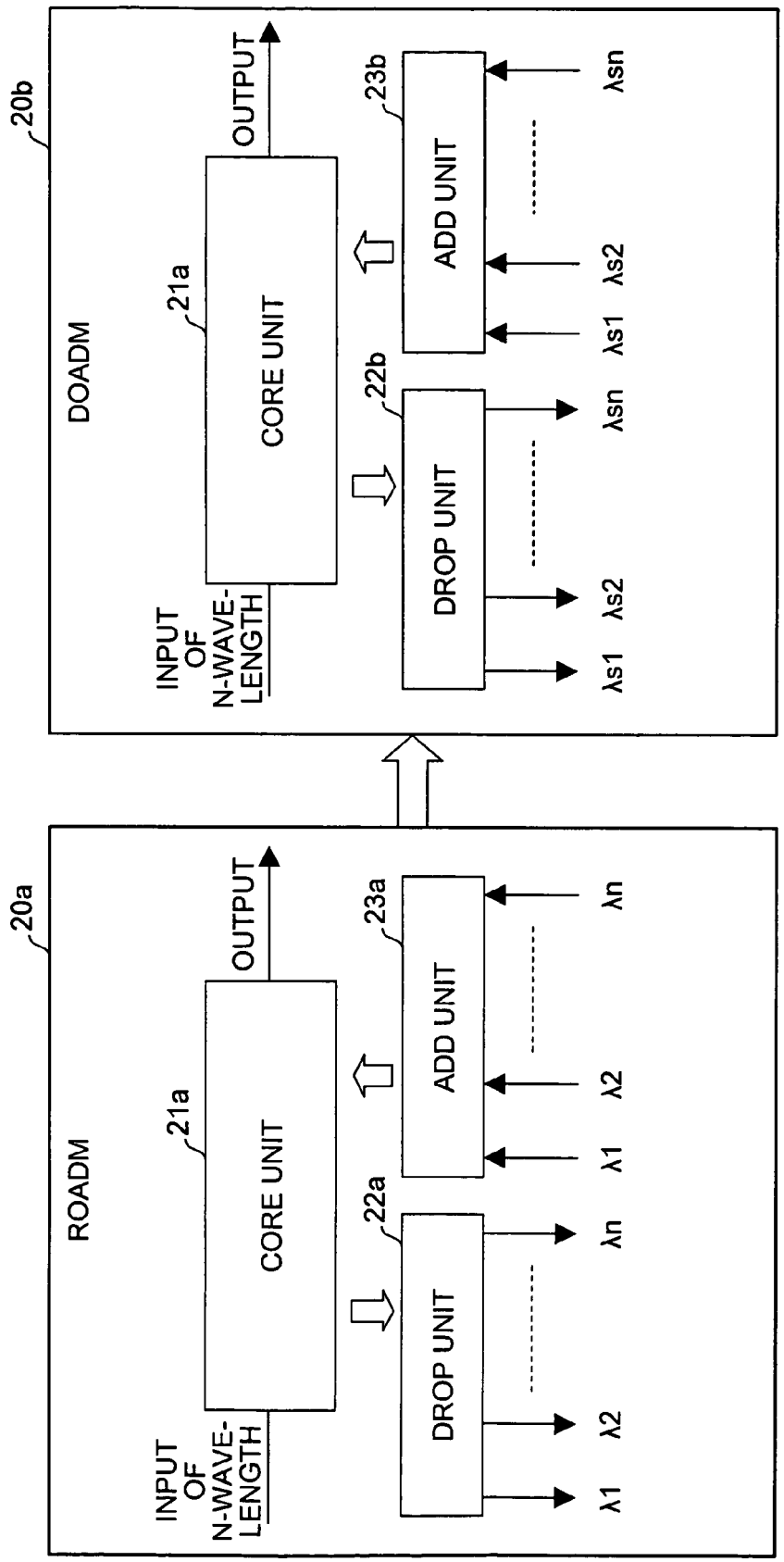
FIG. 4 is a schematic of function expansion from an ROADM to a DOADM.
Figure 5:
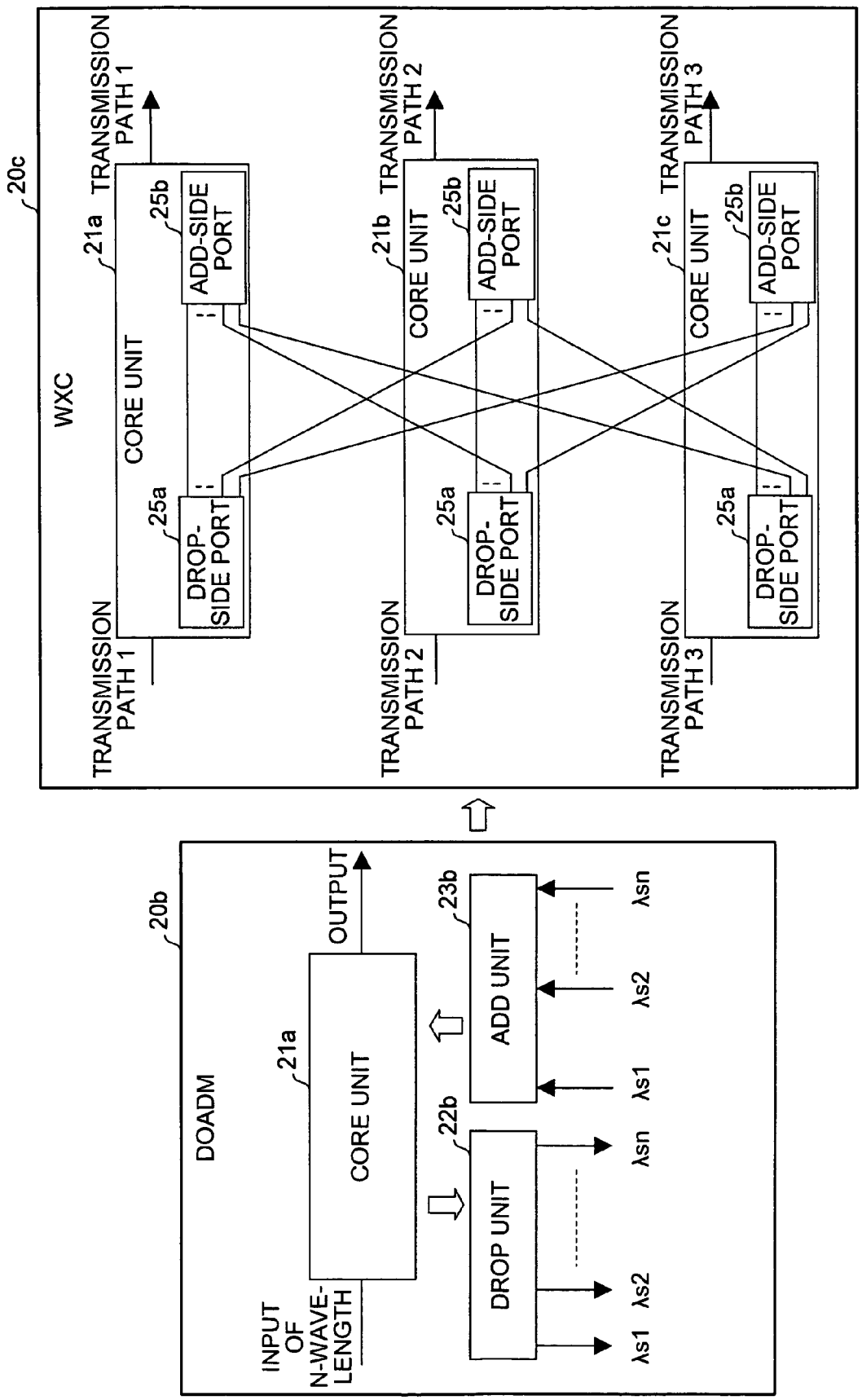
FIG. 5 is a schematic of function expansion from the DOADM to a WXC.

FIG. 3 to FIG. 5 are schematics of function expansions in the respective optical add/drop multiplexers. As shown in the figures, the optical add/drop multiplexer includes a core unit that includes the wavelength selective switch or the wavelength blocker, a drop unit that drops signal light from the core unit to be led to an output port for dropping (drop port), and an add unit that outputs signal light to be added to the core unit from an input port for adding (add port).

FIG. 3 is a schematic of function expansion from a low count channel DOADM to a high count channel DOADM. An input signal in which N wavelengths are multiplexed over the transmission path passes through a core unit 11a and is output. The core unit 11a includes a wavelength selective switch (WSS) or a wavelength blocker (WB), and causes a drop unit 12a to drop a signal having a predetermined wavelength. Furthermore, the core unit 11a multiplexes a signal from an add unit 13a on a main signal.

In a low count channel (LCC) DOADM 10a, wavelengths "i" of the signal dropped from the core unit 11a are output to receivers (Rx) through ports "i" of the drop unit 12a. Signals from transmitters (Tx) are input through ports "i" of the add unit 13a, and are added in the core unit 11a. Although the number of ports i of the drop unit 12a is the same as the number of ports i of the add unit 13a, they may be different from each other.

When the function is expanded to a high count channel (HCC) DOADM 10b and the number of wavelengths is increased from i to k (the number of ports i<k), the core unit 11a is used as it is, and the number of ports is increased to k using available ports of the drop unit 12a and the add unit 13a. In addition, another drop unit and add unit (not shown) are further added to available ports. With this addition, the function can be expanded to the high count channel DOADM 10b.

FIG. 4 is a schematic of function expansion from an ROADM to a DOADM. In a ROADM 20a, ports of a drop unit 22a and an add unit 23a that are connected to a core unit 21a correspond only to fixed wavelengths (λ1 to λn) decided respectively upon initial introduction. When the function is expanded to a DOADM 20b, the core unit 21a is used as it is without replacement, but the drop unit 22a is replaced with a drop unit 22b and the add unit 23a is replaced with an add unit 23b, each in which ports correspond to arbitrary wavelengths. Each of the drop unit 22b and the add unit 23b includes an optical switch or an optical filter, and any one of wavelengths (one wavelength of λs1 to λsn) out of the wavelengths λ1 to λn can be selected for each port. With the selection, it is possible to expand the function without disconnecting a signal in the transmission path in the core unit 21a.

FIG. 5 is a schematic of function expansion from the DOADM to a WXC, and depicts an example of expanding the function of the DOADM 20b of FIG. 4 to the WXC 20c. A core unit 21a includes a drop-side port 25a and an add-side port 25b. The core unit 21a is additionally provided corresponding to an increase in the number of transmission paths based on network requirements. In the example of FIG. 5, the number of routes (the number of transmission paths) increases from 1 to 3, and a core unit 21b and a core unit 21c are added accordingly.

Although the drop unit and the add unit are omitted from the WXC 20c of FIG. 5, the drop unit 22b and the add unit 23b described in the DOADM 20b are connected to the core units 21a, 21b, and 21c. Ports of the drop-side port 25a and ports of the add-side port 25b that are provided in the core units 21a, 21b, and 21c are connected to each other in the interior of the WXC 20c.

The drop-side port 25a of the core unit 21a is connected to the add-side port 25b of the core unit 21b and to the add-side port 25b of the core unit 21c. The drop-side port 25a of the core unit 21b is connected to the add-side port 25b of the core unit 21a and to the add-side port 25b of the core unit 21c. Furthermore, the drop-side port 25a of the core unit 21c is connected to the add-side port 25b of the core unit 21a and to the add-side port 25b of the core unit 21b.

By the examples of connections, the functions can be expanded corresponding to the number of routes in the three metro rings (#1 to #3) as explained with reference to FIG. 1. Therefore, it is possible to expand the function such that the number of core units that forms the WXC 20c is increased and the number of routes is increased without disconnecting a main signal passing through the core unit.

Figure 6:
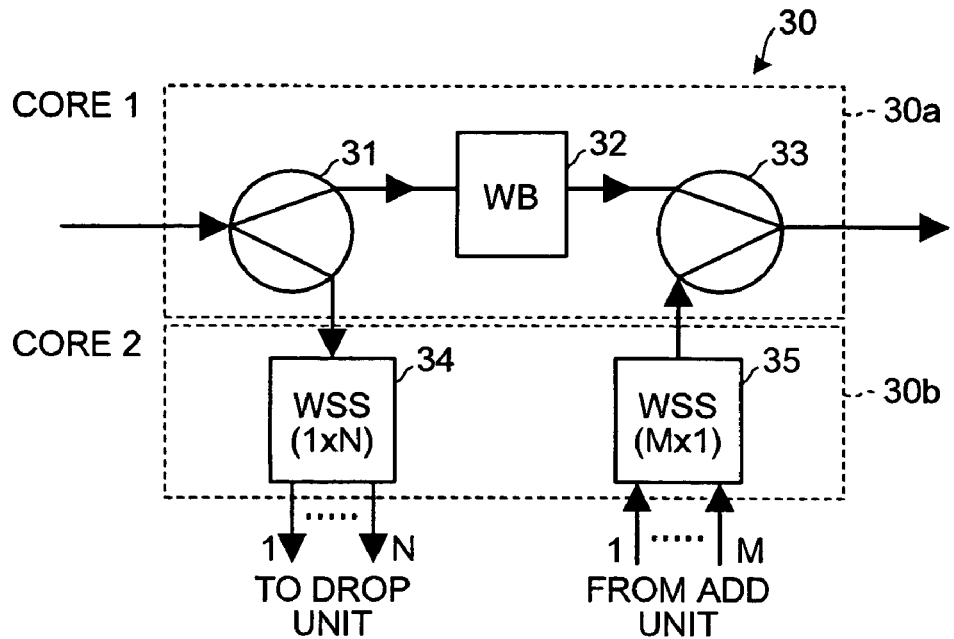
FIG. 6 is a schematic of a configuration of a core unit.

Various configuration examples of the core unit are explained below with reference to FIG. 6 to FIG. 9. FIG. 6 is a diagram of configuration example 1 of the core unit. A core unit 30 as shown in FIG. 6 includes a core 1 (30a) and a core 2 (30b). The core 1 (30a) includes a 1×2 (hereinafter, the number of inputs versus the number of outputs is expressed as "the number of inputs×the number of outputs") optical coupler 31, a wavelength blocker (WB) 32 connected to one of the outputs of the optical coupler 31, and a 2×1 optical coupler 33 of which one of the inputs is connected to the output of the wavelength blocker 32. The core 2 (30b) includes a 1×N-port wavelength selective switch (WSS) 34 for dropping connected to the other output of the optical coupler 31, and an M×1-port wavelength selective switch (WSS) 35 for adding connected to the other input of the optical coupler 33.

A multiple-input and single-output optical coupler couples a plurality of signal lights input, and outputs them as a multiplexed wavelength. A single-input and multiple-output optical coupler drops a multiplexed signal light input as it is, and outputs the signal lights. A multiple-input and single-output wavelength selective switch multiplexes a plurality of arbitrary wavelengths input, and a single-input and multiple- output wavelength selective switch demultiplexes a signal light having an arbitrary wavelength from the multiplexed signal light input, and outputs the signal lights (if there are N outputs, N wavelengths are output). Therefore, when the signal passes through the optical coupler and is dropped, the whole signal light multiplexed is dropped, which causes attenuation to increase as compared with the wavelength selective switch. An optical amplifier or the like is provided to take measures against the attenuation.

A wavelength selective switch (WSS) and so on (not shown) are further connected to ports of the wavelength selective switches 34 and 35 that are arranged in the drop unit and the add unit, respectively. With the connection, the function can be expanded from the low count channel DOADM to the high count channel DOADM. Furthermore, by combining the wavelength selective switches with each other, the function is expanded to the WXC, which allows the loss to be suppressed without upsizing the device. As shown in FIG. 6, there are a small number of fibers to be connected between the components in the core unit 30, which makes it easy to conduct the connections. Moreover, even during system operation, the functions can be expanded without reconnecting the fibers and disconnecting the main signal. Furthermore, it is possible to realize a "drop and continue" function used to transmit the same wavelength signal as a main signal to the drop side while a certain wavelength is transmitted as the main signal.

Figure 7:
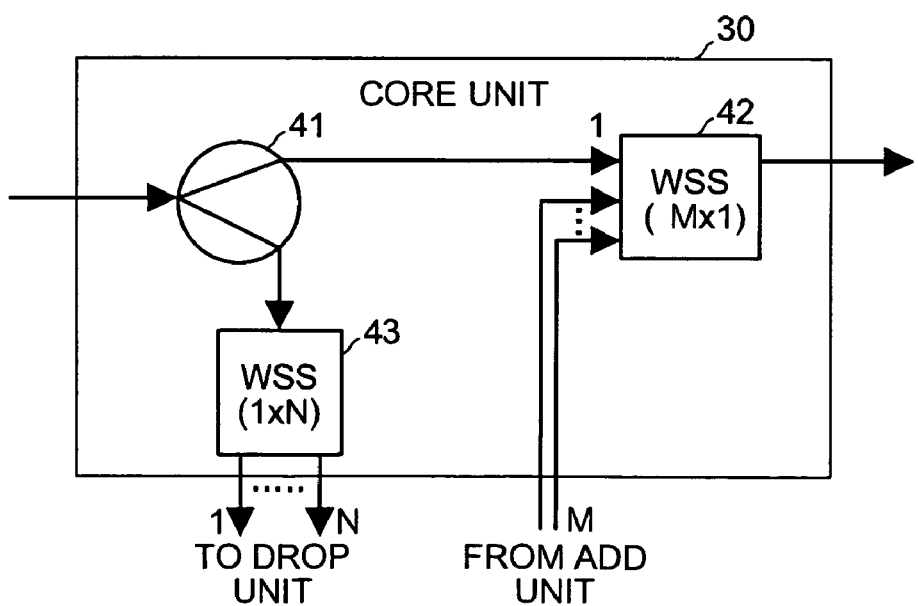
FIG. 7 is a schematic of another configuration of the core unit.

FIG. 7 is a schematic of another configuration of the core unit. A core unit 30 of FIG. 7 includes a 1×2 optical coupler 41, an M×1-port wavelength selective switch (WSS) 42 connected to one output of the optical coupler 41, and a 1×N-port wavelength selective switch (WSS) 43 for dropping connected to the other output of the optical coupler 41.

A wavelength selective switch and a grouping filter or so (not shown) are further connected to ports of the wavelength selective switch 43 for dropping, and an optical coupler or so (not shown) is connected to the add unit. Based on the connections, the function is expanded from the low count channel DOADM to the high count channel DOADM. Furthermore, by combining the wavelength selective switches with each other, the function is expanded to the WXC, which allows the loss to be suppressed without upsizing the device. As shown in FIG. 7, there are a small number of fibers to be connected between the components in the core unit 30, which makes it easy to conduct the connections. Moreover, even during system operation, the functions can be expanded without reconnecting the fibers and disconnecting the main signal. Furthermore, it is possible to realize the drop and continue function used to transmit the same wavelength as a main signal also to the drop side while a certain wavelength is transmitted as the main signal.

Figure 8:
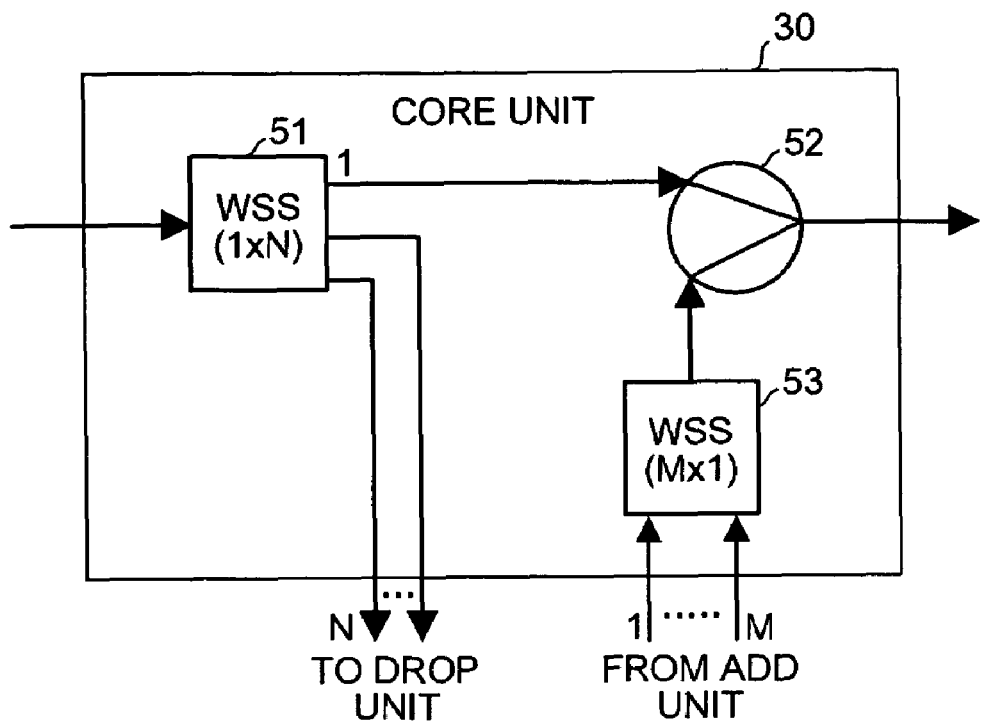
FIG. 8 is a schematic of still another configuration of the core unit.

FIG. 8 is a schematic of still another configuration of the core unit. A core unit 30 of FIG. 8 includes a 1×N-port wavelength selective switch (WSS) 51, a 2×1 optical coupler 52 whose one of inputs is connected to one of a plurality of output ports of the wavelength selective switch 51, and an M×1-port wavelength selective switch (WSS) 53 for adding connected to one input of the optical coupler 52.

A wavelength selective switch and a grouping filter or so (not shown) are further connected to ports of the wavelength selective switch 51 for dropping, and an optical coupler or so (not shown) is connected to the add unit. Based on the connections, the function can be expanded from the low count channel DOADM to the high count channel DOADM. Furthermore, by combining the wavelength selective switches with each other, the function is expanded to the WXC, which allows the loss to be suppressed without upsizing the device. As shown in FIG. 8, there are a small number of fibers to be connected between the components in the core unit 30, which makes it easy to conduct the connections. Moreover, even during system operation, the functions can be expanded without reconnecting the fibers and disconnecting the main signal.

Figure 9:
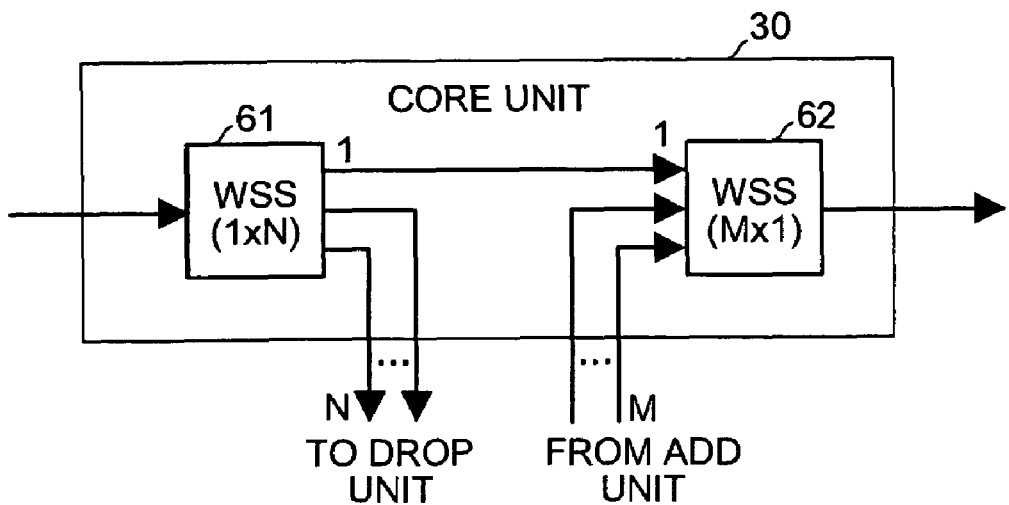
FIG. 9 is a schematic of still another configuration of the core unit.

FIG. 9 is a schematic of still another configuration of the core unit. A core unit 30 of FIG. 9 includes a 1×N-port wavelength selective switch (WSS) 61, and an M×1-port wavelength selective switch (WSS) 62 whose one of input ports is connected to one of a plurality of output ports of the wavelength selective switch 61.

A wavelength selective switch, a grouping filter, an optical coupler, and so on (not shown) are further connected to ports of the wavelength selective switches 61 and 62 that are arranged in the drop unit and the add unit, respectively. Based on the connections, the function is expanded from the low count channel DOADM to the high count channel DOADM. Furthermore, by combining the wavelength selective switches with each other, the function is expanded to the WXC, which allows the loss to be suppressed without upsizing the device. As shown in FIG. 9, there are a small number of fibers to be connected between the components in the core unit 30, which makes it easy to conduct the connections. Moreover, even during system operation, the functions can be expanded without reconnecting the fibers and disconnecting the main signal.

Figure 10:
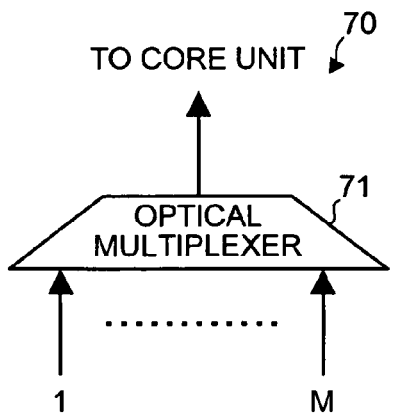
FIG. 10 is a schematic of a configuration of an add unit.

Various configuration examples of the add unit are explained below with reference to FIG. 10 to FIG. 17. FIG. 10 is a schematic of a configuration of an add unit. An add unit 70 of FIG. 10 includes an optical multiplexer 71 for a fixed wavelength. When the optical multiplexer 71 is used, the function can be expanded to the OADM (ROADM) that is reconfigurable because input ports (1 to M) provided in the optical multiplexer 71 support a fixed wavelength. The add unit 70 is connected to the add-side port of the core unit 30 (see FIG. 6 to FIG. 9), a part of the input ports of the optical multiplexer 71 is used for reception, and another part thereof is used for the WXC. The function is thereby expanded to the ROADM including the WXC. The add unit 70 of FIG. 10 is connected to the add-side port of the core unit 30, which allows a simple OADM to be constructed at low cost.

Figure 11A:
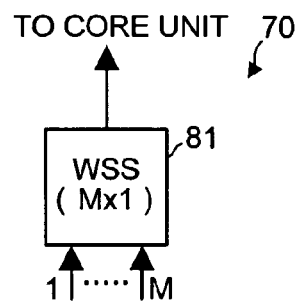
FIG. 11A is a schematic of another configuration of the add unit.
Figure 11B:
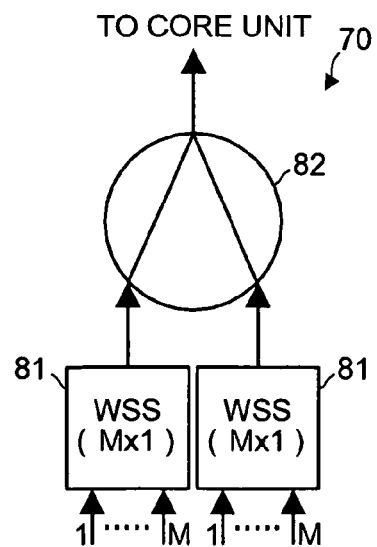
FIG. 11B is a schematic of another configuration of the add unit.

FIG. 11A is a schematic of another configuration of the add unit. An add unit 70 includes an M×1-port wavelength selective switch (WSS) 81. FIG. 11B is a schematic of another configuration of the add unit. In an example as shown in FIG. 11B, a plurality (two in the example of FIG. 11B) of M×1-port wavelength selective switches (WSS) 81, each of which is the basic configuration as shown in FIG. 11A, are provided to connect outputs of the wavelength selective switches 81 to inputs of the 2×1 optical coupler 82, respectively.

The optical coupler 82 having the configuration as shown in FIG. 11B is provided to increase the number of channels of the add unit 70. Such configuration example allows an arbitrary wavelength type DOADM to be realized. These add units 70 are connected to the add-side ports of the core units 30 (see FIG. 6 to FIG. 9), which makes it possible to expand the function from the low count channel DOADM to the high count channel DOADM. Based on the configuration, the add unit 70 can be easily connected to the add-side ports of the core unit 30, and a signal having an arbitrary wavelength can be transmitted to each of the add-side ports of the core unit 30.

Figure 12:
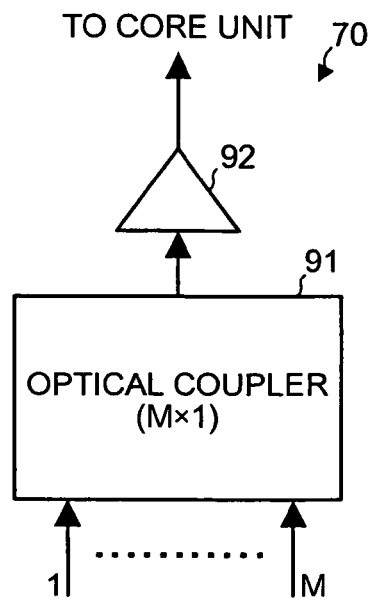
FIG. 12 is a schematic of another configuration of the add unit.

FIG. 12 is a schematic of another configuration of the add unit. An add unit 70 includes an M×1 optical coupler 91. An optical amplifier 92 that amplifies an output of the optical coupler 91 may be provided if necessary. Such an add unit 70 allows the arbitrary wavelength type DOADM to be realized, and is connected to the add-side port of the core unit 30 (see FIG. 6 to FIG. 9), which makes it possible to expand the function from the low count channel DOADM to the high count channel DOADM. By connecting the add unit 70 to the add-side port of the core unit 30, a simple OADM can be constructed at low cost.

Figure 13:
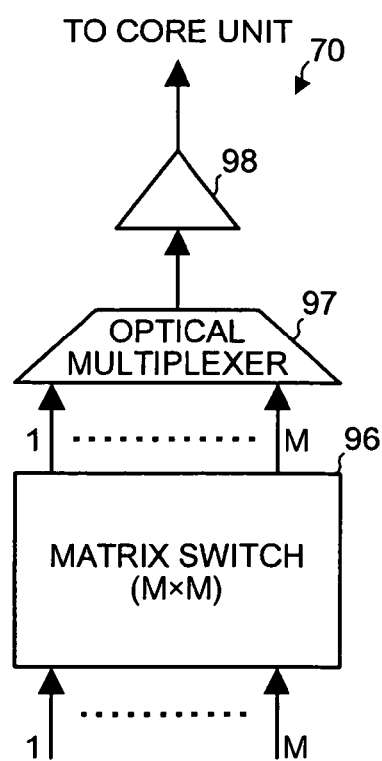
FIG. 13 is a schematic of another configuration of the add unit.

FIG. 13 is a schematic of another configuration of the add unit. An add unit 70 includes an M×M matrix switch 96 and an optical multiplexer 97 that multiplexes inputs from M pieces of ports. An optical amplifier 98 that amplifies an output of the optical multiplexer 97 may be provided if necessary. This provision allows the arbitrary wavelength type DOADM to be constructed. Such an add unit 70 is connected to the add-side port of the core unit 30 (see FIG. 6 to FIG. 9), which makes it possible to expand the function from the low count channel DOADM to the high count channel DOADM. By connecting the matrix switch 96 having the required number of wavelength ports to the add-side ports of the core unit 30, a signal having an arbitrary wavelength can be transmitted to each of the add-side ports. In this case, there is no need to prepare a plurality of matrix switches even including some pieces that are not used upon initial introduction.

FIG. 14 to FIG. 17 are schematics of configurations of the add unit. A grouping filter is applied to each of the add unit. The grouping filter can be realized by using a filter that is manufactured comparatively easily. The grouping filter is connected to the add-side port of the core unit 30 (see FIG. 6 to FIG. 9), which allows the function to be expanded to the DOADM in a simple manner at low cost.

Figure 14:
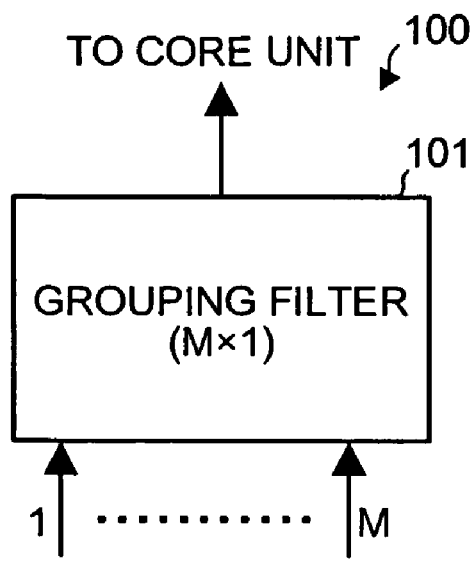
FIG. 14 is a schematic of another configuration of the add unit.

FIG. 14 is a schematic of another configuration of the add unit. An add unit 100 includes an M×1 grouping filter 101. Based on the configuration, the ports of the grouping filter 101 correspond to a plurality of assigned wavelengths to realize the DOADM with limitation on wavelength.

Figure 15:
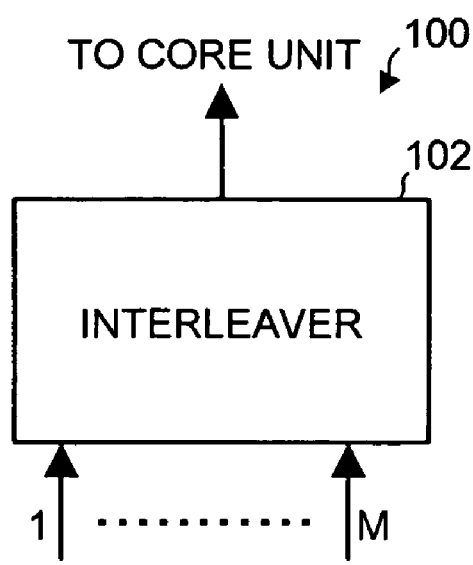
FIG. 15 is a schematic of another configuration of the add unit.

FIG. 15 is a schematic of another configuration of the add unit. An add unit 100 includes an interleaver (IL) 102 that serves as the M×1 grouping filter. The internal configuration of the interleaver 102 is explained in detail later. Input to each of M ports of the interleaver 102 are wavelengths one by one out of the wavelengths assigned to each of the M ports, and M pieces of signals having the wavelengths input are multiplexed and are output.

Figure 16:
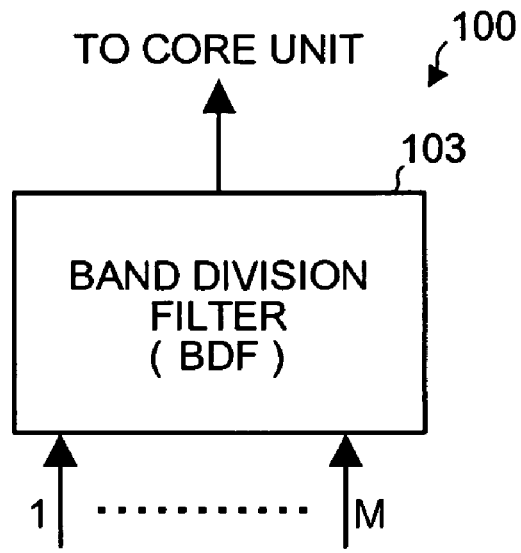
FIG. 16 is a schematic of another configuration of the add unit.

FIG. 16 a schematic of another configuration of the add unit. An add unit 100 includes a band division filter (BDF) 103 that serves as the M×1 grouping filter. The internal configuration of the band division filter 103 is explained in detail later. Input to each of M ports of the band division filter 103 are wavelengths one by one out of the wavelengths assigned to each of the M ports, and M pieces of signals having the wavelengths input are multiplexed and are output.

Figure 17:
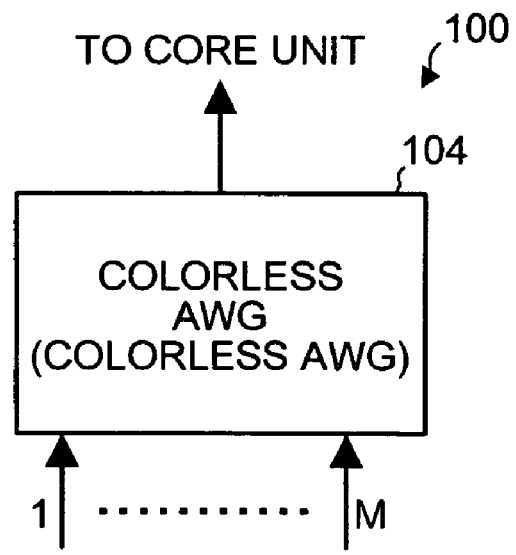
FIG. 17 is a schematic of another configuration of the add unit.

FIG. 17 a schematic of another configuration of the add unit. An add unit 100 includes a colorless AWG (Colorless Arrayed Waveguide Grating) 104 that serves as the M×1 grouping filter. The colorless AWG 104 is configured by using the cyclic property of AWG, and allocates an optical signal with wavelengths multiplexed input into an input port, to different output ports according to each wavelength. Input to each of M ports of the colorless AWG 104 are wavelengths one by one out of the wavelengths assigned to each of the M ports, and M pieces of signals having the wavelengths input are multiplexed and are output. A specific product of the colorless AWG 104 is an AWG router manufactured by NEL. As compared with other systems, the colorless AWG has a higher degree of design flexibility, and a compact size and low cost are possible to be achieved (Reference: "Press Release" [online], Mar. 20th, 2003, NTT Electronics Corp., [Search: Jul. 15th, 2004], Internet <URL:http://www.nel.co.jp/new/information/2003_03_20.html>)

Figure 18:
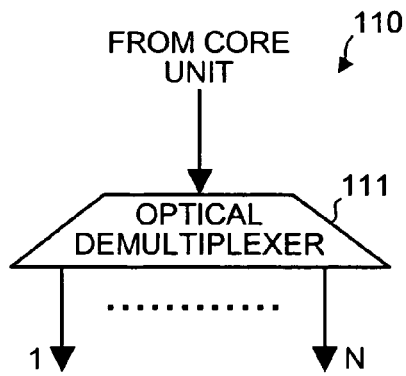
FIG. 18 is a schematic of a configuration of a drop unit.

Various configuration examples of the drop unit are explained below with reference to FIG. 18 to FIG. 25. FIG. 18 is a schematic of a configuration of a drop unit. A drop unit 110 of FIG. 18 includes an optical demultiplexer 111 for a fixed wavelength that has N pieces of output ports. When the optical demultiplexer 111 is used, the function can be expanded to the DOADM with limitation on wavelength because the output ports provided in the optical demultiplexer 111 support a fixed wavelength. The drop unit 110 is connected to the drop-side port of the core unit 30 (see FIG. 6 to FIG. 9), a part of the ports of the optical demultiplexer 111 is used for transmission, and another part thereof is used for the WXC. The function is thereby expanded to the ROADM including the WXC. The drop unit 110 of FIG. 18 is connected to the drop-side port of the core unit 30, which allows a simple OADM to be constructed at low cost.

Figure 19A:
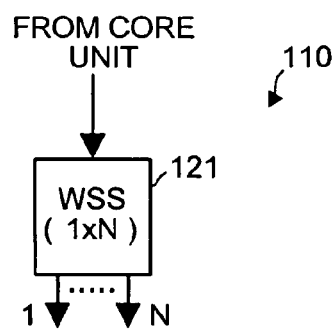
FIG. 19A is a schematic of another configuration of the drop unit.
Figure 19B:
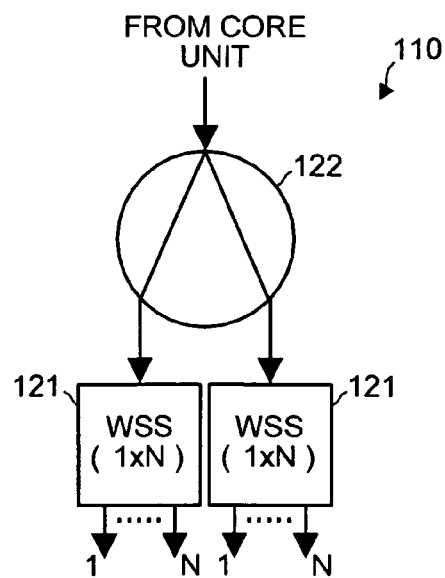
FIG. 19B is a schematic of another configuration of the drop unit.

FIG. 19A is a schematic of another configuration of the drop unit. A drop unit 110 of FIG. 19A includes a 1×N-port wavelength selective switch (WSS) 121. FIG. 19B is a schematic of another configuration of the drop unit. In an example as shown in FIG. 19B, a plurality (two in the example in the figure) of 1×N-port wavelength selective switches (WSS) 121, each of which is the basic configuration as shown in FIG. 19A, are provided to connect outputs of a 1×2 optical coupler 122 to ports in the input side of these wavelength selective switches 121.

The optical coupler 122 having the configuration as shown in FIG. 19B is provided to increase the number of channels of the drop unit 110. Such configuration example allows an arbitrary wavelength type DOADM to be realized. These drop units 110 are connected to the drop-side ports of the core unit 30 (see FIG. 6 to FIG. 9), which makes it possible to expand the function from the low count channel DOADM to the high count channel DOADM. Based on the configuration, the drop unit 110 can be easily connected to the drop-side ports of the core unit 30, and a signal having an arbitrary wavelength can be transmitted to each of the drop-side ports of the core unit 30.

Figure 20:
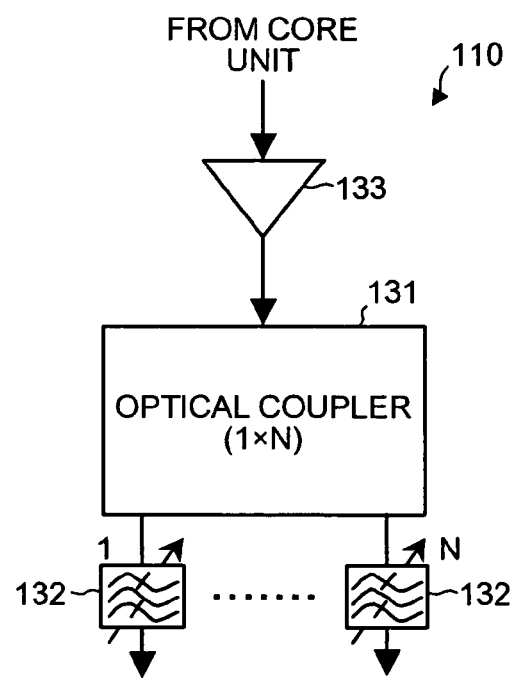
FIG. 20 is a schematic of another configuration of the drop unit.

FIG. 20 is a schematic of another configuration of the drop unit. A drop unit 110 includes a 1×N optical coupler 131 and a plurality of wavelength variable light filters 132 that are connected to the N pieces of output ports of the optical coupler 131. An optical amplifier 133 may be provided in the input side of the optical coupler 131 if necessary. Such a configuration allows the arbitrary wavelength type DOADM to be realized. The drop unit 110 is connected to the drop-side port of the core unit 30 (see FIG. 6 to FIG. 9), which makes it possible to expand the function from the low count channel DOADM to the high count channel DOADM. By connecting the drop unit 110 to the drop-side port of the core unit 30, a simple OADM can be constructed at low cost.

Figure 21:
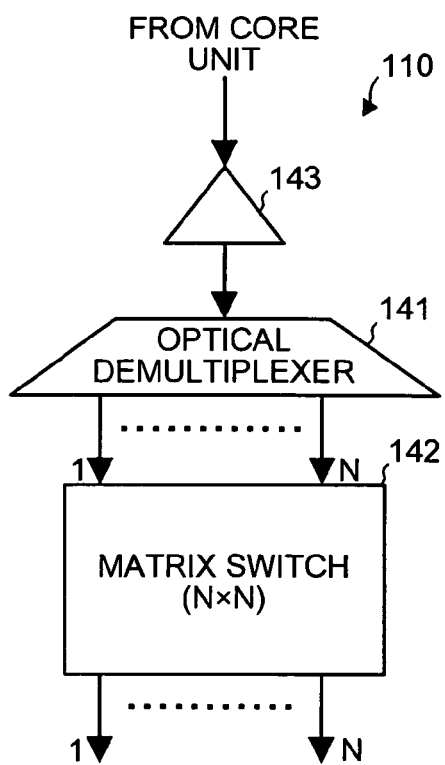
FIG. 21 is a schematic of another configuration of the drop unit.

FIG. 21 is a schematic of another configuration of the drop unit. A drop unit 110 includes an optical demultiplexer 141 that includes N pieces of output ports, and an N×N matrix switch 142. An optical amplifier 143 may be provided in the input side of the optical coupler 141 if necessary. Such a configuration allows the arbitrary wavelength type DOADM to be realized. The drop unit 110 is connected to the drop-side port of the core unit 30 (see FIG. 6 to FIG. 9), which makes it possible to expand the function from the low count channel DOADM to the high count channel DOADM. By connecting the matrix switch 142 having the required number of wavelength ports to the drop-side ports of the core unit 30, a signal having an arbitrary wavelength can be transmitted to the each of the drop-side ports. In this case, there is no need to prepare a plurality of matrix switches even including some pieces that are not used upon initial introduction.

Figure 22:
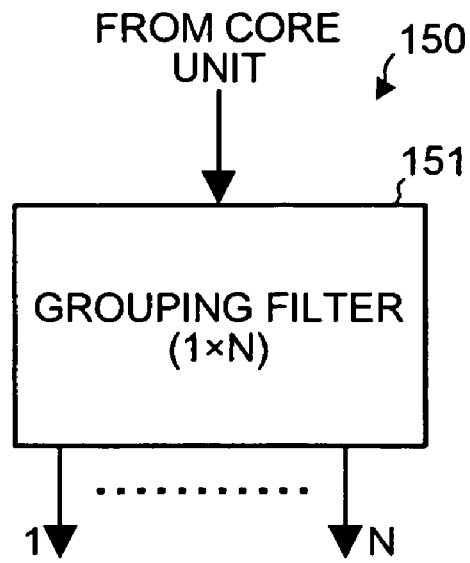
FIG. 22 is a schematic of another configuration of the drop unit.

FIG. 22 to FIG. 25 are configuration examples each in which a grouping filter is used in the drop unit. FIG. 22 is a schematic of another configuration of the drop unit. A drop unit 150 includes a 1×N grouping filter 151. Based on the configuration, the ports of the grouping filter 151 correspond to a plurality of wavelengths assigned to realize the DOADM with limitation on wavelength.

Figure 23:
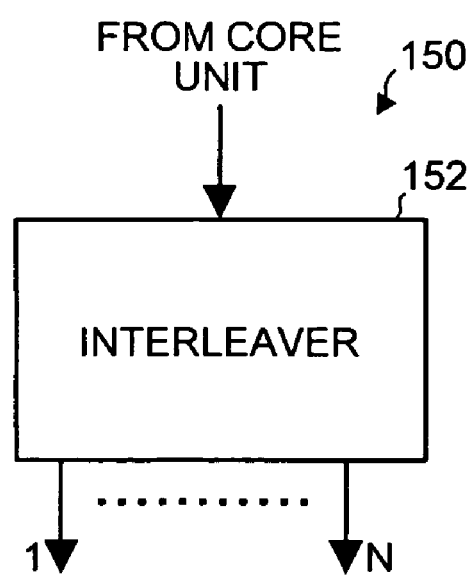
FIG. 23 is a schematic of another configuration of the drop unit.

FIG. 23 is a schematic of another configuration of the drop unit. A drop unit 150 includes an interleaver 152 that serves as the 1×N grouping filter. The internal configuration of the interleaver 152 is explained in detail later. The interleaver 152 realizes the function of the drop unit by allocating wavelengths of a drop signal one by one, out of the wavelengths assigned to N ports of the interleaver, to each of the N ports.

Figure 24:
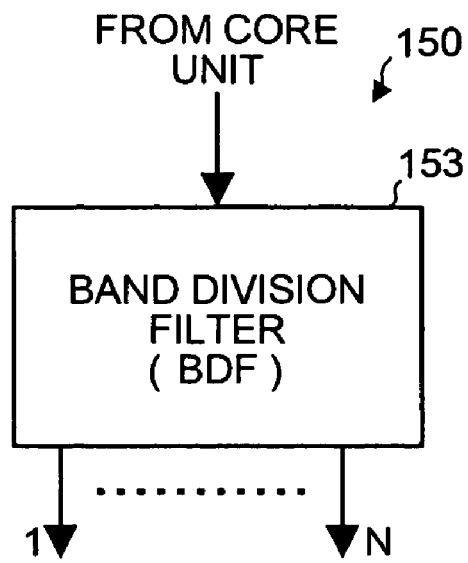
FIG. 24 is a schematic of another configuration of the drop unit.

FIG. 24 is a schematic of another configuration of the drop unit. A drop unit 150 includes a band division filter (BDF) 153 that serves as the 1×N grouping filter. The internal configuration of the band division filter 153 is explained in detail later. The band division filter 153 realizes the function of the drop unit by allocating wavelengths of a drop signal one by one, out of the wavelengths assigned to N ports of the band division filter, to each of the N ports.

Figure 25:
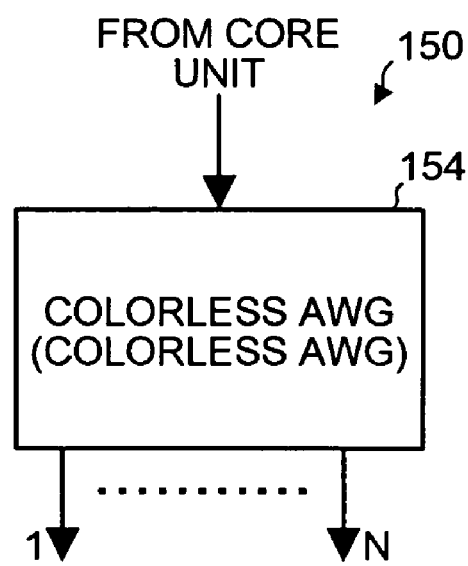
FIG. 25 is a schematic of another configuration of the drop unit.

FIG. 25 is a schematic of another configuration of the drop unit. A drop unit 150 includes a colorless AWG 154 that serves as the 1×N grouping filter. The colorless AWG 154 realizes the function of the drop unit by allocating wavelengths of a drop signal one by one, out of the wavelengths assigned to N ports of the colorless AWG, to each of the N ports.

Figure 26:
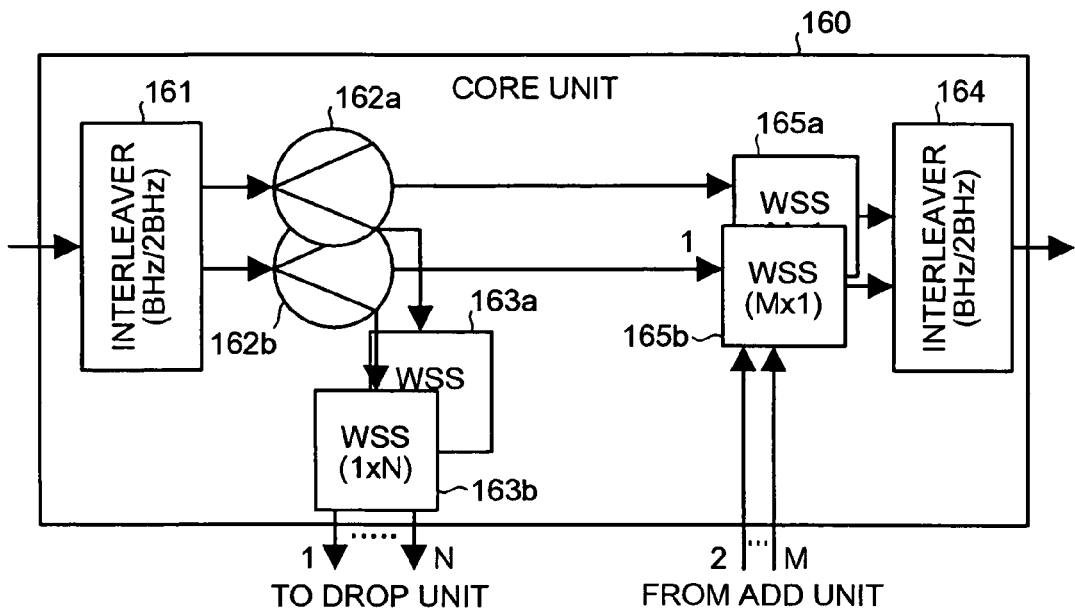
FIG. 26 is a schematic of a core unit that changes a wavelength spacing.

FIG. 26 is a schematic of a core unit that changes a wavelength spacing. A core unit 160 includes a BHz/2 BHz input-side interleaver 161, two 1×2 optical couplers 162a and 162b that are connected to the interleaver 161, two 1×N-port 2 BHz-spacing wavelength selective switches (WSS) 163a and 163b for dropping, a BHz/2 BHz output-side interleaver 164, two M×1-port 2 BHz-spacing wavelength selective switches (WSS) 165a and 165b for adding. The core unit 160 can support transmission signals at a BHz (e.g., 50 GHz) spacing. The output-side interleaver 164 returns the transmission signals at a 2 BHz spacing to those at the BHz spacing and outputs the transmission signals. It is noted that 2 BHz represents a frequency as twice as BHz (if B=50 G, 2 BHz=100 GHz).

A wavelength selective switch or a grouping filter or so (not shown) is further connected to the ports of the wavelength selective switches 163a and 163b for dropping in the core unit 160, and an optical coupler or so is connected to the port for adding, which allows the function expansion from the low count channel DOADM to the high count channel DOADM. Furthermore, a combination of a plurality of wavelength selective switches allows the function to be expanded to the WXC. When the wavelength spacing is narrowed in terms of design or manufacturing of the wavelength selective switch in particular, the number of ports has sometimes been limited. According to the core unit 160 having the configuration, the expansion can be easily realized by using the wavelength selective switches 163a, 163b, 165a, and 165b that support a spacing (2 BHz) that is twice as wide as the wavelength spacing (BHz) of signals.

Figure 27:
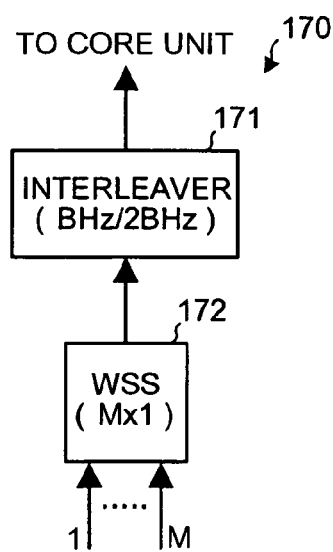
FIG. 27 is a schematic of a core unit that changes a wavelength spacing.

FIG. 27 is a schematic of a core unit that changes a wavelength spacing. An add unit 170 includes a BHz/2 BHz interleaver 171 and an M×1-port 2 BHz-spacing wavelength selective switch (WSS) 172. This configuration allows the wavelength spacing handled by the wavelength selective switch 172 to be widened (loosened) to 2 BHz even if the transmission signal is at BHz. The add unit 170 is connected to the add-side port of the core unit 160 of FIG. 26 to allow the function expansion from the low count channel DOADM to the high count channel DOADM.

Figure 28:
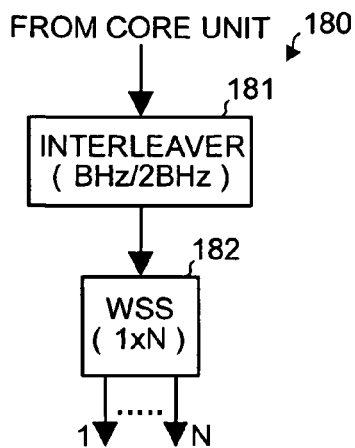
FIG. 28 is a schematic of a drop unit that changes a wavelength spacing.

FIG. 28 is a schematic of a drop unit that changes a wavelength spacing. A drop unit 180 includes a BHz/2 BHz interleaver 181 and a 1×N-port 2 BHz-spacing wavelength selective switch (WSS) 182. This configuration allows the wavelength spacing handled by the wavelength selective switch 182 to be widened (loosened) to 2 BHz even if the transmission signal is at BHz. The drop unit 180 is connected to the drop-side port of the core unit 160 of FIG. 26 to allow the function expansion from the low count channel DOADM to the high count channel DOADM.

Figure 29:
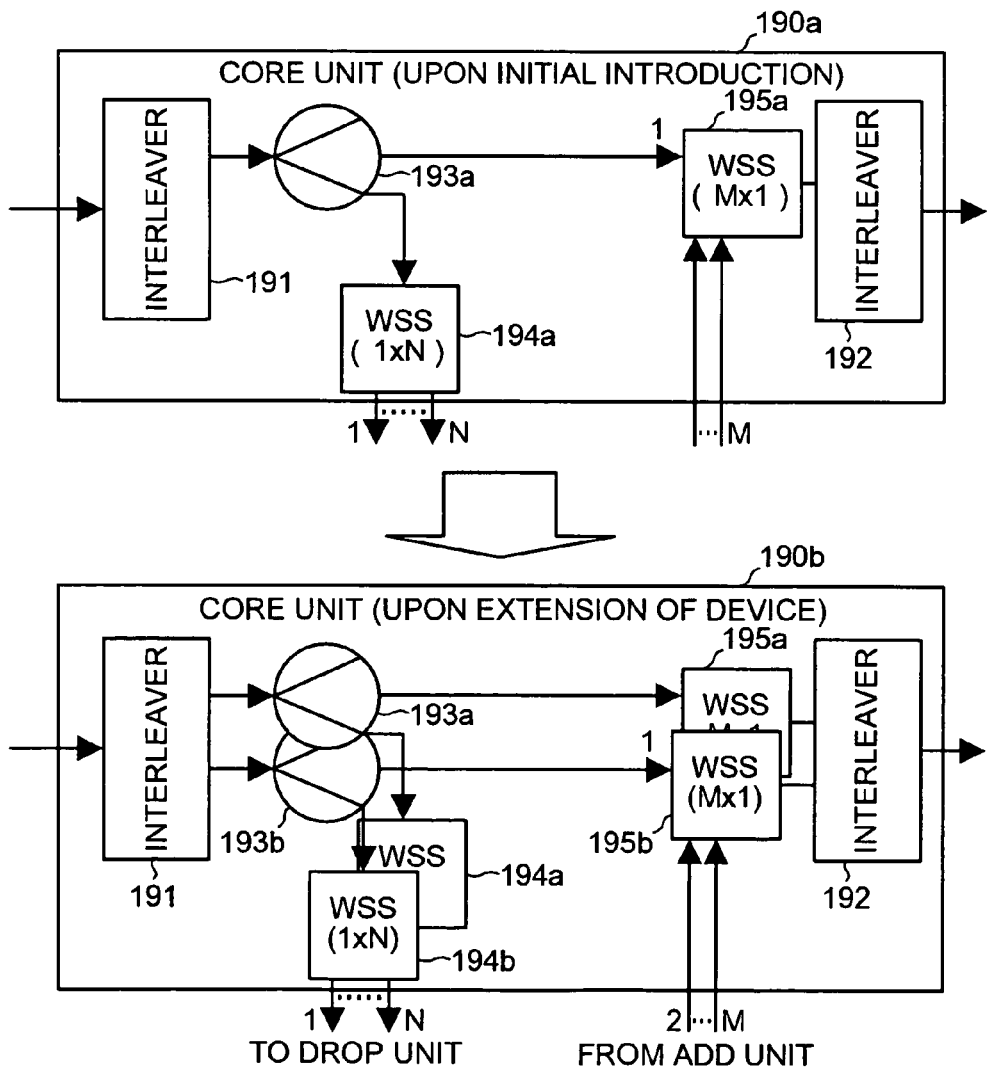
FIG. 29 is a schematic for explaining function expansion of the core unit.

FIG. 29 is a schematic for explaining function expansion of the core unit. A core unit 190a is provided before the function expansion (upon initial introduction), and at this time a transmission signal is at BHz. At the time of the initial introduction with little communication capacity, a 1×2 optical coupler 193a, a 1×N-port 2 BHz-spacing wavelength selective switch (WSS) 194a, and an M×1-port 2 BHz-spacing wavelength selective switch (WSS) 195a are arranged between a pair of interleavers 191 and 192, and the device is started to be operated.

When the communication capacity increases and the addition of the device is needed, the function is to be expanded. At this time, a core unit 190b may be configured by additionally providing another group of 1×2 optical coupler 193b, a 1×N-port 2 BHz-spacing wavelength selective switch (WSS) 194b, and an M×1-port 2 BHz-spacing wavelength selective switch (WSS) 195b between the pair of interleavers 191 and 192. This configuration allows the extension while operating the transmission signal, which makes it possible to increase the number of add/drop ports using a general-purpose wavelength selective switch. Moreover, there is no need to replace the internal configuration with another one, which makes it possible to achieve function expansion at low cost.

Figure 30A:
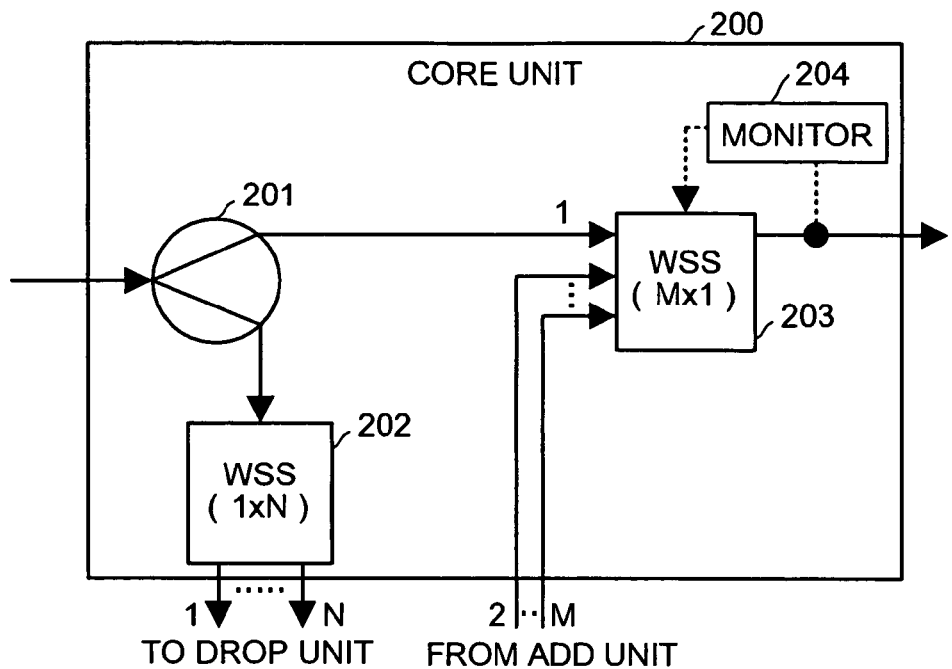
FIG. 30A is a schematic of optical power control in the core unit.

The control of optical power in portions of the core unit is explained below. FIG. 30A is a schematic of optical power control in the core unit. A core unit 200 includes a 1×2 optical coupler 201, a 1×N-port wavelength selective switch (WSS) 202 for dropping, and an M×1-port wavelength selective switch (WSS) 203 for adding. A branch portion for power monitor and a monitor 204 for optical power are arranged in an output portion of the M×1-port wavelength selective switch (WSS) 203. The monitor 204 includes a photodetector such as PD and detects the intensity of each channel in the optical WDM signal or total optical signal power. The wavelength selective switch 203 adjusts photo-coupling of a through signal (main signal) passing through the core unit 200 and an add signal for each channel to perform optical power control.

Figure 30B:
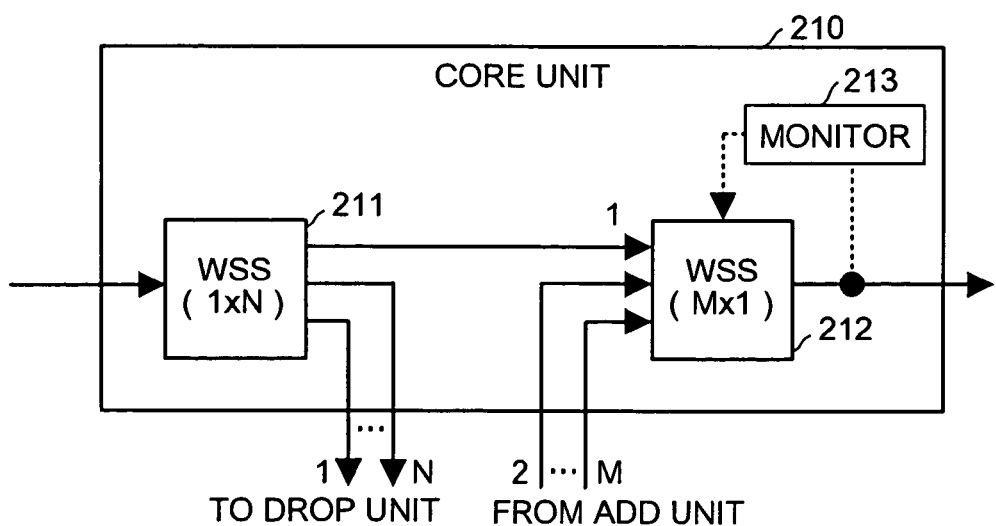
FIG. 30B is a schematic of another optical power control in the core unit.

FIG. 30B is a schematic of another optical power control in the core unit. A core unit 210 includes a 1×N-port wavelength selective switch (WSS) 211 for dropping, and an M×1-port wavelength selective switch (WSS) 212 for adding. A branch portion for power monitor and a monitor 213 for optical power of each channel, or total optical power are arranged in an output portion of the M×1-port wavelength selective switch (WSS) 212. With this arrangement, photo-coupling of a through signal (main signal) passing through the core unit 210 and an add signal is adjusted for each channel to perform optical power control.

Figure 31:
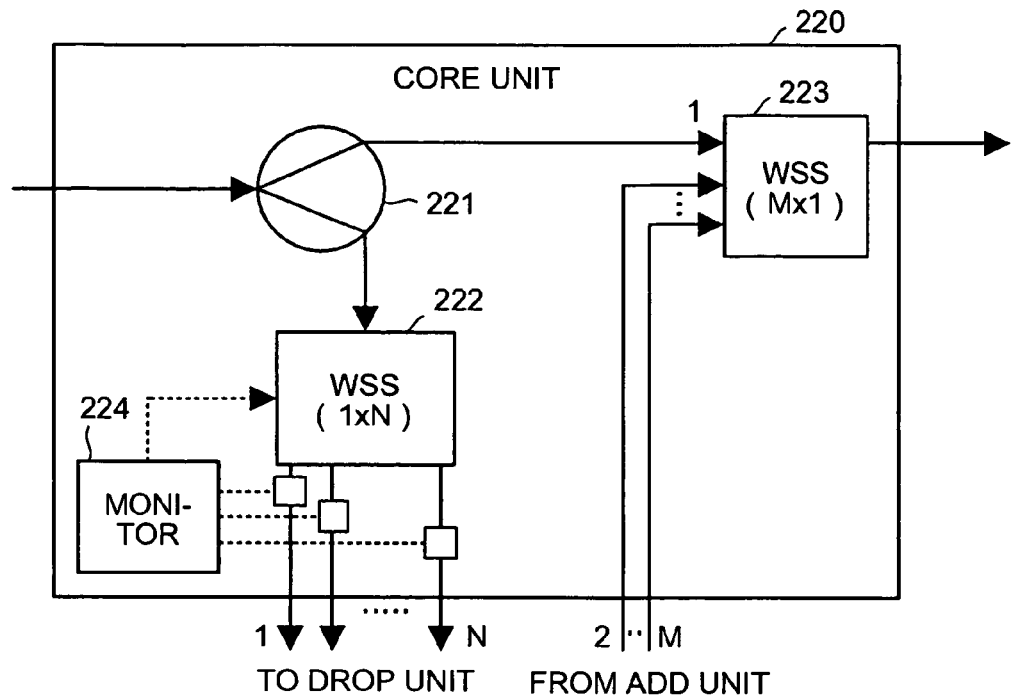
FIG. 31 is a schematic of another optical power control in the core unit.

FIG. 31 is a schematic of another optical power control in the core unit. A core unit 220 includes a 1×2 optical coupler 221, a 1×N-port wavelength selective switch (WSS) 222 for dropping, and an M×1-port wavelength selective switch (WSS) 223 for adding. A branch portion for power monitor and a monitor 224 are arranged in an output portion of the wavelength selective switch 222 for dropping. Photo-coupling is adjusted for each channel in the wavelength selective switch 222 to adjust an optical power level to be output from the wavelength selective switch 222. This adjustment allows the optical power level of drop signals for each channel to be controlled.

Figure 32A:
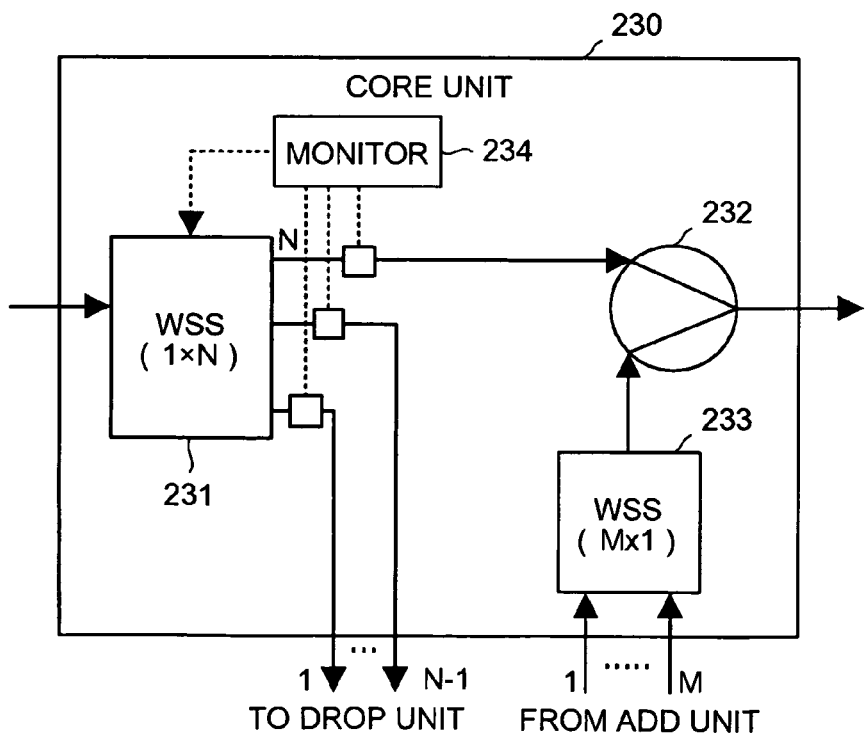
FIG. 32A is a schematic of another optical power control in the core unit.

FIG. 32A is a schematic of another optical power control in the core unit. A core unit 230 includes a 1×N-port wavelength selective switch (WSS) 231 for dropping, a 2×1 optical coupler 232, and an M×1-port wavelength selective switch (WSS) 233 for adding. A branch portion for power monitor and a monitor 234 are arranged in an output portion of the wavelength selective switch 231. Photo-coupling is adjusted for each channel in the wavelength selective switch 231 to adjust an optical power level at the output portion of the wavelength selective switch 231. This adjustment allows optical power control for a through signal (main signal) passing through the core unit 230 and for a drop signal to be performed for each channel.

Figure 32B:
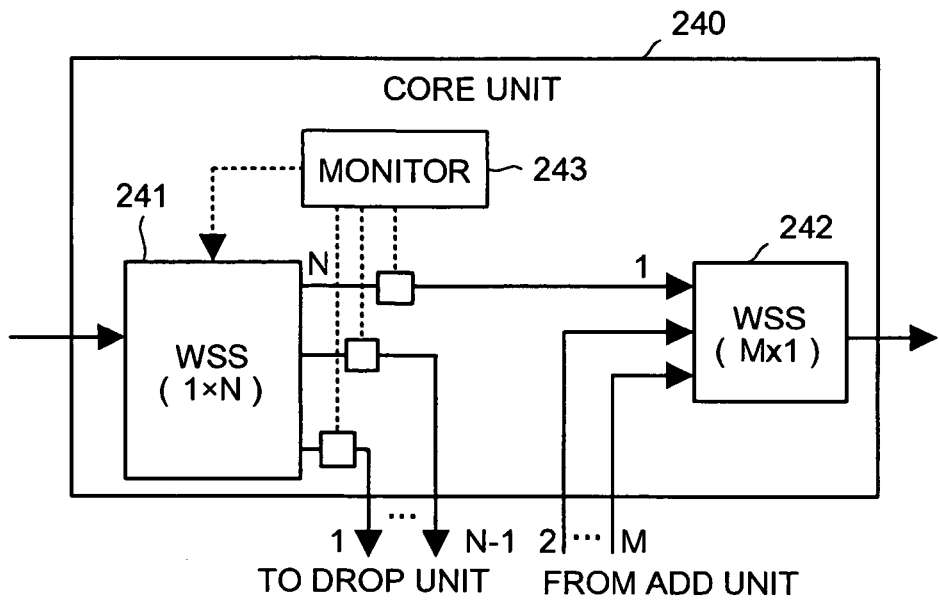
FIG. 32B is a schematic of another optical power control in the core unit.

FIG. 32B is a schematic of another optical power control in the core unit. A core unit 240 includes a 1×N-port wavelength selective switch (WSS) 241 for dropping, and an M×1-port wavelength selective switch (WSS) 242 for adding. A branch portion for power monitor and a monitor 243 for optical power are arranged in an output portion of the wavelength selective switch 241. Photo-coupling is adjusted for each channel in the wavelength selective switch 241, which allows optical power control for a through signal (main signal) passing through the core unit 230 and for a drop signal to be performed for each channel.

Figure 33:
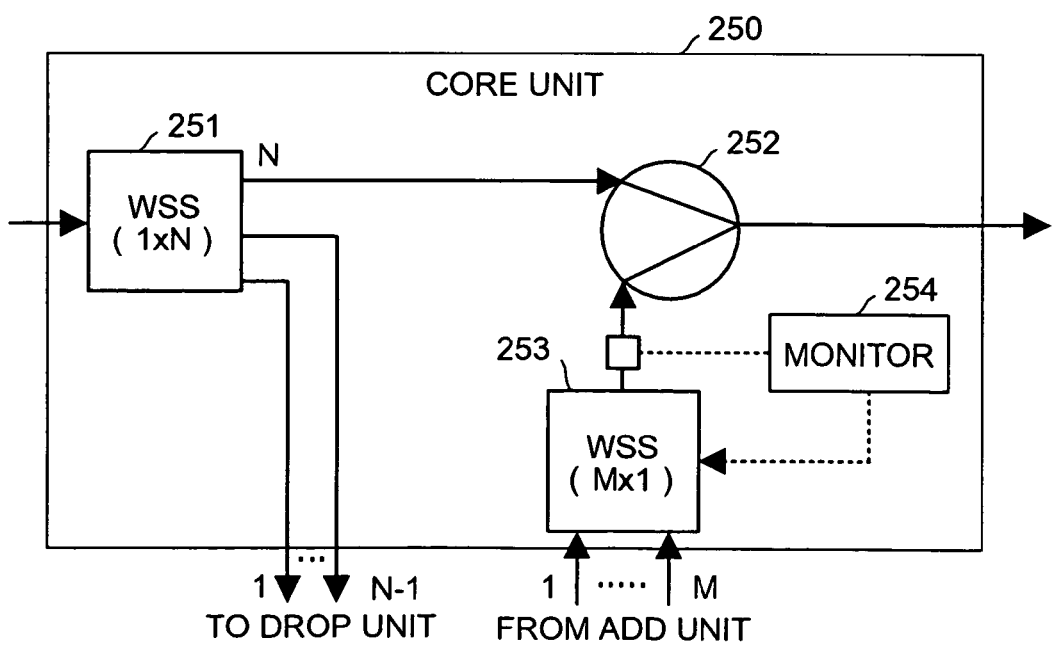
FIG. 33 is a schematic of another optical power control in the core unit.

FIG. 33 is a schematic of another optical power control in the core unit. A core unit 250 includes a 1×N-port wavelength selective switch (WSS) 251 for dropping, a 2×1 optical coupler 252, and an M×1-port wavelength selective switch (WSS) 253 for adding. A branch portion for power monitor and a monitor 254 are arranged in an output portion of the wavelength selective switch 253. Photo-coupling is adjusted for each channel in the wavelength selective switch 253 to allow optical power control for a drop signal to be performed for each channel.

An optical spectrum monitor can be used instead of the monitor 204 to the monitor 254 in the configuration examples 1 to 6 (FIG. 30A to FIG. 33) of the optical power control in the core units. Alternatively, an optical power monitor array can be used as the monitor.

Figure 34A:
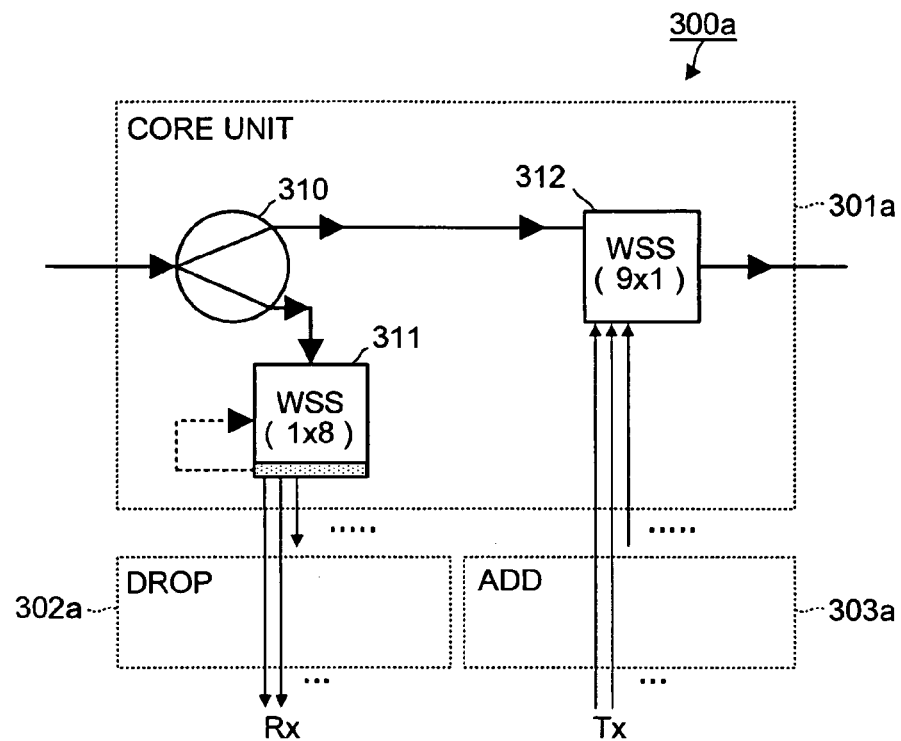
FIG. 34A is a schematic of a configuration of the optical add/drop multiplexer at the time of initial introduction.

In-service upgrade example 1 of the optical add/drop multiplexer according to the present invention is explained below. FIG. 34A is a diagram of a configuration of an optical add/drop multiplexer upon initial introduction. An optical add/drop multiplexer 300a forms the low count channel (LCC) DOADM. As shown in the figure, a core unit 301a of the optical add/drop multiplexer 300a includes a 1×2 optical coupler 310, a 1×8-port 50-GHz-spacing wavelength selective switch (WSS) 311 for dropping, and a 9×1-port 50-GHz-spacing wavelength selective switch (WSS) 312 for adding. The core unit 301a is connected with a drop unit 302a and an add unit 303a. Based on the configuration, the number of signals to be dropped to the drop unit 302a by the core unit 301a corresponds to eight ports at maximum, and the number of signals to be added from the add unit 303a corresponds to nine ports at maximum. A part of the signals to be dropped or added can be dropped to or added from the wavelength cross-connect device (not shown) or the like.

Figure 34B:
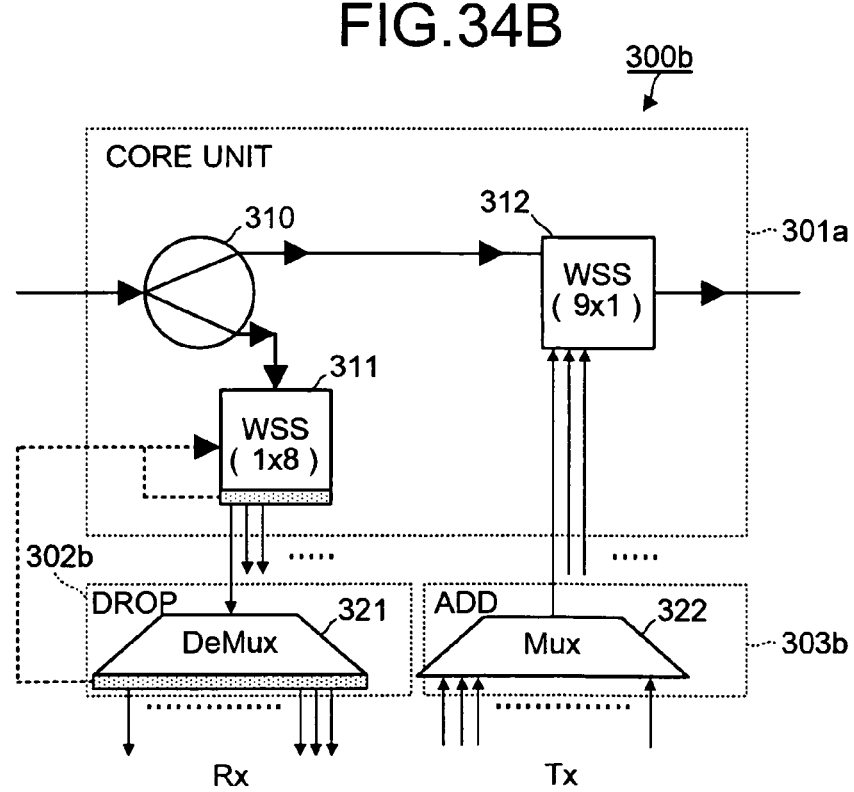
FIG. 34B is a schematic for explaining expansion of the optical add/drop multiplexer shown in FIG. 34A.

FIG. 34B is a schematic for explaining expansion of the optical add/drop multiplexer shown in FIG. 34A. The core unit 301a of an optical add/drop multiplexer 300b has the same configuration as that of FIG. 34A. That is, no part is changed in the core unit 301a. However, each configuration of the drop unit 302a and the add unit 303a is changed. A new drop unit 302b includes an optical demultiplexer (DeMux) 321, and an add unit 303b includes an optical multiplexer (Mux) 322. This configuration allows the optical add/drop multiplexer 300b to expand the function to the ROADM that supports the wavelength cross-connect.

Figure 34C:
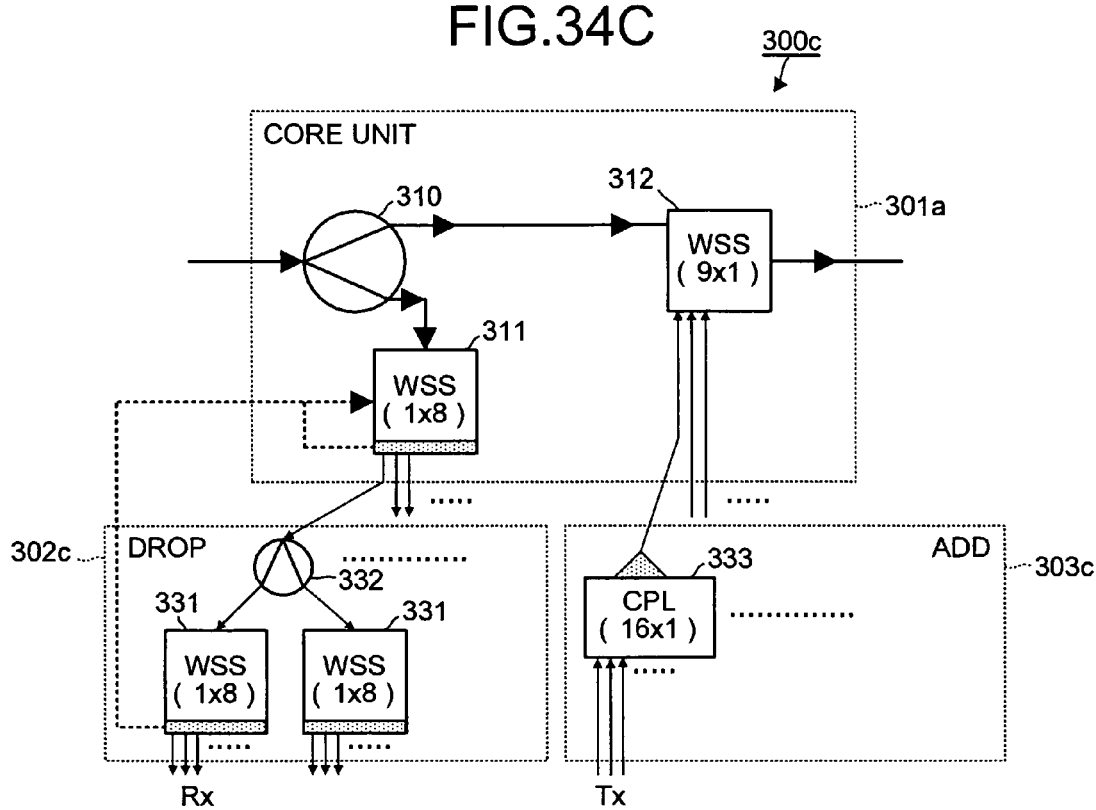
FIG. 34C is a schematic for explaining another expansion of the optical add/drop multiplexer shown in FIG. 34A.

FIG. 34C is a schematic for explaining another expansion of the optical add/drop multiplexer shown in FIG. 34A. The core unit 301a of an optical add/drop multiplexer 300c has the same configuration as that of FIG. 34A. That is, no part is changed in the core unit 301a. However, the drop unit 302a and the add unit 303a are changed to a drop unit 302c and an add unit 303c, respectively. The drop unit 302b includes a 1×8-port 50-GHz-spacing wavelength selective switch (WSS) 331, and the add unit 303c includes a 16×1-port optical coupler (CPL) 333. As shown in FIG. 34C, by providing a 1×2 optical coupler 332 in the drop unit 302c, a signal dropped from one of the ports of the core unit 301a can also be dropped to a plurality of 1×8-port 50-GHz-spacing wavelength selective switches (WSS) 331. A plurality of 16×1-port optical couplers 333 can be arranged in the add unit 303c. This configuration allows the optical add/drop multiplexer 300c to expand the function to the high count channel (HCC) DOADM.

Furthermore, a part of the 1×8-port 50-GHz-spacing wavelength selective switches (WSS) 311 of the core unit 301a is connected with the 1×8-port 50-GHz-spacing wavelength selective switches (WSS) 331 of the drop unit 302c, and the rest of the ports are connected to the wavelength cross-connect device (not shown), which allows the function to be expanded to the high count channel DOADM that supports the wavelength cross-connect.

Figure 34D:
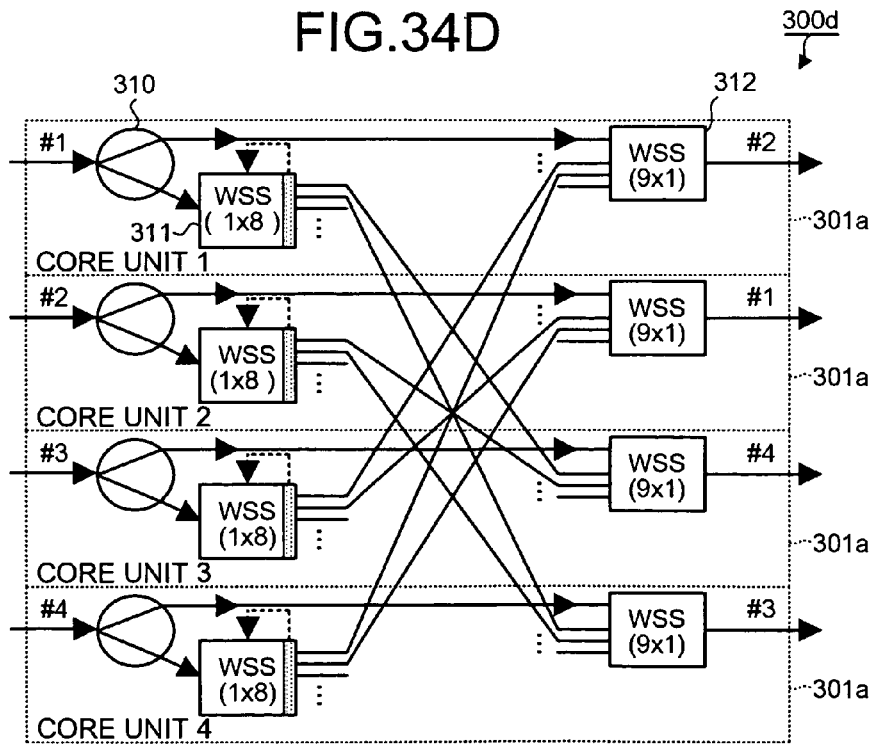
FIG. 34D is a schematic for explaining another expansion of the optical add/drop multiplexer shown in FIG. 34A.

FIG. 34D is a schematic for explaining another expansion of the optical add/drop multiplexer shown in FIG. 34A. The core unit 301a of an optical add/drop multiplexer 300d has the same configuration as that of FIG. 34A, but the number of the core unit 301a is increased to four (core unit 1 to core unit 4). This configuration allows the number of routes to be increased from 1 to 4 and the function to be expanded to the WXC configuration. The function can be expanded to that of FIG. 34D after the function is expanded to the ROADM (see FIG. 34B), or can be expanded after the function is expanded to the high count channel (HCC) DOADM (see FIG. 34C). It is noted that the drop unit and the add unit are omitted in FIG. 34D for simplicity.

Figure 34E:
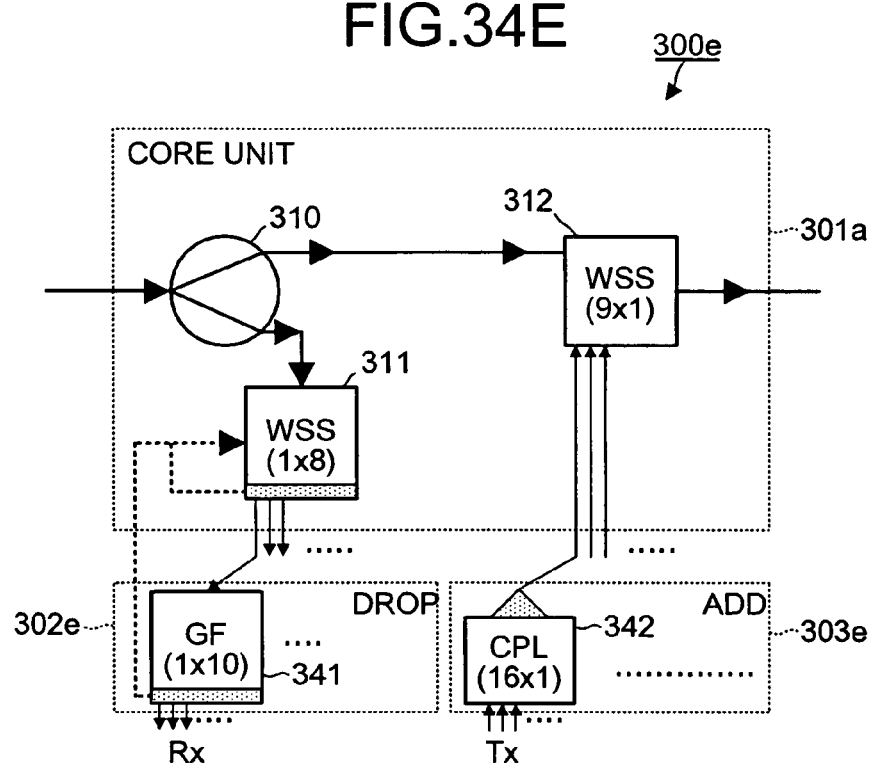
FIG. 34E is a schematic for explaining another expansion of the optical add/drop multiplexer shown in FIG. 34A.

FIG. 34E is a schematic for explaining another expansion of the optical add/drop multiplexer shown in FIG. 34A. An optical add/drop multiplexer 300e is an example of modifying the drop unit 302c and the add unit 303c a shown in FIG. 34C. A 1×10 grouping filter (GF) 341 is provided in a drop unit 302e, and a 16×1-port optical coupler (CPL) 342 is provided in an add unit 303e. This configuration allows the optical add/drop multiplexer 300e to expand the function to the high count channel (HCC) DOADM. The grouping filter 341 is less expensive than WSS 331 (see FIG. 34C), which allows reduction in cost.

The grouping filter 341 of the drop unit 302e is connected to a part of the ports of the 1×8-port 50-GHz-spacing wavelength selective switches (WSS) 311 in the core unit 301a, and the rest of the ports are connected to the wavelength cross-connect device (not shown). It is thereby possible to expand the function to the DOADM with limitation on wavelength that supports the wavelength cross-connect.

The configurations of the function expansions as shown in FIG. 34B to FIG. 34E can be provided without replacement of the core unit 301a. Therefore, even during system operation, the functions can be expanded without reconnecting the fibers and disconnecting the main signal.

Figure 35A:
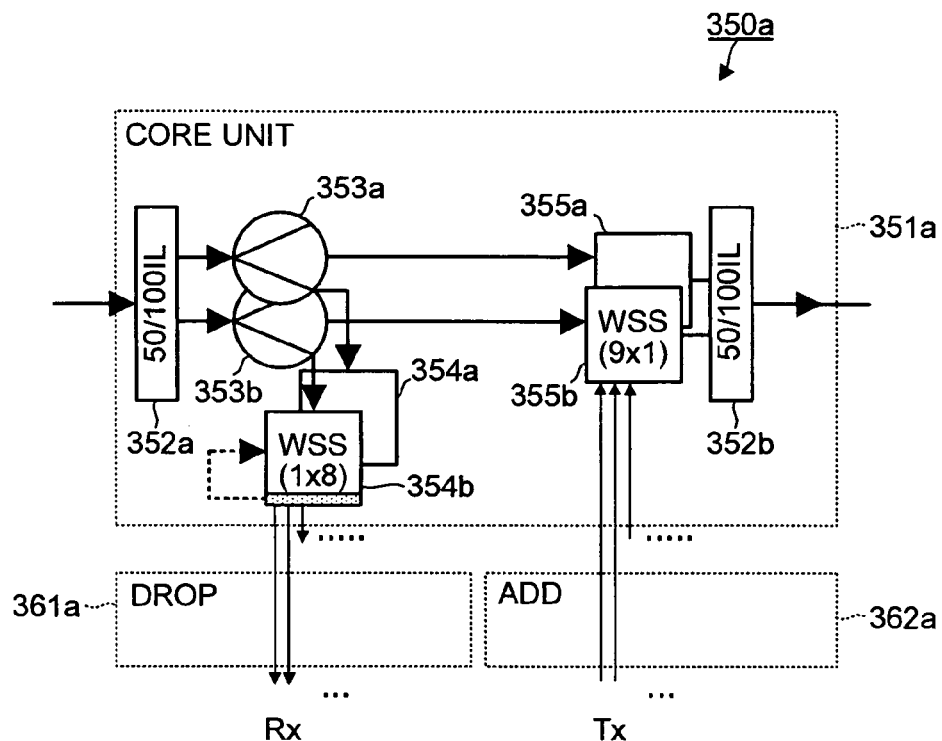
FIG. 35A is a schematic of the optical add/drop multiplexer at the time of initial introduction (In-service upgrade example 2)

In-service upgrade example 2 of the optical add/drop multiplexer according to the present invention is explained below. FIG. 35A is a schematic of the optical add/drop multiplexer at the time of initial introduction. An optical add/drop multiplexer 350a forms the low count channel (LCC) DOADM. As shown in the figure, a core unit 351a of the optical add/drop multiplexer 350a includes a pair of 50 GHz/100 GHz interleavers (IL) 352a and 352b in the input side and the output side thereof. The interleaver 352a includes two 1×2 optical couplers 353a and 353b, two 1×8-port 100-GHz-spacing wavelength selective switches (WSS) 354a and 354b for dropping, and two 9×1-port 100-GHz-spacing wavelength selective switches (WSS) 355a and 355b for adding.

The core unit 351a is connected with a drop unit 361a and an add unit 362a. Based on the configuration, the number of signals to be dropped to the drop unit 361a by the core unit 351a corresponds to 16 ports at maximum, and the number of signals to be added from the add unit 362a corresponds to 18 ports at maximum. A part of the signals dropped or added can be dropped or added to the wavelength cross-connect device (not shown) or the like.

Figure 35B:
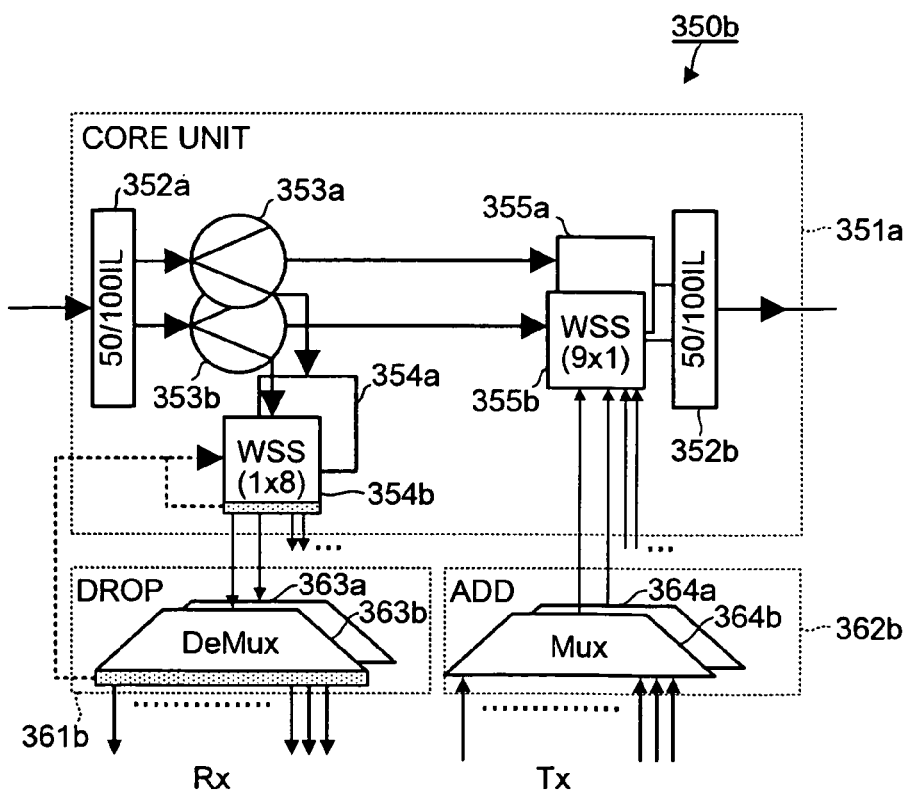
FIG. 35B is a schematic for explaining expansion of the optical add/drop multiplexer shown in FIG. 35A.

FIG. 35B is a schematic for explaining expansion of the optical add/drop multiplexer shown in FIG. 35A. The core unit 351a of an optical add/drop multiplexer 350b has the same configuration as that of FIG. 35A. That is, no part is changed in the core unit 351a. However, each configuration of the drop unit 361a and the add unit 362a is changed. A drop unit 361b includes two optical demultiplexers (DeMux) 363a and 363b, and an add unit 362b includes optical multiplexers (Mux) 364a and 364b. This configuration allows the optical add/drop multiplexer 350b to expand the function to the ROADM that supports the wavelength cross-connect.

Figure 35C:
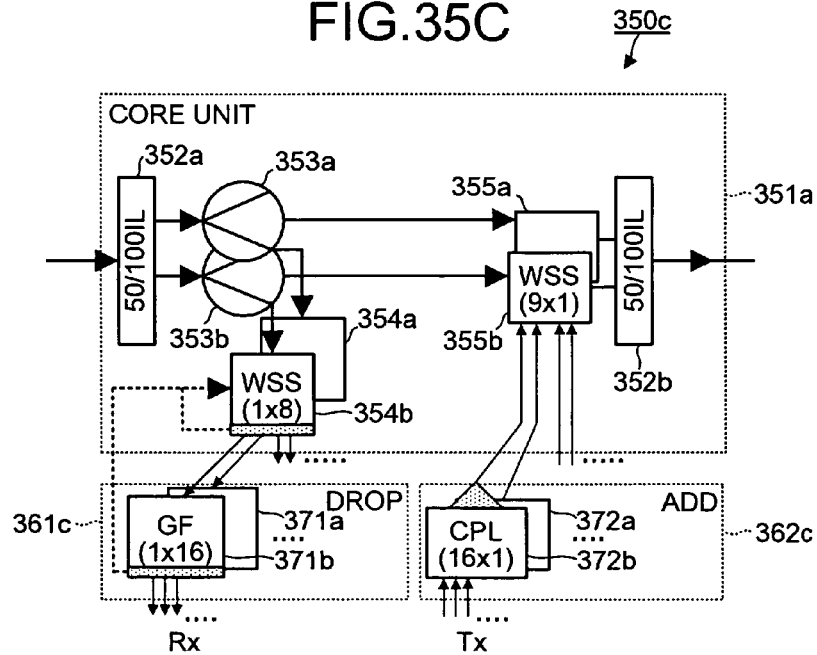
FIG. 35C is a schematic for explaining expansion of the optical add/drop multiplexer shown in FIG. 35A.

FIG. 35C is a schematic for explaining expansion of the optical add/drop multiplexer shown in FIG. 35A. The core unit 351a of an optical add/drop multiplexer 350c has the same configuration as that of FIG. 35A. However, each configuration of the drop unit 361a and the add unit 362a is changed. A drop unit 361c includes two 1×16 grouping filters (GF) 371a and 371b, and an add unit 303e includes two 16×1-port optical couplers (CPL) 372a and 372b. This configuration allows the optical add/drop multiplexer 350c to expand the function to the high count channel (HCC) DOADM with limitation on wavelength that supports the wavelength cross-connect. A larger number of grouping filters can be provided in the drop unit 361c corresponding to the required number of channels for dropping. Likewise, a larger number of optical couplers can be provided in the add unit 362c corresponding to the required number of channels for adding. A part of the signals to be dropped or added can be dropped or added to the wavelength cross-connect device (not shown) or the like.

Figure 35D:
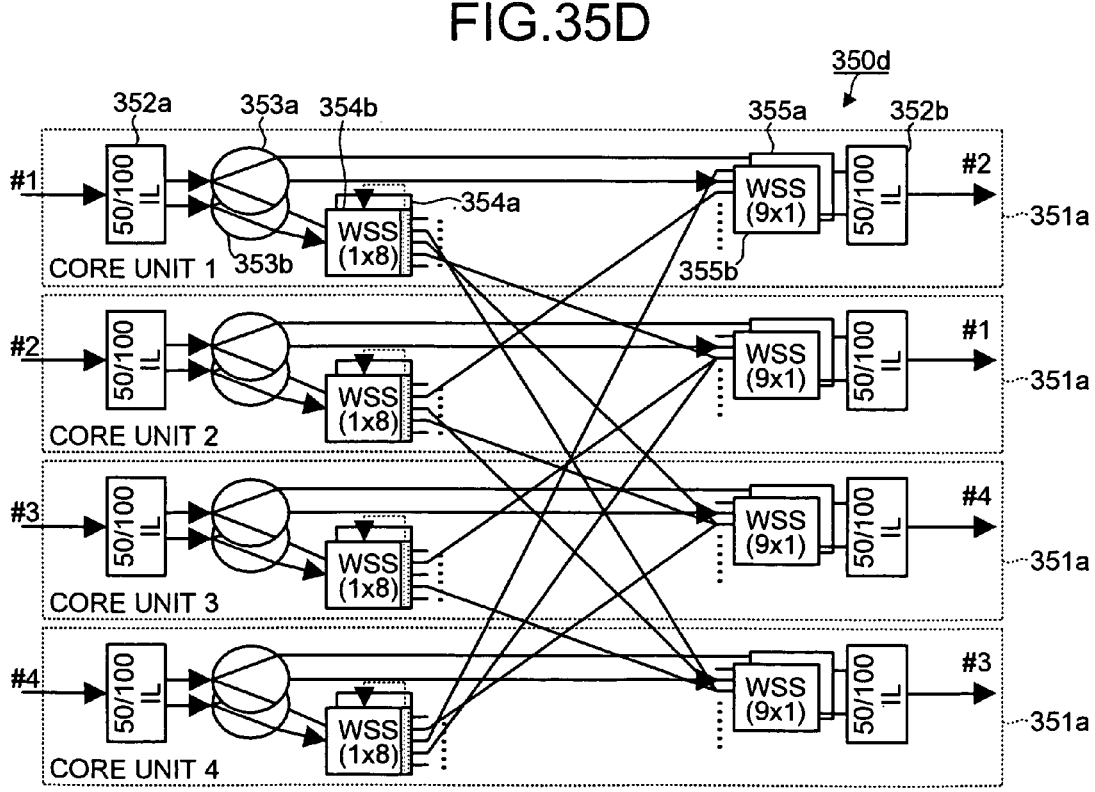
FIG. 35D a schematic for explaining expansion of the optical add/drop multiplexer shown in FIG. 35A.

FIG. 35D is a schematic for explaining expansion of the optical add/drop multiplexer shown in FIG. 35A. The core unit 351a of an optical add/drop multiplexer 350d has the same configuration as that of FIG. 35A, but the number of core unit 351a is increased to four (core unit 1 to core unit 4). This configuration allows the number of routes to be increased from 1 to 4 and the function to be expanded to the WXC configuration. The function can be expanded to that of FIG. 35D after the function is expanded to the ROADM (see FIG. 35B), or can be expanded after the function is expanded to the high count channel (HCC) DOADM (see FIG. 35C). It is noted that the drop unit and the add unit are omitted in FIG. 35D for simplicity.

The configurations of the function expansions as shown in FIG. 35B to FIG. 35D can be provided without replacement of the core unit 351a. Therefore, even during system operation, the functions can be expanded without reconnecting the fibers and disconnecting the main signal.

Figure 36A:
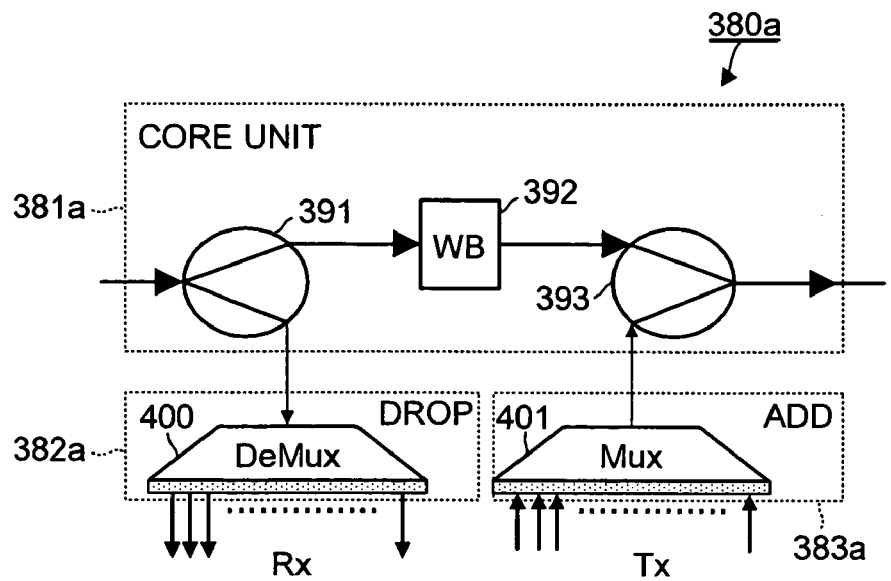
FIG. 36A is a schematic of a configuration of the optical add/drop multiplexer at the time of initial introduction (In-service upgrade example 3)

In-service upgrade example 3 of the optical add/drop multiplexer according to the present invention is explained below. FIG. 36A is a schematic of a configuration of the optical add/drop multiplexer at the time of initial introduction. An optical add/drop multiplexer 380a forms the ROADM. A core unit 381a of the optical add/drop multiplexer 380a includes a 1×2 optical coupler 391, a 50-GHz-spacing wavelength blocker (WB) 392, and a 2×1 optical coupler 393. A drop unit 382a includes an optical demultiplexer (DeMux) 400, and an add unit 383a includes an optical multiplexer (Mux) 401.

Figure 36B:
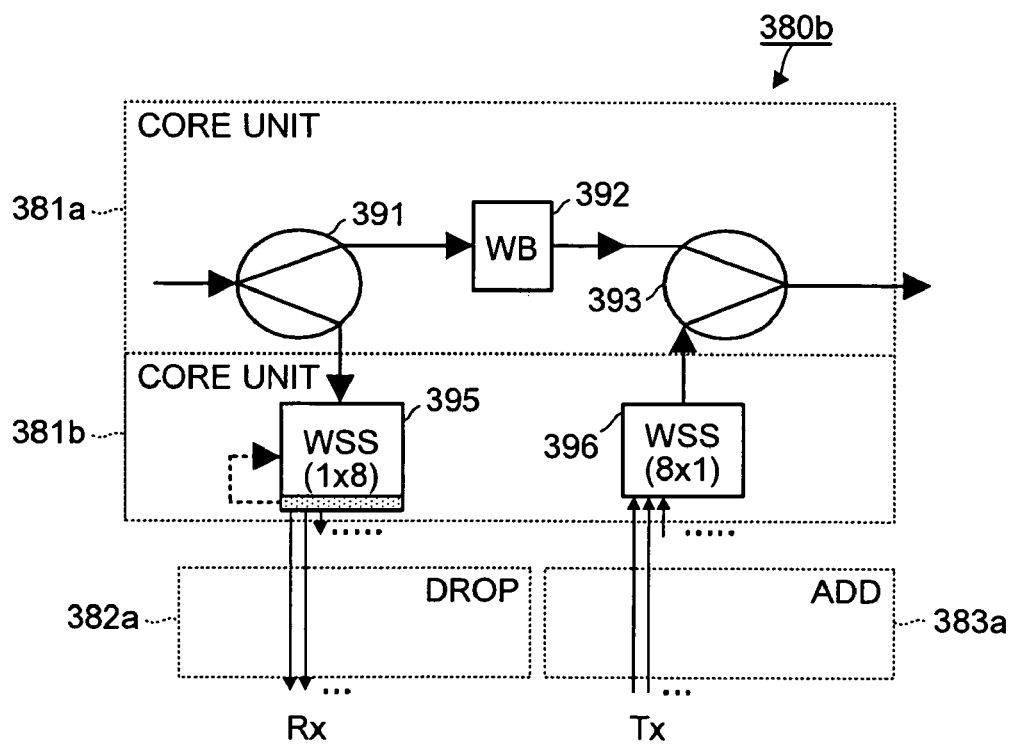
FIG. 36B is a schematic for explaining expansion of the optical add/drop multiplexer shown in FIG. 36A.

FIG. 36B is a schematic for explaining expansion of the optical add/drop multiplexer shown in FIG. 36A. The core unit 381a of an optical add/drop multiplexer 380b has the same configuration as that of FIG. 36A. That is, no part is changed in the core unit 381a. However, a 1×8-port 50-GHz-spacing wavelength selective switch (WSS) 395 for optical demultiplexing is provided in a drop-side port of the core unit 381a. An 8×1-port 50-GHz-spacing wavelength selective switch (WSS) 396 for optical multiplexing is provided in an add-side port of the core unit 381a. These portions are configured as a unit different from the core unit 381a, and the unit is additionally arranged as a core unit 381b. This arrangement allows the optical add/drop multiplexer 380b to achieve function expansion as low count channel (LCC) DOADM. In this configuration, the optical demultiplexer 400 provided in the drop unit 382a and the optical multiplexer 401 provided in the add unit 383a as shown in FIG. 36A can be detached and used for another device. A part of the output ports of the wavelength selective switch 395 and a part of the input ports of the wavelength selective switch 396 can also be dropped or added to a wavelength cross-connect device (not shown).

Figure 36C:
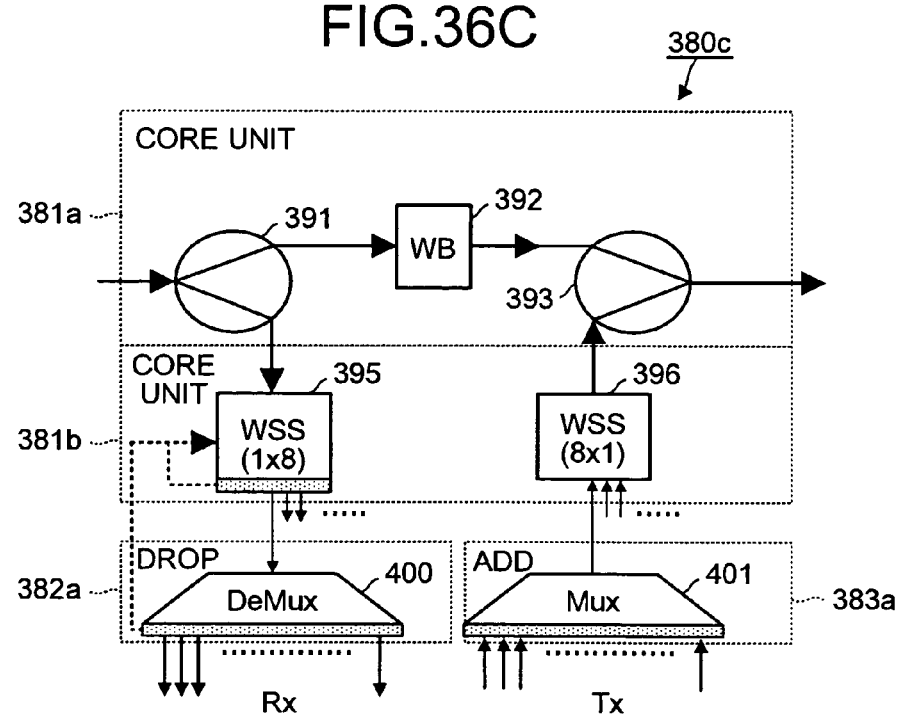
FIG. 36C is a schematic for explaining expansion of the optical add/drop multiplexer shown in FIG. 36A.

FIG. 36C is a schematic for explaining expansion of the optical add/drop multiplexer shown in FIG. 36A. The core unit 381a of an optical add/drop multiplexer 380c has the same configuration as that of FIG. 36A. That is, no part is changed in the core unit 381a. However, the 1×8-port 50-GHz-spacing wavelength selective switch (WSS) 395 for optical demultiplexing is provided in the drop-side port of the core unit 381b. The 8×1-port 50-GHz-spacing wavelength selective switch (WSS) 396 for optical multiplexing is provided in the add-side port of the core unit 381b. At least one of the output ports of the wavelength selective switch 395 in the drop side is connected to the optical demultiplexer (DeMux) 400 of the drop unit 382a, and at least one of the input ports of the wavelength selective switch 396 in the add side is connected to the optical multiplexer (Mux) 401 of the add unit 383a. This arrangement allows the optical add/drop multiplexer 380c to achieve function expansion as the ROADM that supports the wavelength cross-connect. The optical add/drop multiplexer 380c can also be configured by expanding the functions of the optical add/drop multiplexer 380b (see FIG. 36B).

Figure 36D:
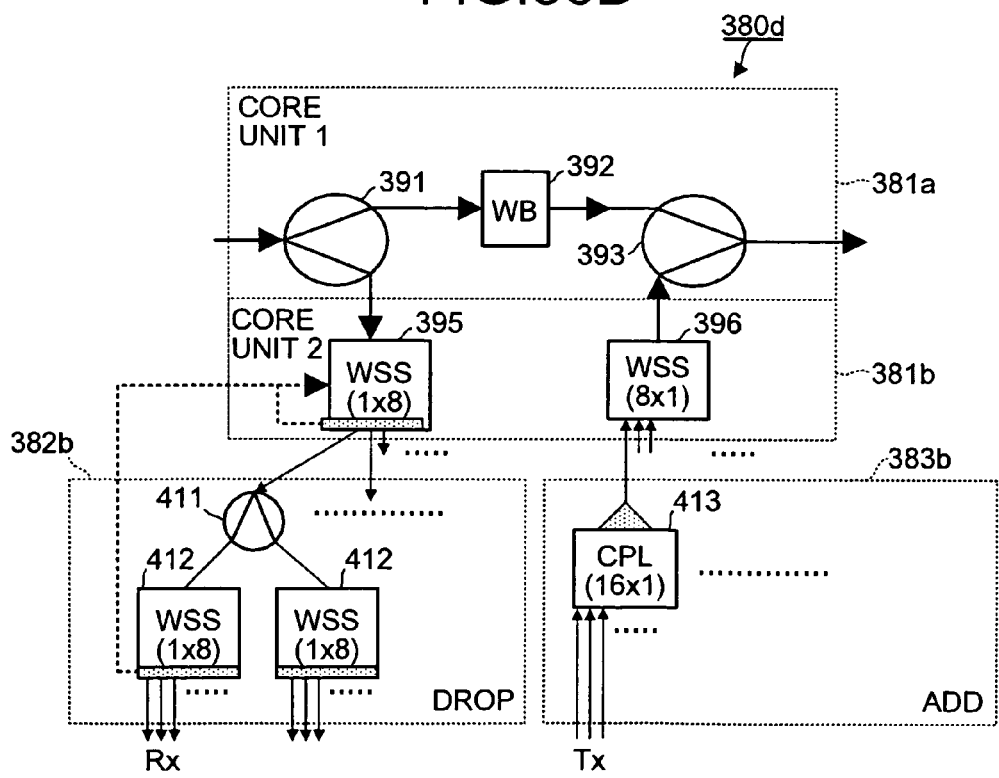
FIG. 36D is a schematic for explaining expansion of the optical add/drop multiplexer shown in FIG. 36A.

FIG. 36D is a schematic for explaining expansion of the optical add/drop multiplexer shown in FIG. 36A. A functional state of an optical add/drop multiplexer 380d as shown in FIG. 36D immediately before it is configured is equivalent to the optical add/drop multiplexer 380b (see FIG. 36B) based on the (LCC) DOADM. The configurations of the core units 381a and 381b are not changed. However, a drop unit 382b includes a 1×2 optical coupler 411, and two 1×8-port 50-GHz-spacing wavelength selective switches (WSS) 412. An add unit 383b includes a 16×1 optical coupler (CPL) 413.

This configuration allows the function to be expanded to the high count channel (HCC) DOADM. The number of pieces of the optical coupler 411 and of the wavelength selective switch 412 provided in the drop unit 382b and the number of pieces of the optical coupler 413 provided in the add unit 383b can be increased by the number required. A part of the output ports of the wavelength selective switch 395 and a part of the input ports of the wavelength selective switch 396 can also be dropped or added to a wavelength cross-connect device (not shown).

Figure 36E:
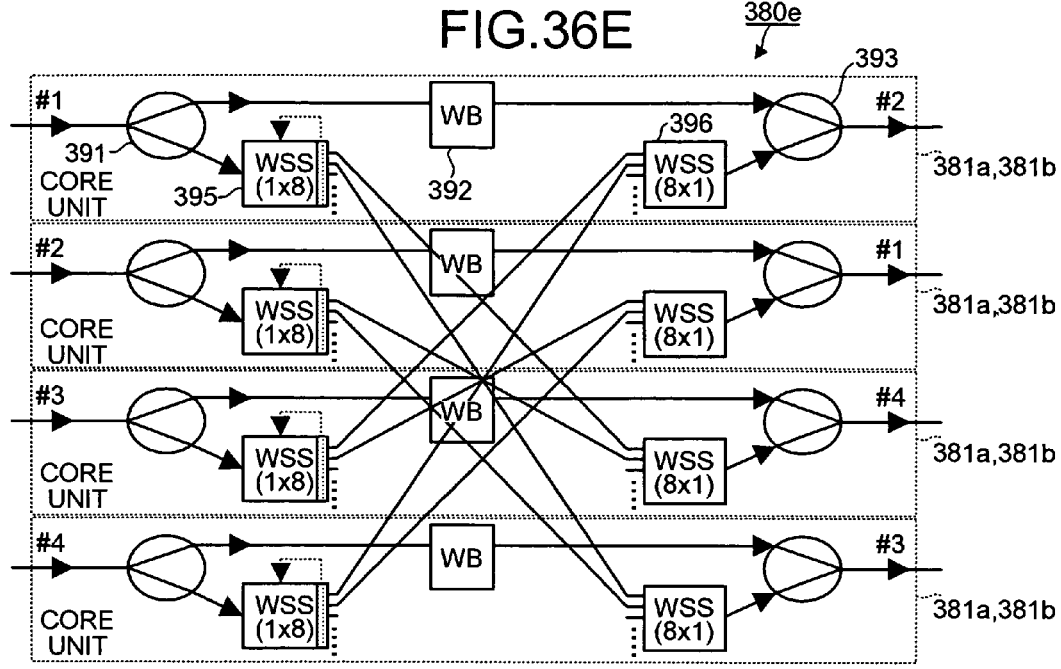
FIG. 36E is a schematic for explaining expansion of the optical add/drop multiplexer shown in FIG. 36A.

FIG. 36E is a schematic for explaining expansion of the optical add/drop multiplexer shown in FIG. 36A. A functional state of an optical add/drop multiplexer 380e as shown in FIG. 36E immediately before it is configured is equivalent to the optical add/drop multiplexer 380c (see FIG. 36C) in the functional state of the ROADM or to the optical add/drop multiplexer 380d (see FIG. 36D) in the functional state of the (HCC) DOADM. A plurality pairs of the core units 381a and 381b are connected to allow the function to be expanded to the optical add/drop multiplexer 380e including the WXC. The functions of the pair of core units 381a and 381b are described in the one core unit as shown in FIG. 36E for simplicity. The configurations of the drop units 382a and 382b and the add units 383a and 383b are not shown, but these units are connected to the core units, respectively.

Figure 36F:
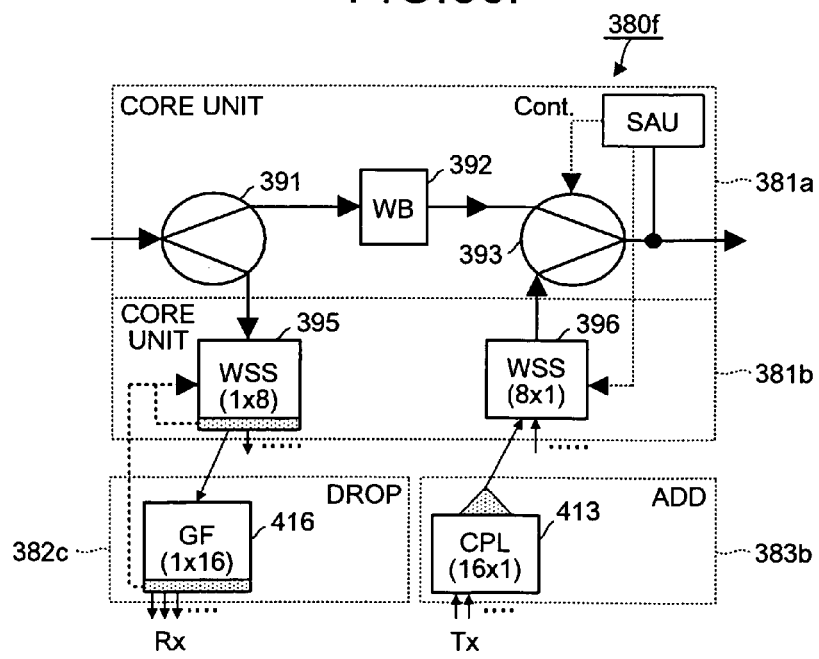
FIG. 36F is a schematic for explaining expansion of the optical add/drop multiplexer shown in FIG. 36A.

FIG. 36F is a schematic for explaining expansion of the optical add/drop multiplexer shown in FIG. 36A. An optical add/drop multiplexer 380f as shown in FIG. 36F is in a function expanded state of the (HCC) DOADM, and is another configuration example in which it can be replaced for the configuration of FIG. 36D. In the optical add/drop multiplexer 380f as shown in FIG. 36F, a 1×16-port grouping filter (GF) 416 is arranged in the drop unit 382c. The add unit 383b uses the 16×1-port optical coupler (CPL) 413. In the configuration example of FIG. 36F, the function can be further expanded to the WXC as shown in FIG. 36E.

The configurations of the function expansions as shown in FIG. 36B to FIG. 36F can be provided without replacement of the core unit 381a. Therefore, even during system operation, the functions can be expanded without reconnecting the fibers and disconnecting the main signal.

Figure 37A:
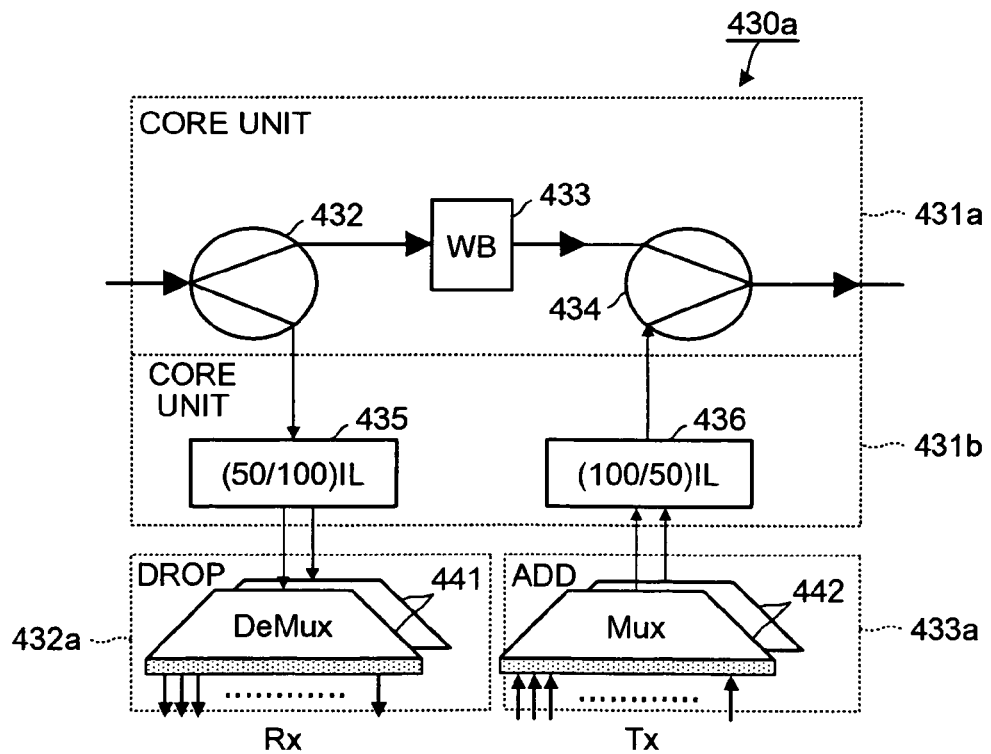
FIG. 37A is a schematic of a configuration of the optical add/drop multiplexer at the time of initial introduction (In-service upgrade example 4)

In-service upgrade example 4 of the optical add/drop multiplexer according to the present invention is explained below. FIG. 37A is a schematic of a configuration of the optical add/drop multiplexer at the time of initial introduction. An optical add/drop multiplexer 430a forms the ROADM. A core unit 431a of the optical add/drop multiplexer 430a includes a 1×2 optical coupler 432, a 50-GHz-spacing wavelength blocker (WB) 433, and a 2×1 optical coupler 434. A core unit 431b is formed as a module differently from the core unit 431a. The core unit 431b includes a 50 GHz/100 GHz interleaver (IL) 435 connected to a drop-side port thereof, and a 50 GHz/100 GHz interleaver (IL) 436 connected to an add-side port thereof. A drop unit 432a includes two optical demultiplexers (DeMux) 441, and an add unit 433a includes two optical multiplexers (Mux) 442.

Figure 37B:
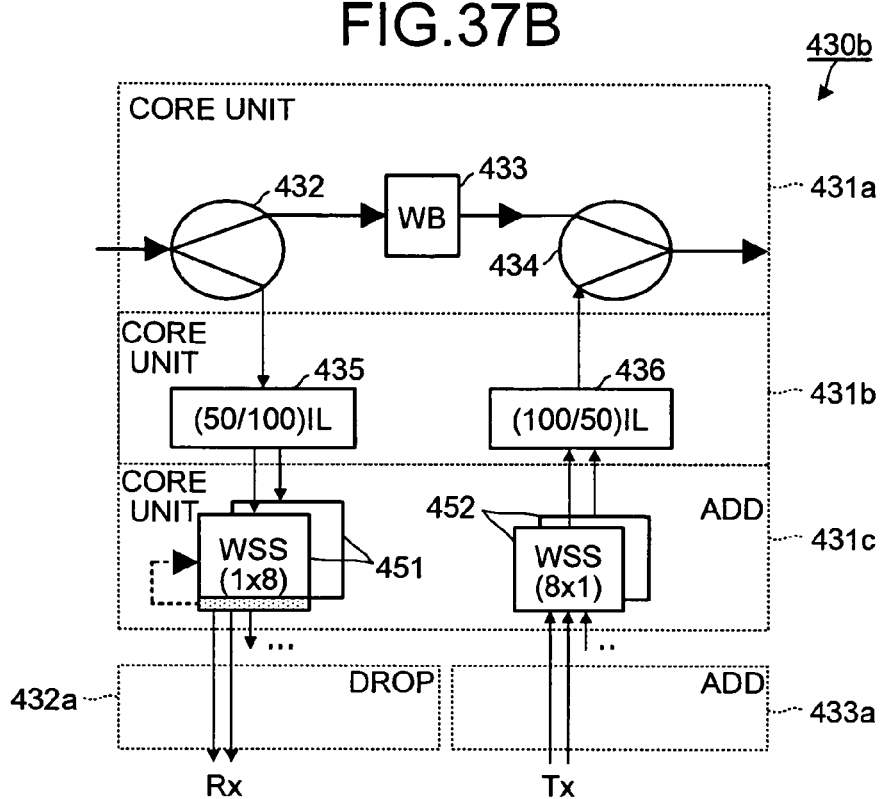
FIG. 37B is a schematic for explaining expansion of the optical add/drop multiplexer shown in FIG. 37A.

FIG. 37B is a schematic for explaining expansion of the optical add/drop multiplexer shown in FIG. 37A. The core units 431a and 431b of an optical add/drop multiplexer 430b have the same configuration as that of FIG. 37A. That is, no parts are changed in the core units 431a and 431b. However, the core unit 431b is further connected with a core unit 431c that is configured as another unit. The core unit 431c includes a plurality of 1×8-port 100-GHz-spacing wavelength selective switches (WSS) 451 for dropping, and a plurality of 8×1-port 100-GHz-spacing wavelength selective switches (WSS) 452 for adding. This arrangement allows the optical add/drop multiplexer 430b to achieve function expansion as the low count channel (LCC) OADM. A part of the output ports of the wavelength selective switches (WSS) 451 or a part of the input ports of the wavelength selective switches (WSS) 452 can also be dropped or added to a wavelength cross-connect device (not shown). In this configuration, the optical demultiplexer 441 provided in the drop unit 432a and the optical multiplexer 442 provided in the add unit 433a as shown in FIG. 37A can be detached and used for another device.

Figure 37C:
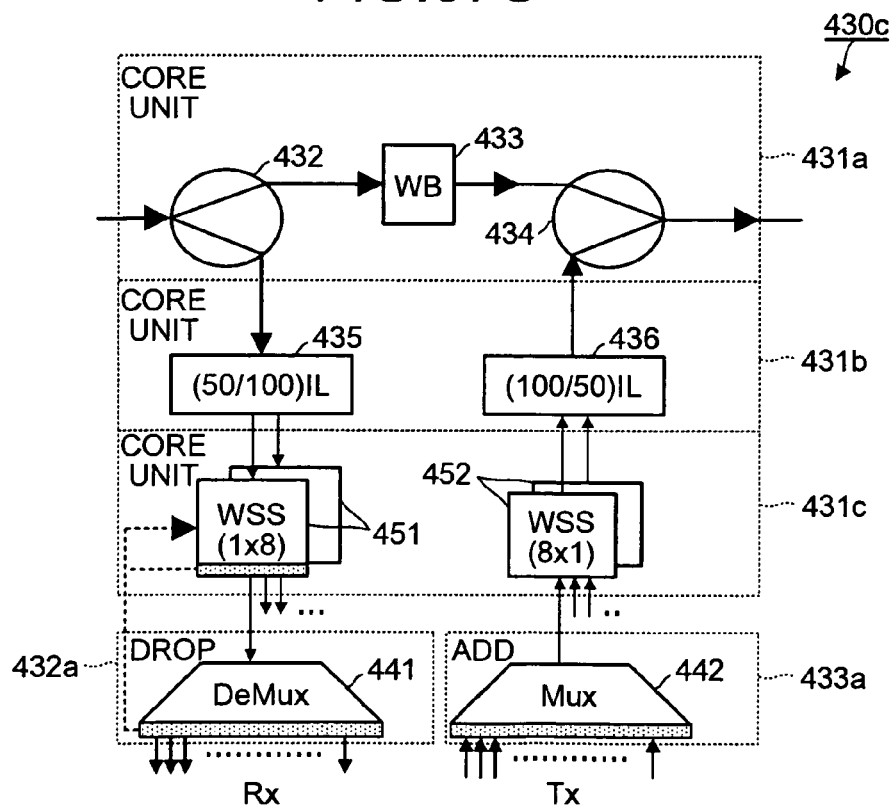
FIG. 37C is a schematic for explaining the expansion of the optical add/drop multiplexer shown in FIG. 37A.

FIG. 37C is a schematic for explaining the expansion of the optical add/drop multiplexer shown in FIG. 37A. Function expansion from the function of the low count channel (LCC) DOADM as shown in FIG. 37B is explained below. Each of the core units 431a, 431b, and 431c of an optical add/drop multiplexer 430c has the same configuration as that of FIG. 37B. That is, no parts are changed therein.

At least one of the output ports of the wavelength selective switch 451 in the drop side is connected to the optical demultiplexer (DeMux) 441 of the drop unit 432a. At least one of the input ports of the wavelength selective switch 452 in the add side is connected to the optical multiplexer (Mux) 442 of the add unit 433a. This arrangement allows the optical add/drop multiplexer 430c to achieve function expansion as the ROADM that supports the wavelength cross-connect. The optical add/drop multiplexer 430c can be configured by expanding the functions of the optical add/drop multiplexer 430a (see FIG. 37A). When the function is to be changed from the initial state of FIG. 37A, the core unit 431c may be additionally arranged in the above manner.

Figure 37D:
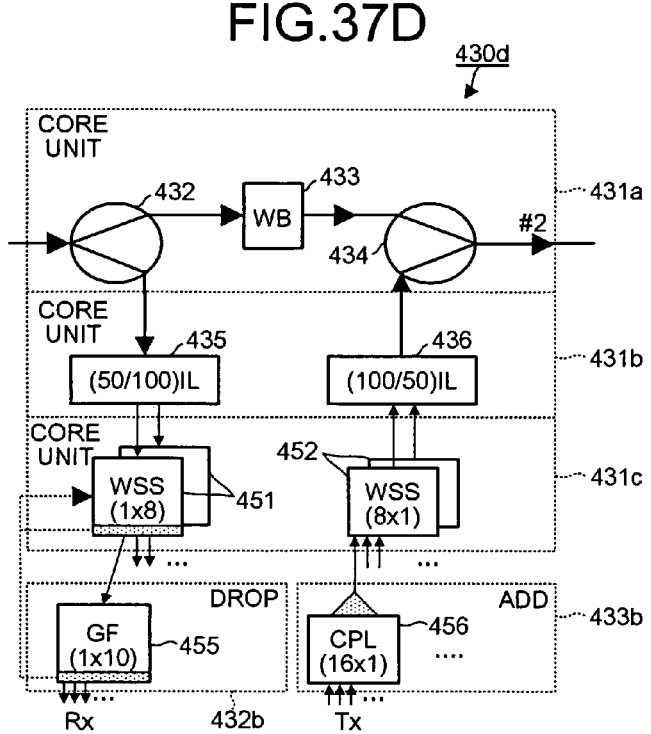
FIG. 37D is a schematic for explaining expansion of the optical add/drop multiplexer shown in FIG. 37A.

FIG. 37D is a schematic for explaining expansion of the optical add/drop multiplexer shown in FIG. 37A. A functional state of an optical add/drop multiplexer 430d as shown in FIG. 37D immediately before it is configured is equivalent to the optical add/drop multiplexer (see FIG. 37B) based on the low count channel (LCC) DOADM. The configurations of the core units 431a, 431b, and 431c are not changed. The drop unit 432b includes a 1×10-port grouping filter (GF) 455. The add unit 433b includes a 16×1-port optical coupler (CPL) 456. This configuration allows the function to be expanded to the high count channel (HCC) DOADM. A part of the output ports of the wavelength selective switches 451 or a part of the input ports of the wavelength selective switches 452 can also be dropped or added to a wavelength cross-connect device (not shown). The number of grouping filters 455 provided in the drop unit 432b and the number of optical couplers 456 provided in the add unit 433b can be additionally provided by the number of ports required.

Figure 37E:
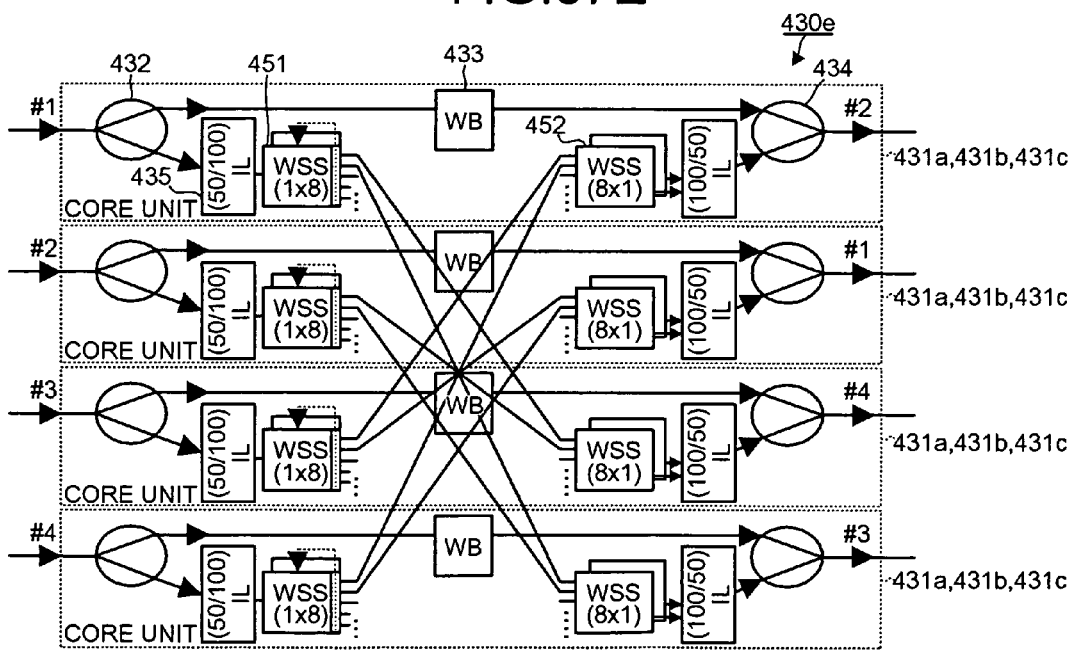
FIG. 37E is a schematic for explaining expansion of the optical add/drop multiplexer shown in FIG. 37A.

FIG. 37E is a schematic for explaining expansion of the optical add/drop multiplexer shown in FIG. 37A. A functional state of an optical add/drop multiplexer 430e as shown in FIG. 37E immediately before it is configured is equivalent to the optical add/drop multiplexer (see FIG. 37C) 430c in the functional state of the ROADM or to the optical add/drop multiplexer (see FIG. 37D) 430d in the functional state of the (HCC) DOADM. A group of three units such as the core units 431a, 431b, and 431c is connected in plurality, which allows the function to be expanded to the optical add/drop multiplexer 430e including the WXC. As shown in FIG. 37E, the three units such as the core units 431a, 431b, and 431c are described in one core unit for simplicity. The configurations of the drop units 432a and 432b and the add units 433a and 433b are not shown therein, but they are connected to the core units 431a, 431b, and 431c, respectively.

The configurations of the function expansions as shown in FIG. 37B to FIG. 37E can be provided without replacement of the core unit 431a. Therefore, even during system operation, the functions can be expanded without reconnecting the fibers and disconnecting the main signal.

Figure 38A:
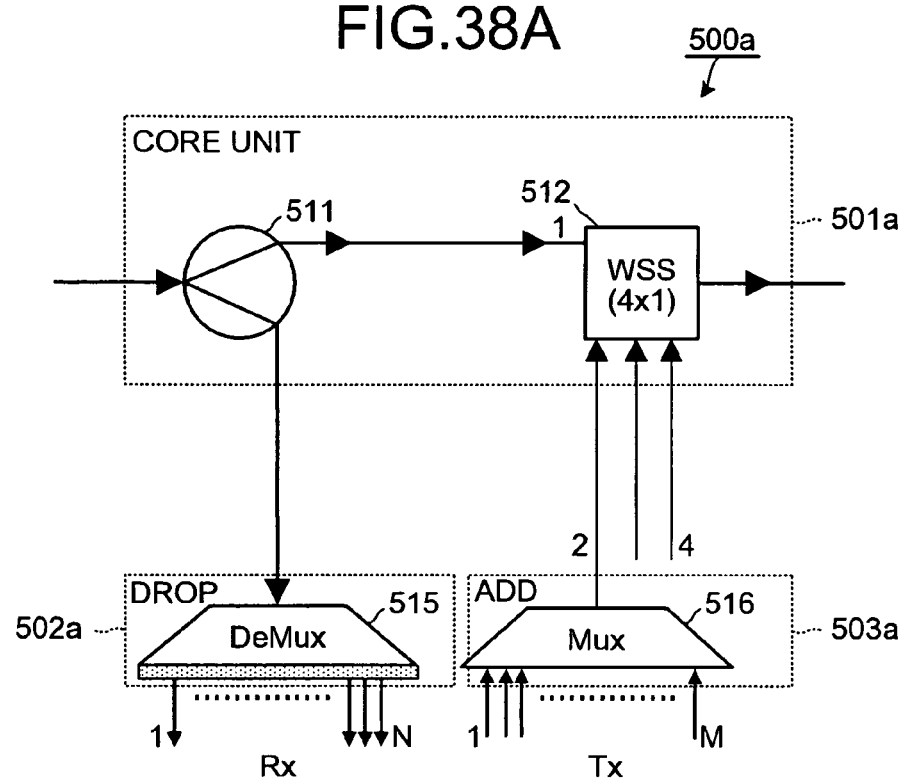
FIG. 38A is a schematic of a configuration of the optical add/drop multiplexer at the time of initial introduction (In-service upgrade example 5)

In-service upgrade example 5 of the optical add/drop multiplexer according to the present invention is explained below. FIG. 38A is a schematic of a configuration of the optical add/drop multiplexer at the time of initial introduction. An optical add/drop multiplexer 500a forms the ROADM. A core unit 501a of the optical add/drop multiplexer 500a includes a 1×2 optical coupler 511, and a 4×1-port wavelength selective switch (WSS) 512. A drop unit 502a includes a 1×N-port optical demultiplexer (DeMux) 515, and an add unit 503a includes an M×1-port optical multiplexer (Mux) 516.

Figure 38B:
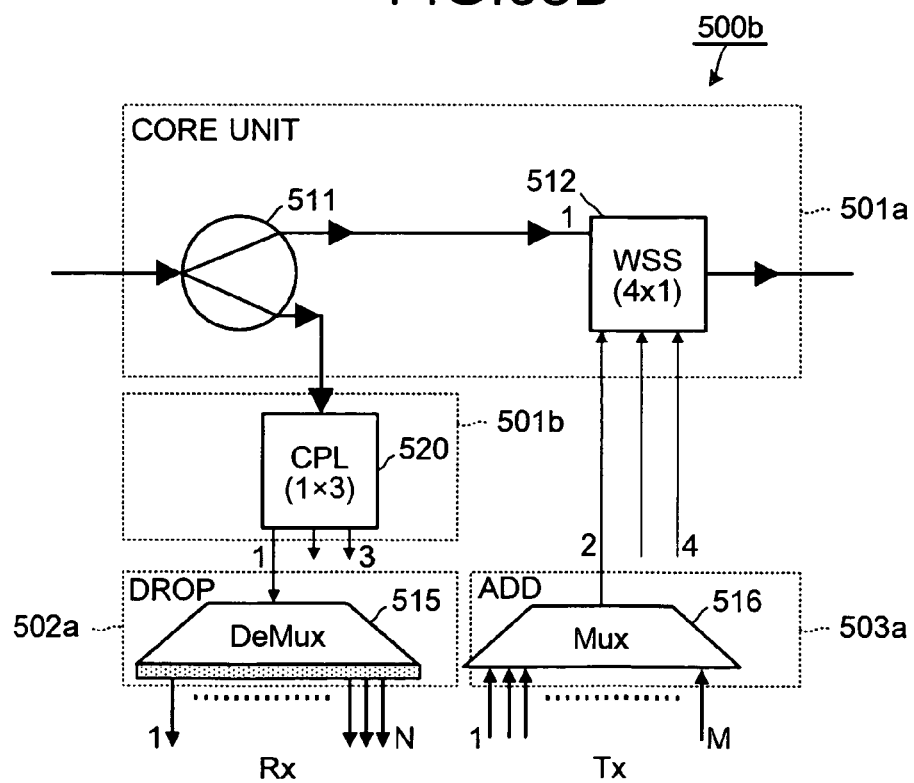
FIG. 38B is a schematic for explaining expansion of the optical add/drop multiplexer shown in FIG. 38A.

FIG. 38B is a schematic for explaining expansion of the optical add/drop multiplexer shown in FIG. 38A. The core unit 501a of an optical add/drop multiplexer 500b has the same configuration as that of FIG. 38A. That is, no part is changed in the core unit 501a. However, the core unit 501a is further connected with a core unit 501b that is configured as another unit. The core unit 501b includes a 1×3 optical coupler (CPL) 520 for dropping. One of the output ports of the optical coupler 520 is connected to the drop unit 502a, and the functions of the other output ports can be expanded so as to have the wavelength cross-connect.

Figure 38C:
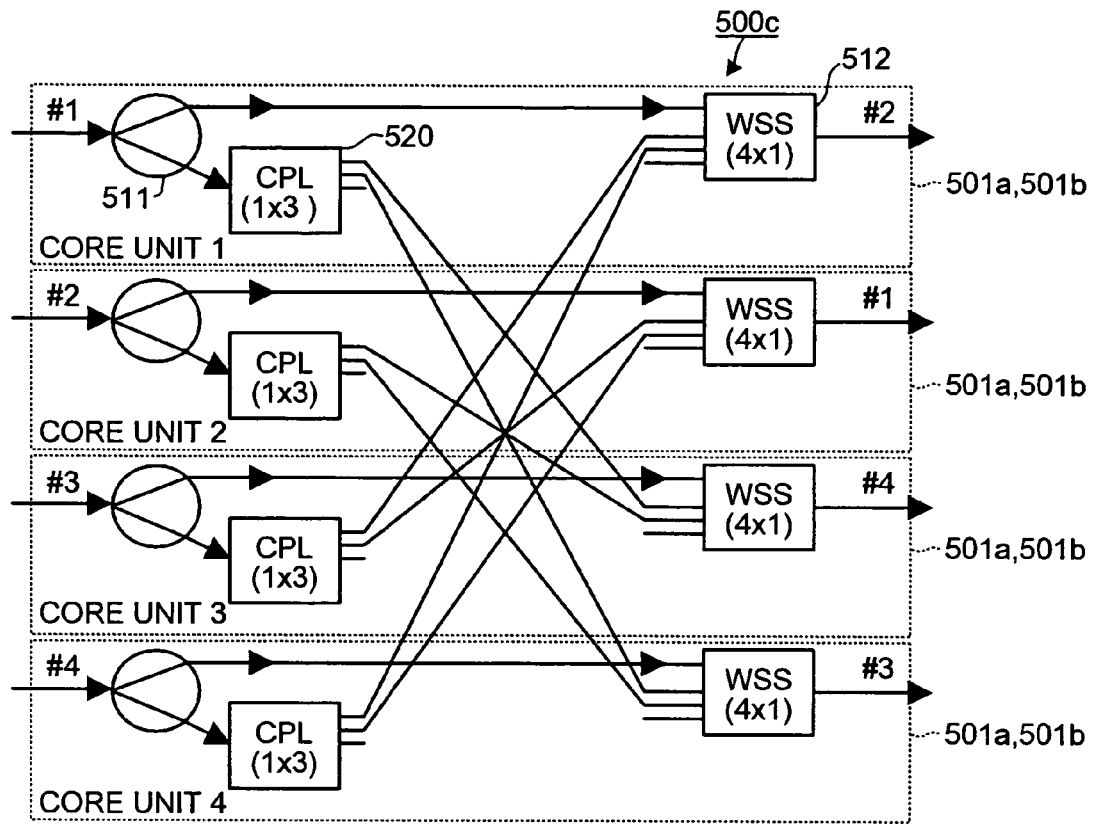
FIG. 38C is a schematic for explaining expansion of the optical add/drop multiplexer shown in FIG. 38A.

FIG. 38C is a schematic for explaining expansion of the optical add/drop multiplexer shown in FIG. 38A. An optical add/drop multiplexer 500c includes a plurality pairs of the core units 501a and 501b as shown in FIG. 38B (four pairs shown in FIG. 38C) to expand the function to the WXC. In the configuration example, a signal can be switched between the two rings of the transmission paths A and B as shown in FIG. 59.

Different core units are connected to each other between the output ports of the optical couplers 520 for dropping and the input ports of the wavelength selective switches 512 for adding, as shown in FIG. 38C. For example, some of the output ports of the optical coupler 520 in a core unit 1 are connected to the input ports of the wavelength selective switches 512 in a core unit 3 and a core unit 4. Some of the output ports of the optical coupler 520 in a core unit 2 are connected to the input ports of the wavelength selective switches 512 in the core unit 3 and the core unit 4. Some of the output ports of the optical coupler 520 in the core unit 3 are connected to the input ports of the wavelength selective switches 512 in the core unit 1 and the core unit 2. Some of the output ports of the optical coupler 520 in the core unit 4 are connected to the input ports of the wavelength selective switches 512 in the core unit 1 and the core unit 2. The routes of the transmission paths input or output to or from the core units are described using sign "#". The core unit 1 outputs the input of the route #1 to the route #2. The core unit 2 outputs the input of the route #2 to the route #1. The core unit 3 outputs the input of the route #3 to the route #4. The core unit 4 outputs the input of the route #4 to the route #3.

The optical add/drop multiplexer 500c is configured as a wavelength cross-connect including four routes, and can switch a signal between the route #1 and the route #2, the route #1 and the route #3, the route #1 and the route #4, the route #2 and the route #3, the route #2 and the route #4, and the route #3 and the route #4 as shown in FIG. 59.

The configurations of the function expansions as shown in FIG. 38B and FIG. 38C can be provided without replacement of the core unit 501a. Therefore, even during system operation, the functions can be expanded without reconnecting the fibers and disconnecting the main signal.

Figure 39A:
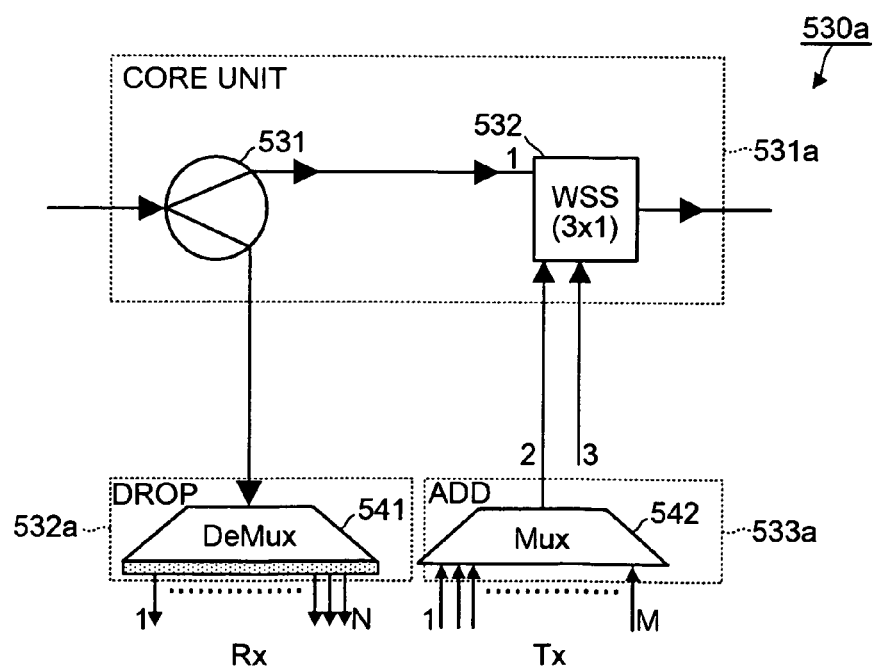
FIG. 39A is a schematic of a configuration of the optical add/drop multiplexer at the time of initial introduction (In-service upgrade example 6)

In-service upgrade example 6 of the optical add/drop multiplexer according to the present invention is explained below. FIG. 39A is a schematic of a configuration of the optical add/drop multiplexer at the time of initial introduction. An optical add/drop multiplexer 530a forms the ROADM. A core unit 531a of the optical add/drop multiplexer 530a includes a 1×2 optical coupler 531, and a 3×1-port wavelength selective switch (WSS) 532. A drop unit 532a includes a 1×N-port optical demultiplexer (DeMux) 541, and an add unit 533a includes an M×1-port optical multiplexer (Mux) 542.

Figure 39B:
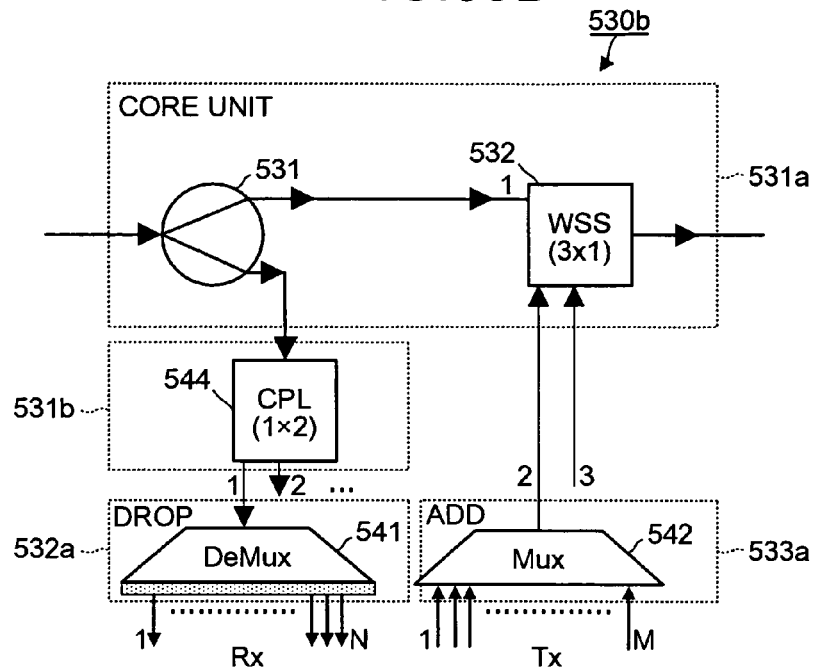
FIG. 39B is a schematic for explaining expansion of the optical add/drop multiplexer shown in FIG. 39A.

FIG. 39B is a schematic for explaining expansion of the optical add/drop multiplexer shown in FIG. 39A. The core unit 531a of an optical add/drop multiplexer 530b has the same configuration as that of FIG. 39A. That is, no part is changed in the core unit 531a. However, the core unit 531a is further connected with a core unit 531b that is configured as another unit. The core unit 531b includes a 1×2 optical coupler (CPL) 544 for dropping. One of the output ports of the optical coupler 544 is connected to the drop unit 532a, and the function can be expanded so that the other output port has the wavelength cross-connect.

Figure 39C:
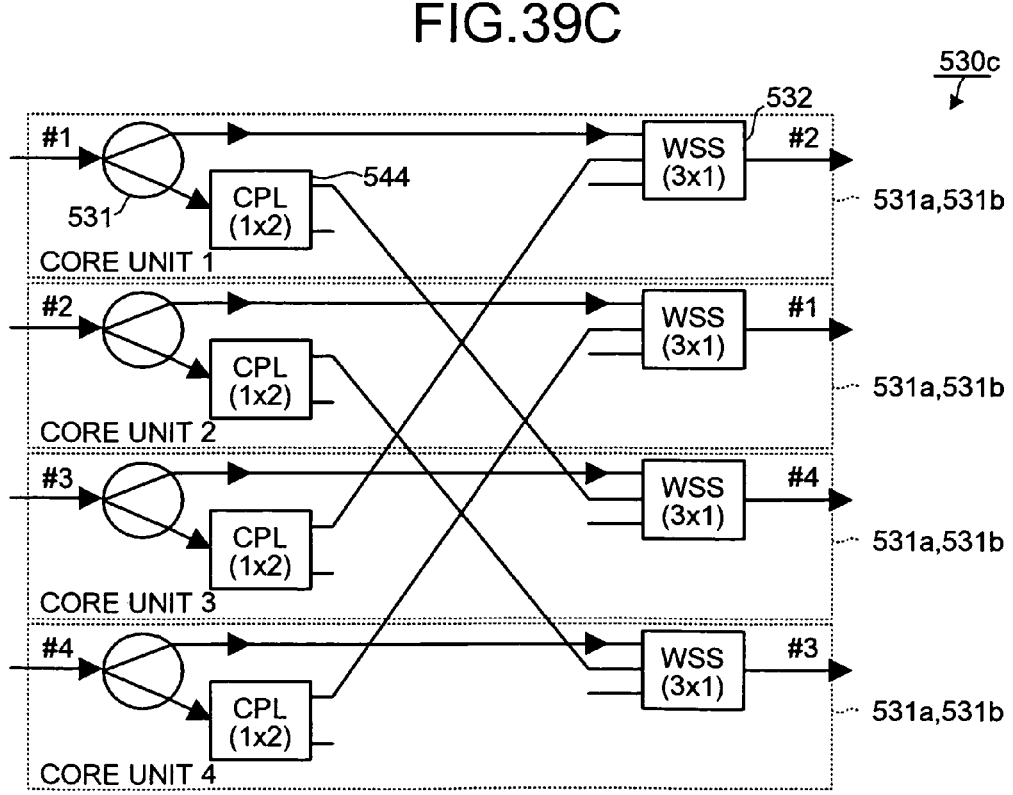
FIG. 39C is a schematic for explaining expansion of the optical add/drop multiplexer shown in FIG. 39A.

FIG. 39C is a schematic for explaining expansion of the optical add/drop multiplexer shown in FIG. 39A. An optical add/drop multiplexer 530c includes a plurality pairs of the core units 531a and 531b as shown in FIG. 39B (four pairs in FIG. 39C) to expand the function to the WXC.

Different core units are connected to each other between the output ports of the optical couplers 544 for dropping and the input ports of the wavelength selective switches 532 for adding, as shown in FIG. 39C. For example, one of the output ports of the optical coupler 544 in a core unit 1 is connected to one of the input ports of the wavelength selective switches 532 in a core unit 4. One of the output ports of the optical coupler 544 in a core unit 2 is connected to one of the input ports of the wavelength selective switches 532 in a core unit 3. One of the output ports of the optical coupler 544 in the core unit 3 is connected to one of the input ports of the wavelength selective switches 532 in the core unit 2. One of the output ports of the optical coupler 544 in the core unit 4 is connected to one of the input ports of the wavelength selective switches 532 in the core unit 1. The routes of the transmission paths input or output to or from the core units are described using sign "#". The core unit 1 outputs the input of the route #1 to the route #2. The core unit 2 outputs the input of the route #2 to the route #1. The core unit 3 outputs the input of the route #3 to the route #4. The core unit 4 outputs the input of the route #4 to the route #3.

The configurations of the function expansions as shown in FIG. 39B and FIG. 39C can be provided without replacement of the core unit 531a. Therefore, even during system operation, the functions can be expanded without reconnecting the fibers and disconnecting the main signals.

Figure 39D:
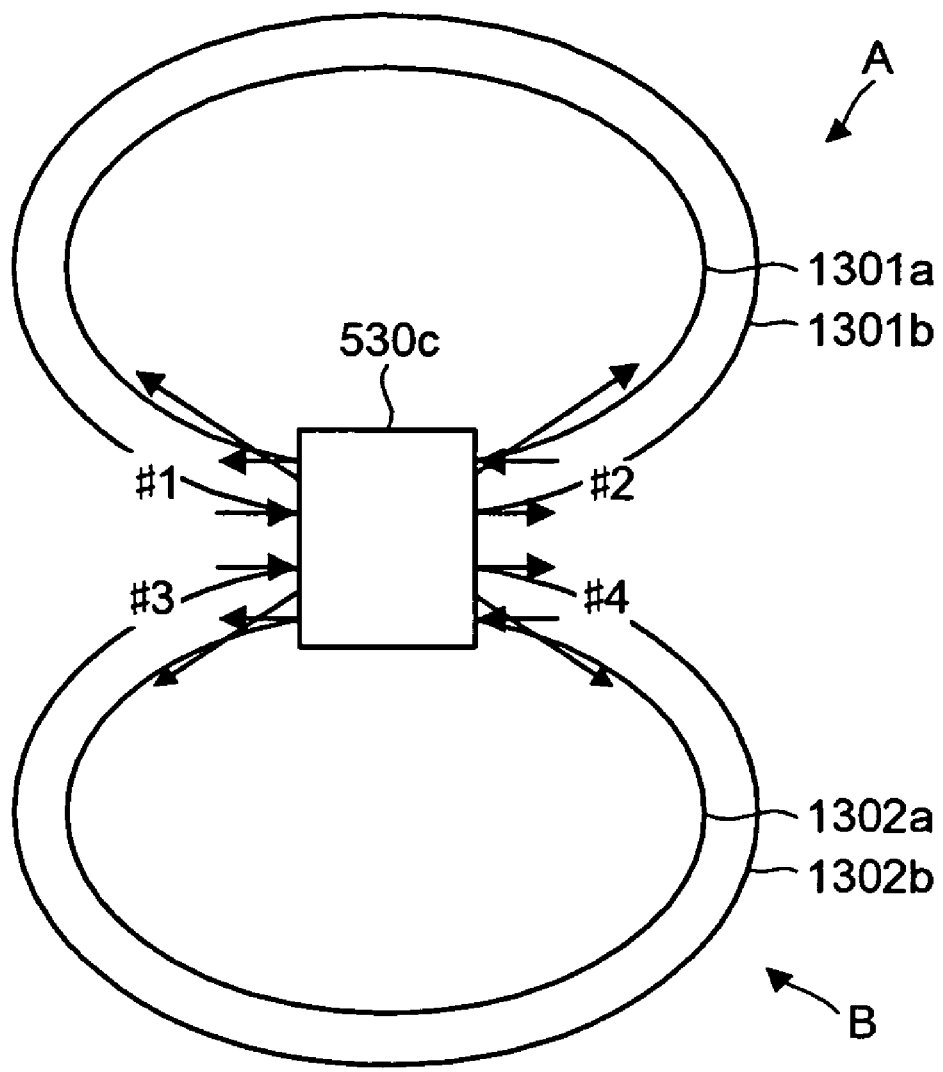
FIG. 39D is a schematic for explaining signal switching between transmission paths when the expansion shown in FIG. 39C is performed.

FIG. 39D is a schematic for explaining signal switching between transmission paths when the expansion shown in FIG. 39C is performed. There are two rings of a transmission path A (optical fibers 1301a and 1301b) and a transmission path B (1302a and 1302b) formed by the optical add/drop multiplexer 530c including the WXC, and signal switching is performed between the transmission paths A and B as shown in FIG. 39D. The optical add/drop multiplexer 530c as explained with reference to FIG. 39C is configured as a wavelength cross-connect including four routes, and can switch a signal between a route #1 and a route #2, between the route #1 and a route #4, between the route #2 and a route #3, and between the route #3 and the route #4. The optical add/drop multiplexer 530c has a function such that the number of routes that is selectable is limited as compared with the optical add/drop multiplexer 500c (see FIG. 38C), but has an advantage of achieving simplified configuration.

Figure 40A:
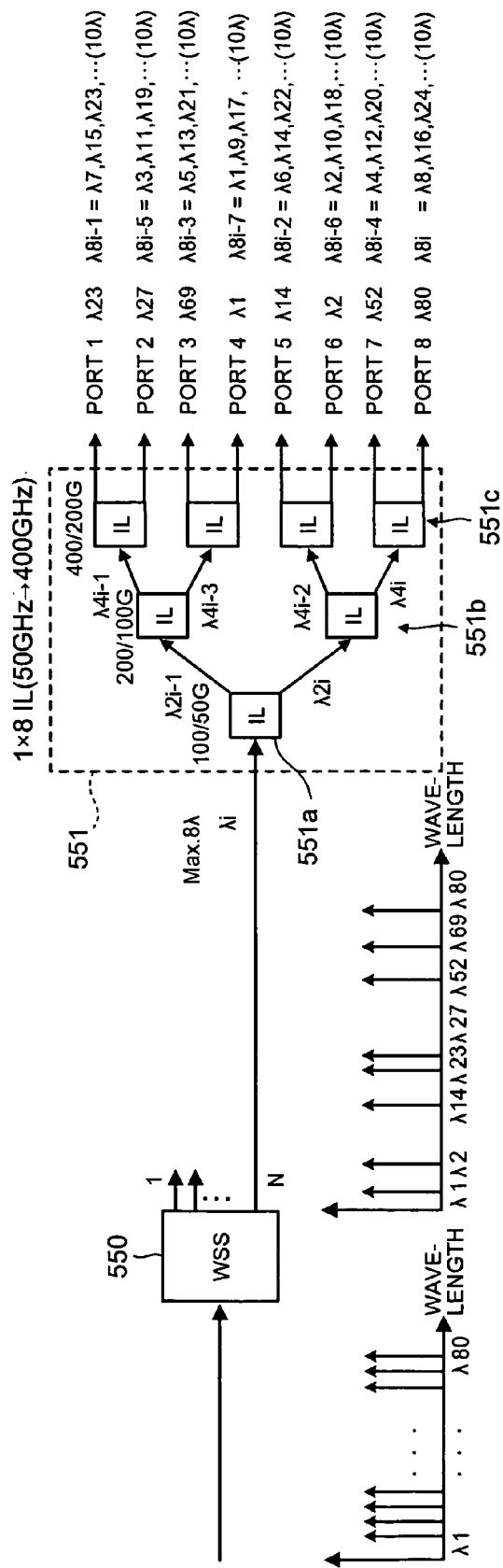
FIG. 40A is a schematic of a configuration when the interleaver is used on the drop side as the grouping filter.

FIG. 40A is a schematic of a configuration when the interleaver is used on the drop side as the grouping filter. An interleaver 551 is connected to one of the output ports of a 1×N-port wavelength selective switch (WSS) 550. As shown in FIG. 40A, the number of wavelengths (λ) of a transmission signal is 80 waves at maximum, and a 1×8-port interleaver 551 is used as the grouping filter (GF). An input signal to the interleaver 551 has eight waves at maximum at a 50 GHz-spacing.

In the example as shown in FIG. 40A, the eight waves are λ1, λ2, λ14, λ23, λ27, λ52, λ69, and λ80. One 100 GHz/50 GHz interleaver 551a, two 200 GHz/100 GHz interleavers 551b, and four 400 GHz/200 GHz interleavers 551c are sequentially connected in the interleaver 551. This connection allows the signals input at a 50 GHz-spacing to be demultiplexed from the outputs of the eight ports in total, and 10 waves (10 λ) are assigned to each of the ports. Upon actual operation, one wave out of the 10 waves is output (e.g., port 1 outputs λ23).

Figure 40B:
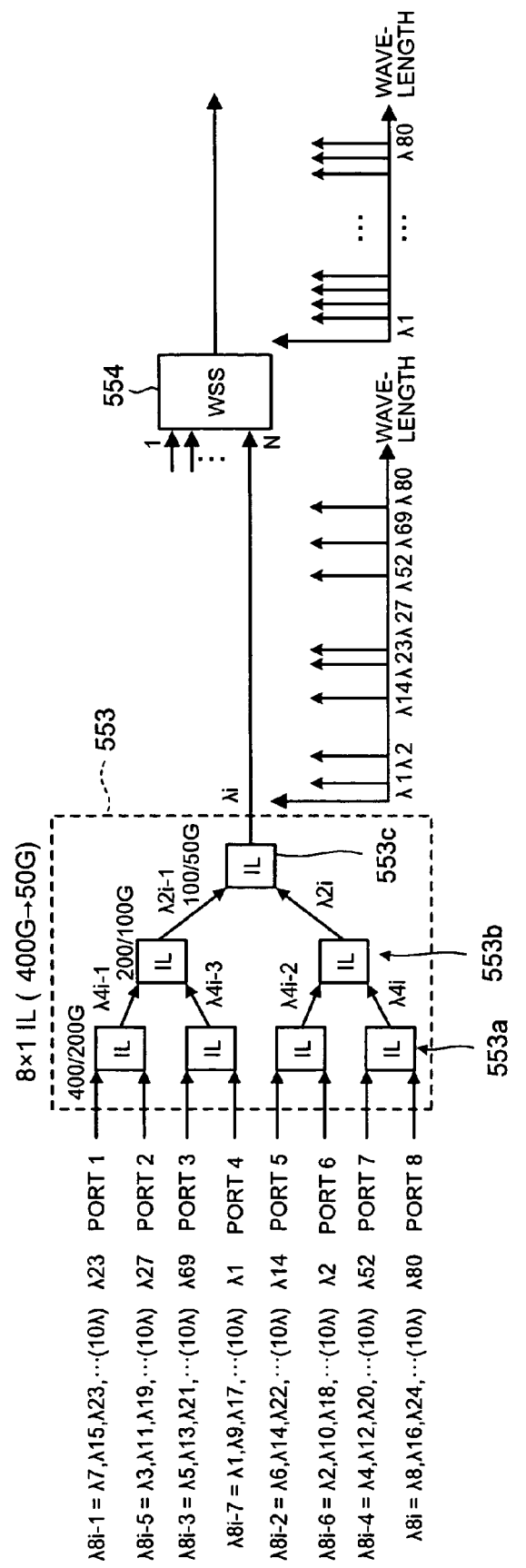
FIG. 40B is a schematic of a configuration when the interleaver is used on the add side as the grouping filter.

FIG. 40B is a schematic of a configuration when the interleaver is used on the add side as the grouping filter. An 8×1-port interleaver (IL) 553 is used as the grouping filter (GF). Input signals to the interleaver 553 are λ1, λ2, λ14, λ23, λ27, λ52, λ69, and λ80 in the example as shown in FIG. 40B. Four 400 GHz/200 GHz interleavers 553a, two 200 GHz/100 GHz interleavers 553b, and one 100 GHz/50 GHz interleaver 553c are sequentially connected in the interleaver 553. This connection allows inputs to the eight ports in total, and 10 waves are assigned to each of the ports. Upon actual operation, one wave out of the 10 waves is input (e.g., λ23 is input to port 1). The output of the interleaver 553 is set as signals at a 50 GHz-spacing, and is connected to one of the input ports of the N×1-port wavelength selective switch (WSS) 554. These interleavers 551 and 553 are excellent in transmission characteristics as compared with another system in which they are used as grouping filters.

Figure 34F:
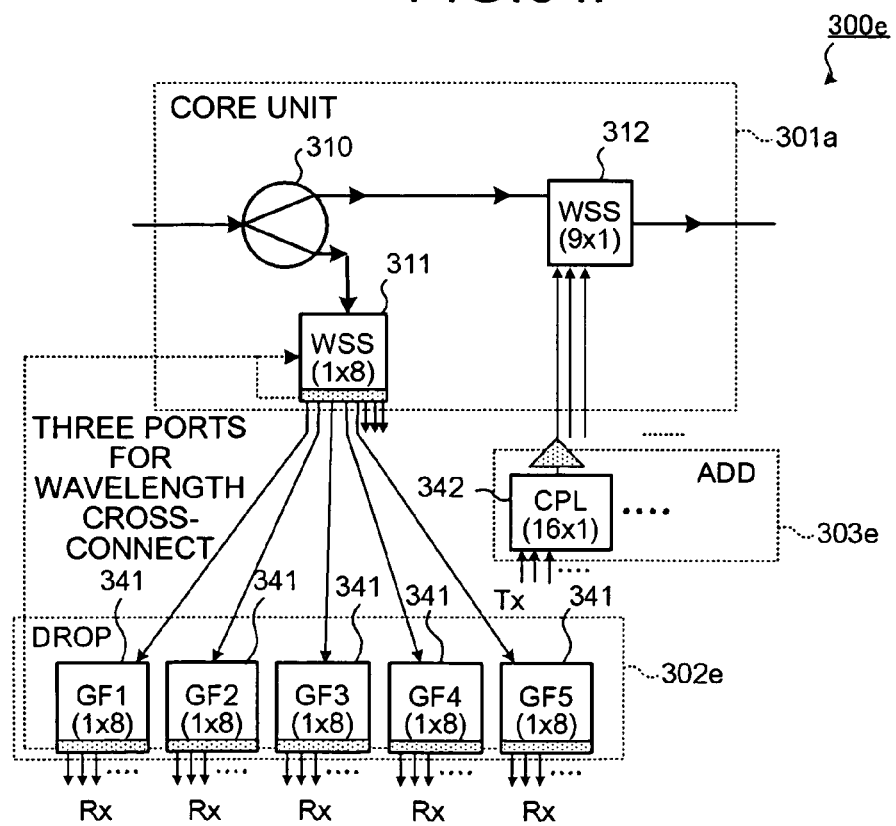
FIG. 34F is a schematic of a specific configuration of the optical add/drop multiplexer shown in FIG. 34E.
Figure 34G:
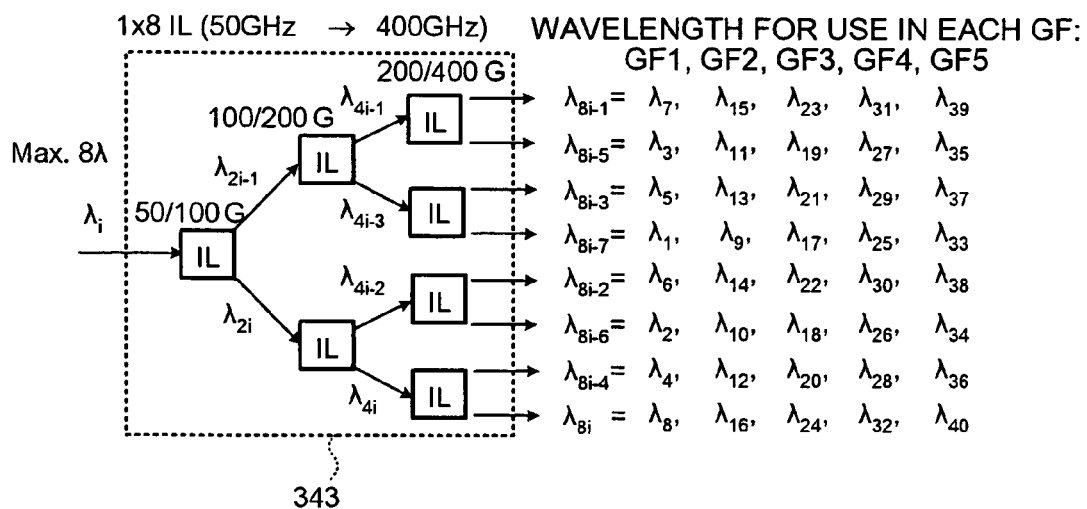
FIG. 34G is a schematic of the interleaver that forms a grouping filter (GF) shown in FIG. 34F.

Specific examples of the configurations using the interleaver as the grouping filter are explained below. FIG. 34F is a schematic of a specific configuration of the optical add/drop multiplexer shown in FIG. 34E. FIG. 34G is a schematic of the interleaver that forms a grouping filter (GF) shown in FIG. 34F. In the configuration of FIG. 34E, if the number of wavelengths of a main signal input to the core unit 301a is 40 wavelengths, an interleaver 343 (see FIG. 34G) as the grouping filter (GF) 341 is connected to each of the five ports out of the eight output ports of the wavelength selective switch 311, and different wavelengths are assigned to the output ports of all the interleavers 343. By connecting the remaining three ports to the wavelength cross-connect device, it is possible to overcome the limitation on the number of wavelengths for use, which is a problem occurring upon using the grouping filter, and to allow signals corresponding to all the 40 wavelengths of the main signal to be dropped and at the same time to realize the wavelength cross-connect.

Figure 34H:
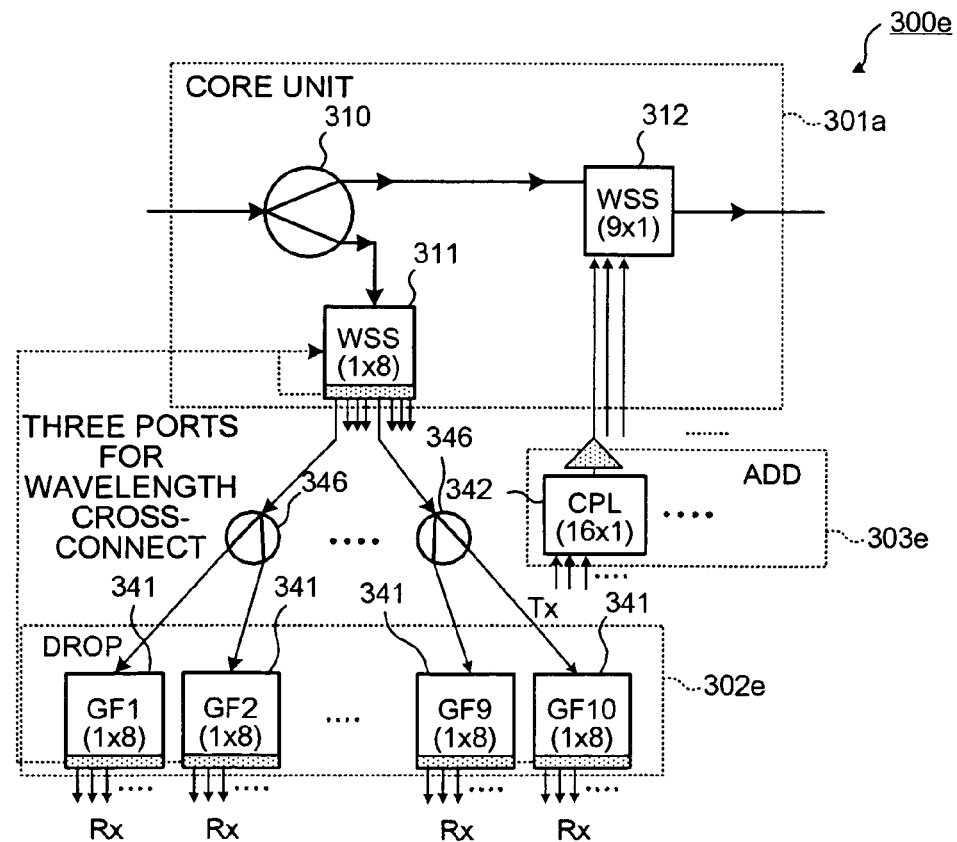
FIG. 34H is a schematic of a specific configuration of the optical add/drop multiplexer shown in FIG. 34E.
Figure 34I:
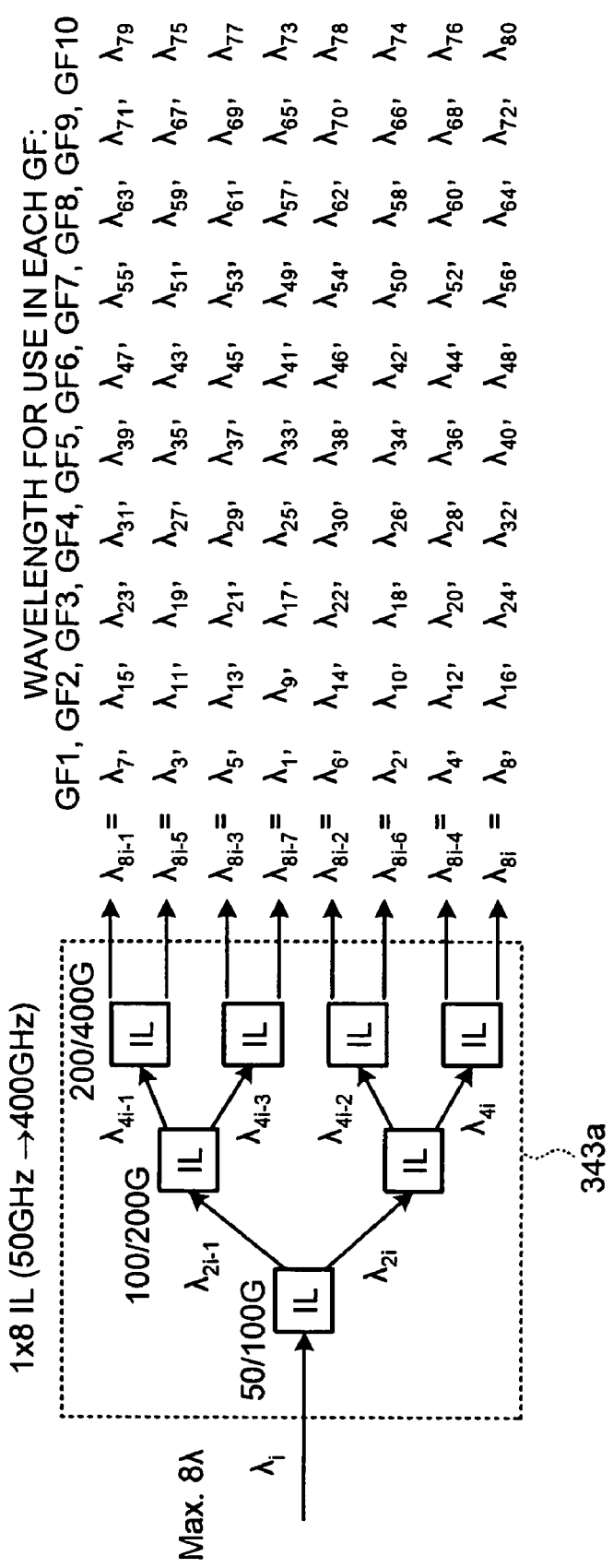
FIG. 34I is a schematic of the interleaver that forms a grouping filter (GF) shown in FIG. 34H.

FIG. 34H is a schematic of a specific configuration of the optical add/drop multiplexer shown in FIG. 34E. FIG. 34I is a schematic of the interleaver that forms a grouping filter (GF) shown in FIG. 34H. In the configuration of FIG. 34E, if the number of wavelengths of a main signal input to the core unit 301a is 80 wavelengths, a 1×2 optical coupler 346 is connected to each of the five ports out of the eight output ports of the wavelength selective switch (WSS) 311, and a 1×8-port interleaver 343a (see FIG. 34I) as the grouping filter (GF) 341 is connected to two output ports of the optical coupler 346. Thus, different wavelengths are assigned to all the output ports of the interleavers 343a. By connecting the remaining three ports to the wavelength cross-connect device, it is possible to overcome the limitation on the number of wavelengths for use, which is a problem occurring upon using the grouping filter, and to allow signals corresponding to all the 80 wavelengths of the main signal to be dropped and at the same time to realize the wavelength cross-connect.

Figure 36G:
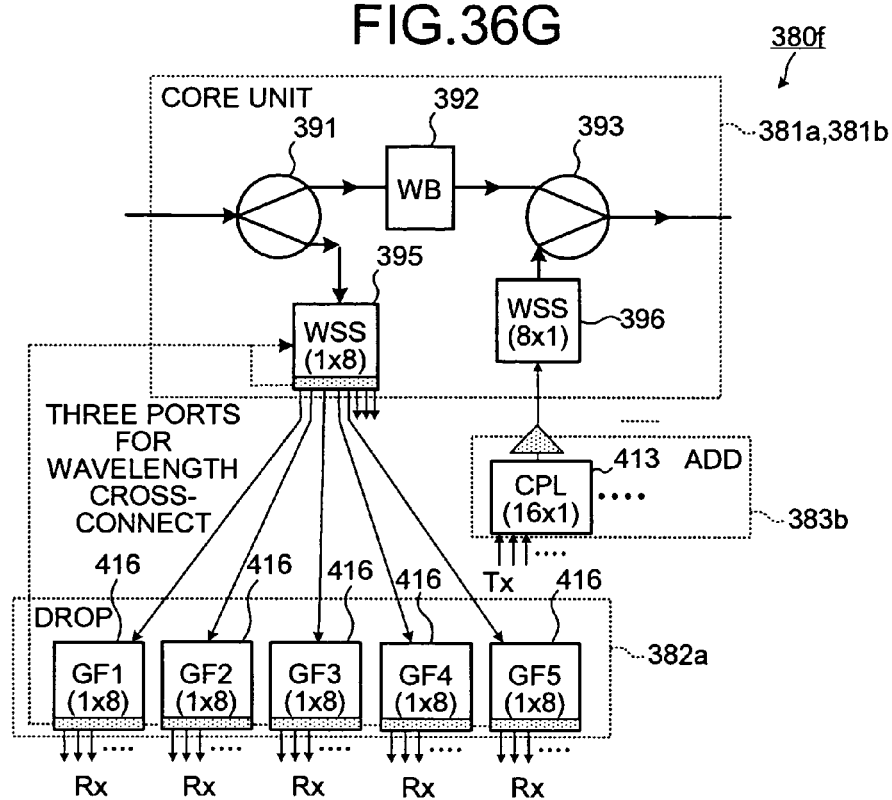
FIG. 36G is a schematic of a specific configuration of the optical add/drop multiplexer shown in FIG. 36F.
Figure 36H:
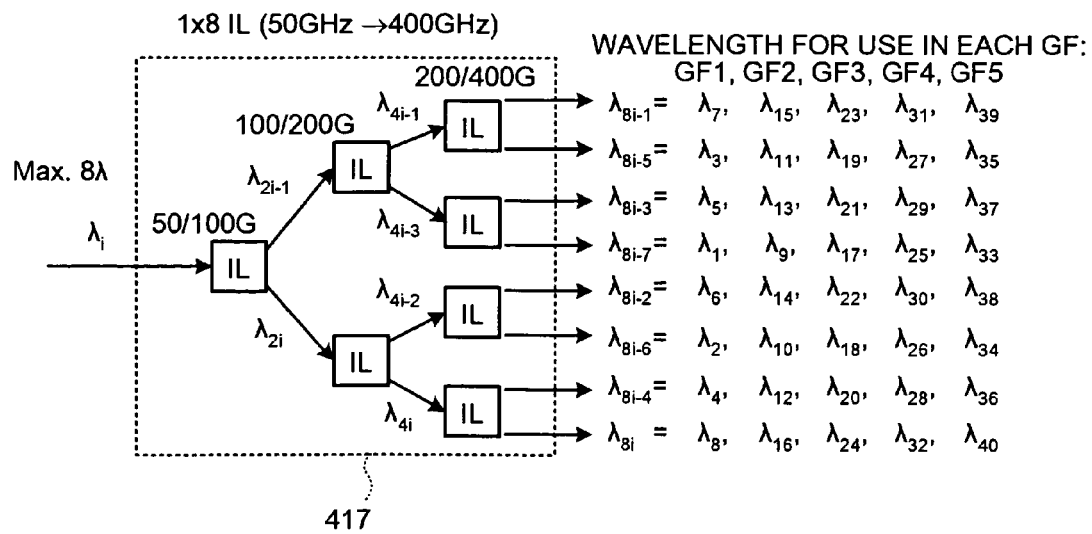
FIG. 36H is a schematic of the interleaver that forms a grouping filter (GF) shown in FIG. 36G.

FIG. 36G is a schematic of a specific configuration of the optical add/drop multiplexer shown in FIG. 36F. FIG. 36H is a schematic of the interleaver that forms a grouping filter (GF) shown in FIG. 36G. In the configuration of FIG. 36F, if the number of wavelengths of a main signal input to the core unit 381a is 40 wavelengths, a 1×8-port interleaver 417 (see FIG. 36H) as the grouping filter 416 is connected to each of the five ports out of the eight output ports of the wavelength selective switch (WSS) 395. Different wavelengths are assigned to all the output ports of the interleavers 417, and the remaining three ports are connected to the wavelength cross-connect device. It is thereby possible to overcome the limitation on the number of wavelengths for use, which is a problem occurring upon using the grouping filter, and to allow signals corresponding to all the 40 wavelengths of the main signal to be dropped and at the same time to realize the wavelength cross-connect.

Figure 36I:
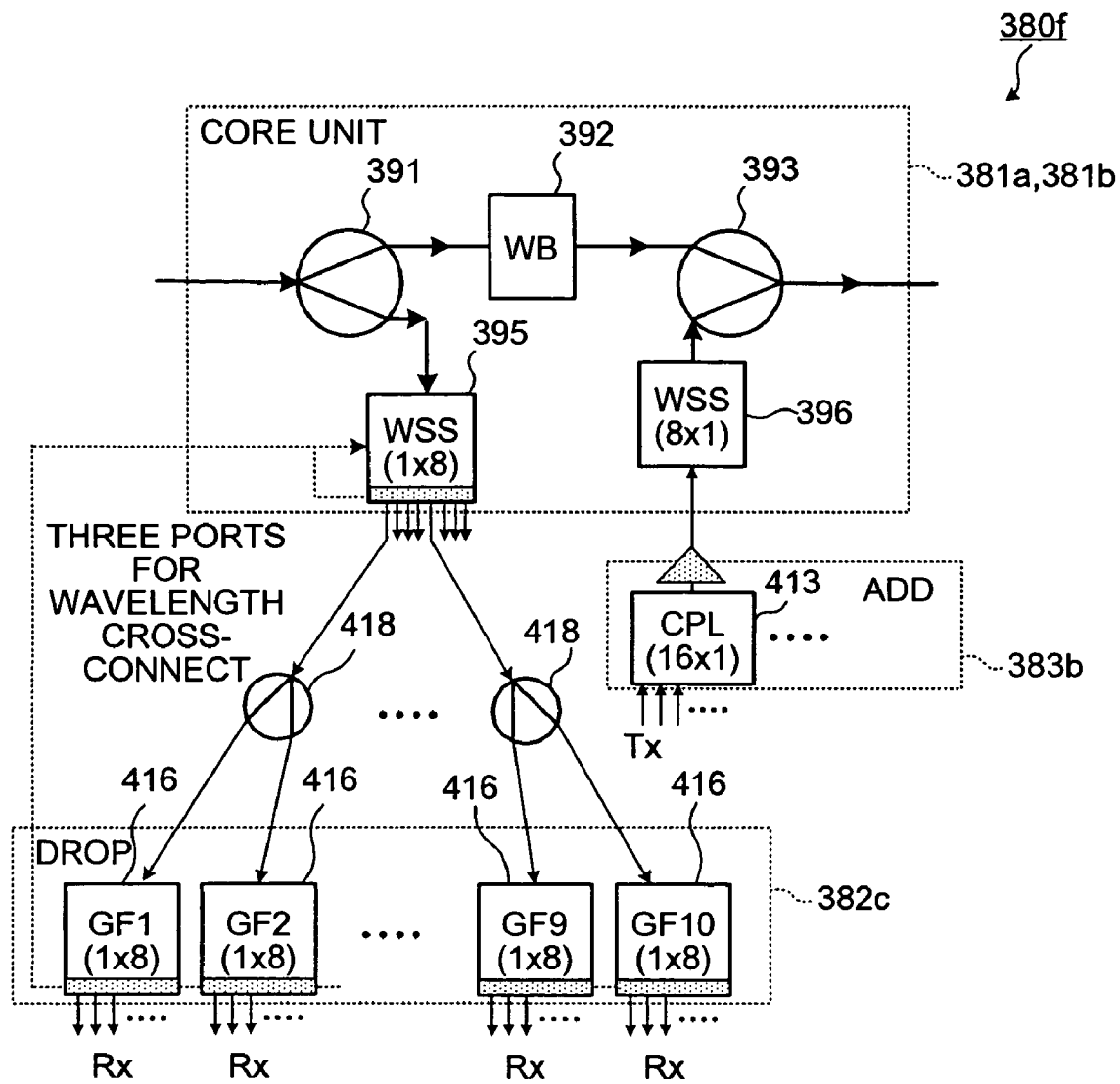
FIG. 36I is a schematic of a specific configuration of the optical add/drop multiplexer shown in FIG. 36F.
Figure 36J:
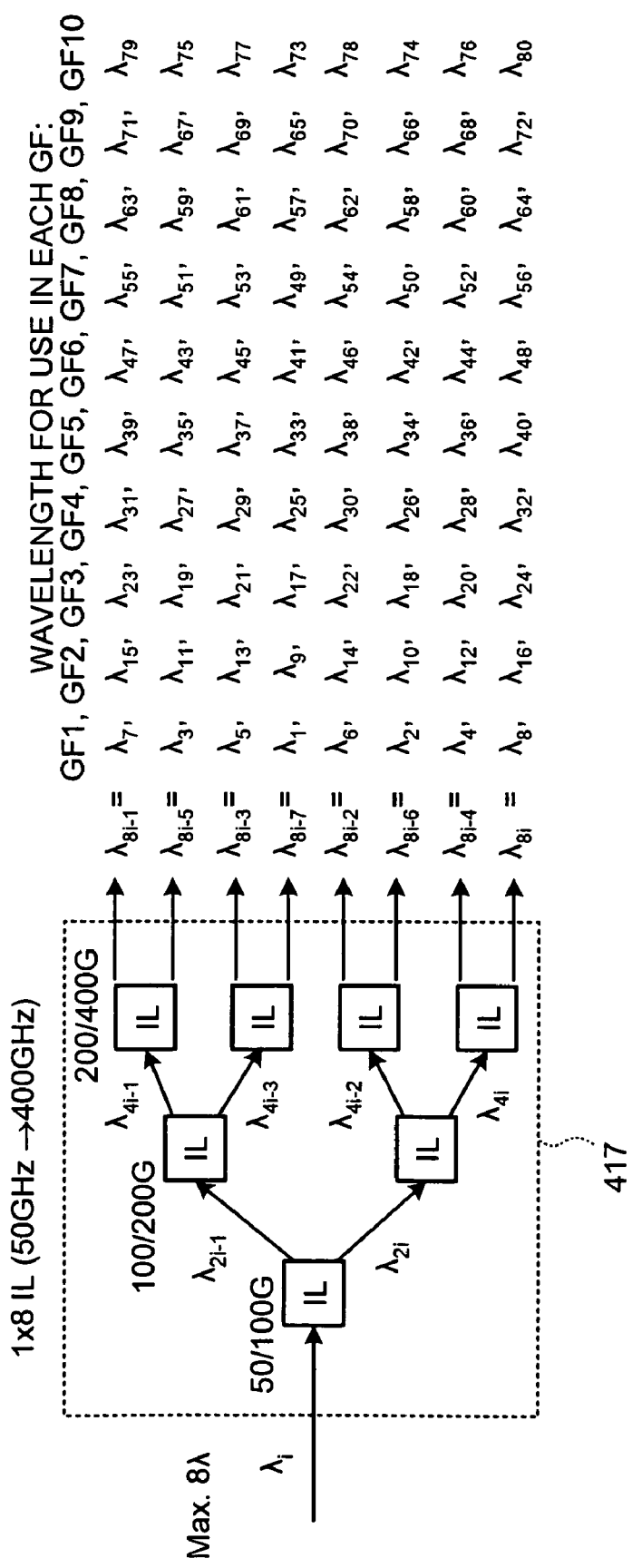
FIG. 36J is a schematic of the interleaver that forms a grouping filter (GF) shown in FIG. 36I.

FIG. 36I is a schematic of a specific configuration of the optical add/drop multiplexer shown in FIG. 36F. FIG. 36J is a schematic of the interleaver that forms a grouping filter (GF) shown in FIG. 36I. If the number of wavelengths of a main signal input to the core unit 381a as shown in FIG. 36F is 80 wavelengths, a 1×2-port optical coupler 418 is connected to each of the five ports out of the eight output ports of the wavelength selective switch (WSS) 395, and a 1×8-port interleaver 417 (see FIG. 36J) as the grouping filter (GF) 416 is connected to two output ports of the optical coupler 418. Different wavelengths are assigned to all the output ports of the interleavers 417, and the each remaining three ports are connected to the wavelength cross-connect devices. It is thereby possible to overcome the limitation on the number of wavelengths for use, which is a problem occurring upon using the grouping filter, and to allow signals corresponding to all the 80 wavelengths of the main signal to be dropped and at the same time to realize the wavelength cross-connect.

Figure 35E:
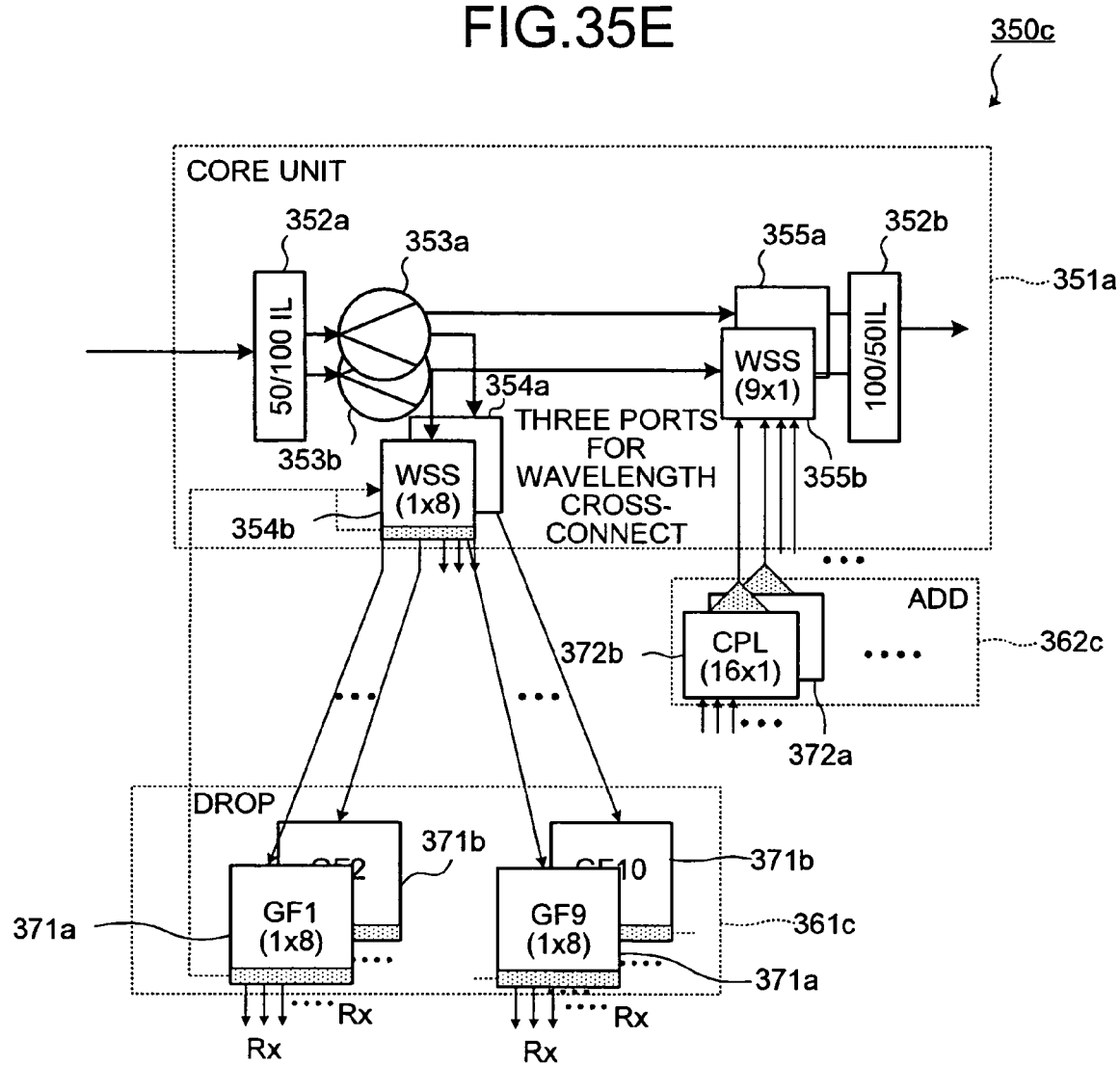
FIG. 35E is a schematic of a specific configuration the optical add/drop multiplexer shown in FIG. 35C.
Figure 35F:
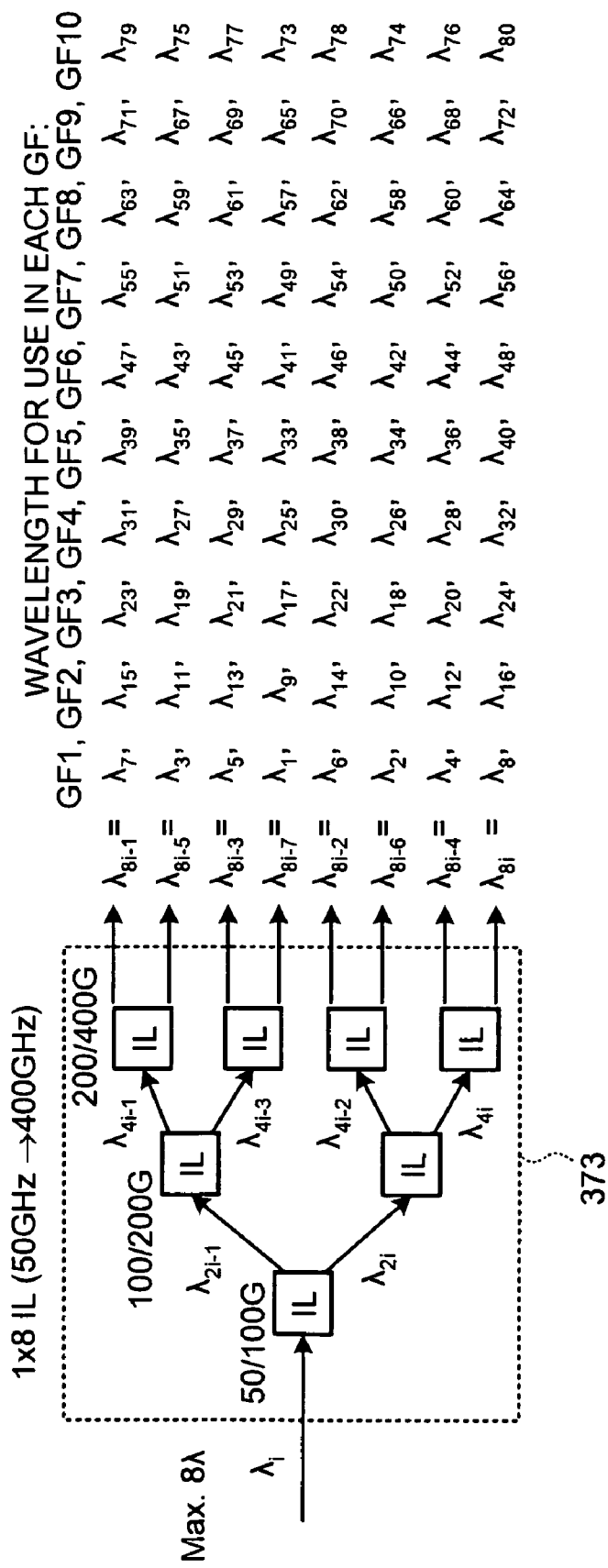
FIG. 35F is a schematic of the interleaver that forms a grouping filter (GF) shown in FIG. 35E.

FIG. 35E is a schematic of a specific configuration the optical add/drop multiplexer shown in FIG. 35C. FIG. 35F is a schematic of the interleaver that forms a grouping filter (GF) shown in FIG. 35E. In the configuration of FIG. 35C, if the number of wavelengths of a main signal input to the core unit 351a is 80 wavelengths, a 1×8-port interleaver 373 (see FIG. 35F) as the grouping filters 371a/371b is connected to each of the five ports out of the eight output ports of the respective wavelength selective switches (WSS) 354a and 354b. Different wavelengths are assigned to all the output ports of the interleavers 373, and the each remaining three ports are connected to the wavelength cross-connect devices. It is thereby possible to overcome the limitation on the number of wavelengths for use, which is a problem occurring upon using the grouping filter, and to allow signals corresponding to all the 80 wavelengths of the main signal to be dropped and at the same time to realize the wavelength cross-connect.

Figure 37F:
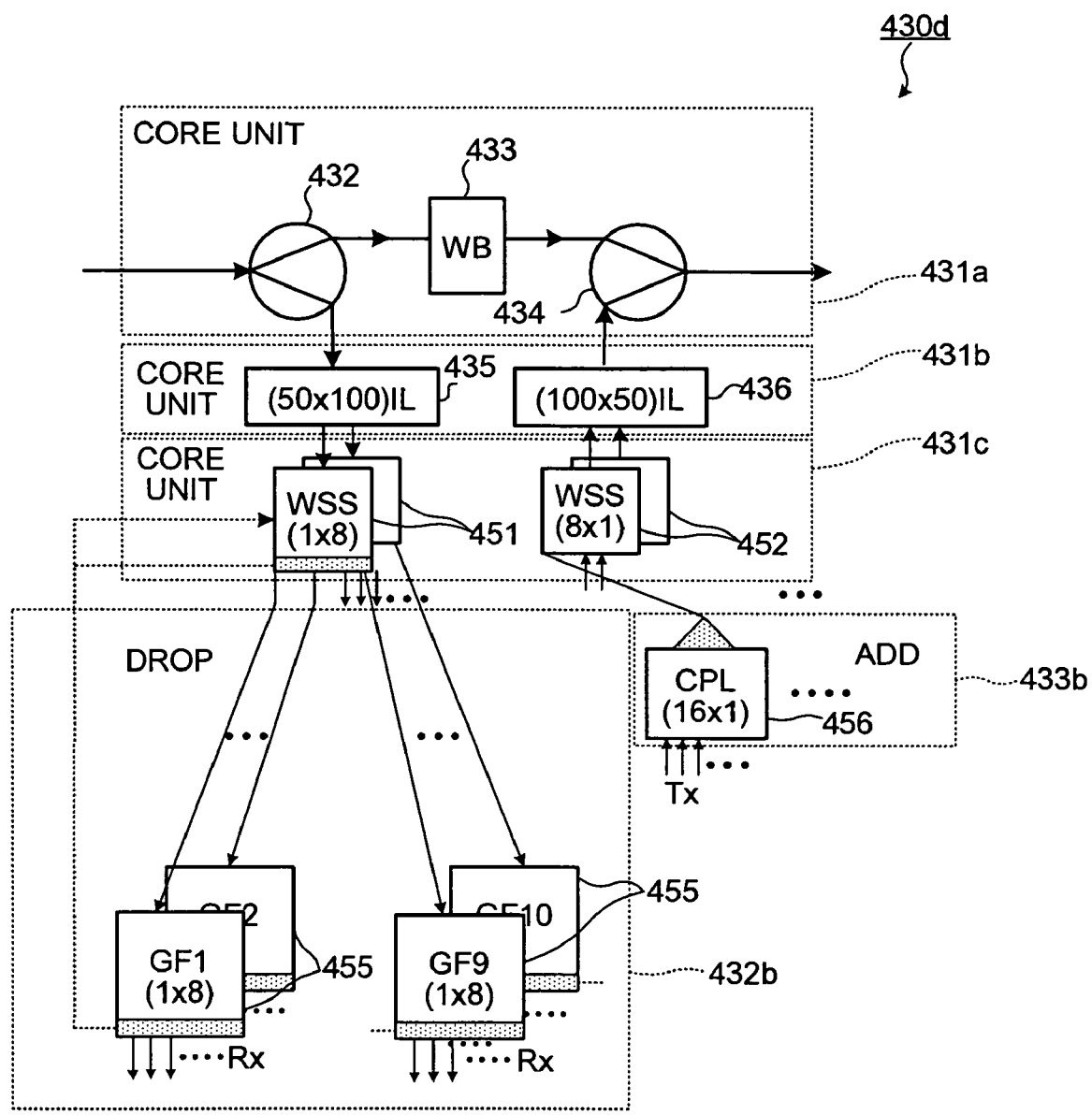
FIG. 37F is a schematic of a specific configuration of the optical add/drop multiplexer shown in FIG. 37D.
Figure 37G:
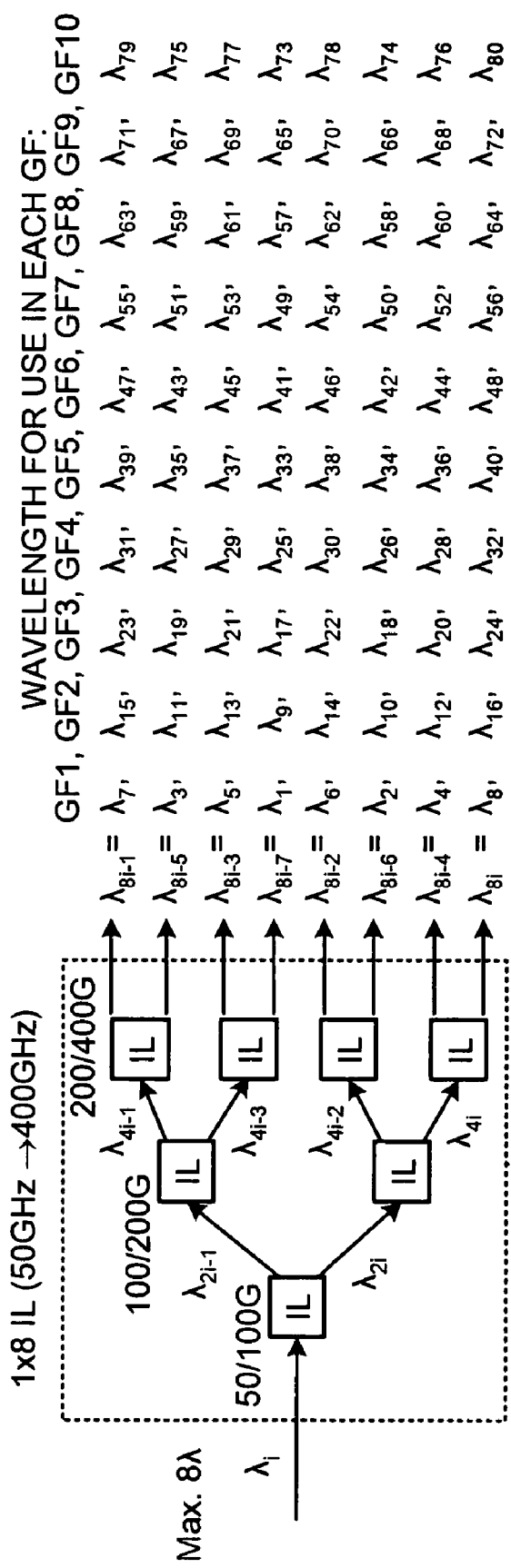
FIG. 37G is a schematic of the interleaver that forms a grouping filter (GF) shown in FIG. 37F.

FIG. 37F is a schematic of a specific configuration of the optical add/drop multiplexer shown in FIG. 37D. FIG. 37G is a schematic of the interleaver that forms a grouping filter (GF) shown in FIG. 37F. In the configuration of FIG. 37D, if the number of wavelengths of a main signal input to the core unit 431a is 80 wavelengths, a 1×8-port interleaver 457 as the grouping filter (GF) 455 is connected to each of the five ports out of the eight output ports of the respective wavelength selective switches (WSS) 451. Different wavelengths are assigned to all the output ports of the interleavers 457, and the each remaining three ports are connected to the wavelength cross-connect devices. It is thereby possible to overcome the limitation on the number of wavelengths for use, which is a problem occurring upon using the grouping filter, and to allow signals corresponding to all the 80 wavelengths of the main signal to be dropped and at the same time to realize the wavelength cross-connect.

FIG. 41A is a diagram of a configuration example of using a band division filter as a grouping filter in the drop side. A band division filter (BDF) 561 is connected to one of the output ports of a 1×N-port wavelength selective switch (WSS) 560. As shown in FIG. 41A, the number of wavelengths (λ) of a transmission signal is 80 waves at maximum, and a 1×8-port band division filter 561 is used as the grouping filter (GF). Eight wavelengths (8λ) are assigned respectively to eight output ports of the band division filter 561, and one of the eight wavelengths is used for actual operation.

Figure 41B:
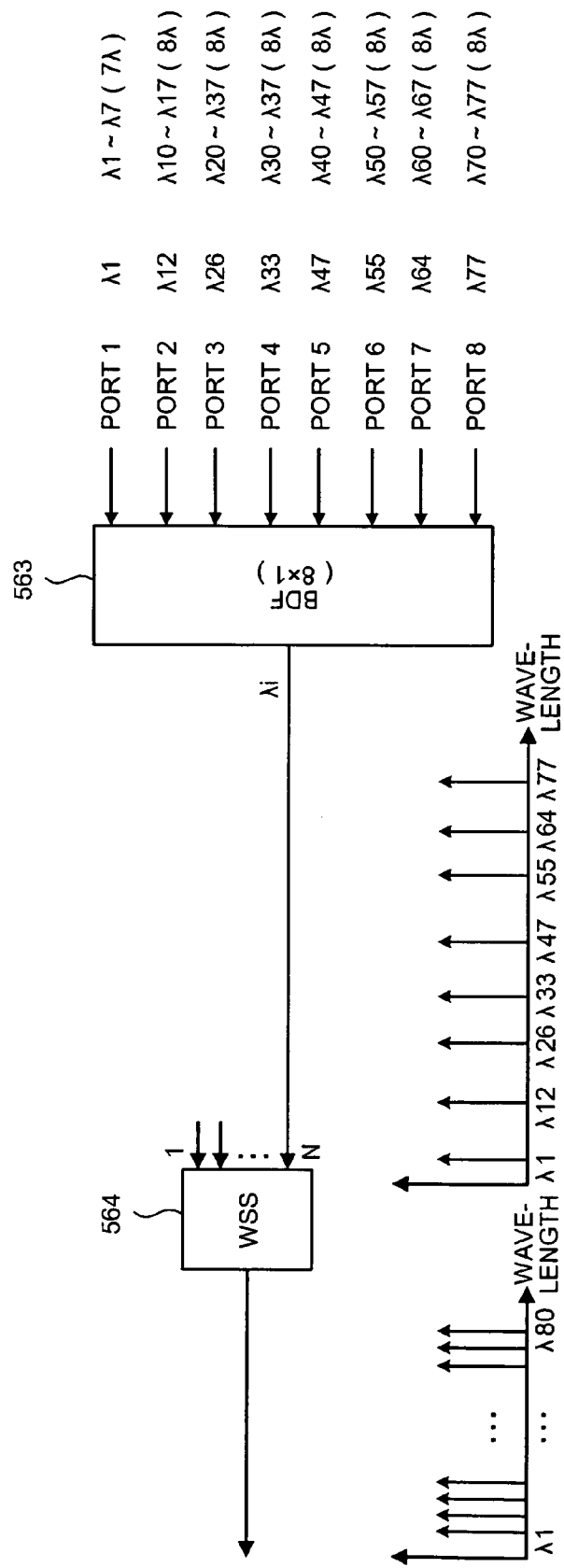
FIG. 41B is a schematic of a configuration when the band division filter is used on the add side as the grouping filter.

FIG. 41B is a diagram of a configuration example of using a band division filter as a grouping filter in the add side. Eight wavelengths each are assigned respectively to eight input ports of an 8×1-port band division filter (BDF) 563, and one of the eight wavelengths is used for actual operation. The output of the band division filter 563 is connected to one of the input ports of an N×1-port wavelength selective switch (WSS) 564. It may be necessary to ensure a guard band that is unavailable, depending on the band division filters 561 and 563. This guard band may cause an available guide band to be limited. However, the band division filters 561 and 563 can be realized at low cost as compared with some other system in which the band division filters are used as the grouping filters.

Figure 34J:
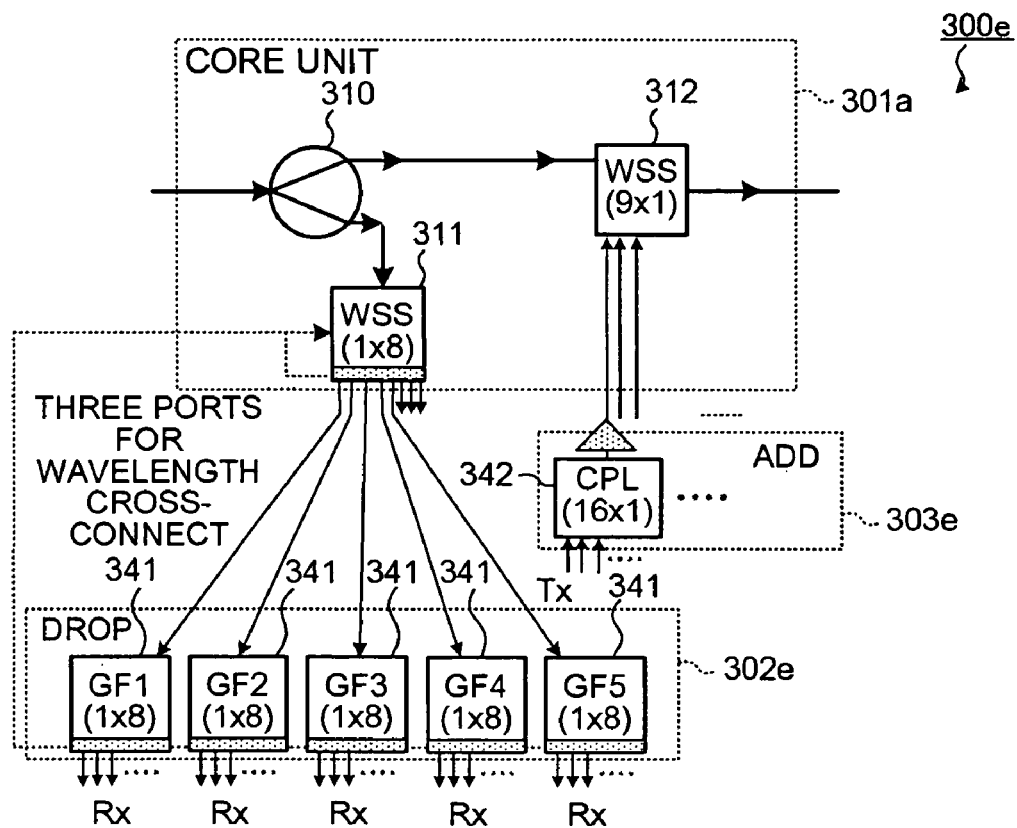
FIG. 34J is a schematic of a specific configuration of the optical add/drop multiplexer shown in FIG. 34E.
Figure 34K:
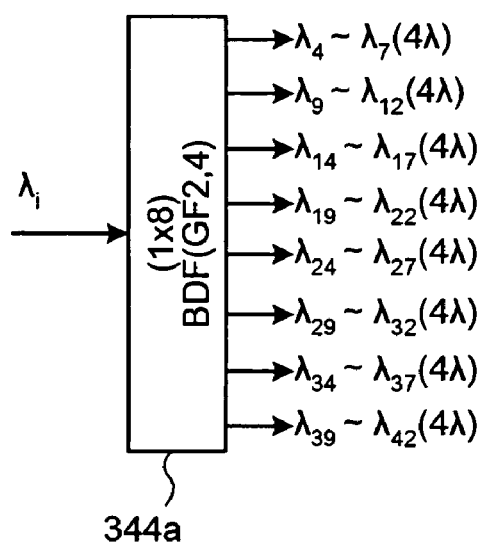
FIG. 34K is a schematic of a specific configuration of the optical add/drop multiplexer shown in FIG. 34E.
Figure 34L:
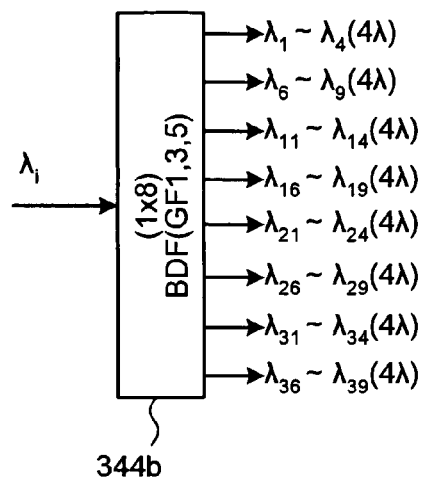
FIG. 34L is a schematic of the band division filter that forms grouping filters (GF1, 3, 5) shown in FIG. 34J.

Specific examples of the configurations using the band division filter as the grouping filter are explained below. FIG. 34J is a schematic of a specific configuration of the optical add/drop multiplexer shown in FIG. 34E. FIG. 34K is a schematic of a specific configuration of the optical add/drop multiplexer shown in FIG. 34E. FIG. 34L is a schematic of the band division filter that forms grouping filters (GF1, 3, 5) shown in FIG. 34J. In the configuration of FIG. 34E, if the number of wavelengths of a main signal input to the core unit 301a is 40 wavelengths, the band division filters (BDF) 344a and 344b as the grouping filter 341 are connected to each of the five ports out of the eight output ports of the wavelength selective switch (WSS) 311. Different wavelengths are assigned to all the output ports of the band division filters 344a and 344b, and the remaining three ports are connected to the wavelength cross-connect device. It is thereby possible to loosen the limitation on the number of wavelengths for use, which is a problem occurring upon using the grouping filter, and to allow signals corresponding to the 40 wavelengths to be dropped and at the same time to realize the wavelength cross-connect.

Figure 34M:
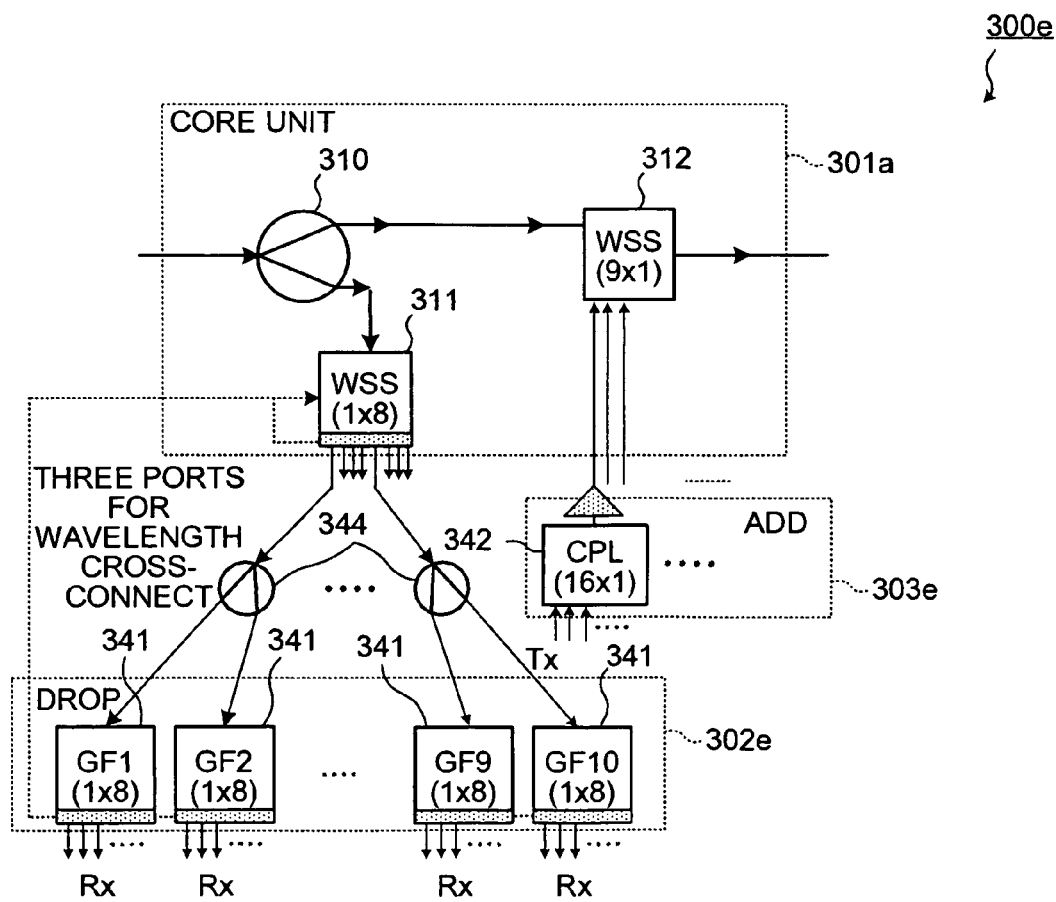
FIG. 34M is a schematic of a specific configuration of the optical add/drop multiplexer shown in FIG. 34E.
Figure 34N:
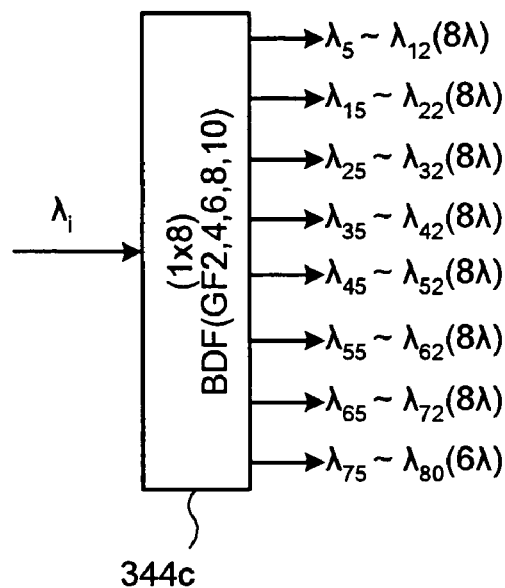
FIG. 34N is a schematic of the band division filter that forms grouping filters (GF2, 4, 6, 8, and 10) shown in FIG. 34M.
Figure 34O:
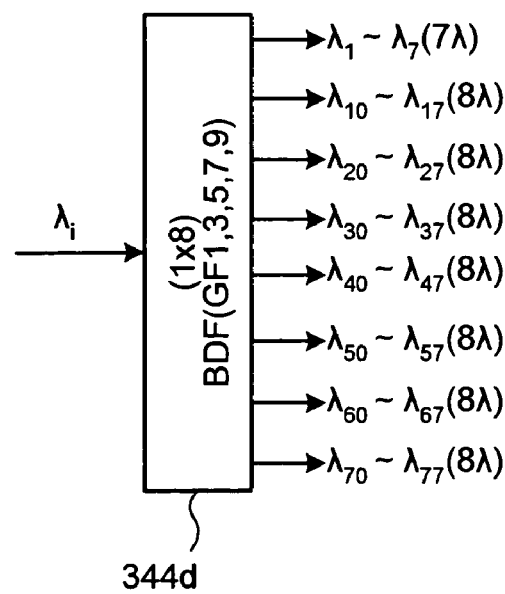
FIG. 34O is a schematic of the band division filter that forms grouping filters (GF1, 3, 5, 7, and 9) shown in FIG. 34M.

FIG. 34M is a schematic of a specific configuration of the optical add/drop multiplexer shown in FIG. 34E;

FIG. 34N is a schematic of the band division filter that forms grouping filters (GF2, 4, 6, 8, and 10) shown in FIG. 34M. FIG. 34N is a schematic of the band division filter that forms grouping filters (GF2, 4, 6, 8, and 10) shown in FIG. 34M. FIG. 34O is a schematic of the band division filter that forms grouping filters (GF1, 3, 5, 7, and 9) shown in FIG. 34M. If the number of wavelengths of a main signal input to the core unit 301a as shown in FIG. 34E is 80 wavelengths, a 1×2-port optical coupler 344 is connected to each of the five ports out of the eight output ports of the wavelength selective switch (WSS) 311, and the (1×8-port) band division filters 344c and 344d as the grouping filter (GF) 341 are connected to each of the two output ports of the optical coupler 344. Different wavelengths are assigned to all the output ports of the band division filters 344*c* and 344*d*, and the remaining three ports are connected to the wavelength cross-connect device. It is thereby possible to overcome the limitation on the number of wavelengths for use, which is a problem occurring upon using the grouping filter, and to allow signals corresponding to all the 80 wavelengths of the main signal to be dropped and at the same time to realize the wavelength cross-connect.

Figure 36K:
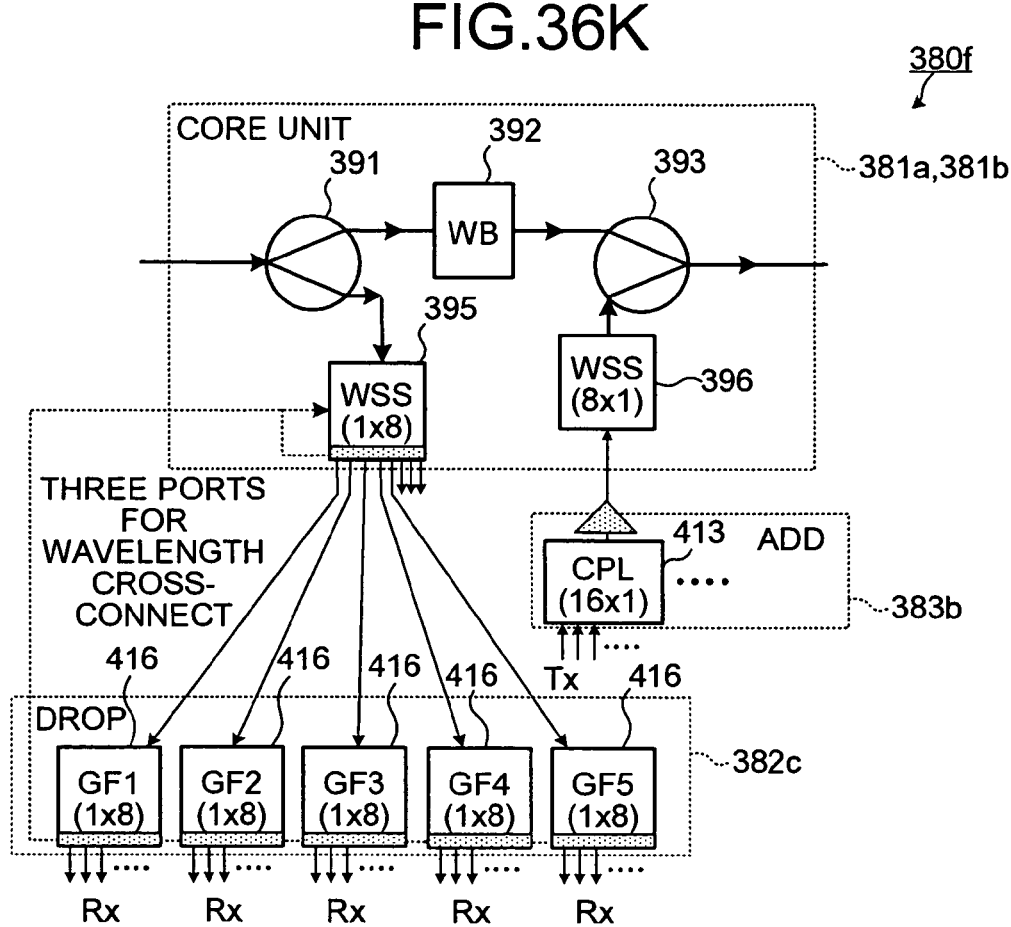
FIG. 36K is a schematic of a specific configuration of the optical add/drop multiplexer shown in FIG. 36F.
Figure 36L:
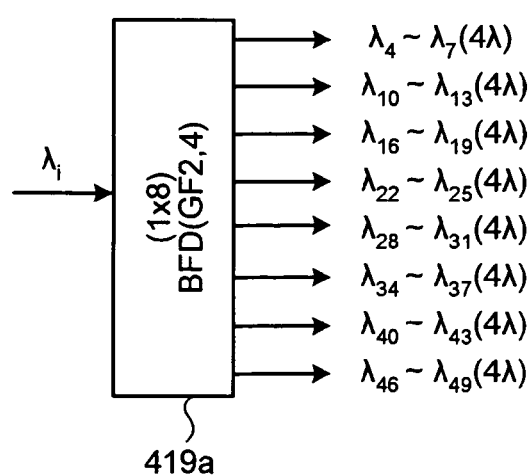
FIG. 36L is a schematic of the band division filter that forms grouping filters (GF2, 4) shown in FIG. 36K.
Figure 36M:
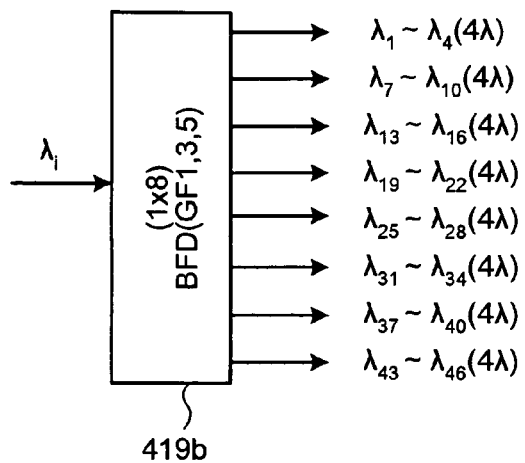
FIG. 36M is a schematic of the band division filter that forms grouping filters (GF1, 3, 5) shown in FIG. 36K.

FIG. 36K is a schematic of a specific configuration of the optical add/drop multiplexer shown in FIG. 36F. FIG. 36L is a schematic of the band division filter that forms grouping filters (GF2, 4) shown in FIG. 36K. FIG. 36M is a schematic of the band division filter that forms grouping filters (GF1, 3, 5) shown in FIG. 36K. If the number of wavelengths of a main signal input to the core unit 381*a* as shown in FIG. 36F is 40 wavelengths, the (1×8-port) band division filters 419*a* and 419*b* as the grouping filter (GF) 416 are connected to each of the five ports out of the eight output ports of the wavelength selective switch (WSS) 395. Different wavelengths are assigned to all the output ports of the band division filters 419*a* and 419*b*, and the remaining three ports are connected to the wavelength cross-connect device. It is thereby possible to overcome the limitation on the number of wavelengths for use, which is a problem occurring upon using the grouping filter, and to allow signals corresponding to all the 40 wavelengths of the main signal to be dropped and at the same time to realize the wavelength cross-connect.

Figure 36N:
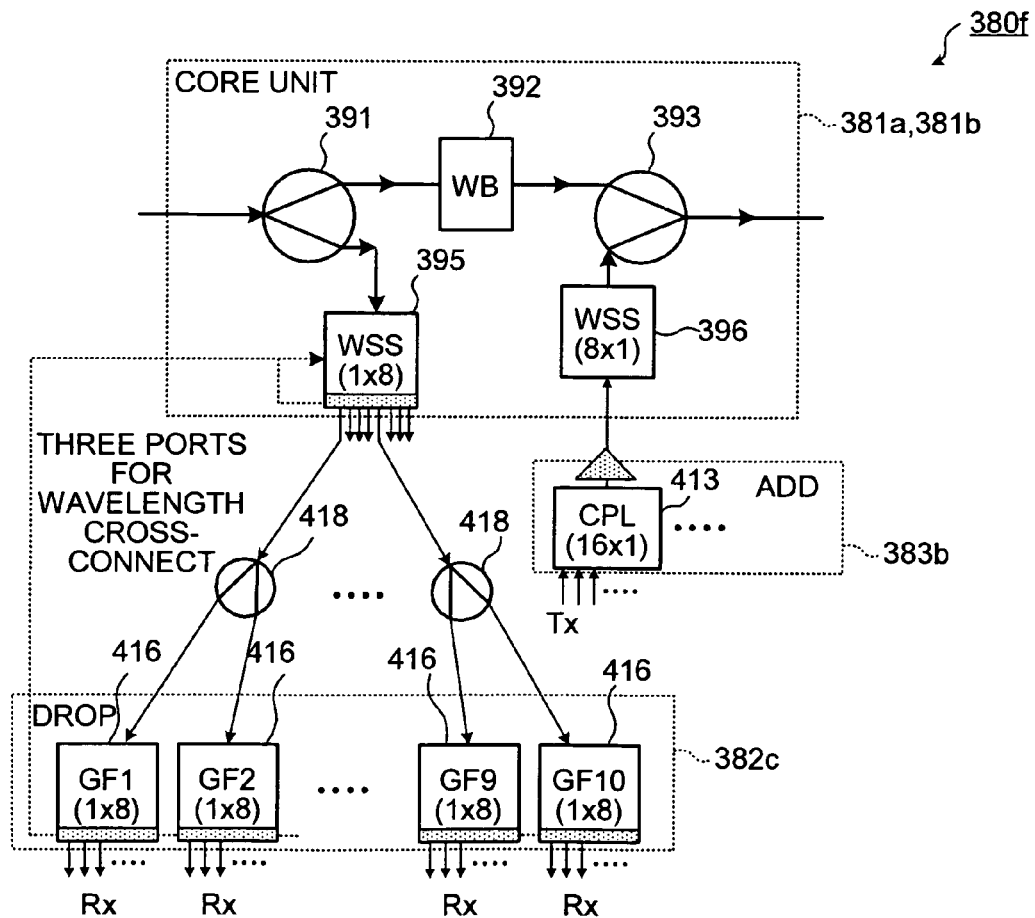
FIG. 36N is a schematic of a specific configuration of the optical add/drop multiplexer shown in FIG. 36F.
Figure 36O:
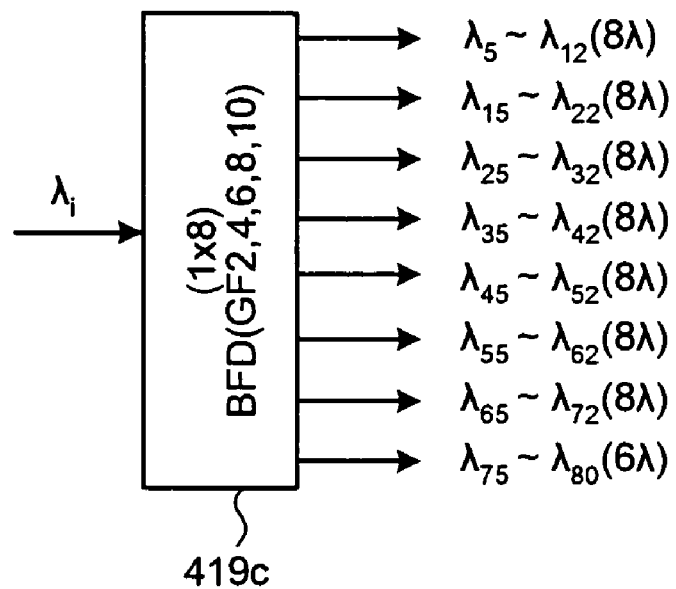
FIG. 36O is a schematic of the band division filter that forms grouping filters (GF2, 4, 6, 8, and 10) shown in FIG. 36N.
Figure 36P:
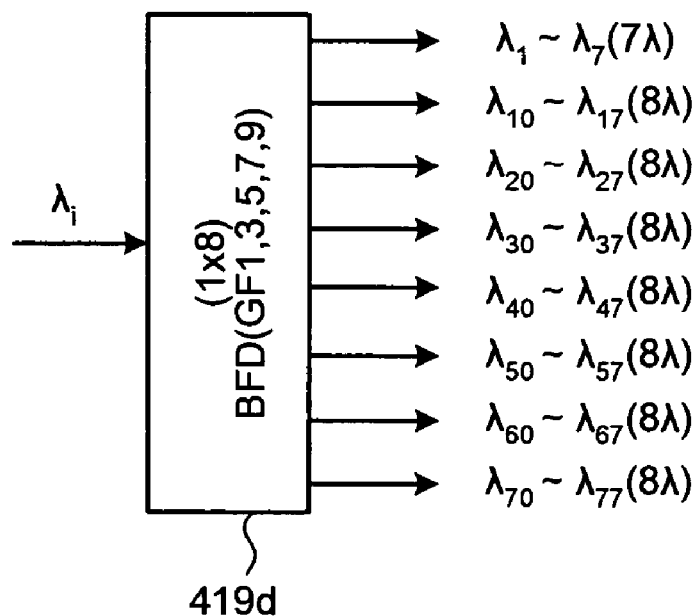
FIG. 36P is a schematic of the band division filter that forms grouping filters (GF1, 3, 5, 7, and 9) shown in FIG. 36N.

FIG. 36N is a schematic of a specific configuration of the optical add/drop multiplexer shown in FIG. 36F. FIG. 36O is a schematic of the band division filter that forms grouping filters (GF2, 4, 6, 8, and 10) shown in FIG. 36N. FIG. 36P is a schematic of the band division filter that forms grouping filters (GF1, 3, 5, 7, and 9) shown in FIG. 36N. If the number of wavelengths of a main signal input to the core unit 301*a* as shown in FIG. 36F is 80 wavelengths, a 1×2-port optical coupler 418 is connected to each of the five ports out of the eight output ports of the wavelength selective switch (WSS) 395, and the (1×8-port) band division filters 419*c* and 419*d* are connected to each of the two output ports of the optical coupler 418. Different wavelengths are assigned to all the output ports of the band division filters 419*c* and 419*d*, and the remaining three ports are connected to the wavelength cross-connect device. It is thereby possible to overcome the limitation on the number of wavelengths for use, which is a problem occurring upon using the grouping filter, and to allow signals corresponding to all the 80 wavelengths of the main signal to be dropped and at the same time to realize the wavelength cross-connect.

Figure 35G:
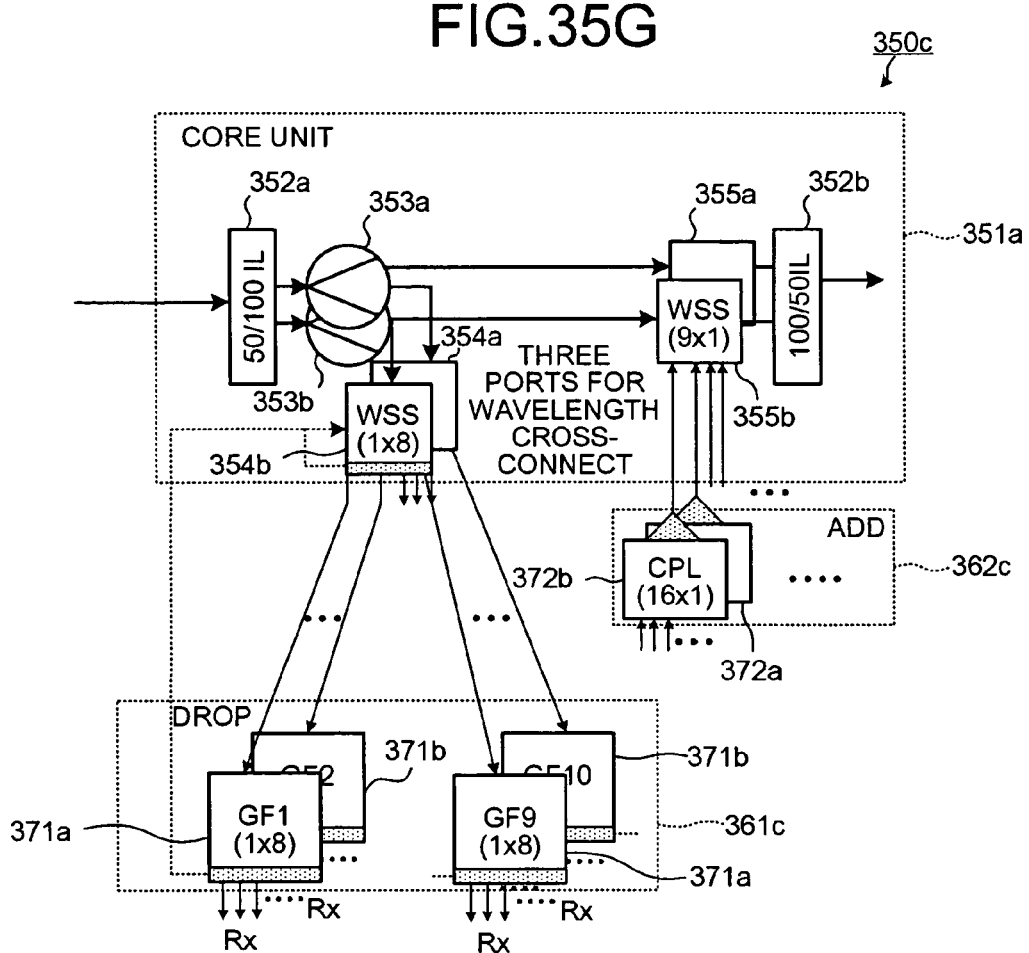
FIG. 35G is a schematic of a specific configuration of the optical add/drop multiplexer as shown in FIG. 35C.
Figure 35H:
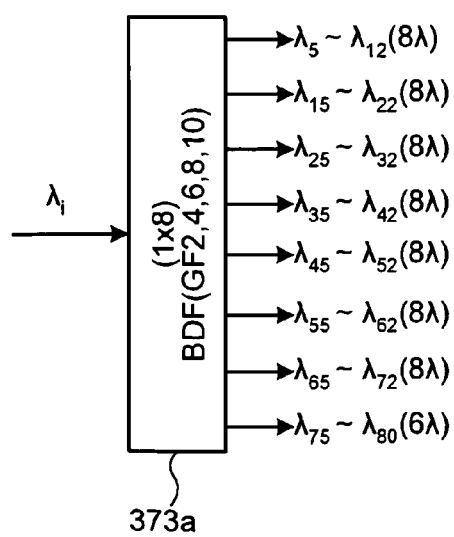
FIG. 35H is a schematic of the band division filter that forms grouping filters (GF2, 4, 6, 8, and 10) shown in FIG. 35G.
Figure 35I:
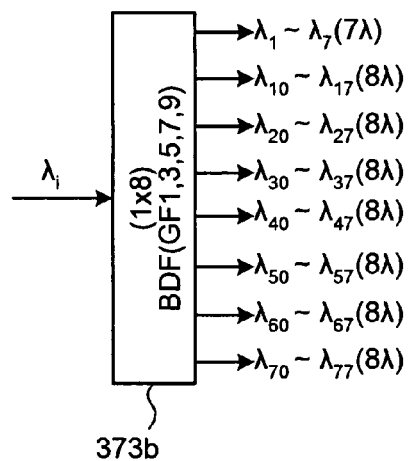
FIG. 35I is a schematic of the band division filter that forms grouping filters (GF1, 3, 5, 7, and 9) shown in FIG. 35G.

FIG. 35G is a diagram of another specific configuration of the optical add/drop multiplexer as shown in FIG. 35C. FIG. 35H is a schematic of the band division filter 373*a* that forms grouping filters (GF2, 4, 6, 8, and 10) shown in FIG. 35G. FIG. 35I is a schematic of the band division filter 373*d* that forms grouping filters (GF1, 3, 5, 7, and 9) shown in FIG. 35G. In the configuration of FIG. 35C, if the number of wavelengths of a main signal input to the core unit 351*a* is 80 wavelengths, the (1×8-port) band division filters 373*a* and 373*b* as the grouping filters (GF) 371*a*/371*b* are connected to each of the five ports out of the eight output ports of the wavelength selective switches (WSS) 354*a* and 354*b*. Different wavelengths are assigned to all the output ports of the band division filters 373*a* and 373*b*, and the each remaining three ports are connected to the wavelength cross-connect devices. It is thereby possible to overcome the limitation on the number of wavelengths for use, which is a problem occurring upon using the grouping filter, and to allow signals corresponding to all the 80 wavelengths of the main signal to be dropped and at the same time to realize the wavelength cross-connect.

Figure 37H:
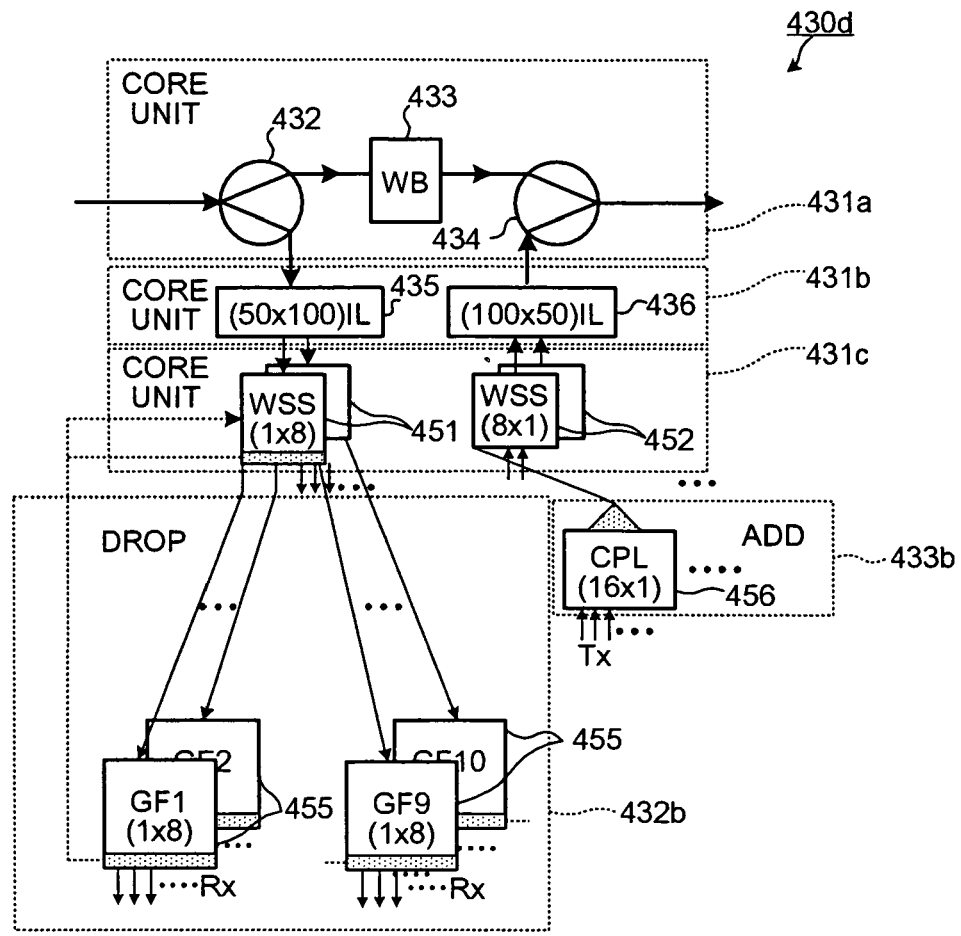
FIG. 37H is a schematic of a specific configuration of the optical add/drop multiplexer shown in FIG. 37D.
Figure 37I:
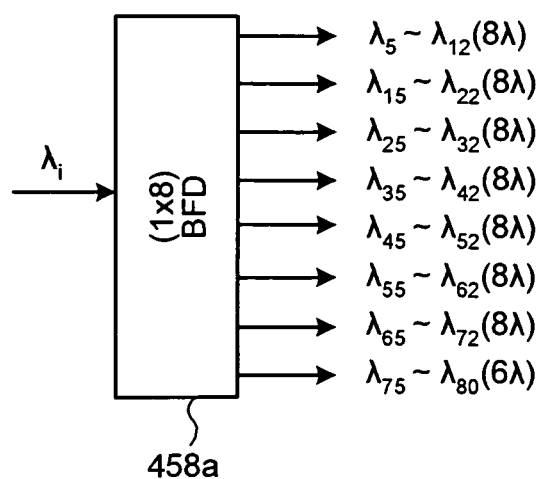
FIG. 37I is a schematic of the band division filter that forms grouping filters (GF2, 4, 6, 8, and 10) shown in FIG. 37H.
Figure 37J:
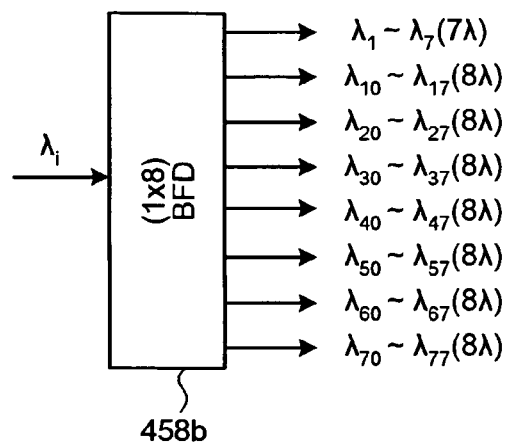
FIG. 37J is a schematic of the band division filter that forms grouping filters (GF1, 3, 5, 7, and 9) shown in FIG. 37H.

FIG. 37H is a schematic of a specific configuration of the optical add/drop multiplexer shown in FIG. 37D. FIG. 37I is a schematic of the band division filter that forms grouping filters (GF2, 4, 6, 8, and 10) shown in FIG. 37H. FIG. 37J is a schematic of the band division filter that forms grouping filters (GF1, 3, 5, 7, and 9) shown in FIG. 37H. In the configuration of FIG. 37D, if the number of wavelengths of a main signal input to the core unit 431*a* is 80 wavelengths, the (1×8-port) band division filters 458*a* and 458*b* as the grouping filters (GF) 455 are connected to each of the five ports out of the eight output ports of the respective wavelength selective switches (WSS) 451. Different wavelengths are assigned to all the output ports of the band division filters 458*a* and 458*b*, and the each remaining three ports are connected to the wavelength cross-connect devices. It is thereby possible to overcome the limitation on the number of wavelengths for use, which is a problem occurring upon using the grouping filter, and to allow signals corresponding to all the 80 wavelengths of the main signal to be dropped and at the same time to realize the wavelength cross-connect.

Figure 42A:
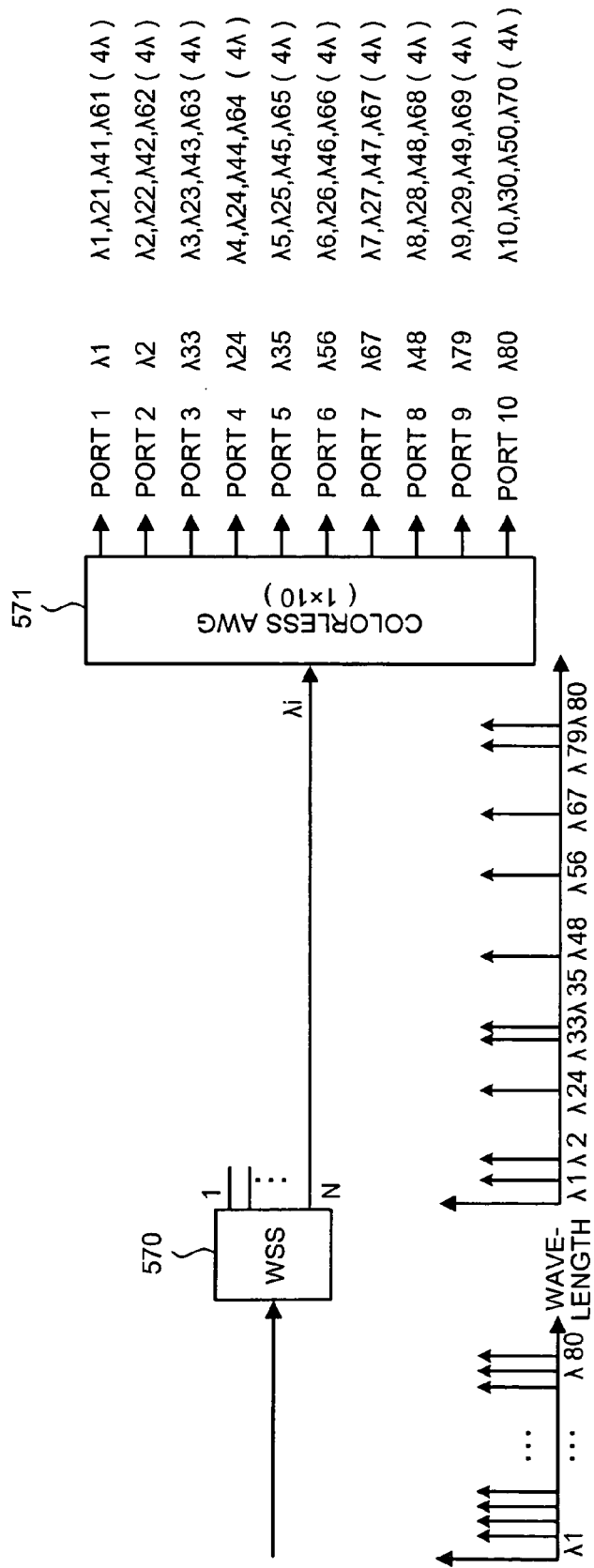
FIG. 42A is a schematic of a configuration when the colorless AWG is used on the drop side as the grouping filter.

FIG. 42A is a schematic of a configuration when the colorless AWG is used on the drop side as the grouping filter. A colorless AWG 571 is connected to one of the output ports of a 1×N-port wavelength selective switch (WSS) 570. As shown in the figure, the number of wavelengths (λ) of a transmission signal is 80 waves at maximum, and a 1×10-port colorless AWG 571 is used as the grouping filter (GF). Four wavelengths (4λ) as a group are assigned to each of the 10 output ports of the colorless AWG 571, and one of the four wavelengths is used for actual operation.

FIG. 42B is a schematic of a configuration when the colorless AWG is used on the add side as the grouping filter. Four wavelengths as a group are assigned to each of the input ports of a 10×1-port colorless AWG 573, and one of the four wavelengths is used for actual operation. The output of the colorless AWG 573 is connected to one of the input ports of a N×1-port wavelength selective switch (WSS) 574.

Figure 34P:
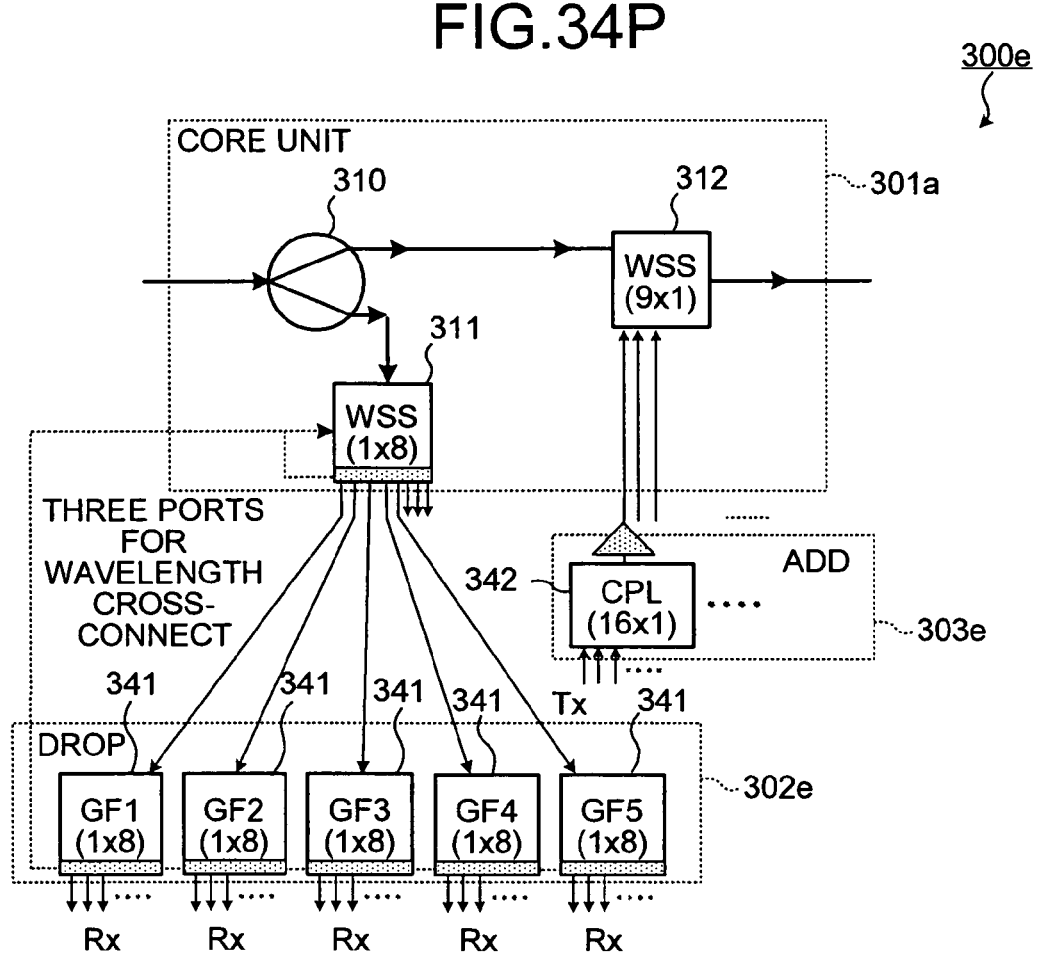
FIG. 34P is a schematic of a specific configuration of the optical add/drop multiplexer shown in FIG. 34E.
Figure 34Q:
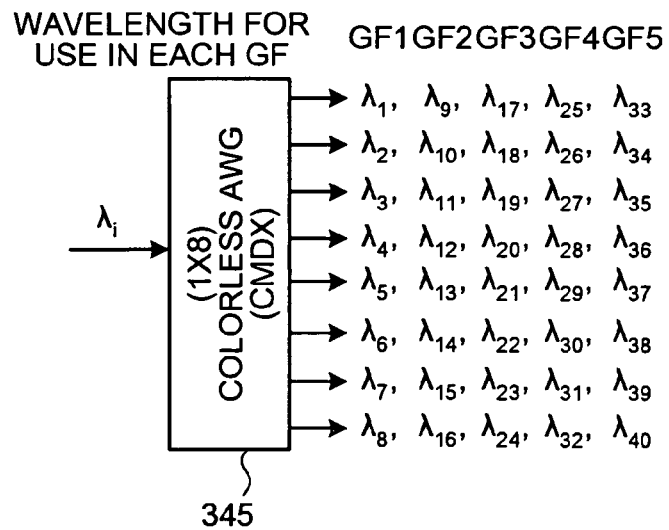
FIG. 34Q is a schematic of a colorless AWG that forms the grouping filters (GF1 to 5) shown in FIG. 34P.

FIG. 34P is a diagram of another specific configuration of the optical add/drop multiplexer as shown in FIG. 34E. FIG. 34Q is a schematic of a colorless AWG that forms the grouping filters (GF1 to 5) shown in FIG. 34P. If the number of wavelengths of a main signal input to the core unit 301*a* of FIG. 34E is 40 wavelengths, a 1×8-port colorless AWG 345 as the grouping filter (GF) 341 is connected to each of the five ports out of the eight output ports of the wavelength selective switch (WSS) 311. Different wavelengths are assigned to all the output ports of the colorless AWG 345, and the remaining three ports are connected to the wavelength cross-connect device. It is thereby possible to overcome the limitation on the number of wavelengths for use, which is a problem occurring upon using the grouping filter, and to allow signals corresponding to all the 40 wavelengths of the main signal to be dropped and at the same time to realize the wavelength cross-connect.

Figure 34R:
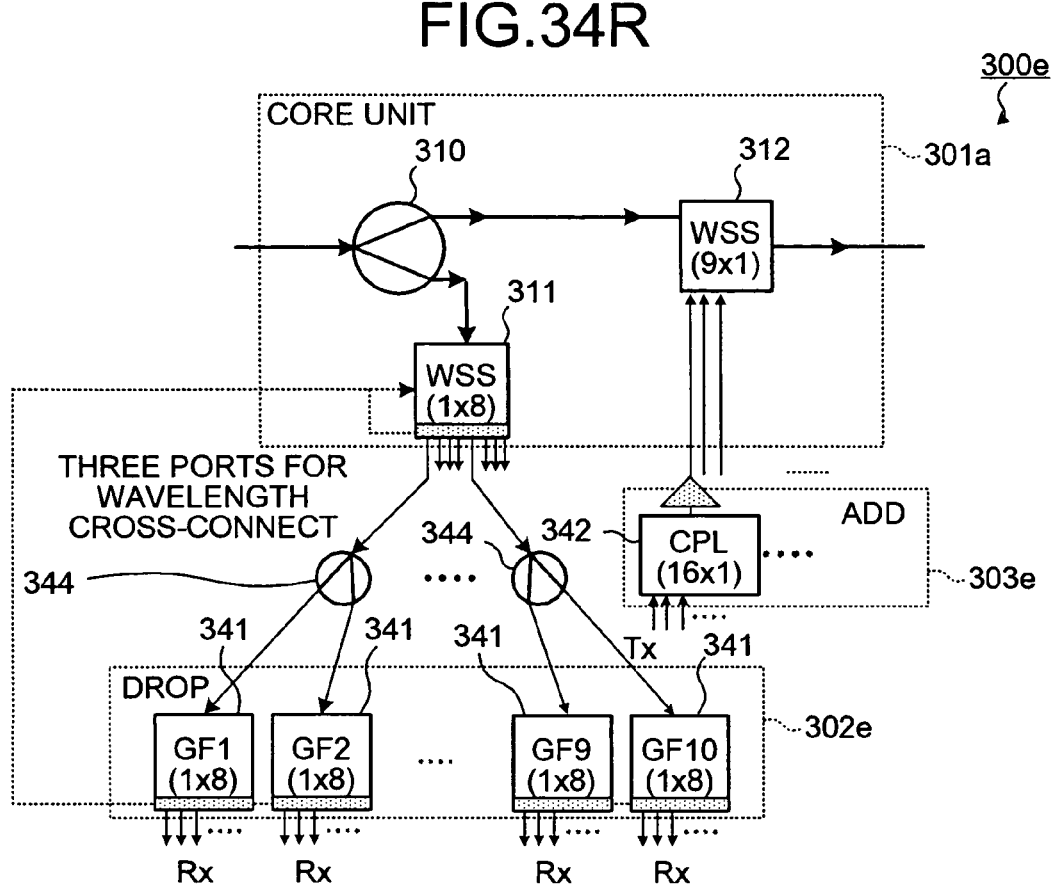
FIG. 34R is a schematic of a specific configuration of the optical add/drop multiplexer shown in FIG. 34E.
Figure 34S:
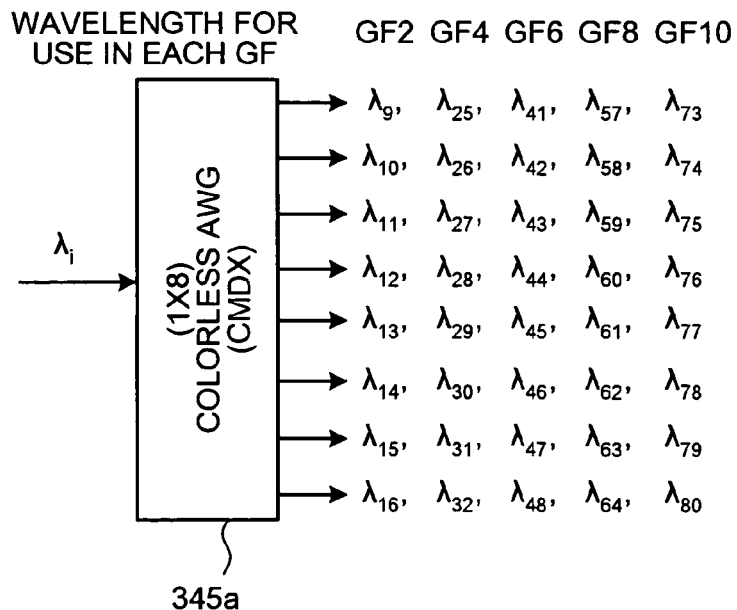
FIG. 34S is a schematic of a colorless AWG that forms grouping filters (GF2, 4, 6, 8, and 10) shown in FIG. 34R.
Figure 34T:
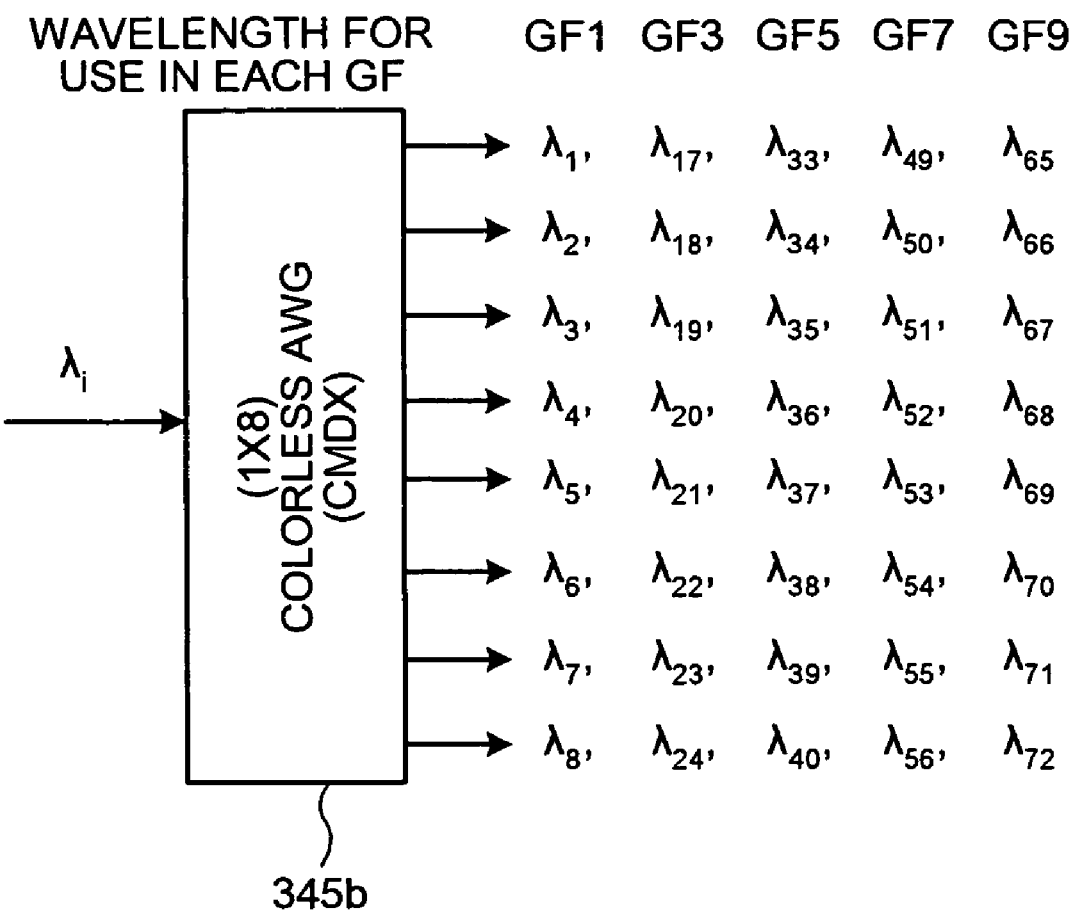
FIG. 34T is a schematic of the colorless AWG that forms grouping filters (GF1, 3, 5, 7, and 9) shown in FIG. 34R.

FIG. 34R is a schematic of a specific configuration of the optical add/drop multiplexer shown in FIG. 34E. FIG. 34S is a schematic of a colorless AWG that forms grouping filters (GF2, 4, 6, 8, and 10) shown in FIG. 34R. FIG. 34T is a schematic of the colorless AWG that forms grouping filters (GF1, 3, 5, 7, and 9) shown in FIG. 34R. If the number of wavelengths of a main signal input to the core unit 301*a* of FIG. 34E is 80 wavelengths, a 1×2-port optical coupler 344 is connected to each of the five ports out of the eight output ports of the wavelength selective switches (WSS) 311, and the (1×8-port) colorless AWGs 345a and 345b are connected to each of the two output ports of the optical coupler 344. Different wavelengths are assigned to all the output ports of the colorless AWGs 345a and 345b, and the remaining three ports are connected to the wavelength cross-connect device. It is thereby possible to overcome the limitation on the number of wavelengths for use, which is a problem occurring upon using the grouping filter, and to allow signals corresponding to all the 80 wavelengths of the main signal to be dropped and at the same time to realize the wavelength cross-connect.

Figure 36Q:
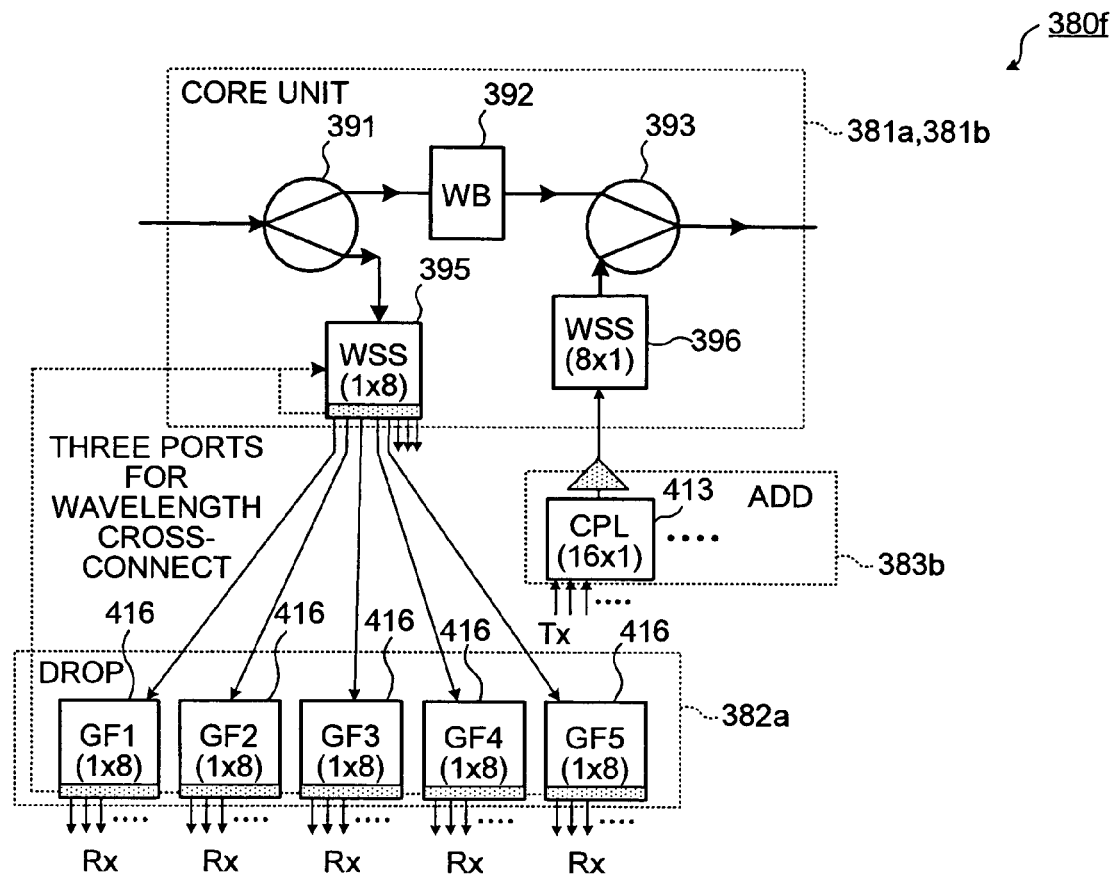
FIG. 36Q is a schematic of a specific configuration of the optical add/drop multiplexer shown in FIG. 36F.
Figure 36R:
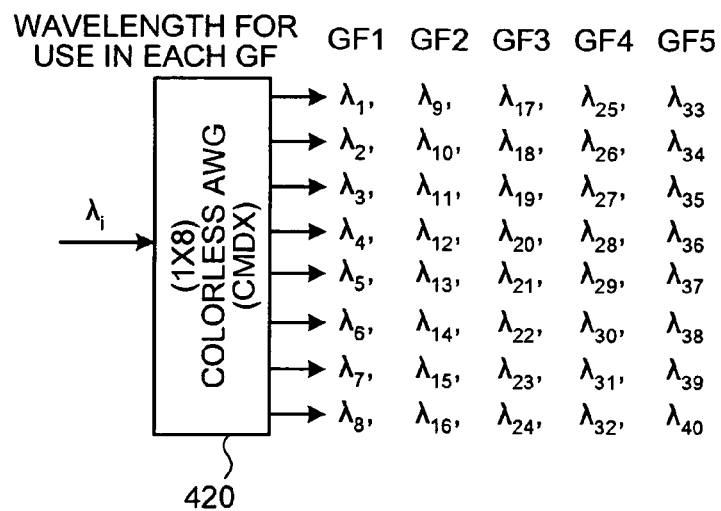
FIG. 36R is a schematic of the colorless AWG that forms grouping filters (GF1 to 5) shown in FIG. 36Q.

FIG. 36Q is a schematic of a specific configuration of the optical add/drop multiplexer shown in FIG. 36F. FIG. 36R is a schematic of the colorless AWG that forms grouping filters (GF1 to 5) shown in FIG. 36Q. If the number of wavelengths of a main signal input to the core unit 381a of FIG. 36F is 40 wavelengths, a 1×8-port colorless AWG 420 as the grouping filter (GF) 416 is connected to each of the five ports out of the eight output ports of the wavelength selective switch (WSS) 395. Different wavelengths are assigned to all the output ports of the colorless AWG (CMDX) 420, and the remaining three ports are connected to the wavelength cross-connect device. It is thereby possible to overcome the limitation on the number of wavelengths for use, which is a problem occurring upon using the grouping filter, and to allow signals corresponding to all the 40 wavelengths of the main signal to be dropped and at the same time to realize the wavelength cross-connect.

Figure 36S:
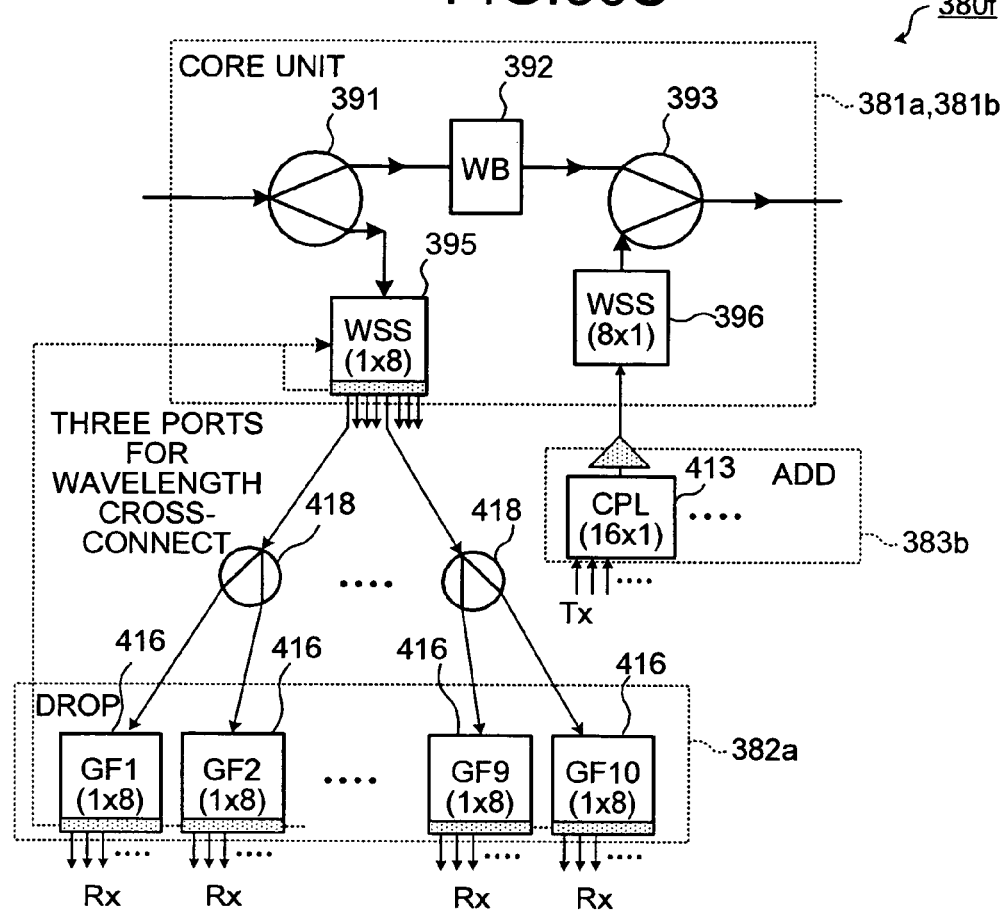
FIG. 36S is a schematic of a specific configuration of the optical add/drop multiplexer shown in FIG. 36F.
Figure 36T:
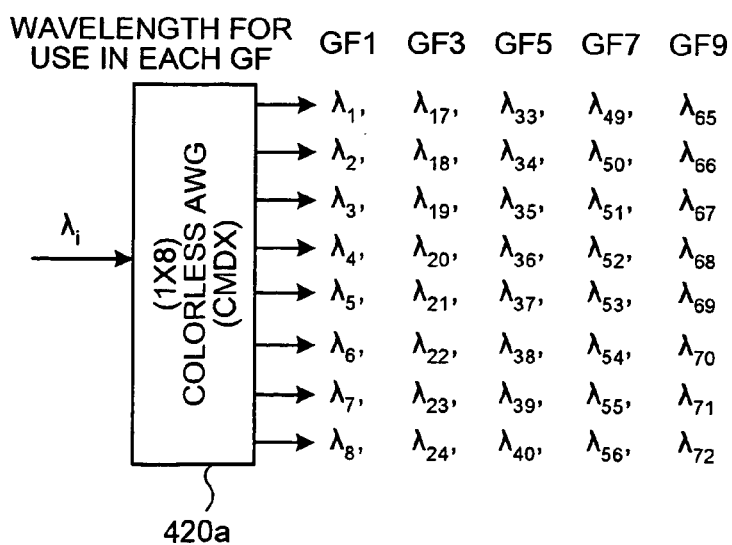
FIG. 36T is a schematic of the colorless AWG that forms grouping filters (GF1, 3, 5, 7, and 9) shown in FIG. 36S.
Figure 36U:
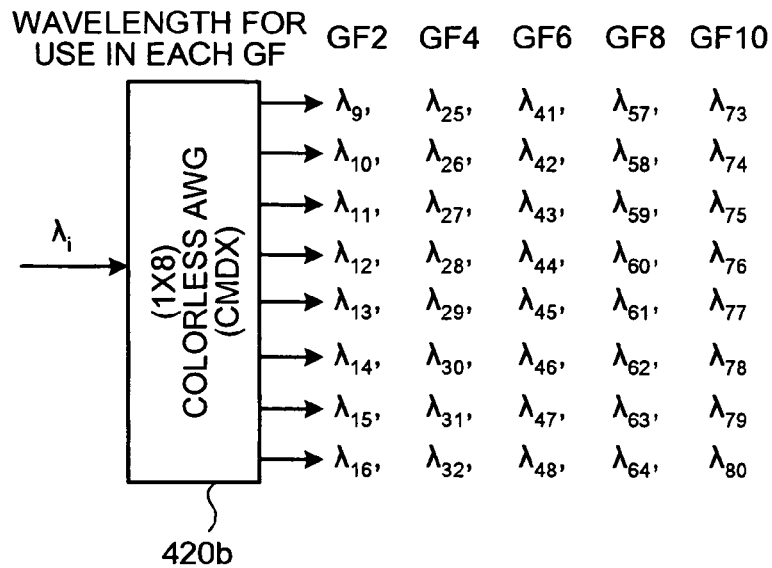
FIG. 36U is a schematic of the colorless AWG that forms grouping filters (GF2, 4, 6, 8, and 10) shown in FIG. 36S.

FIG. 36S is a schematic of a specific configuration of the optical add/drop multiplexer shown in FIG. 36F. FIG. 36T is a schematic of the colorless AWG 420a that forms grouping filters (GF1, 3, 5, 7, and 9) shown in FIG. 36S. FIG. 36U is a schematic of the colorless AWG 420b that forms grouping filters (GF2, 4, 6, 8, and 10) shown in FIG. 36S. If the number of wavelengths of a main signal input to the core unit 381a of FIG. 36F is 80 wavelengths, a 1×2-port optical coupler 418 is connected to each of the five ports out of the eight output ports of the wavelength selective switch (WSS) 395, and the (1×8-port) colorless AWGs (CMDX) 420a and 420b are connected to each of the two output ports of the respective optical couplers 418. Different wavelengths are assigned to all the output ports of the colorless AWGs (CMDX) 420a and 420b, and the remaining three ports are connected to the wavelength cross-connect device. It is thereby possible to overcome the limitation on the number of wavelengths for use, which is a problem occurring upon using the grouping filter, and to allow signals corresponding to all the 80 wavelengths of the main signal to be dropped and at the same time to realize the wavelength cross-connect.

Figure 35J:
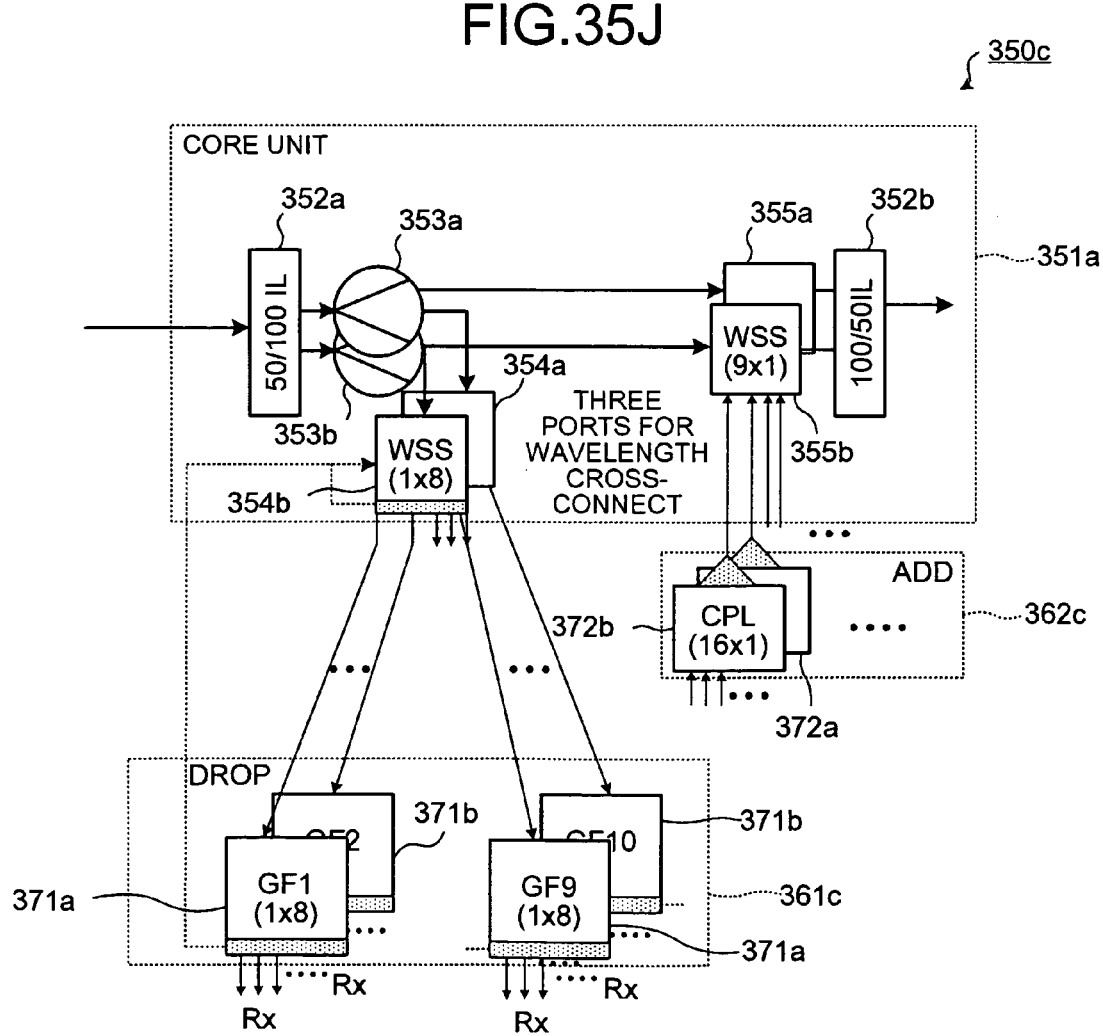
FIG. 35J is a schematic of a specific configuration of the optical add/drop multiplexer shown in FIG. 35C.
Figure 35K:
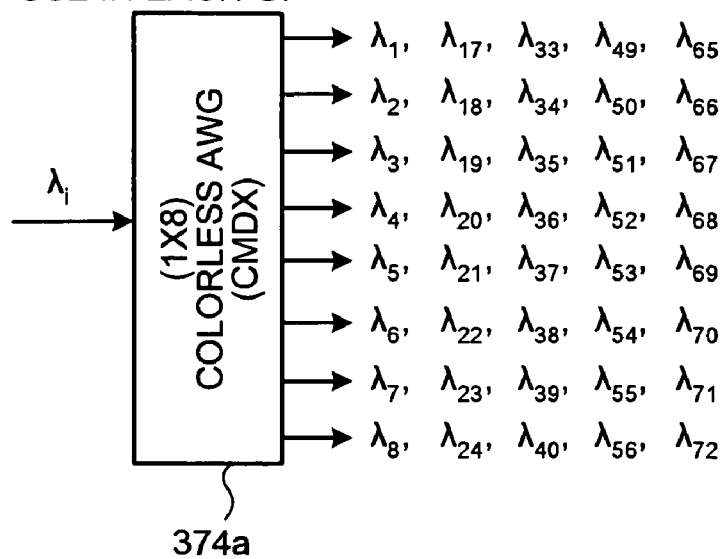
FIG. 35K is a schematic of the colorless AWG that forms grouping filters (GF1, 3, 5, 7, and 9) shown in FIG. 35J.
Figure 35L:
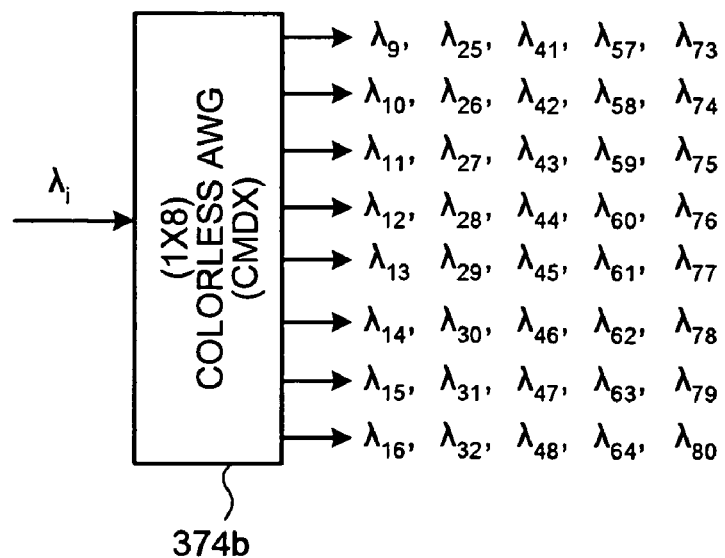
FIG. 35L is a schematic of the colorless AWG that forms grouping filters (GF2, 4, 6, 8, and 10) shown in FIG. 35J.

FIG. 35J is a schematic of a specific configuration of the optical add/drop multiplexer shown in FIG. 35C. FIG. 35K is a schematic of the colorless AWG 374a that forms grouping filters (GF1, 3, 5, 7, and 9) shown in FIG. 35J. FIG. 35L is a schematic of the colorless AWG 374b that forms grouping filters (GF2, 4, 6, 8, and 10) shown in FIG. 35J. If the number of wavelengths of a main signal input to the core unit 351a of FIG. 35C is 80 wavelengths, 1×8-port colorless AWGs 374a and 374b as the grouping filters (GF) 371a/371b are connected to each of the five ports out of the eight output ports of the respective wavelength selective switches (WSS) 354a and 354b. Different wavelengths are assigned to all the output ports of the colorless AWGs 374a and 374b, and the each remaining three ports are connected to the wavelength cross-connect devices. It is thereby possible to overcome the limitation on the number of wavelengths for use, which is a problem occurring upon using the grouping filter, and to allow signals corresponding to all the 80 wavelengths of the main signal to be dropped and at the same time to realize the wavelength cross-connect.

Figure 37K:
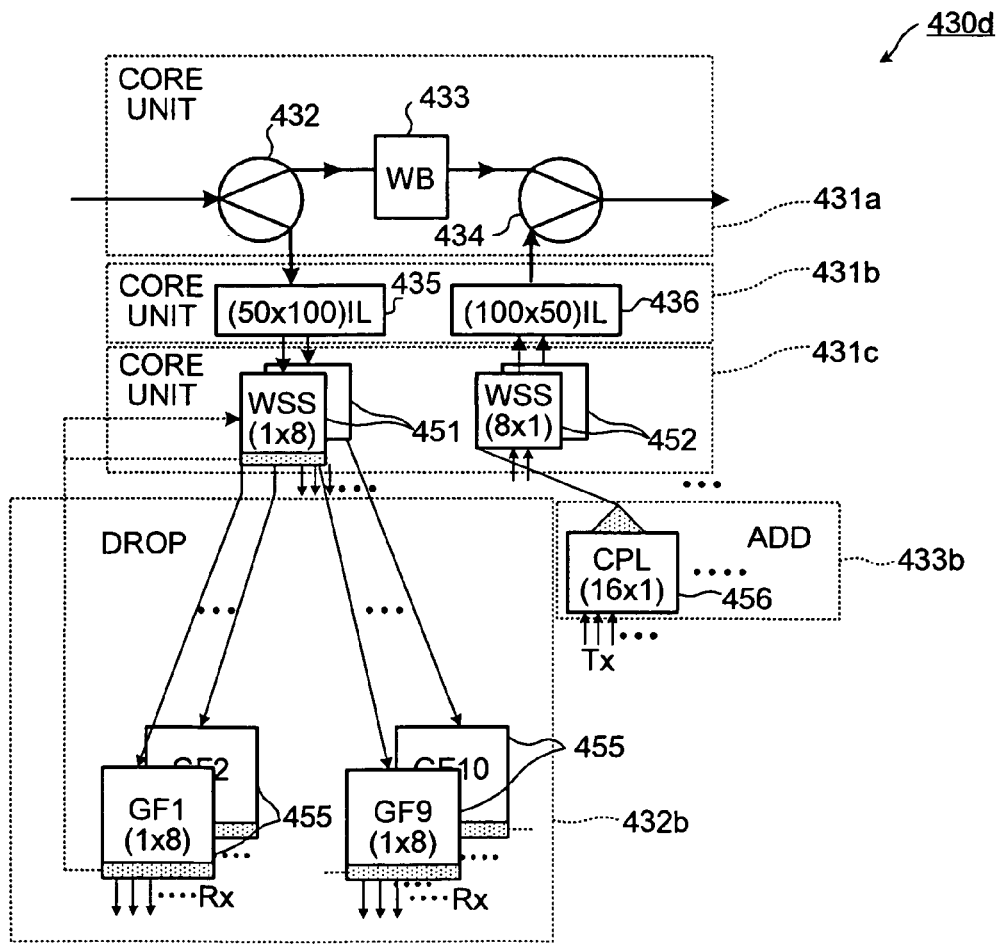
FIG. 37K is a schematic of a specific configuration of the optical add/drop multiplexer shown in FIG. 37D.
Figure 37L:
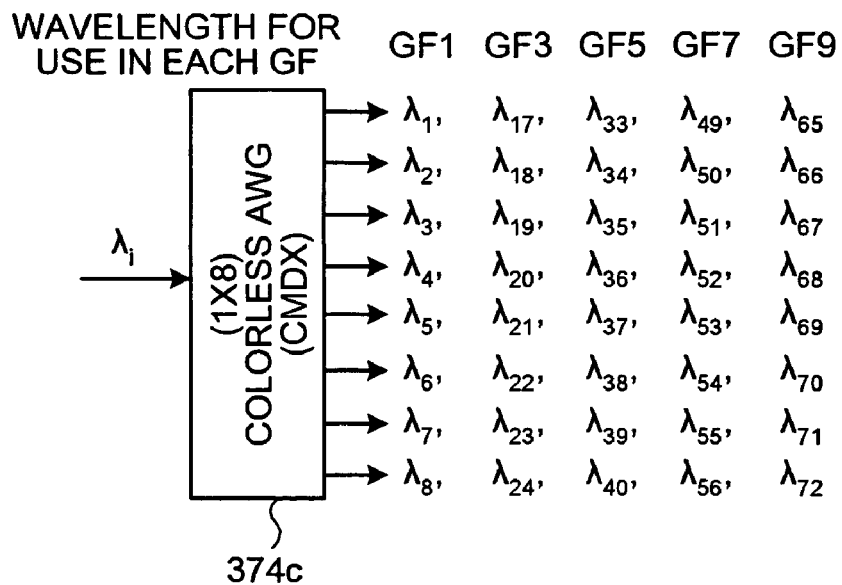
FIG. 37L is a schematic of the colorless AWG that forms grouping filters (GF1, 3, 5, 7, and 9) shown in FIG. 37K.
Figure 37M:
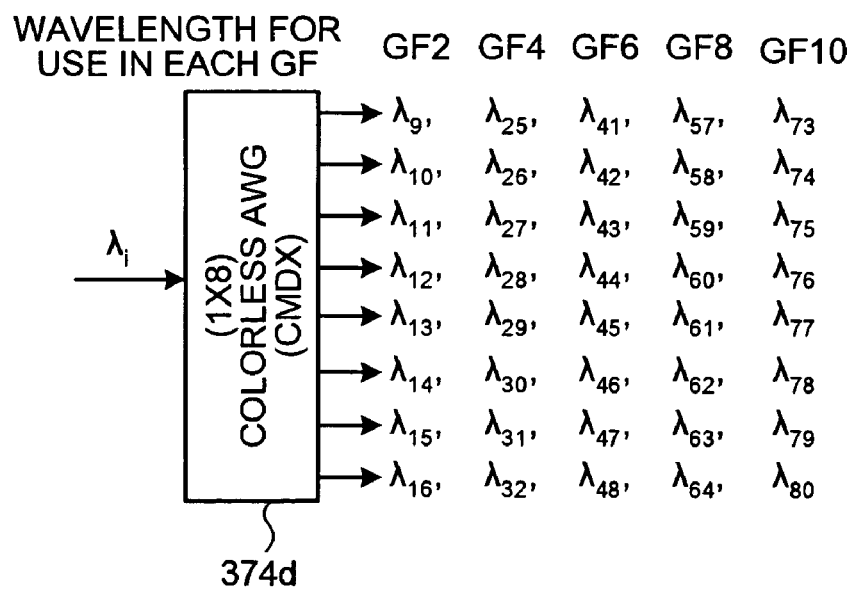
FIG. 37M is a schematic of the colorless AWG that forms grouping filters (GF2, 4, 6, 8, and 10) shown in FIG. 37K.

FIG. 37K is a schematic of a specific configuration of the optical add/drop multiplexer shown in FIG. 37D. FIG. 37L is a schematic of the colorless AWG that forms grouping filters (GF1, 3, 5, 7, and 9) shown in FIG. 37K. FIG. 37M is a schematic of the colorless AWG that forms grouping filters (GF2, 4, 6, 8, and 10) shown in FIG. 37K. In the configuration of FIG. 37D, if the number of wavelengths of a main signal input to the core unit 431a is 80 wavelengths, 1×8-port colorless AWGs 374c and 374d as the grouping filter (GF) 455 are connected to each of the five ports out of the eight output ports of the respective wavelength selective switches (WSS) 451. Different wavelengths are assigned to all the output ports of the colorless AWGs (CMDX) 374c and 374d, and the each remaining three ports are connected to the wavelength cross-connect devices. It is thereby possible to overcome the limitation on the number of wavelengths for use, which is a problem occurring upon using the grouping filter, and to allow signals corresponding to all the 80 wavelengths of the main signal to be dropped and at the same time to realize the wavelength cross-connect.

Figure 43A:
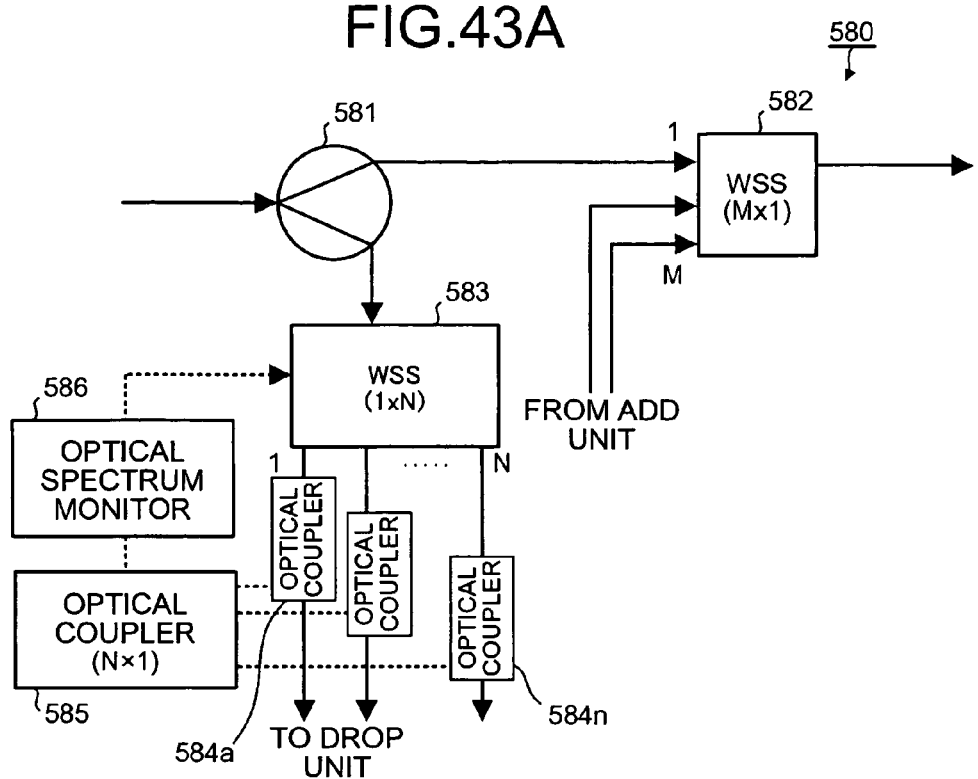
FIG. 43A is a schematic of a configuration in which an optical spectrum monitor is used for control of optical power of the drop signal.

An example of using an optical spectrum monitor for optical power control is explained below. FIG. 43A is a schematic of a configuration in which an optical spectrum monitor is used for control of optical power of the drop signal. A core unit 580 includes a 1×2 optical coupler 581, an M×1-port wavelength selective switch (WSS) 582, and a 1×N-port wavelength selective switch (WSS) 583 for dropping. Optical couplers 584a to 584n are provided in the output ports in the drop side, respectively. Optical signals branched by the optical couplers 584a to 584n are combined by an N×1 optical coupler 585, and the optical signals combined are input to an optical spectrum monitor 586. The optical spectrum monitor 586 adjusts an optically combined state of each of the ports of the wavelength selective switch (WSS) 583 so that the optical power at each of the ports is a required value. It is thereby possible to control the optical power of an optical signal in the drop side.

Figure 43B:
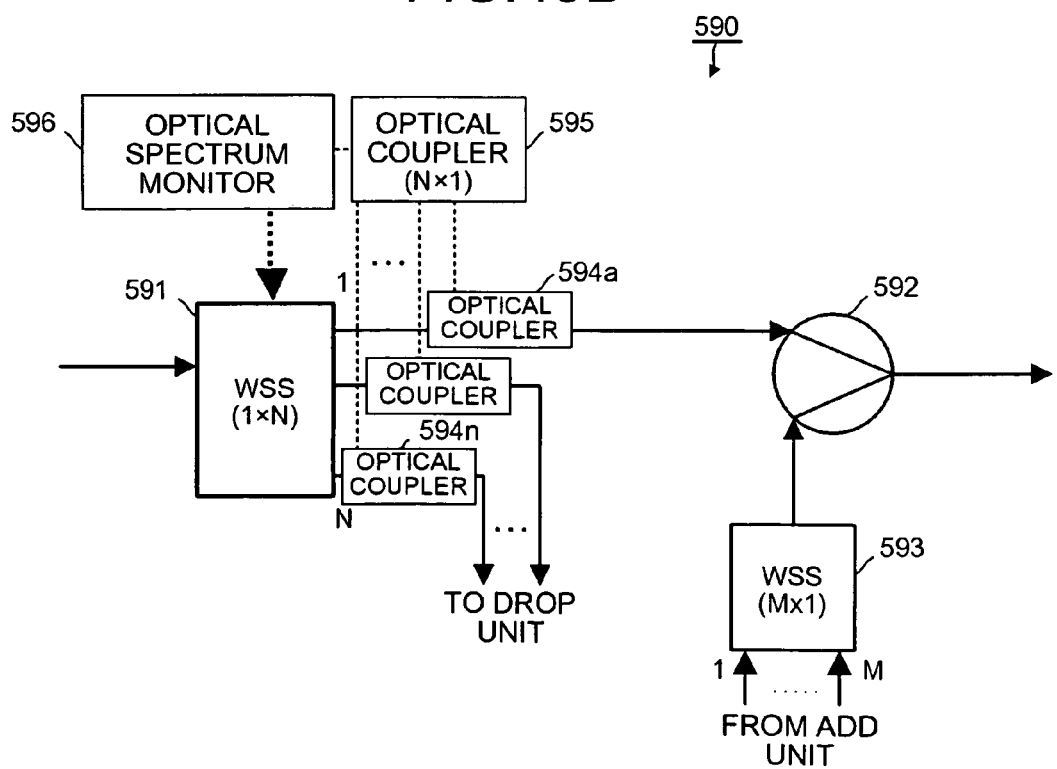
FIG. 43B is a schematic of a configuration in which an optical spectrum monitor is used for control of optical power of the main signal and the drop signal.

FIG. 43B is a schematic of a configuration in which an optical spectrum monitor is used for control of optical power of the drop signal. A core unit 590 includes a 1×N-port wavelength selective switch (WSS) 591 for dropping, a 2×1 optical coupler 592, and an M×1-port wavelength selective switch (WSS) 593 for adding. Optical couplers 594a to 594n are provided in the output ports in the main signal side and the drop side of the wavelength selective switch 591, respectively. Optical signals branched by the optical couplers 594a to 594n are combined by an N×1 optical coupler 595, and the optical signals combined are input to an optical spectrum monitor 596. The optical spectrum monitor 596 adjusts an optically combined state of each of the ports of the wavelength selective switch (WSS) 591 so that the optical power at each of the ports is a required value. It is thereby possible to control the optical power of the main signal and the optical signal in the drop side.

Figure 44:
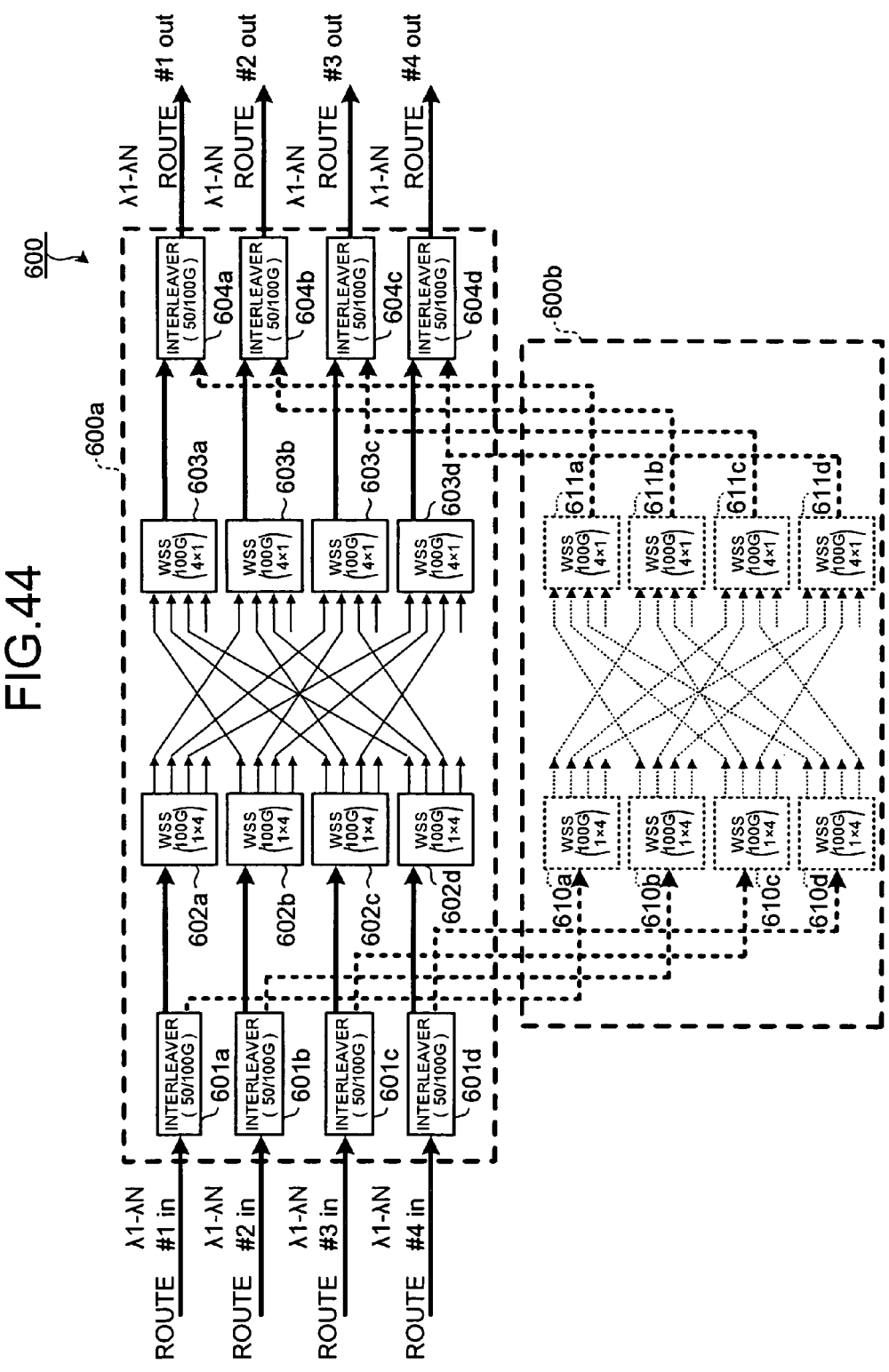
FIG. 44 is a schematic for explaining extension of the core unit that includes the interleaver.

Examples of a configuration when a core unit using an interleaver is extended are explained below. FIG. 44 is a schematic for explaining extension of the core unit that includes the interleaver. A core unit 600a upon initial introduction of an optical add/drop multiplexer 600 is switchably configured among four routes (#1 to #4).

The core unit 600a includes four 50/100 GHz interleavers 601a to 601d provided in its input side corresponding to the four routes, and four 100/50 GHz interleavers 604a to 604d provided in its output side. Arranged between the input-side interleavers and the output-side interleavers are four 1×4-port 100-GHz-spacing wavelength selective switches (WSS) 602a to 602d and four 4×1-port 100-GHz-spacing wavelength selective switches (WSS) 603a to 603d. The output ports of the wavelength selective switches 602a to 602d are mutually connected to the input ports of the wavelength selective switches 603a to 603d according to switching for each required route. Transmission signals are input or output to or from the optical add/drop multiplexer 600 at a 50 GHz-spacing. At the time of initial introduction of the device with little communication capacity, the core unit 600a starts the operation of the device using the channel of an even number. A wavelength spacing of the transmission signal in this case is 100 GHz.

If the communication capacity increases, a core unit 600b is extended to achieve function expansion. The core unit 600b includes 1×4-port 100-GHz-spacing wavelength selective switches (WSS) 610a to 610d of which input ports are connected to the interleavers 601a to 601d in the input side of the core unit 600a, and 4×1-port 100-GHz-spacing wavelength selective switches (WSS) 611a to 611d of which output ports are connected to the interleavers 604a to 604d in the output side of the core unit 600a. Upon extension of the core unit 600b, the core unit 600a handles the channel of an even number for a transmission signal, while the core unit 600b handles the channel of an odd number for a transmission signal. According to the example of the function expansion based on the configuration, cost reduction upon initial introduction becomes possible.

Figure 45A:
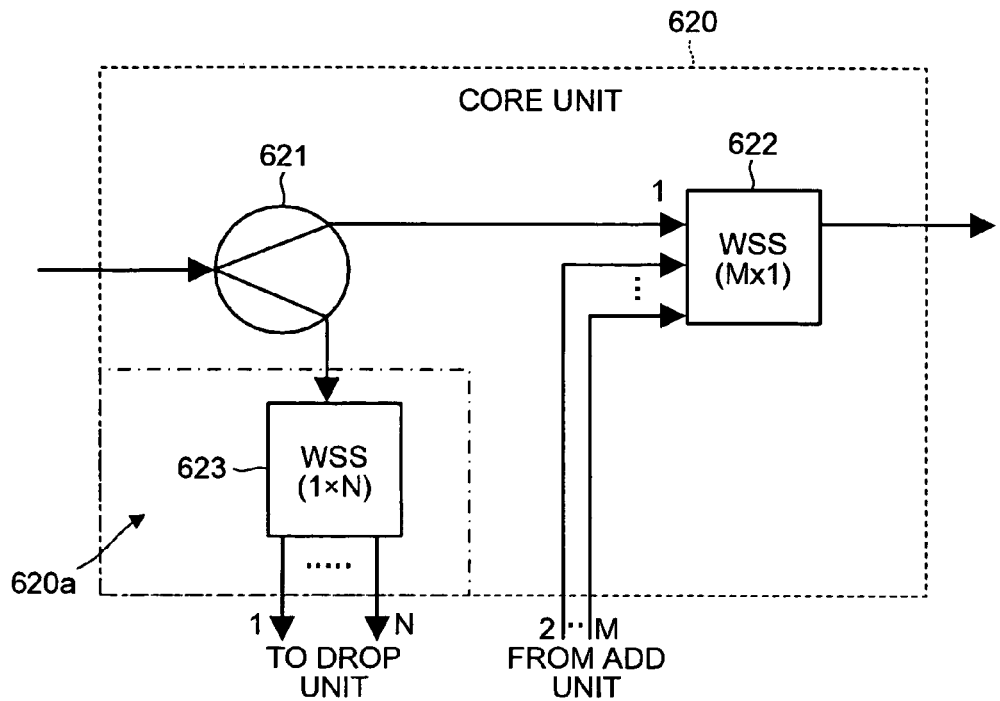

Examples of configurations in which the internal configuration of the core unit is broken into blocks are explained below. FIG. 45A is a schematic of a wavelength selective switch on the drop side separated as a block. A core unit 620 includes a 1×2 optical coupler 621 and an M×1 wavelength selective switch (WSS) 622. Furthermore, a core block 620a including a 1×N wavelength selective switch (WSS) 623 for dropping can be connected to the core unit 620 according to the number of ports that allow signals to be dropped. It is thereby possible to change only the block according to whether the wavelength selective switch 623 for dropping is required.

Figure 45B:
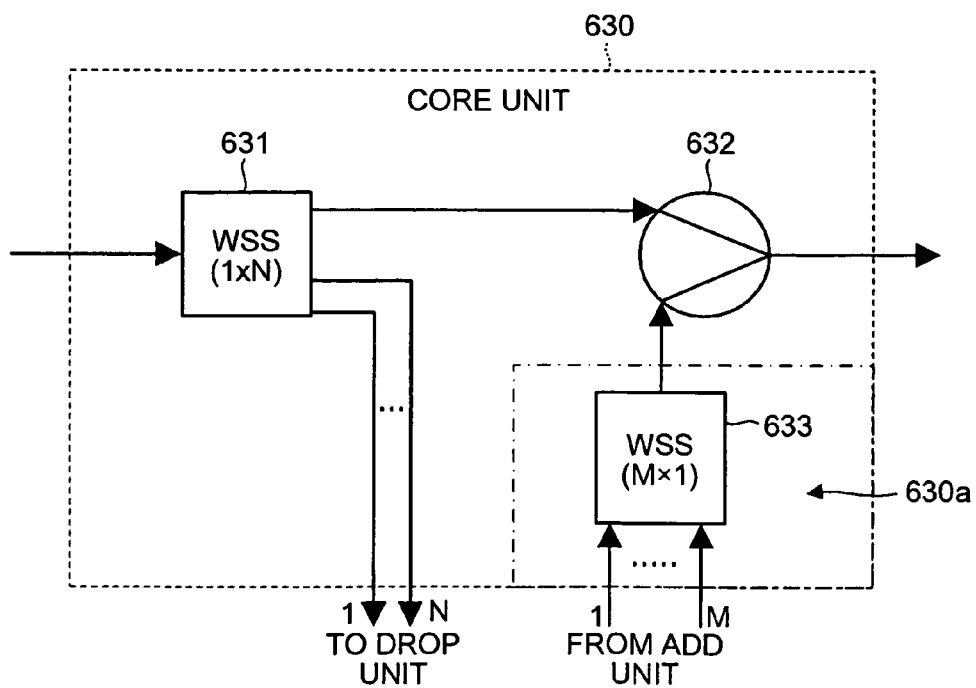

FIG. 45B is a schematic of a wavelength selective switch on the add side separated as a block. A core unit 630 includes a 1×N wavelength selective switch (WSS) 631 and a 2×1 optical coupler 632. Furthermore, a core block 630a including an M×1 wavelength selective switch (WSS) 633 for adding can be connected to the core unit 630 according to the number of ports that allow signals to be added. It is thereby possible to change only the block according to whether the wavelength selective switch 633 for adding is required. The block formed in the drop side or the add side of the core unit can be used as a configuration of the core unit upon function expansion as explained in the in-service upgrade examples.

In the optical add/drop multiplexers, the remaining ports out of the ports for adding/dropping of the add unit or the drop unit are used as ports for routes for wavelength cross-connect, but expansion examples of a port for a WXC route in order to ensure the fixed number of routes are explained below with reference to the drawings.

Figure 46A:
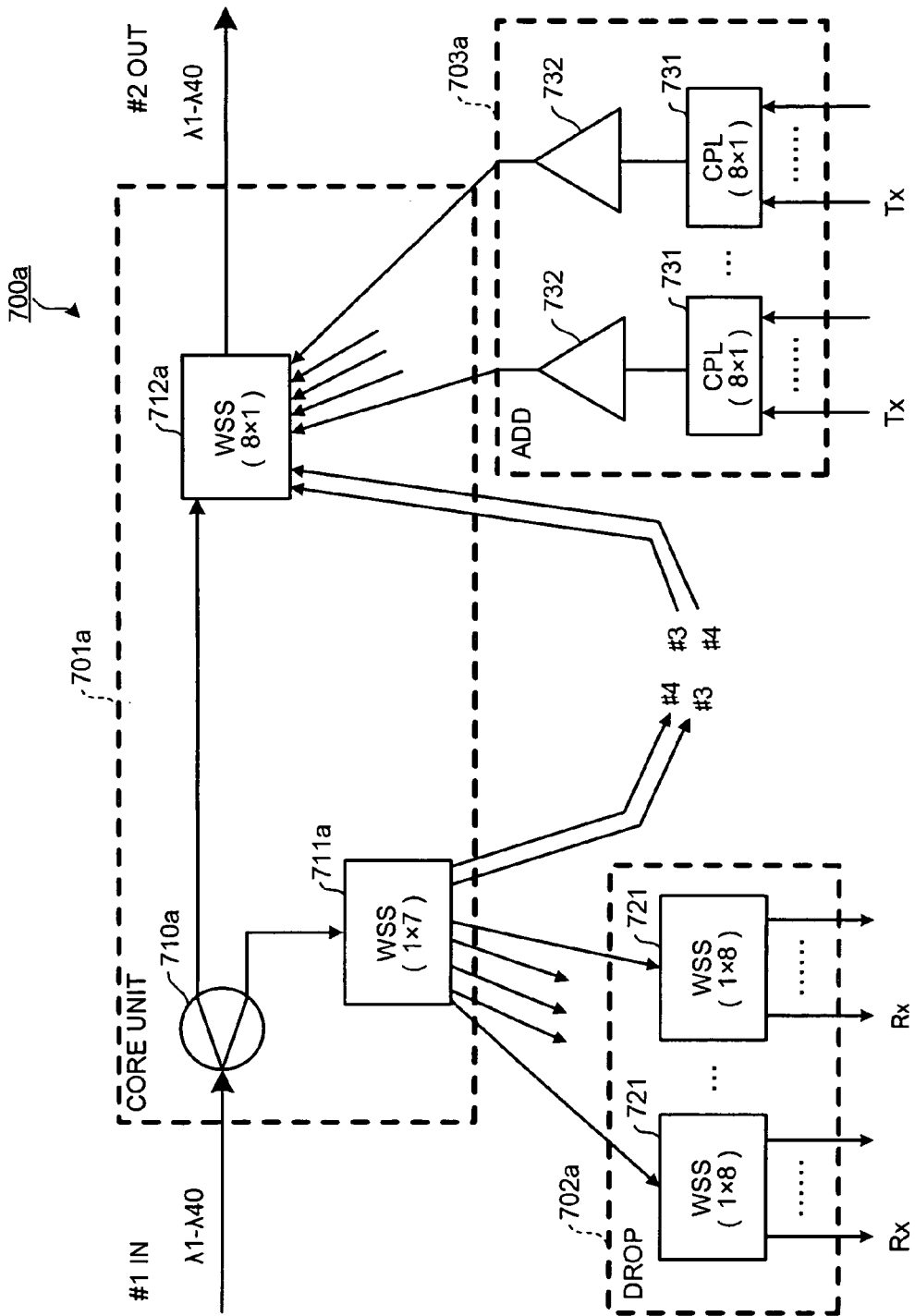

FIG. 46A is a schematic of the optical add/drop multiplexer according to an embodiment of the present invention to realize a function of a wavelength cross-connect. An optical add/drop multiplexer 700a includes a core unit 701a, a drop unit 702a, and an add unit 703a. The core unit 701a includes a 1×2 optical coupler 710a, a 1×7-port wavelength selective switch (WSS) 711a for dropping connected to one of the outputs of the 1×2 optical coupler 710a, and an 8×1-port wavelength selective switch (WSS) 712a for adding connected to the other output of the 1×2 optical coupler 710a.

The 1×7-port wavelength selective switch (WSS) 711a is connected with the drop unit 702a, and the 8×1 port wavelength selective switch (WSS) 712a is connected with the add unit 703a. Furthermore, in order to realize the wavelength cross-connect (WXC), two ports in the output side of the 1×7-port wavelength selective switch (WSS) 711a and two ports in the input side of the 8×1 port wavelength selective switch (WSS) 712a are connected to other routes (#3, #4). The number of input ports of the wavelength selective switch (WSS) 712a and the number of output ports of the wavelength selective switch (WSS) 711a of FIG. 46A are the minimum number to realize the wavelength cross-connect for four routes. Therefore, the wavelength selective switches can be replaced with another wavelength selective switch including a larger number of ports. All the wavelength selective switches as shown hereinafter are configured with the necessary minimum number of ports.

The drop unit 702a includes a plurality of 1×8-port wavelength selective switches (WSS) 721. Each of the wavelength selective switches (WSS) 721 can drop the wavelength to eight wavelengths. If 40 wavelengths ($\lambda 1$ to $\lambda 40$) are multiplexed as shown in this embodiment, five pieces of the wavelength selective switches (WSS) 721 are necessary to drop signal lights having all the wavelengths. The add unit 703a includes a plurality of 8×1 optical couplers (CPL) 731 and a plurality of optical amplifiers 732 to recover attenuation due to the 8×1 optical couplers (CPL) 731. In the 8×1 optical couplers (CPL) 731, eight wavelengths can be added to each of them, and five pieces of the 8×1 optical couplers (CPL) 731 are required to add signal lights having all the wavelengths. The optical amplifier 732 is provided to amplify the signal light attenuated due to the 8×1 optical coupler (CPL) 731.

Referring to the ports for output or input of the wavelength selective switch provided in the core unit 701a, the required number of ports are used for ports for adding and ports for dropping such that one port is required if a signal light having 8 wavelengths is to be added or dropped and two ports are required if a signal light having 16 wavelengths is to be added or dropped. The remaining ports are used as a wavelength cross-connect switch. Therefore, the number of ports that can be used as the WXC is changed depending on the required number of ports for adding or for dropping. In other words, the number of routes depends on the number of wavelengths to be added or dropped.

Figure 46B:
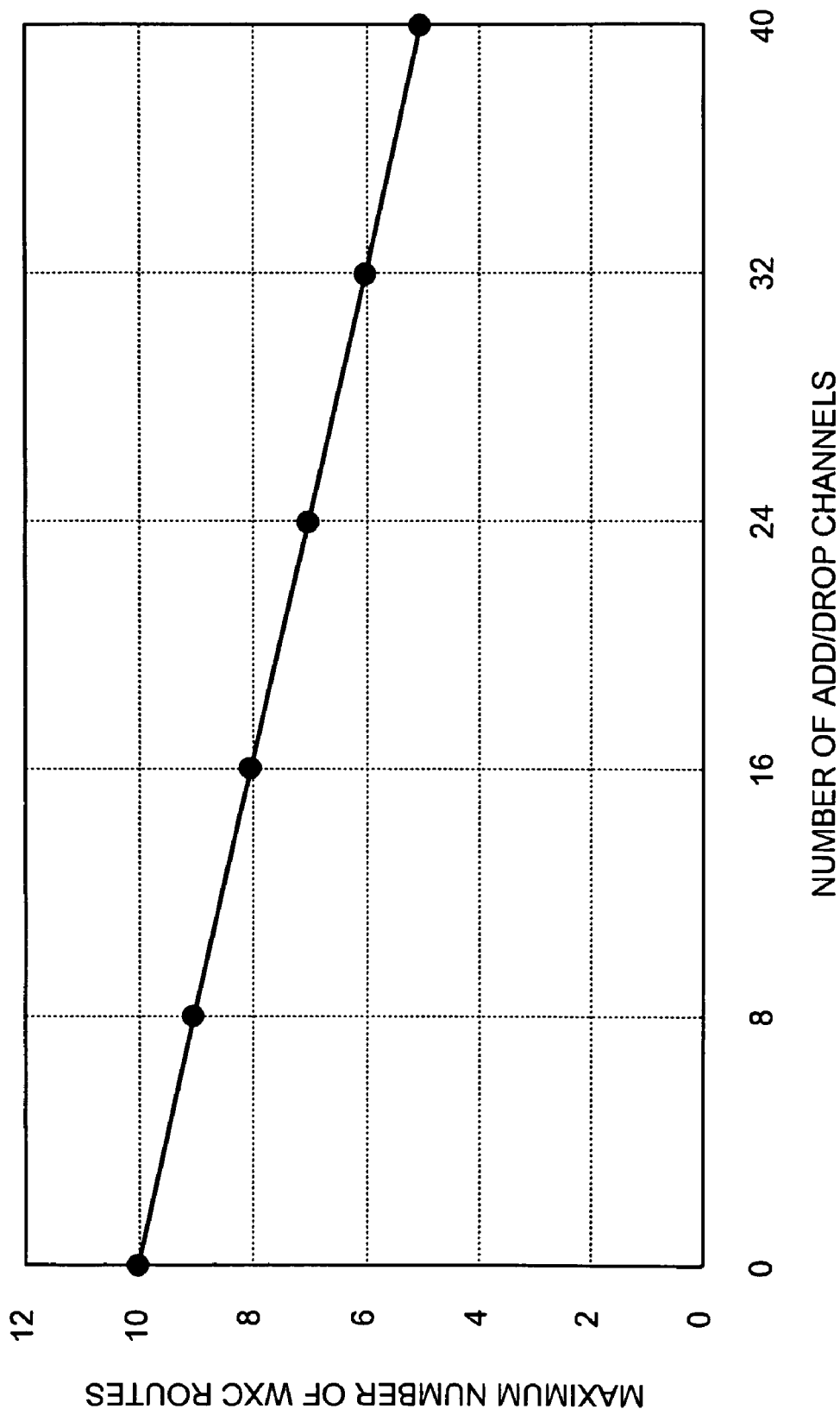

FIG. 46B is a diagram of a relationship between the number of channels for the add unit/drop unit and the maximum number of routes for wavelength cross-connect. The x-axis indicates the number of add/drop channels and the y-axis indicates the maximum number of routes for the wavelength cross-connect. Values obtained when 8×1 (1×8) elements are used in the add unit/drop unit are shown therein. Therefore, the relationship between the number of add/drop channels and the maximum number of routes for the wavelength cross-connect becomes [the maximum number of routes=(the number of output ports not for adding, out of the output ports of the wavelength selective switch for dropping in the core unit)+2]. The value "+2" in the right side indicates a through (main signal) port to a route #2 through which the main signal is caused to pass as shown in FIG. 46A, and indicates a port for a route #1 in which a signal is not directly output to the input port.

Figure 47:
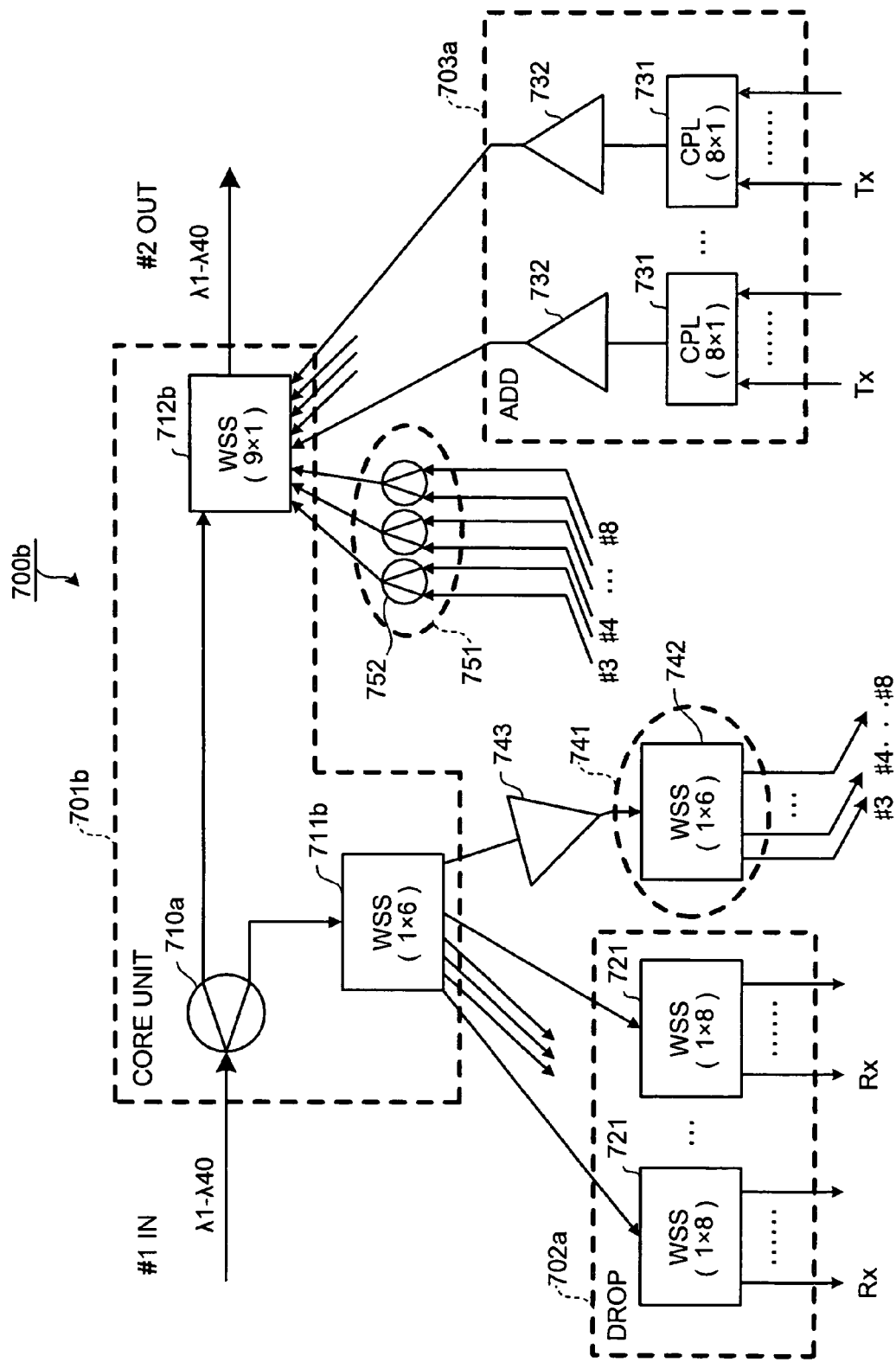
Figure 48:
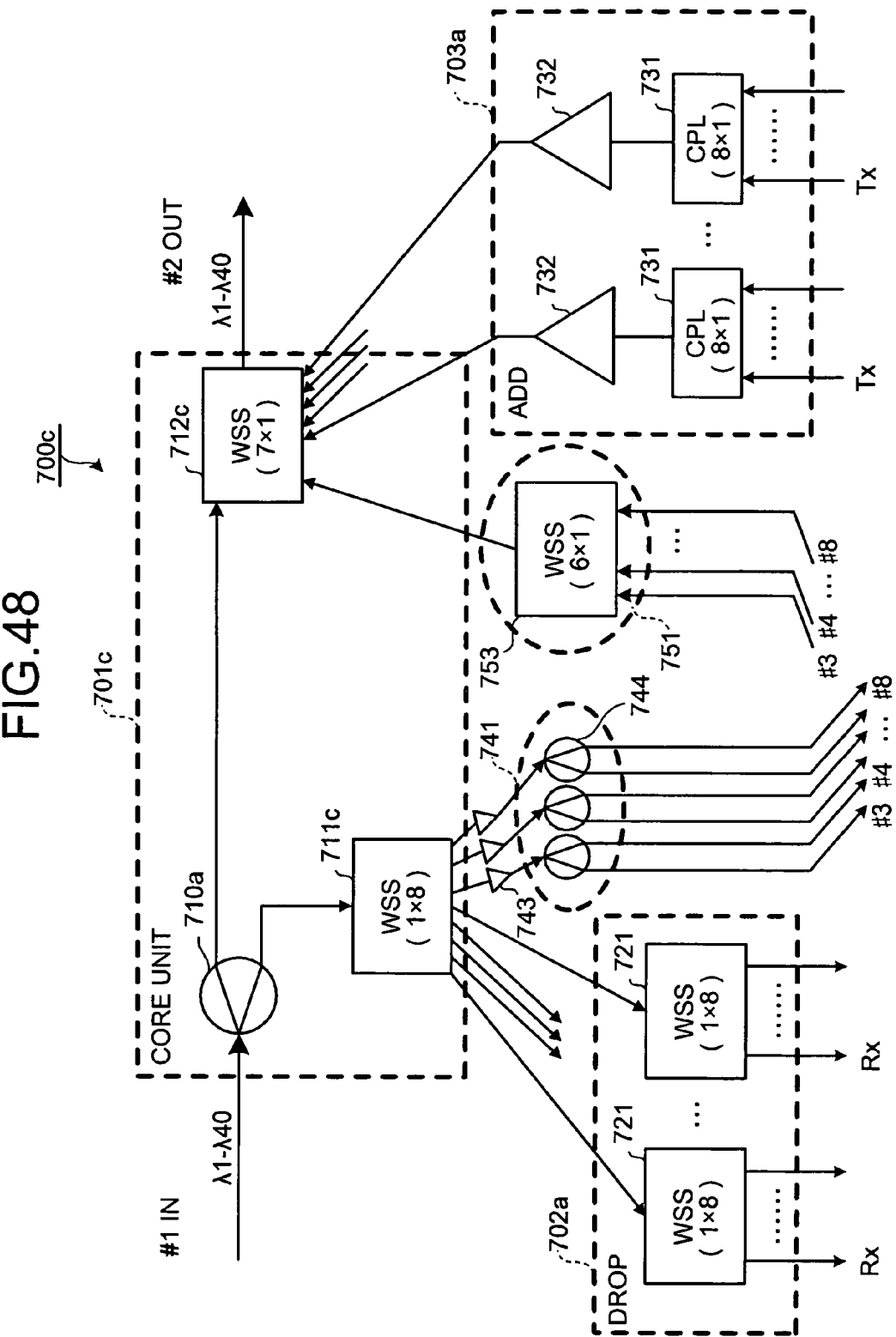

FIG. 47 and FIG. 48 are schematics for explaining expansion of ports for routes of the optical add/drop multiplexer shown in FIG. 46A. In an optical add/drop multiplexer 700b of FIG. 47 and an optical add/drop multiplexer 700c of FIG. 48, the number of ports of wavelength selective switch (WSS) in each core unit is indicated by the necessary minimum number to realize the optical add/drop function. Therefore, the number is different depending on the expansion examples. In actual cases, the optical add/drop multiplexer employs a 1×8-port wavelength selective switch (WSS) for dropping and a 9×1-port wavelength selective switch (WSS) for adding, and therefore, the optical add/drop multiplexer 700*b* and the optical add/drop multiplexer 700*c* are configured with the same core unit.

A core unit 701*b* of the optical add/drop multiplexer 700*b* of FIG. 47 includes a 1×6-port wavelength selective switch (WSS) 711*b* for dropping of which five ports in the output side are connected to the drop unit 702*a*, and a 9×1-port wavelength selective switch (WSS) 712*b* for adding of which five ports in the input side are connected to the add unit 703*a*. The number of ports for connection from the 1×6-port wavelength selective switch (WSS) 711*b* to the drop unit 702*a* and the number of ports for connection from the add unit 703*a* to the 9×1-port wavelength selective switch (WSS) 712*b* are fixed to five ports (for 40 wavelengths), respectively. It is thereby possible to drop or add all the signal lights (λ1 to λ40) multiplexed. In order to increase the number of ports for connection to routes, a 1×6-port wavelength selective switch (WSS) 742 as an expansion element 741 for output to a route is connected to one of the outputs of the 1×6-port wavelength selective switch (WSS) 711*b* for dropping. Furthermore, 2×1 optical couplers 752 as an expansion element 751 for input from a route are connected to three ports in the input side of the 9×1-port wavelength selective switch (WSS) 712*b* for adding.

As shown in FIG. 47, an optical amplifier 743 that amplifies a signal light to be output to a route is provided between the 1×6-port wavelength selective switch (WSS) 711*b* and the expansion element 741. However, the optical amplifier 743 may be provided in either one of the ports for output to and input from a route. Therefore, the optical amplifier 743 may also be provided between the expansion element 751 and the 9×1-port wavelength selective switch (WSS) 712*b*.

A core unit 701*c* of the optical add/drop multiplexer 700*c* includes a 1×8-port wavelength selective switch (WSS) 711*c* for dropping of which five ports in the output side are connected to the drop unit 702*a*, and a 7×1-port wavelength selective switch (WSS) 712*c* for adding of which five ports in the input side are connected to the add unit 703*a*. The number of ports for connection from the 1×8-port wavelength selective switch (WSS) 711*c* to the drop unit 702*a* and the number of ports for connection from the 7×1-port wavelength selective switch (WSS) 712*c* to the add unit 703*a* are fixed to five ports (for 40 wavelengths), respectively. It is thereby possible to drop or add all the signal lights (λ1 to λ40) multiplexed.

In the optical add/drop multiplexer 700*c*, three 1×2 optical couplers 744 as the expansion element 741 are connected to three ports in the output side of the 1×8-port wavelength selective switch (WSS) 711*c* for dropping, and a 6×1-port wavelength selective switch (WSS) 753 as the expansion element 751 is connected to one of the inputs of the 7×1-port wavelength selective switch (WSS) 712*c* for adding. These points are different from the optical add/drop multiplexer 700*b* (see FIG. 47). By using the optical couplers 744 for the expansion element 741, an unnecessary signal light may be input depending on a route. Therefore, the 7×1-port wavelength selective switch (WSS) 712*c* for adding in the core unit 701*c* is controlled so as to cut off the unnecessary signal light.

As explained above, in the expansion examples of FIG. 47 and FIG. 48, the expansion elements (741, 751) for routes are provided in the wavelength selective switches (WSS) for dropping and add for connection to another route, which allows independent six ports to be ensured. In other words, the wavelength cross-connect for eight routes can always be configured, irrespective of the number of wavelengths to be added or dropped. If the optical couplers (744, 752) are used for the expansion elements (741, 751), a plurality of signal lights having the same wavelength are multiplexed, which may cause signal degradation due to optical interference to occur therein. If the optical coupler is used, it is exclusively provided in either one of the expansion element 741 for output and the expansion element 751 for input, and the wavelength selective switch (WSS) is arranged in the other one of the expansion elements (741, 751) as shown in FIG. 47 or FIG. 48. As explained above, when the optical coupler is used for the expansion element (741, 751), it is also exclusively provided only in either one of the expansion elements in optical add/drop multiplexers as explained below with reference to the drawings.

FIG. 49 to FIG. 51 are schematics for explaining expansion of ports for routes of the optical add/drop multiplexer when the 1×2 optical coupler is added to the core unit. The core unit (701*d*, 701*e*, 701*f*) of each optical add/drop multiplexer as shown in FIG. 49 to FIG. 51 is obtained by adding a 1×2 optical coupler 710*b* as an expansion element 713. The optical coupler 710*b* is added between the output of the 1×2 optical coupler 710*a* to the drop unit 702*a* and the 1×7-port wavelength selective switch (WSS) 711*a* that drops a signal to the drop unit 702*a*, of the core unit 701*a* in the optical add/drop multiplexer 700*a* (see FIG. 46A).

The number of ports of the wavelength selective switch (WSS) for dropping or adding in the core unit of each of the optical add/drop multiplexers as shown in FIG. 49 to FIG. 51 is indicated by the necessary minimum number to realize the function. In actual cases, the optical add/drop multiplexer employs a 1×8-port wavelength selective switch (WSS) for dropping and a 9×1-port wavelength selective switch (WSS) for adding. Therefore, the core units (701*d*, 701*e*, 701*f*) of FIG. 49 to FIG. 51 have the same configuration as one another. The optical amplifier 743 that amplifies a signal light to be output to a route is provided between the expansion element 713 of the core unit and the expansion element 741 for routes. The optical amplifier 743 may be provided in either one of the add side and the drop side of the route.

In an optical add/drop multiplexer 700*d* of FIG. 49, a 1×5 port wavelength selective switch (WSS) 711*d* for dropping is connected to one of the outputs of the expansion element 713 in the core unit 701*d*. Furthermore, five ports in the output side of the 1×5-port wavelength selective switch (WSS) 711*d* for dropping are connected to the drop unit 702*a*. One 1×2 optical coupler 744 as the expansion element 741 for routes is connected to the other port of the expansion element 713. Five ports for input of the 8×1-port wavelength selective switch (WSS) 712*a* for adding are connected from the add unit 703*a* and two ports thereof are connected from other routes to form the wavelength cross-connect for four routes.

As explained above, the port for connection to the drop unit 702*a* is separated from the port for connection to the expansion element 741 for the routes in the core unit 701*d*. With the separation, the increase or decrease in the number of wavelengths to be added or dropped is performed mutually independently from the increase in the number of routes for the cross-connect. Furthermore, the optical coupler 744 is used for the expansion element 741, and this case is compared with the case of using the wavelength selective switch to allow simplification and cost reduction of the configuration. Moreover, if necessary, the optical amplifier 743 may be provided in the upstream or the downstream of the optical coupler 744 as the expansion element 741 so as to compensate for optical loss due to the expansion element 713 of the core unit 701*d*.

An optical add/drop multiplexer 700e of FIG. 50 includes the core unit 701e the same as that of the optical add/drop multiplexer 700d (see FIG. 49). However, the optical add/drop multiplexer 700e has a difference in that a 1×6-port wavelength selective switch 742 that serves as the expansion element 741 for routes is connected to one of the outputs of the expansion element 713, five ports in the input side of the 9×1-port wavelength selective switch (WSS) 712b for adding are connected from the add unit 703a, and three ports thereof are connected with three 2×1 optical couplers 752 that serves as the expansion element 751 with signals input from routes.

The wavelength cross-connect for eight routes is configured in the above manner, and the number of routes can further be increased. Moreover, if necessary, the optical amplifier 743 may be provided in the upstream or the downstream of the 1×6-port wavelength selective switch 742 as the expansion element 741 so as to compensate for optical loss due to the expansion element 713 of the core unit 701e.

An optical add/drop multiplexer 700f of FIG. 51 includes the core unit 701f the same as that of the optical add/drop multiplexer 700d (see FIG. 49). However, the optical add/drop multiplexer 700f has a difference in that a 1×6 optical coupler (CPL) 745 that serves as the expansion element 741 for routes is connected to one port of the expansion element 713, five ports in the input side of the 7×1-port wavelength selective switch (WSS) 712c for adding are connected from the add unit 703a, and one port thereof is connected from one 6×1-port wavelength selective switch 753 that serves as the expansion element 751.

The wavelength cross-connect for eight routes is configured in the above manner. Using the optical coupler 745 for the expansion element 741 may cause unnecessary signal light to be input depending on a route. Therefore, the 7×1-port wavelength selective switch (WSS) 712c for adding in the core unit 701f is controlled so as to cut off the unnecessary signal light. Furthermore, the 1×6 optical coupler (CPL) 745 used as the expansion element 741 for routes has a larger optical loss as compared with the 1×2 optical coupler 744 (see FIG. 49). Therefore, if the output for the routes in the same level as that of the optical add/drop multiplexers 700d and 700e is required, the optical amplifier 743 needs to be provided in the upstream or the downstream of the 1×6 optical coupler 745 so as to compensate for the optical loss.

If the optical couplers (744, 745, 752) are used for the expansion elements (741, 751), a plurality of signal lights having the same wavelength are multiplexed, which may cause signal degradation due to optical interference to occur therein. Therefore, as shown in FIG. 50 or FIG. 51, the wavelength selective switch (WSS) has to be arranged in either one of the expansion elements (741, 751).

FIG. 52 to FIG. 54 are schematics for explaining expansion of the ports for the routes of the optical add/drop multiplexer when the 1×6 optical coupler is used on the drop side. Each of core units (701g, 701h, and 701i) of the optical add/drop multiplexers as shown in FIG. 52 to FIG. 54 includes the 1×6 optical coupler 745 that serves also as the expansion element 713 in the drop side, instead of the 1×7-port wavelength selective switch (WSS) 711a for dropping of the core unit 701a in the optical add/drop multiplexer 700a (see FIG. 46A).

The number of ports of each of wavelength selective switches for dropping and add of each core unit in the optical add/drop multiplexers of FIG. 52 to FIG. 54 is the necessary required number of ports to realize the functions. A 1×8-port wavelength selective switches (WSS) for dropping and a 9×1-port wavelength selective switch (WSS) for adding are used to allow realization of the same functions. Therefore, the core units (701g, 701h, and 701i) of FIG. 52 to FIG. 54 have the configurations actually the same as one another. Furthermore, the 1×6 optical coupler has a larger optical loss as compared with the 1×2 optical coupler. Therefore, if necessary, the optical amplifier 743 may be provided in the input side of each of the wavelength selective switches 721 in the drop unit 702a so as to compensate for the optical loss.

In an optical add/drop multiplexer 700g of FIG. 52, five ports in the output side of the 1×6 optical coupler 745 as the expansion element 713 that is provided for dropping of the core unit 701g are fixed for dropping and connected to the drop unit, and the remaining one port is connected to the 1×2 optical coupler 744 as the expansion element 741 for routes. In the 8×1-port wavelength selective switch (WSS) 712a for adding, five ports in the input side thereof are connected from the add unit 703a, and two ports thereof are connected from other routes.

The drop unit 702a is separated from the expansion element 741 for routes in the above manner to configure the wavelength cross-connect for four routes. By limiting the number of routes to four, the routes can be formed independently from one another at low cost without using the wavelength selective switch (WSS) for the expansion element 741 for routes.

An optical add/drop multiplexer 700h of FIG. 53 includes the core unit 701h the same as that of the optical add/drop multiplexer 700g (see FIG. 52). However, the optical add/drop multiplexer 700f has a difference in that the 1×6-port wavelength selective switch (WSS) 742 as the expansion element 741 for routes is connected from the expansion element 713 for dropping, five ports in the input side of the 9×1-port wavelength selective switch (WSS) 712b for adding are connected from the add unit 703a, and three ports thereof are connected with 2×1 optical couplers 752 as the expansion element 751 with signals input from routes.

The wavelength cross-connect for eight routes is configured in the above manner, and the number of routes can further be increased. Furthermore, the optical amplifier 743 may be provided in the upstream or the downstream of the 1×6-port wavelength selective switch 742 as the expansion element 741 so as to compensate for optical loss due to the expansion element 713 of the core unit 701h.

An optical add/drop multiplexer 700i of FIG. 54 includes the core unit 701i the same as that of the optical add/drop multiplexer 700g (see FIG. 52). However, the optical add/drop multiplexer 700i has a difference in that the 1×6 optical coupler 745 as the expansion element 741 for routes is connected from the expansion element 713 for dropping, five ports in the input side of the 7×1-port wavelength selective switch (WSS) 712c for adding are connected from the add unit 703a, and one port thereof is connected with the 6×1-port wavelength selective switch (WSS) 753 as the expansion element 751 with signals input from routes.

The wavelength cross-connect for eight routes is configured in the above manner. Using the optical coupler 745 for the expansion element 741 may cause unnecessary signal light to be input depending on a route. Therefore, the 7×1-port wavelength selective switch (WSS) 712c for adding in the core unit 701i is controlled so as to cut off the unnecessary signal light. Furthermore, if necessary, the optical amplifier 743 may be provided in the upstream or the downstream of the 1×6 optical coupler (CPL) 745 as the expansion element 741 so as to compensate for optical loss due to the expansion element 713 in the core unit 701i.

If the optical couplers (744, 745, 752) are used for the expansion elements (741, 751), a plurality of signal lights having the same wavelength are multiplexed, which may cause signal degradation due to optical interference to occur therein. Therefore, as shown in FIG. 53 or FIG. 54, the wavelength selective switch (WSS) is arranged in either one of the expansion elements (741, 751).

An optical coupler, a matrix switch, or a grouping filter, instead of the wavelength selective switch, may be used for the drop unit 702a in each of the optical add/drop multiplexer of FIG. 47 to FIG. 53. Furthermore, a wavelength selective switch, a matrix switch, or a grouping filter, instead of the optical coupler, may be used for the add unit 703a therein.

FIG. 55 to FIG. 56 are schematics for explaining expansion of the ports for the routes based on ROADM. In all of the optical add/drop multiplexers of FIG. 46A to FIG. 54, the functions are based on add and drop of an arbitrary wavelength as the DOADM. Optical add/drop multiplexers 700j and 700k as shown in FIG. 55 and FIG. 56 are formed as the ROADM, and add and drop a signal light having a fixed wavelength. In this case, a fixed wavelength device such as the AWG is used as an optical demultiplexer for adding or dropping to allow signals of all wavelengths to be added or dropped by a single device.

Therefore, in the configuration based on the ROADM, more ports out of ports of a 4×1-port wavelength selective switch (WSS) 712j for adding in a core unit 701j can be assigned for routes. FIG. 55 and FIG. 56 depict the necessary minimum number of ports to realize the functions. In actual cases, the optical add/drop multiplexers (700j, 700k) employ a 9×1-port wavelength selective switch (WSS) for adding. Therefore, the core unit 701j of FIG. 55 and a core unit 701k of FIG. 56 are configured with the same core unit.

The optical add/drop multiplexer 700j of FIG. 55 includes the core unit 701j, a drop unit 702j, and an add unit 703j. The core unit 701j includes the 1×2 optical coupler 710a, the 1×2 optical coupler 710b as the expansion element 713 that is connected to one port of the 1×2 optical coupler 710a and is used for connection for dropping, and a 4×1-port wavelength selective switch (WSS) 712j for adding connected to the other port of the 1×2 optical coupler 710a. A drop unit 702j including an optical demultiplexer 722 is connected to one port of the 1×2 optical coupler 710b as the expansion element 713, and the 1×2 optical coupler 744 as the expansion element 741 for routes is connected to the other port thereof. One port in the input side of the 4×1-port wavelength selective switch (WSS) 712j for adding is connected from the add unit 703j including an optical multiplexer 733, and two ports thereof are connected from other routes.

The wavelength cross-connect for four routes is configured in the above manner. The expansion element 713 in the core unit 701j separates the signal connected to the drop unit 702j from the signal connected to routes. Furthermore, the routes are limited to four to allow the functions to be realized with simple configuration so that the signal light for the routes is less attenuated.

The optical add/drop multiplexer 700k of FIG. 56 includes a core unit 701k the same as that of the optical add/drop multiplexer 700j (see FIG. 55). However, the optical add/drop multiplexer 700k has a difference in that the 1×6 optical coupler (CPL) 745 as the expansion element 741 for routes is connected to the core unit 701k, one port in the input side of the 8×1-port wavelength selective switch (WSS) 712a is connected from the add unit 703j, and six ports thereof are connected from other routes.

The wavelength cross-connect for eight routes is configured in the above manner. Using the optical coupler 745 for the expansion element 741 may cause unnecessary signal light to be input depending on a route. Therefore, the 8×1-port wavelength selective switch (WSS) 712a for adding in the core unit 701k is controlled so as to cut off the unnecessary signal light. Furthermore, the optical amplifier 743 may be provided to compensate for optical loss due to the 1×6 optical coupler (CPL) 745 provided in the upstream or the downstream of the expansion element 741.

As explained above, the optical add/drop multiplexers 700j and 700k of FIG. 55 and FIG. 56 need only one port each for connection to the add unit and the drop unit, unlike the configuration based on the DOADM, which makes it possible to realize the function at low cost because there is no need to provide the wavelength selective switch (WSS) for the expansion element 741 for routes. Furthermore, as compared with the core units (701d, 701e, 701f) of the optical add/drop multiplexers 700d, 700e, and 700f, each of the core units (701d, 701e, 0701f) has a difference in that the 1×5 port wavelength selective switch (WSS) 711d is added to one port in the output side of the 1×2 optical coupler 710b as the expansion element 713 for dropping (see FIG. 49 to FIG. 51). Therefore, referring to a main signal passing from #1 in to #2 out, a signal input from another route, or a signal output to another route, it is possible to perform the function expansion (in-service upgrade) from the optical add/drop multiplexers 700j and 700k to the optical add/drop multiplexers 700d, 700e, and 700f without disconnecting the signals.

In the expansion examples of each port for WXC routes of the optical add/drop multiplexers as explained with reference to FIG. 47 to FIG. 56, the number of routes can be fixed and ensured, and the port for WXC route can be expanded without disconnecting the through path passing from the input port to the output port of the optical add/drop multiplexer.

FIG. 57 is a schematic for explaining expansion of the ports for the routes of the optical add/drop multiplexer when the 1×2 optical coupler is added to the core unit. The core unit of each optical add/drop multiplexer is shown in FIG. 57. The core unit of each optical add/drop multiplexer shown in FIG. 57 is obtained by adding a 1×2 coupler C2 as an expansion element 713. The optical coupler C2 is added between the output of the 1×2 optical coupler C1 and each of the unit D1 for dropping and the unit D2 to other routes. The number of port of AWG for dropping or adding in the core unit of each of the optical add/drop multiplexer shown FIG. 57 is indicated by the necessary minimum number to realize the function.

In the drop unit D1, the AWG AWG1 for dropping is connected to one of the outputs of the expansion element C2. Each port in the output side of the AWG AWG1 for dropping is connected to the receiver for dropping. The 1×N WSS WSS1 is connected to one of the outputs of the expansion element C2. Each port of the 1×N WSS WSS1 is connected to other routes to form the wavelength cross-connect. Here, these ports to realize the wavelength cross-connect carry out the function for dropping.

As explained above, the port for connection to the drop unit D1 is separated from the port for connection to other routes. With the separation, the increase or decrease in the number of wavelengths to be added or dropped is performed independently from the increase or decrease in the number of routes for the wavelength cross-connect. Furthermore, to use the AWG for dropping and adding allow simplification and cost reduction of the node configuration.

FIG. 58 is a schematic for illustrating expansion of the ports for the routes of the optical add/drop multiplexer when the 1×2 optical coupler is added to the core unit. The core unit of each optical add/drop multiplexer is shown in FIG. 58. The core unit of each optical add/drop multiplexer shown in FIG. 58 is obtained by adding a 1×2 coupler C2 as an expansion element 713. The optical coupler C2 is added between the output of the 1×2 optical coupler C1 and each of the drop unit D1 and D2. The number of port of the wavelength selective switch (WSS) for dropping or adding in the core unit of each of the optical add/drop multiplexer shown FIG. 2 is indicated by the necessary minimum number to realize the function. In actual case, the optical add/drop multiplexer employs a 1×N-port WSS for dropping and an M×1-port WSS for adding.

In the drop unit D1 shown in FIG. 58, a 1×N port WSS WSS1 for dropping is connected to one of the outputs of the expansion element C2. Each port in the output side of the 1×N WSS WSS1 for dropping is connected to the receiver. The 1×N WSS WSS2 is connected to one of the outputs of the expansion element C2. Some ports of the 1×N WSS WSS2 are connected to the receiver for dropping, and other ports are connected to other routes to form the wavelength cross-connect. Here, these ports to realize the wavelength cross-connect carry out the function for dropping.

As explained above, the port for connection to the drop unit D1 is separated from the port for connection to other routes. In the case of the DOADM function, the number of required drop signals up to N can prepare only the 1×N WSS WSS1. When the number of required drop signals is over N, it is possible to realize the configuration by arranging the empty port of 1×N WSS WSS2 to other routes. It is possible to realize the dropping and adding configuration corresponding to the required the number of wavelengths (ports) by a minimum composition. Furthermore, it is possible to realize the configuration to routes other network by a minimum composition in proportion to the number of demands.

As explained above, according to the optical add/drop multiplexers, the device is configured with minimum components upon initial introduction when a small number of wavelengths are to be dropped and added. Thereafter, when the multiple wavelengths are to be dropped and added and the number of routes is increased, a configuration corresponding to each case is added to allow the function expansion. In this case, there is no need to replace the add unit with another one through which a transmission signal passes. This allows the in-service upgrade such that the function is expanded without disconnecting a transmission signal.

According to the present invention, it is possible to expand the optical add/drop function corresponding to the change in network requirements.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical add/drop multiplexer for switching a optical path, and dropping or adding a channel that has a predetermined wavelength, the optical path for changing an input signal that has multiplexed wavelengths and that is input to an input port, to an output signal for each wavelength, the output signal being led to output ports for a plurality of routes in each transmission path, the optical add/drop multiplexer comprising:
a first core unit that includes
a through path that lets the input signal pass through to the output port;
a drop port for dropping the input signal that has a predetermined wavelength; and
an add port for adding the channel to the input signal; and
a second core unit that includes
a first wavelength selective switch that is connected to the drop port, that demultiplexes the input signal dropped from the drop port for each wavelength, and that outputs a plurality of arbitrarily selected signals that are formed as a result of demultiplexing,
a second wavelength selective switch that is connected to the add port, that multiplexes a plurality of arbitrarily selected signals having a plurality of wavelengths to form a multiplexed signal that is output to the add port;
a drop unit that receives an output from the first wavelength selective switch and outputs a plurality of signals that are formed as a result of demultiplexing; and
an add unit that multiplexes signal light that has a plurality of wavelengths, the signal light being added to the second wavelength selective switch.

2. The optical add/drop multiplexer according to claim 1, wherein
the first wavelength selective switch is connected to a wavelength cross-connect.

3. The optical add/drop multiplexer according to claim 1, wherein the second wavelength selective switch is connected to a wavelength cross-connect.

4. The optical add/drop multiplexer according to claim 1, wherein the first core unit includes
a 1×N optical coupler that receives the input signal and hat has N pieces of output ports, where 1 is the number of input, and N is a positive integer and represents the number of output;
an M×1 optical coupler that has M pieces of input ports and that outputs the input signal as the output signal, where M is a positive integer and represents the number of input, and 1 is the number of output;
a through path that is formed by connecting one of the output ports of the 1×N optical coupler to one of the input ports of the M×1 optical coupler; and
a wavelength blocker that is provided in the through path.

5. The optical add/drop multiplexer according to claim 1, wherein the first core unit includes
a 1×N optical coupler that receives the input signal and that has N pieces of output ports, where 1 is the number of input, and N is a positive integer and represents the number of output;
an M×1 optical coupler that has M pieces of input ports and that outputs the input signal as the output signal, where M is a positive integer and represents the number of input, and 1 is the number of output; and
a through path that is formed by connecting one of the output ports of the 1×N optical coupler to one of the input ports of the M×1 optical coupler; and
in the second core unit
the first wavelength selective switch is a 1×N wavelength selective switch that is connected to one of the output ports of the 1×N optical coupler and that has N pieces of drop ports; and
the second wavelength selective switch is an M×1 wavelength selective switch that is connected to one of the input ports of the M×1 optical coupler and that has M pieces of add ports.

6. The optical add/drop multiplexer according to claim 1, wherein the drop port is included in a drop unit that includes any one of an optical demultiplexer for a fixed wavelength, a 1×N wavelength selective switch, where 1 is the number of input, and N is a positive integer and represents the number of output, a grouping filter, an optical coupler, and a wavelength variable filter.

7. The optical add/drop multiplexer according to claim 1, wherein the add port is included in an add unit that includes any one of an optical multiplexer for a fixed wavelength, an M×1 wavelength selective switch, where M is a positive integer and represents the number of input, and 1 is the number of output, a grouping filter, and an optical coupler.

8. The optical add/drop multiplexer according to claim 6, wherein the grouping filter is an interleaver, and limitation on the number of wavelengths for use when using the grouping filter is resolved.

9. The optical add/drop multiplexer according to claim 7, wherein the grouping filter is an interleaver, and limitation on the number of wavelengths for use when using the grouping filter is resolved.

10. The optical add/drop multiplexer according to claim 6, wherein the grouping filter is a band division filter, and limitation on the number of wavelengths for use when using the grouping filter is resolved.

11. The optical add/drop multiplexer according to claim 7, wherein the grouping filter is a band division filter, and limitation on the number of wavelengths for use when using the grouping filter is resolved.

12. The optical add/drop multiplexer according to claim 6, wherein the grouping filter is an arrayed waveguide grating, and limitation on the number of wavelengths for use when using the grouping filter is resolved.

13. The optical add/drop multiplexer according to claim 7, wherein the grouping filter is an arrayed waveguide grating, and limitation on the number of wavelengths for use when using the grouping filter is resolved.

* * * * *